US007751975B2

(12) United States Patent
Allen et al.

(10) Patent No.: US 7,751,975 B2
(45) Date of Patent: Jul. 6, 2010

(54) MULTILANE VEHICLE INFORMATION CAPTURE SYSTEM

(75) Inventors: Jim Allen, Wetumpka, AL (US); Sheng Zhong, Montgomery, AL (US); Raghavan Venugopal, Montgomery, AL (US); Tiegang Xie, Montgomery, AL (US); Fajie Sun, Montgomery, AL (US); Sangmesh Reddy, Montgomery, AL (US); Brijesh Rai Chawla, Montgomery, AL (US); Balaraju Banna, Montgomery, AL (US); Shyamnath Harinath, Montgomery, AL (US)

(73) Assignee: United Toll Systems, Inc., Sarasota, FL (US)

( * ) Notice: Subject to any disclaimer, the term of this patent is extended or adjusted under 35 U.S.C. 154(b) by 26 days.

(21) Appl. No.: 12/172,040

(22) Filed: Jul. 11, 2008

(65) Prior Publication Data

US 2009/0174576 A1 Jul. 9, 2009

Related U.S. Application Data

(60) Division of application No. 11/138,271, filed on May 27, 2005, which is a continuation-in-part of application No. 10/953,858, filed on Sep. 30, 2004, now Pat. No. 7,071,840, which is a continuation of application No. 10/206,972, filed on Jul. 30, 2002, now Pat. No. 6,864,804, which is a continuation-in-part of application No. 10/098,131, filed on Mar. 15, 2002, now abandoned, which is a continuation-in-part of application No. 09/977,937, filed on Oct. 17, 2001, now Pat. No. 7,136,828.

(60) Provisional application No. 60/574,996, filed on May 28, 2004, provisional application No. 60/574,997, filed on May 28, 2004, provisional application No. 60/574,998, filed on May 28, 2004, provisional application No. 60/574,999, filed on May 28, 2004.

(51) Int. Cl.
*G05D 1/02* (2006.01)
*G05D 1/03* (2006.01)

(52) U.S. Cl. .................................... 701/300; 701/302

(58) Field of Classification Search ......... 701/117–119, 701/300–302; 340/988, 933, 941, 943, 928, 340/907, 435–436

See application file for complete search history.

(56) References Cited

U.S. PATENT DOCUMENTS 5,805,082 A * 9/1998 Hassett ...................... 340/928

(Continued)

*Primary Examiner*—Yonel Beaulieu
(74) *Attorney, Agent, or Firm*—Pillsbury Winthrop Shaw Pittman LLP

(57) ABSTRACT

A system and method for accurate express tolling of highway vehicles. A multilane tolling system comprises a tolling (MVIC) unit that collects information from tolling subsystems arranged to take various vehicle measurements. Preferably, an intelligent vehicle identification subsystem sends vehicle information to the MVIC unit many times per second. Preferably, a vision tracking system (VTS) communicates with the MVIC unit and sends the latter information about the vehicle position using vision tracking sensors. Preferably, an RF subsystem conducts multiple reads of a transponder on a passing vehicle and forwards the read information to the MVIC unit. Preferably, a vehicle image capture unit (VICU) captures images of the passing vehicle when a camera in the VICU receives a trigger from the MVIC unit. Preferably, a driver alert module is used alert a driver passing through a tolling point as to account balance associated with a silent toll tag or pay by plate system.

13 Claims, 155 Drawing Sheets

U.S. PATENT DOCUMENTS 6,204,778 B1 * 3/2001 Bergan et al. ............... 340/936
6,865,518 B2 * 3/2005 Bertrand et al. ............. 702/189

* cited by examiner

KNOWN ART

KNOWN ART

KNOWN ART

KNOWN ART

KNOWN ART

KNOWN ART

KNOWN ART

KNOWN ART

KNOWN ART

KNOWN ART

KNOWN ART

KNOWN ART

KNOWN ART

SECTION A-A

MULTILANE VEHICLE INFORMATION CAPTURE SYSTEM

RELATED APPLICATIONS

This application is a Divisional application under 35 U.S.C. §121 of co-pending U.S. application Ser. No. 11/138,271, filed May 27, 2005, which is a continuation-in-part ("CIP") application of U.S. patent application Ser. No. 10/953,858, filed Sep. 30, 2004, now U.S. Pat. No. 7,071,840, which is a continuation of U.S. patent application Ser. No. 10/206,972 filed Jul. 30, 2002, now U.S. Pat. No. 6,864,804, which is a CIP application of U.S. patent application Ser. No. 10/098,131, filed Mar. 15, 2002, now abandoned, which is a CIP application of U.S. patent application Ser. No. 09/977,937, filed Oct. 17, 2001, now U.S. Pat. No. 7,136,828, all of which are incorporated by reference herein in their entirety. This application further claims the benefit of priority of the filing dates of U.S. provisional Application Nos. 60/574,996, 60/574,997, 60/574,998, and 60/574,999, all filed May 28, 2004, the contents of which are also incorporated herein by reference.

This The above patent and all the above applications are incorporated herein by reference in their entirety.

BACKGROUND

1. Field of the Invention

The present invention relates generally to detection, identification, and classification of metallic objects, and more particularly, to a system and method for using ferromagnetic loops to identify and classify vehicles.

2. Background of the Invention

A typical automatic toll collection system for a highway involves the use of a toll collection station or toll booth positioned between each lane of traffic. Vehicles driving on the highway must pass through a toll lane alongside the toll collection station.

The passage of vehicles by the toll collection stations is monitored with a combination of loop detectors, treadles, or other such devices capable of detecting passing vehicles. These devices provide vehicle classification information after the vehicle has passed a payment point. Although these devices can be used for audit purposes, they do not address the potential for error when an attendant makes a mistake, nor do they address the ability to properly classify all transactions.

In early toll collection systems, attendants were employed to manually collect fares from the operators of vehicles and to regulate the amount of tolls. Utilizing attendants to collect fares involves numerous problems including, but not limited to, the elements of human error, inefficiencies, traffic delays resulting from manually collected tolls, employment costs of toll attendants, and embezzlement or theft of collected toll revenues. As a result, devices have been developed to automatically operate toll collection systems without the need for toll attendants. In these systems, the toll fees paid can be based on a combination of the number of axles on a vehicle as well as a set price per vehicle.

However, known tolling systems designed to operate without a toll booth attendant intervention are typically based on several heterogeneous components that are not optimized to work together.

One example of a toll system that can collect tolls of different toll rates from different classes or categories of vehicles without user intervention is described in the '937 application. The '937 application discloses an intelligent vehicle identification system (IVIS) that includes one or more inductive loops. The inductive loops disclosed in the '937 application includes signature loops, wheel assembly loops, intelligent queue loops, wheel axle loops, gate loops, vehicle separation loops, and enforcement loops.

The '972 application discloses additional designs, configurations, installation, and other characteristics associated with the loops previously disclosed in the '937 application. In other words, a ferromagnetic loop in accordance with the teaching of the '972 application can be adapted to be utilized as one or more of the loops disclosed in the '937 application. Of course, the ferromagnetic loops of the '972 application have applications beyond those in the toll road context and those disclosed in the '937 application. For example, the ferromagnetic loops of the '937 application can be adapted to serve various purposes including traffic law enforcement, traffic surveys, traffic management, detection of concealed metallic objects, treasure hunting, and the like.

The present CIP application provides additional description to the '972 application, and claims additional aspects of the invention disclosed in the '972 application.

SUMMARY OF THE INVENTION

A ferromagnetic loop of the present invention has many applications. For example, it can be used to detect metallic objects, sensing moving vehicles, and classifying vehicles for toll road applications. A preferred embodiment of the ferromagnetic loop is characterized by a continuous wire. Preferably, the continuous wire is shaped in a serpentine manner. Preferably, the continuous wire is shaped in the serpentine manner on a plane having a footprint. The footprint has an axis. A frequency associated with the ferromagnetic loop is affected when there is a relative motion between the ferromagnetic loop and a metallic object along the axis of the footprint. For example, the frequency fluctuates when the object moves along the axis above the ferromagnetic loop. Similarly, the frequency can fluctuate if the ferromagnetic loop moves in a direction along the axis above the object.

The footprint can take one of several shapes. For example, the footprint can be one of a triangle, a rectangle, a square, a circle, an ellipse, a rhombus, a parallelogram, and the like. Preferably, the continuous wire forms multiple contiguous polygons within the footprint. Preferably, each of the multiple contiguous polygons can assume one of several shapes. For example, each of the contiguous polygons can be one of a rectangle, a square, a rhombus, a parallelogram, and the like. Preferably, there are at least three contiguous polygons within the footprint. The contiguous polygons may be parallel, perpendicular, or at an angle with respect to the axis of footprint.

Each of the multiple contiguous polygons is associated with a spacing dimension. The spacing dimension may be constant for all the contiguous polygons. Alternatively, there may be different spacing dimensions among the polygons. For example, the spacing dimensions of the contiguous polygons may demonstrate a gradient characteristic as shown in loop 4900 in FIG. 49.

In a specific implementation for vehicle detection applications, the present invention provides a ferromagnetic loop that is installed on a travel path for detection of vehicles moving in a direction along the travel path. In the specific implementation as shown in FIG. 27, ferromagnetic loop 2700 is characterized by continuous wire 2702, which is shaped in a serpentine manner within footprint 2704. Footprint 2704 has footprint length dimension 2706, which is parallel to direction 2710 and footprint width dimension 2708, which is perpendicular to direction 2710. Continuous wire 2702 forms multiple contiguous polygons 2712 within footprint 2704.

Each of multiple contiguous polygons 2712 is characterized by polygon length dimension 2716 that is parallel to direction 2710 and polygon width dimension 2718 that is perpendicular to direction 2710. Polygon length dimension 2716 is also known as the spacing dimension. A frequency associated with ferromagnetic loop 2700 is affected when a vehicle (not shown) moves across footprint 2704 in direction 2710. The detection of the vehicle can be done using loop detector 2720, which is connected to continuous wire 2702 via lead-in 2714.

In one embodiment, each of polygon width dimensions 2718 is substantially equal to footprint width dimension 2708 and a sum of all the polygon length dimensions 2716 is substantially equal to footprint length dimension 2706. In a different embodiment, any of polygon length dimensions 2716 is as long as any other polygon length dimensions 2716. In still a different embodiment, one or more of polygon length dimensions 2716 is longer than at least one other polygon length dimension 2716. In other words, the spacing dimension 2716 between any two contiguous polygons may be the same or vary.

In a different preferred embodiment of the ferromagnetic loop shown in FIG. 49A, ferromagnetic loop 4910 includes left loop 4912 and right loop 4914. Left loop 4912 is characterized by a left footprint with a left length dimension parallel to the direction and a left width dimension perpendicular to the direction. Similarly, the right loop is characterized by a right footprint with a right length dimension parallel to the direction and a right width dimension perpendicular to the direction. Left loop 4912 and the right loop 4914 are part of a continuous wire that is characterized by overall footprint 4920 having overall length dimension 4922 parallel to the direction and overall width dimension 4924 perpendicular to the direction. Left loop 4912 and right loop 4912 are located offset relative to each other such that a sum of the left length dimension and the right length dimension equals overall length dimension 4922, and a sum of the left width dimension and the right width dimension equals overall width dimension 4924. When a vehicle moves in the direction over the ferromagnetic loop, a left portion of the vehicle's wheel assembly affects a first frequency associated with left loop 4912 and a right portion of the vehicle's wheel assembly affects a second frequency associated with right loop 4914. Each of left loop 4912 and right loop 4914 can assume one of several shapes. For example, the shape for each of the left loop and the right loop can be one of a rectangle, a square, a rhombus, a parallelogram, and the like.

In another embodiment shown in FIG. 49B, the present invention provides a different loop array 4950 for detection of vehicles moving in a direction. Loop array 4950 includes front loop 4952 and rear loop 4954. Each of front loop 4952 and rear loop 4954 is associated with a frequency that is quantifiable by loop detector 4902 in communication with loop array 4950. The frequency associated with each of front loop 4952 and rear loop 4954 is affected when a vehicle moves across each of front loop 4952 and rear loop 4954 in direction 4906. Preferably, at least one of front loop 4952 and rear loop 4954 is characterized by multiple contiguous polygons. Preferably, at least one of front loop 4952 and rear loop 4954 is characterized by a continuous wire shaped in a serpentine manner to form the multiple contiguous polygons. Preferably, at least one of front loop 4952 and rear loop 4954 is characterized by a footprint having a loop length dimension and a loop width dimension, and each of the multiple polygons associated with the loop is characterized by a polygon length dimension and a polygon width dimension. Preferably, the sum of all polygon length dimensions is substantially equal to the loop length dimension, and each of the polygon length dimensions is substantially equal to the loop length dimension.

The present invention further provides methods for installing a ferromagnetic loop for detection of vehicles. A preferred method includes the step of providing a web of grooves on a traveling lane. The web of grooves is characterized by multiple contiguous polygons. The method further includes the step of laying a continuous wire in a serpentine manner within the web of grooves. The method also includes the step of securing the continuous wire within the web of grooves using a bonding agent. Preferably, the method can further include the step of laying the continuous wire at least two turns in at least one groove of the web of grooves. Preferably, the at least two turns are laid side-by-side within the at least one groove. Preferably, the web of grooves has a spacing between any two parallel grooves. The spacing may be from about three inches to about eight inches. Furthermore, the web of grooves may have a gradient spacing between the parallel grooves. The gradient spacing can range from between about three inches and about eight inches.

The present invention further includes a method for preparing a ferromagnetic loop. The method includes the step of pre-forming a continuous wire shaped in a serpentine manner to form multiple contiguous polygons. The method also includes the step of attaching one or more fasteners along the continuous wire to maintain the multiple contiguous polygons. The fasteners are adapted to maintain the multiple contiguous polygons. The method can further include the step of providing at least two turns of the continuous wire to form at least one of the multiple contiguous polygons. The at least two turns of the continuous wire are preferably arranged side-by-side.

SUMMARY OF THE INVENTION

DETAILED DESCRIPTION OF THE INVENTION

Overview of the '937 Application

It is noted the present invention can be adapted for a large number of different applications. For example, the profile information generated by a classification loop array using the present invention can be used in traffic management and analysis, traffic law enforcement, and toll collection.

Figure 1:
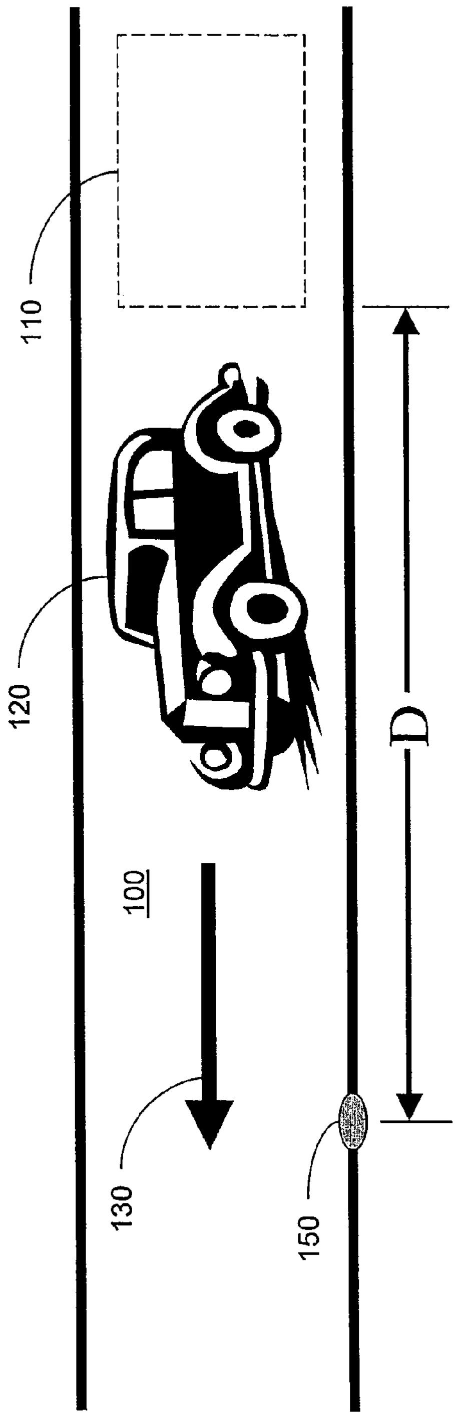
FIG. 1 is a schematic diagram illustrating a vehicle traveling through a path on which a classification loop array of the present invention is located.

FIG. 1 is a schematic diagram illustrating a preferred location of classification loop array 110 of the present invention on the surface of path 100. Path 100 can be, for example, a toll lane, a roadway, an entrance to a parking lot, or any stretch of surface on which vehicle 120 travels in direction 130. Classification loop array 110 is located at a distance D upstream from device 150 along path 100.

Classification loop array 110 comprises at least one signature loop and at least one wheel assembly loop. Briefly, the signature loop is adapted to indicate changes in electromagnetic field which can be processed to produce initial signature information as it detects the presence of vehicle 120 over it. The initial signature information represents changes of inductance which can be interpreted to identify, among other characteristics of vehicle 120, a speed of the vehicle, an axle separation of the vehicle, and a chassis height of the vehicle. The wheel assembly loop is adapted to indicate changes in electromagnetic field which can be processed to produce wheel assembly information as it detects the presence of vehicle 120 over it. The wheel assembly information represents changes of inductance which can be interpreted to identify, among other attributes of vehicle 120, the axle count and the axle separation with increased accuracy and details. Specifically, the wheel assembly loop can detect, among other things, the separation between two successive wheels of vehicle 120 that is traveling in direction 130. The initial signature information and the wheel assembly information, collectively, are also known as profile information of the vehicle.

Device 150 is in communication with classification loop array 110. As discussed below, device 150 can be one of many different devices that can be used in conjunction with classification loop array 110. Although device 150 is shown in FIG. 1 to be located downstream of classification loop array 110 in direction 130, device 150 can be located elsewhere, for example, at a position upstream of classification loop array 110. In another example, device 150 can located next to classification loop array 110. In still another example, device 150 can be at a remote location. Distance D can be any distance depending on specific applications. In a toll collection application in which path 100 is a toll lane, distance D can be between zero and 110 feet. Preferably, distance D is about 65 feet. It is noted that a length of 65 feet is slightly longer than then the length of a typical tractor trailer. The distance D should be increased to about 85 feet to 110 feet for toll lanes that are adapted to accommodate tractor-trailers towing double trailers. Similarly, the distance D can be shorter than 65 feet if tractor trailers are not expected to use path 100.

In a traffic management and analysis application, classification loop array 110 can be arranged such that it can be used to sense movement of vehicle 120 along path 100 in direction 130. For example, path 100 can be a specific stretch of a highway. In this application, device 150 can be, for example, a computer adapted to perform statistical analysis based on data collected by classification loop array 110. Device 150 can, for example, use the data collected by classification loop array 110 to determine the types of vehicles that use the highway, the number of vehicles passing that point each day, the speed of the vehicles, and so on.

In a traffic law enforcement application, classification loop array 110 can be used in conjunction with other devices. For example, device 150 can be a camera that is positioned to take a photograph of the license plate of vehicle 120 if classification loop array 110 detects a speed of vehicle 120 exceeding a speed limit. In still another example, path 100 is a restricted lane that prohibits large vehicles such as tractor trailers and device 150 is a camera used to capture an image of the license plate of vehicle 120 if classification loop array 110 detects the presence of a tractor trailer in path 100.

In a toll collection application in which device 150 is a payment point (e.g., an automated toll collection mechanism), profile information associated with vehicle 120 that is collected by classification loop array 110 can be used to classify vehicle 120 before it arrives at the payment point. The classification can then be used to notify an operator of vehicle 120 about an appropriate fare associated with the classification. In this toll collection application, vehicle 120 is classified and the appropriate fare is determined before it arrives at device 150. More importantly, the classification is made without input from a toll attendant, thereby eliminating human errors associated with classification of vehicles. When vehicle 120 arrives at device 150, the appropriate fare can be collected from the operator. It is noted that device 150 can be replaced by a toll attendant even though in this application the toll attendant does not classify vehicle 120 to determine the fare. In the toll collection application of the present invention, it is preferable that vehicle 120 clears classification loop array 110 (i.e., the entire vehicle 120 must clear classification loop array 110 before vehicle 120 reaches device 150.

Preferred Embodiments for Implementation in a Toll Lane

Figure 1A:
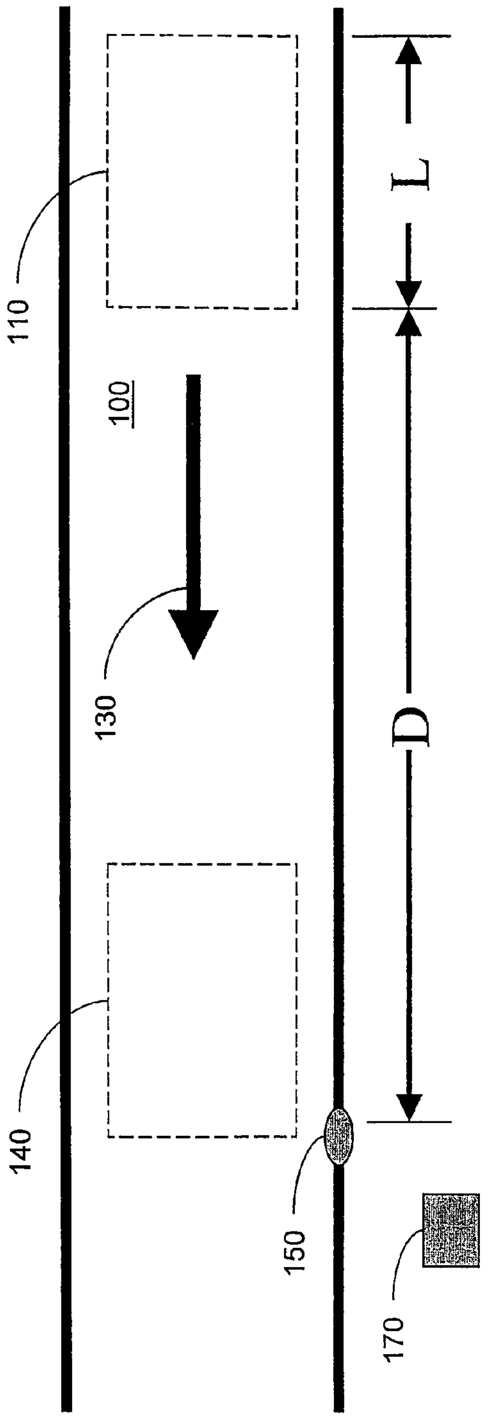
FIG. 1A is a schematic diagram illustrating preferred locations of a classification loop array and an intelligent queue loop.

FIG. 1A is a schematic diagram illustrating the layout of components of another preferred embodiment of the present invention. In this preferred embodiment, path 100 is a toll lane on which vehicle 120 travels in direction 130. Device 150 is a payment point. Classification loop array 110 is located at a distance D upstream of device 150. At or near device 150, intelligent queue loop 140 is located on toll lane 100 downstream of classification loop array 110. Intelligent vehicle identification unit 170 is in communication with classification loop array 110, intelligent queue loop 140, and device 150.

Preferably, classification loop array 110 has a length and a width. The width is preferably wide enough so that no vehicle can travel on toll lane 100 without being detected by classification loop array 110. The length, indicated in FIG. 1A as length L, is preferably between about three and thirty feet. Preferably, classification loop array 110 comprises at least one signature loop that measures six feet by six feet. Intelligent queue loop 140 preferably has a length and width that is similar to the signature loop. In other words, intelligent queue loop 140 is also preferably six feet by six feet.

In this embodiment, the signature loop (not shown in FIG. 1A) of classification loop array 110 is adapted to indicate changes in electromagnetic field which can be processed to produce initial signature information of vehicle 120. Intelligent queue loop 140 is adapted to indicate changes in electromagnetic field which can be processed to produce subsequent signature information of vehicle 120. The initial and subsequent signature information of a common vehicle exhibit similar characteristics on a inductance vs. time plot. Exemplary inductance vs. time plots are shown in FIGS. 6-7, 9-11, 13, and 21-25. The Y-axis represents a unit of inductance and the X-axis represents a unit of time. Preferably, the unit of inductance is in kilo-henrys and the unit of time is in milli-seconds.

Figure 8:
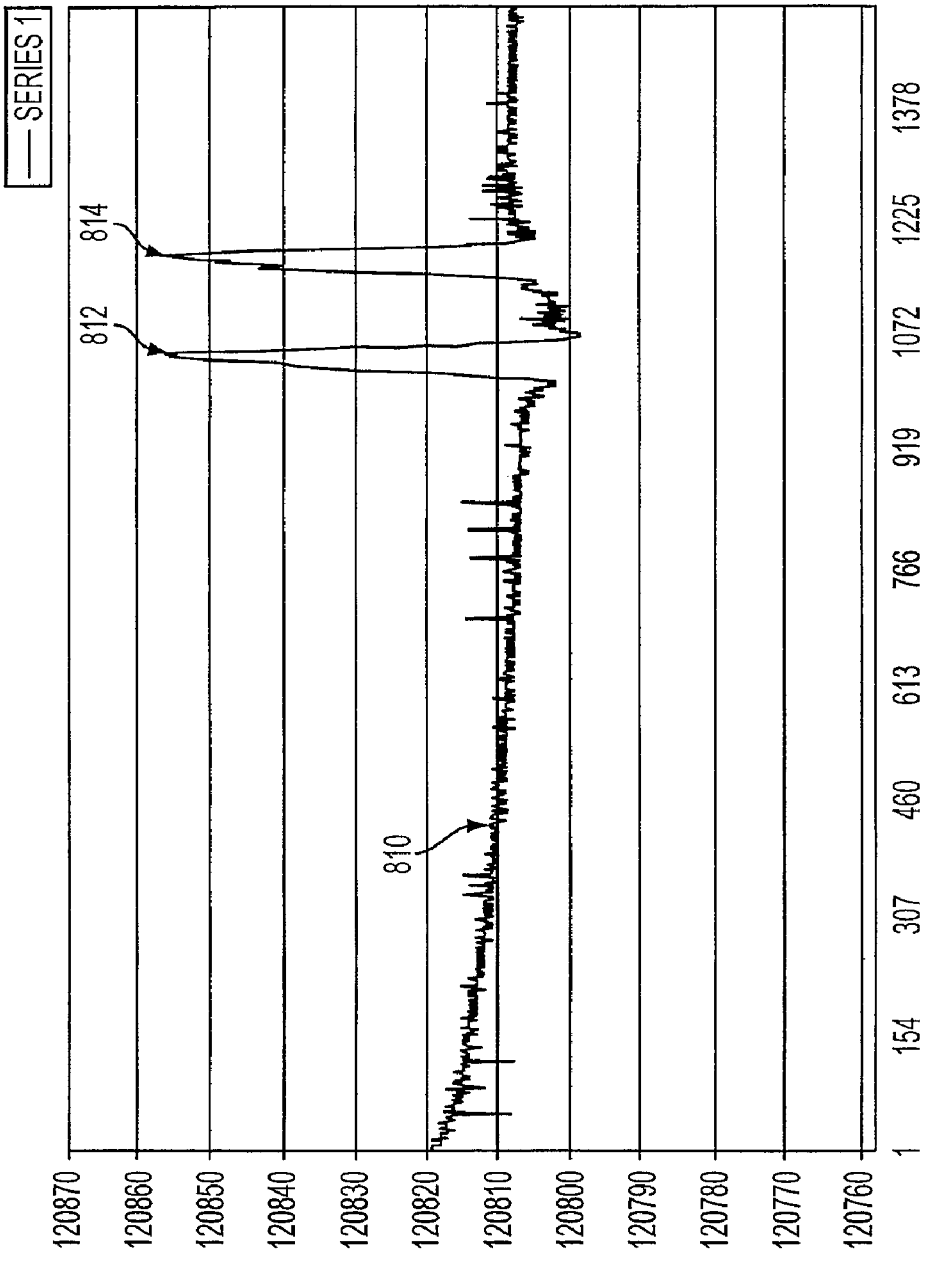
FIG. 8 depicts exemplary wheel assembly information of a two-axle vehicle traveling over a wheel assembly loop at ten miles per hour.
Figure 12:
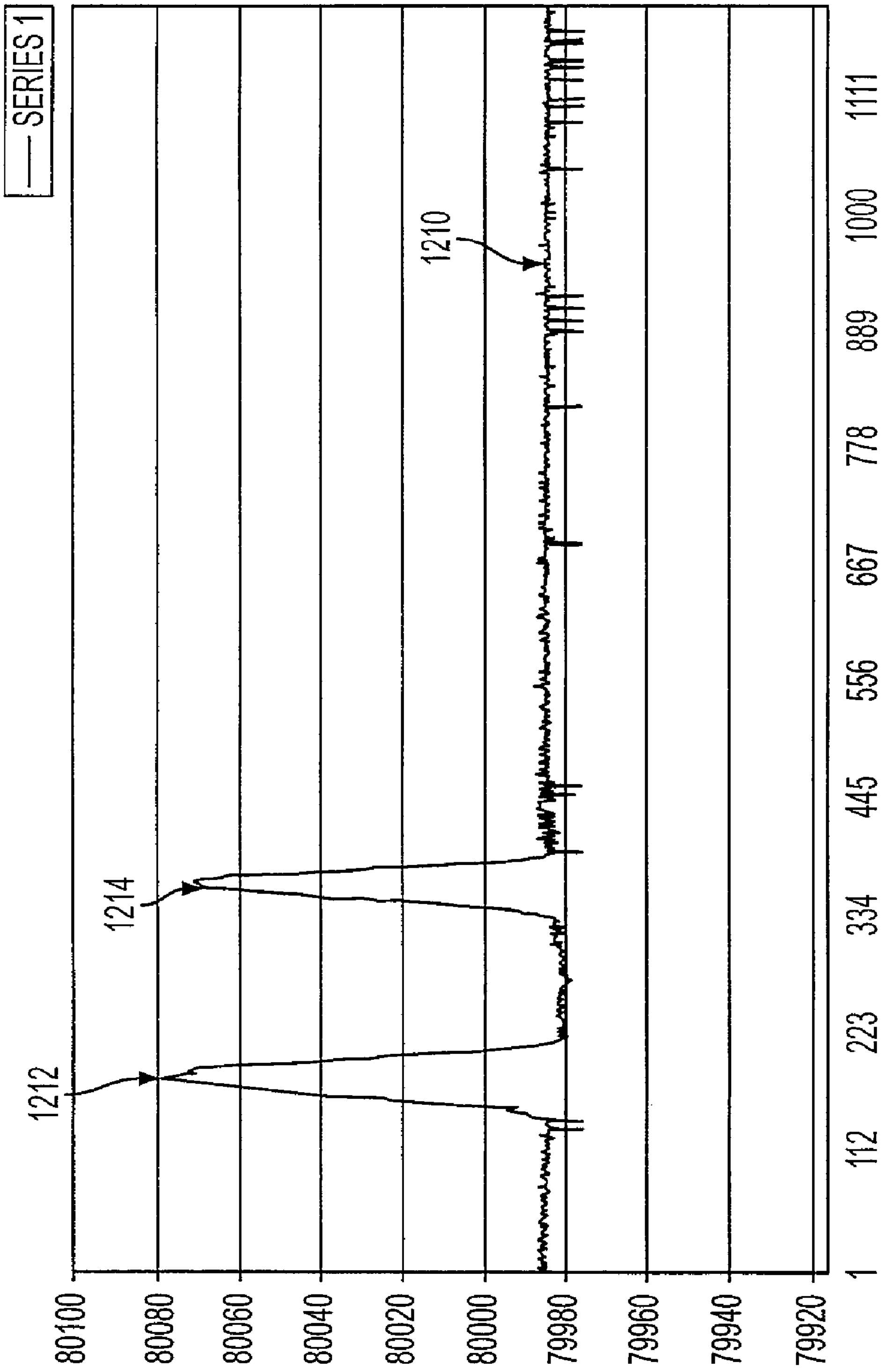
FIG. 12 depicts exemplary wheel assembly information of a two-axle vehicle traveling over a wheel assembly loop.
Figure 14:
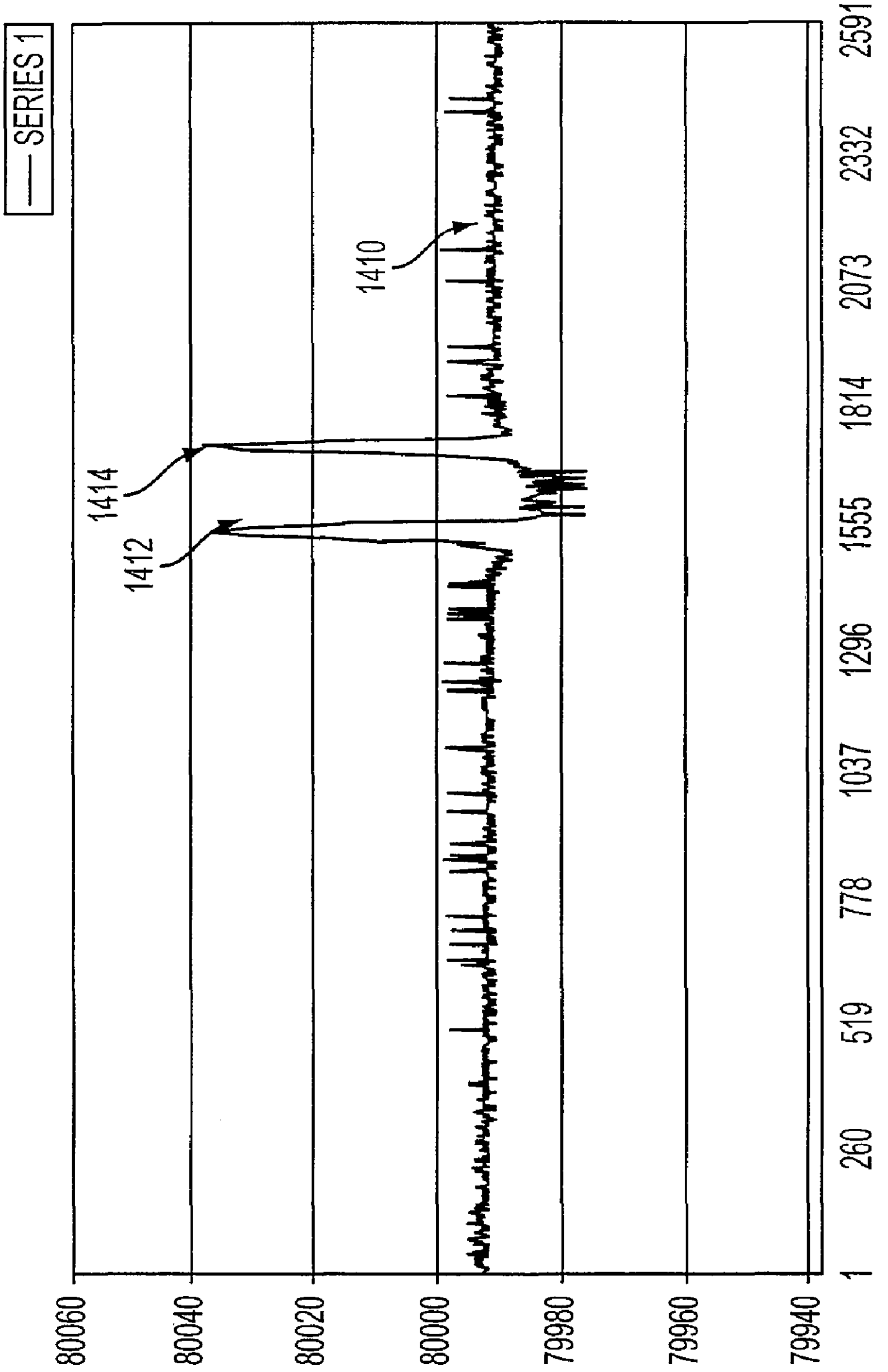
FIG. 14 depicts other exemplary wheel assembly information of a two-axle vehicle traveling over a wheel assembly loop.

Preferably, classification loop array 110 further comprises at least one wheel axle loop (not shown in FIG. 1A). The wheel axle loop is adapted to indicate changes in electromagnetic field which can be processed to produce wheel assembly information. The wheel assembly information can be represented in an inductance vs. time plot. Exemplary inductance vs. time plots of wheel assembly information is shown in FIGS. 8, 12, and 14.

Intelligent vehicle identification unit 170 is in communication with classification loop array 110, intelligent queue loop 140, and device 150. In the preferred embodiment, when vehicle 120 is traveling over classification loop array 110, profile information of vehicle 120 is generated and provided to intelligent vehicle identification unit 170. As noted above, the profile information represents changes of inductance which can be interpreted to identify, among other characteristics of vehicle 120, an axle count of the vehicle, an axle spacing of the vehicle, a speed of the vehicle, and a chassis height of the vehicle.

As suggested above, the profile information includes initial signature information that is produced based at least in part on data collected by the signature loop of classification loop array 110. Preferably, the profile information also includes wheel assembly information that is produced based at least in part on data collected by the wheel assembly loop. When vehicle 120 travels over intelligent queue loop 140, subsequent signature information is produced based at least in part on data collected by intelligent queue loop 140. The profile information and the subsequent signature information are provided to intelligent vehicle identification unit 170.

If the initial signature information and the subsequent signature information indicate that the vehicle previously detected by classification loop array 110 is now at device 150, intelligent vehicle identification unit 170 notifies the operator of vehicle 120 of the appropriate fare associated with the profile information. In other words, intelligent queue loop 140 verifies that that the vehicle at device 150 is the same vehicle for which the fare was determined from classification loop array 110. This serves to detect if one or more vehicles have disturbed the queue order.

Figure 2:
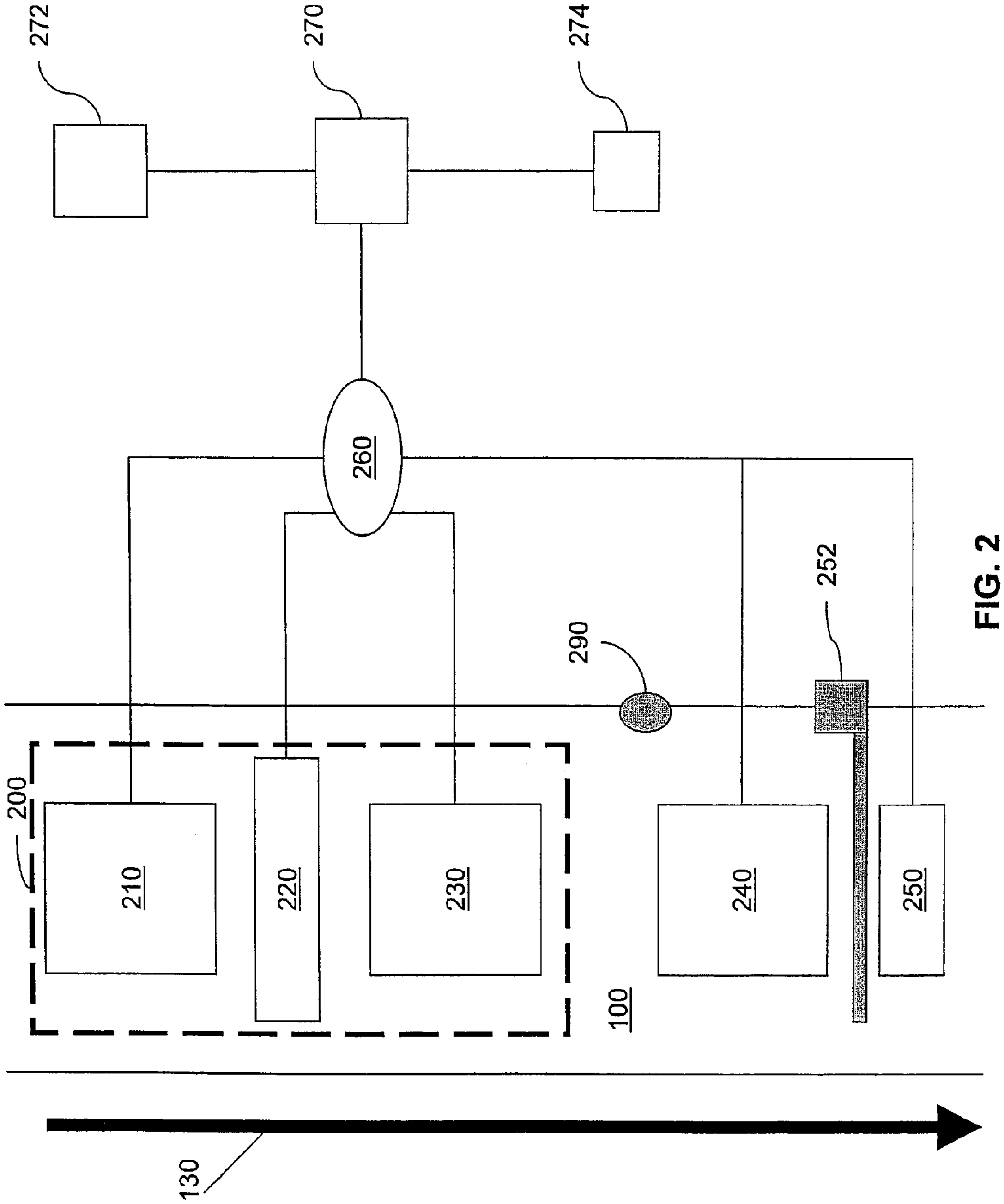
FIG. 2 is a schematic diagram illustrating one embodiment of the present invention as implemented in a toll road application.

FIG. 2 is a schematic diagram illustrating one embodiment of the present invention as implemented in a toll road application. Classification loop array 200 comprises a number of loops, including, for example, one or more signature loops 210 and 230, and at least one wheel assembly loop 220. Signature loops 210 and 230, and wheel assembly loop 220, are arranged such that a vehicle traveling in direction 130 would initially encounter front signature loop 210, and then wheel assembly loop 220, and finally rear signature loop 230.

In addition to classification loop array 200, the preferred embodiment shown in FIG. 2 further comprises intelligent queue loop 240 and gate loop 250. Intelligent queue loop 240 is preferably similar to signature loops 210 and 230 in shape and dimensions. Gate loop 250 is adapted to detect the presence of the vehicle beyond or downstream of toll gate 252. Preferably, toll gate 252 is kept open until the vehicle clears gate loop 250.

Each of front signature loop 210, rear signature loop 230, and intelligent queue loop 240 is preferably generally rectilinear or rectangular in shape. Preferably, each of these loops has two or more turns of wire. The width of each of these loops is preferably six feet. However, the width can be almost as wide as toll lane 100. In an example in which toll lane 100 is 12 feet wide, the width of each of these loops can be between about three feet and about eleven feet. Preferably, each of these loops is a square, in other words, the length of each of these loops is the same as the width. Preferably, each of these loops measures six feet by six feet.

Each of front signature loop 210, rear signature loop 230, intelligent queue loop 240, and gate loop 250 is basically an inductive loop. Each of these loops is used to detect, among other things, a presence of a vehicle over it, the vehicle's chassis height, an axle count of the vehicle, and the movement of the vehicle. Each of these loops preferably produces a flux field or an electromagnetic field that is high enough to be affected by the chassis of each vehicle that uses toll lane 100. The chassis of the vehicle creates eddy currents and disperses the flux field of the loop. This results in lowering the inductance of the loop circuit. One of skill in the art could consult Traffic Detector Handbook, Publication No. FHWA-IP-90-002, which is incorporated herein by reference in its entirety, for further information regarding inductive loops. The loop's detector (e.g., loop detector 260) processes these inductive changes in the loop circuit.

Wheel assembly loop 220 is also an inductive loop. Preferably, wheel assembly loop 220 is adapted to detect the wheel assemblies of the vehicle and to minimize the detection of the chassis of the vehicle and maximize the detection of the axles of the vehicle. Wheel assembly loop 220 is adapted to indicate changes in electromagnetic field which can be processed to produce wheel assembly information.

Intelligent queue loop 240 preferably senses the beginning of the vehicle, the end of the vehicle, the chassis height of the vehicle, and the vehicle's presence over it. Gate loop 250 is preferably adapted to detect the presence of the vehicle. The detection of the vehicle by gate loop 250 controls toll gate 252.

Each of front signature loop 210, wheel assembly loop 220, rear signature loop 230, intelligent queue loop 240, and gate loop 250 is in communication with one or more loop detector 260. Loop detector 260 preferably has a loop signal processor and discriminator unit (LSP&D) (not shown). Preferably, each of front signature loop 210, rear signature loop 230, intelligent queue loop 240, and gate loop 250 can be used to determined signature information including one or more of vehicle presence, vehicle speed, vehicle length, chassis height, and vehicle movement. The signature information, as discussed above, can be represented in an inductance vs. time plot.

Figure 6:
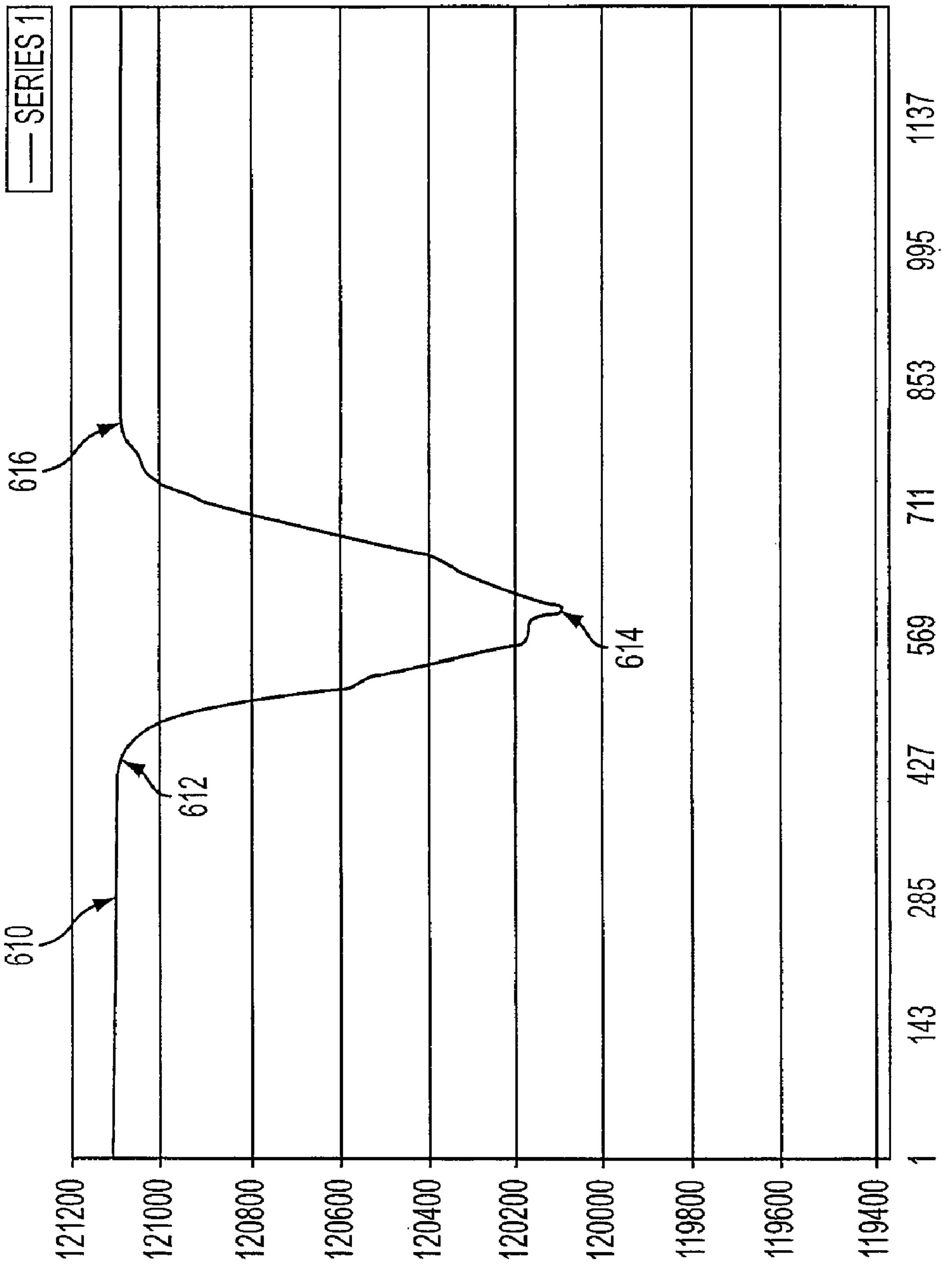
FIG. 6 depicts exemplary signature information of a vehicle traveling at a speed of ten miles per hour over a six feet by six feet signature loop.

FIG. 6 depicts an exemplary signature information of a vehicle traveling at a speed of ten miles per hour over a six feet by six feet signature loop. The speed can be calculated based on the slope of curve 610. Point 612 indicates a moment in time when the vehicle is first detected by the signature loop. Point 614 indicates a moment in time when the vehicle is at the center of the signature loop. Point 616 indicates a moment in time when the vehicle has gone beyond the detection zone of the signature loop.

Figure 7:
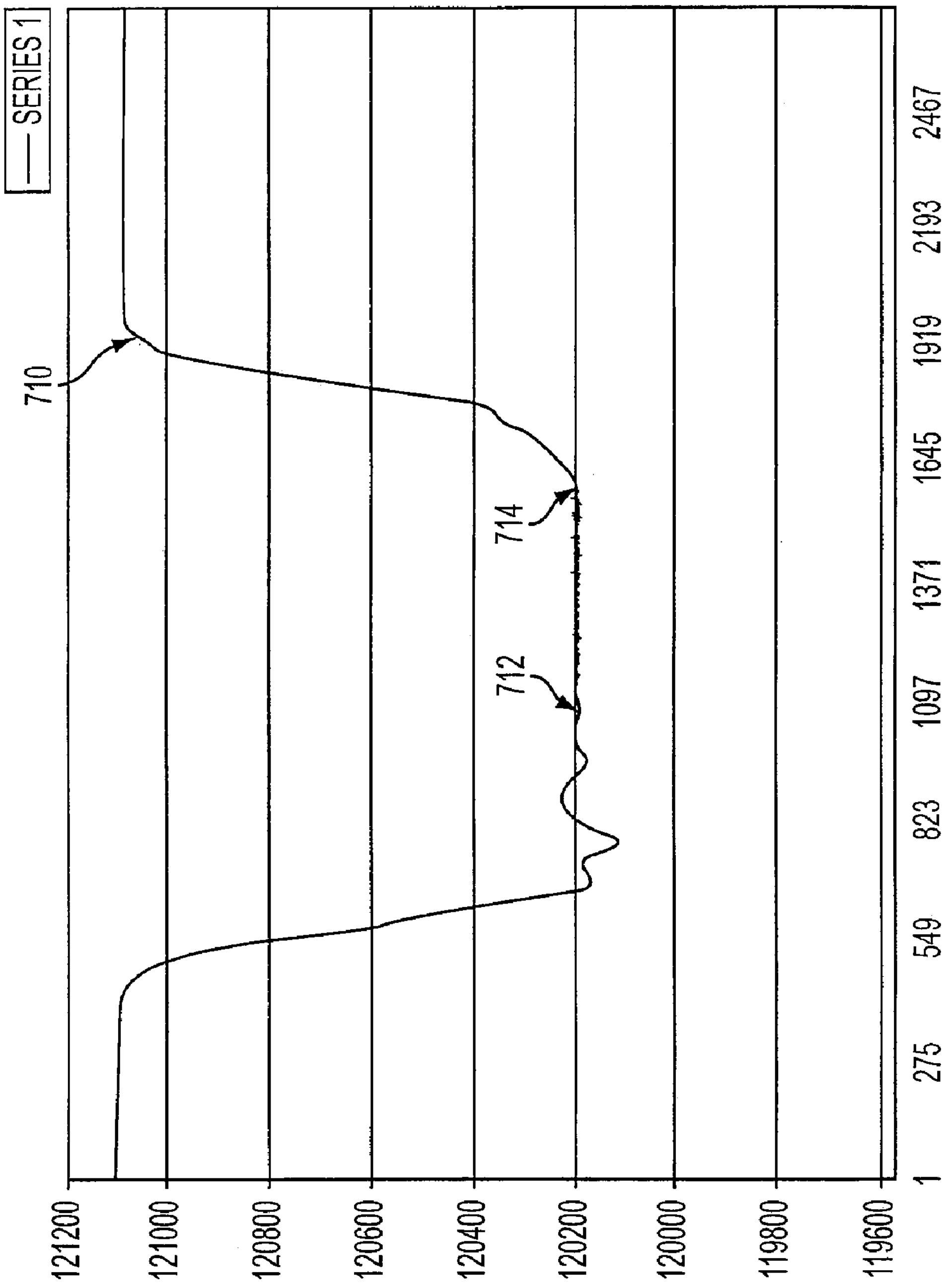
FIG. 7 depicts other exemplary signature information of the same vehicle that comes to a complete stop at one time over the six feet by six feet signature loop.

FIG. 7 depicts other exemplary signature information of the same vehicle that comes to a complete stop at one time over the six feet by six feet signature loop. Curve 710 represents the movement of the vehicle over the signature loop. The flat portion of curve 710 between point 712 (at time=1027) and 714 (at time=1606) indicates that the vehicle is stationary.

Figure 9:
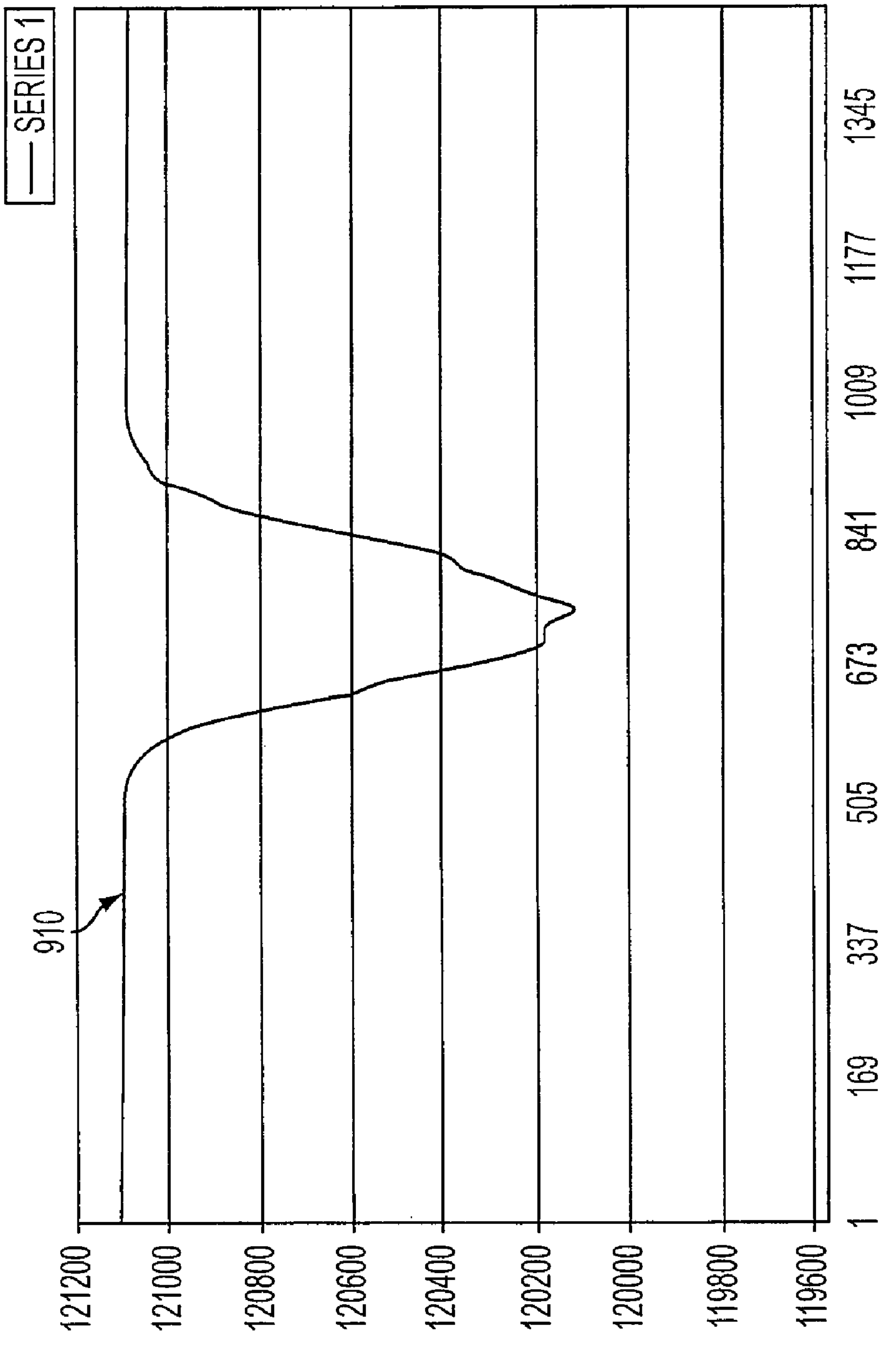
FIG. 9 depicts exemplary signature information of a vehicle traveling at a speed of five miles per hour over a six feet by six feet signature loop.

FIG. 9 depicts an exemplary signature information of a vehicle traveling at a speed of five miles per hour over a six feet by six feet signature loop. Curve 910 shows changes in inductance detected by the signature loop as the vehicle moves over the signature loop.

Figure 10:
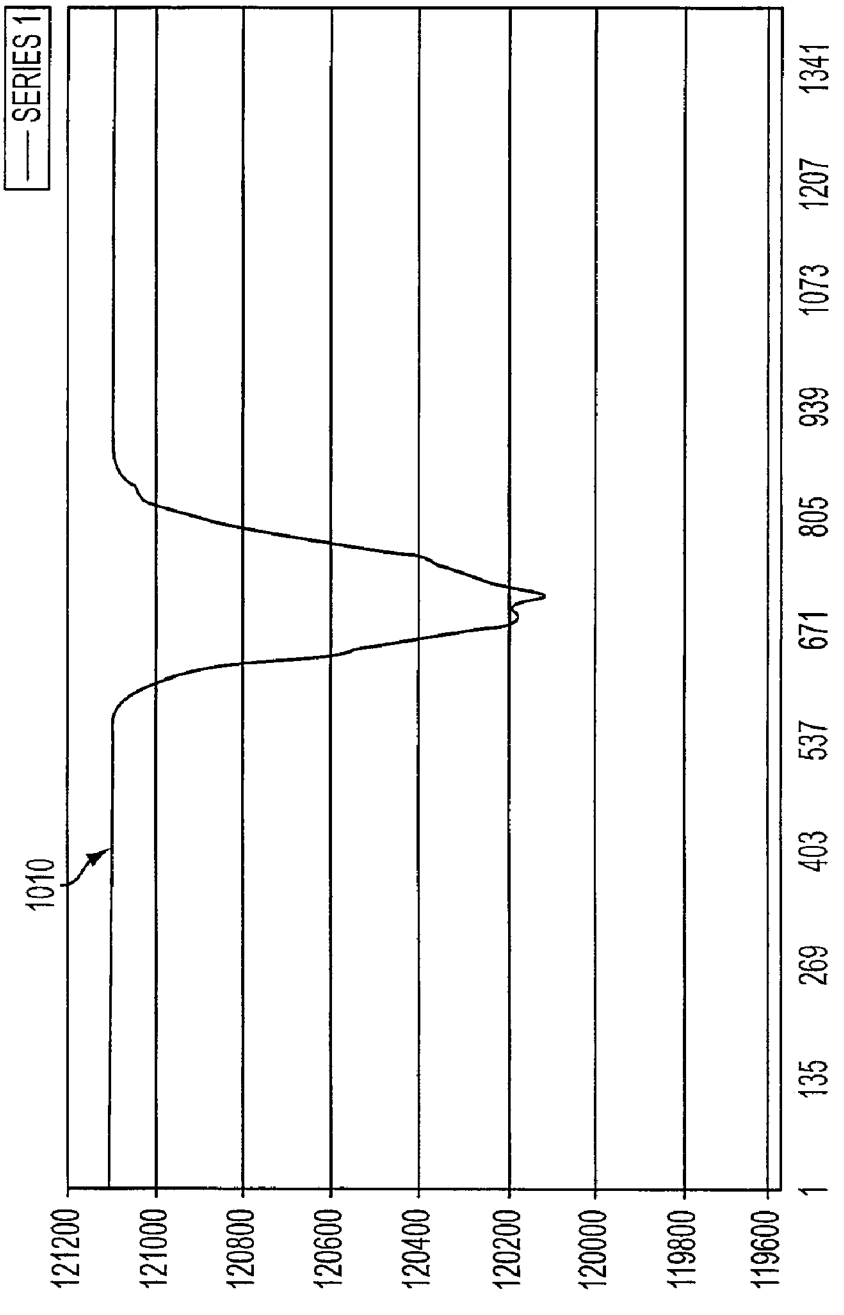
FIG. 10 depicts other exemplary signature information of a vehicle traveling at a speed of 10 miles per hour over a signature loop.

FIG. 10 depicts other exemplary signature information of a vehicle traveling at a speed of 10 miles per hour over a signature loop. Curve 1010 shows changes in inductance detected by the signature loop as the vehicle moves over the signature loop.

Figure 11:
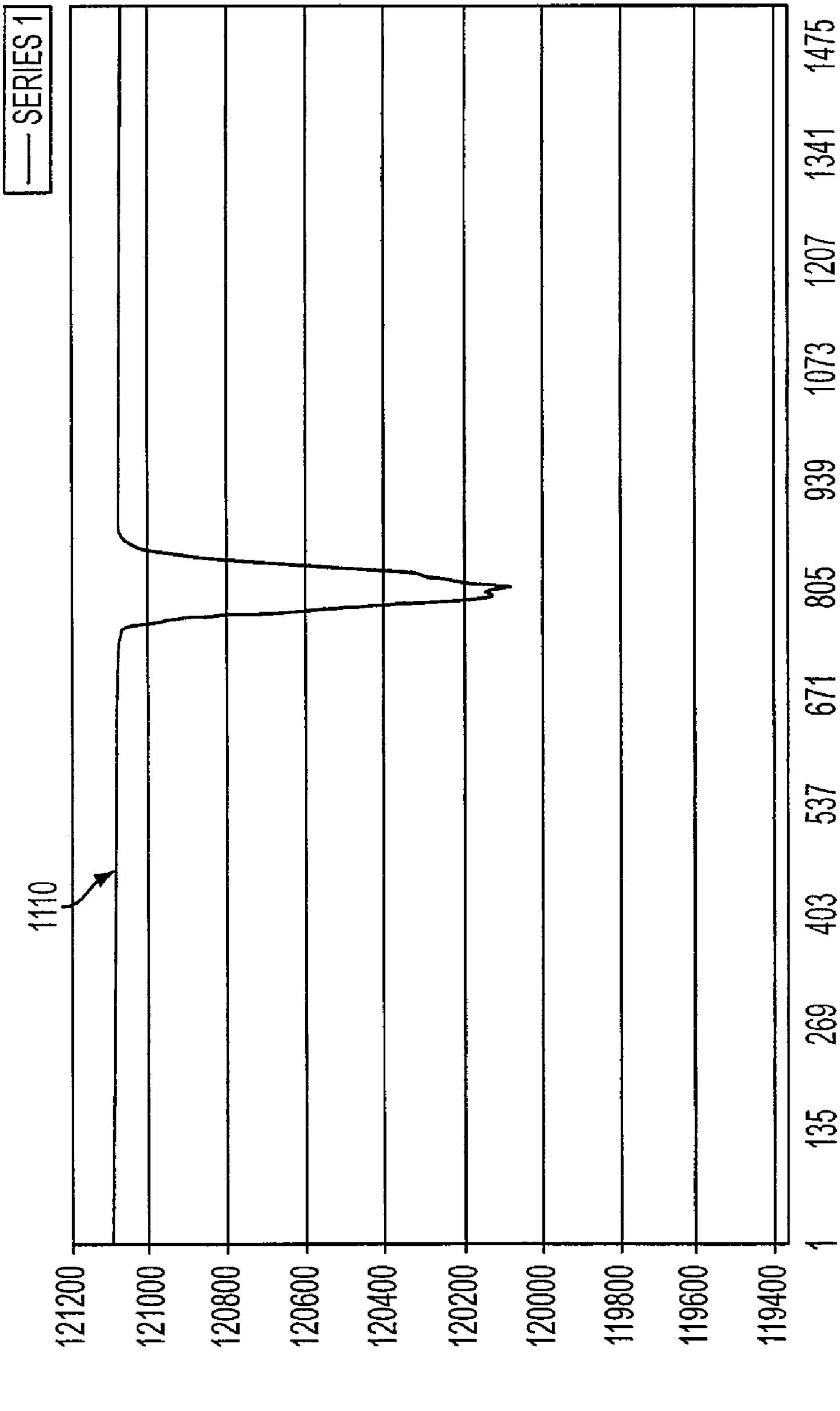
FIG. 11 depicts exemplary signature information of a vehicle traveling at a speed of 30 miles per hour over a six feet by six feet signature loop.

FIG. 11 depicts an exemplary signature information of a vehicle traveling at a speed of 30 miles per hour over a six feet by six feet signature loop. Curve 1110 shows changes in inductance detected by the signature loop as the vehicle moves over the signature loop.

Note that each of curves 910, 1010, and 1110 exhibits a similar pattern. Each of these curves shows that when the vehicle is not detected, the inductance value is in between 121000 units and 121200 units. Each of these curves also shows that when the vehicle is in the center of the signature loop, the inductance value is in between 120000 units and 120200 units. The noticeable difference between these three curves is the width of the gap between two points on the curve when the presence of the vehicle is detected. Indeed, each of these curves characterizes the same vehicle (incidentally, the vehicle is a pickup truck) moving at speeds of five miles per hour, 10 miles per hour, and 30 miles per hour, as represented by curves 910, 1010, and 1110, respectively, over the same signature loop.

Figure 13:
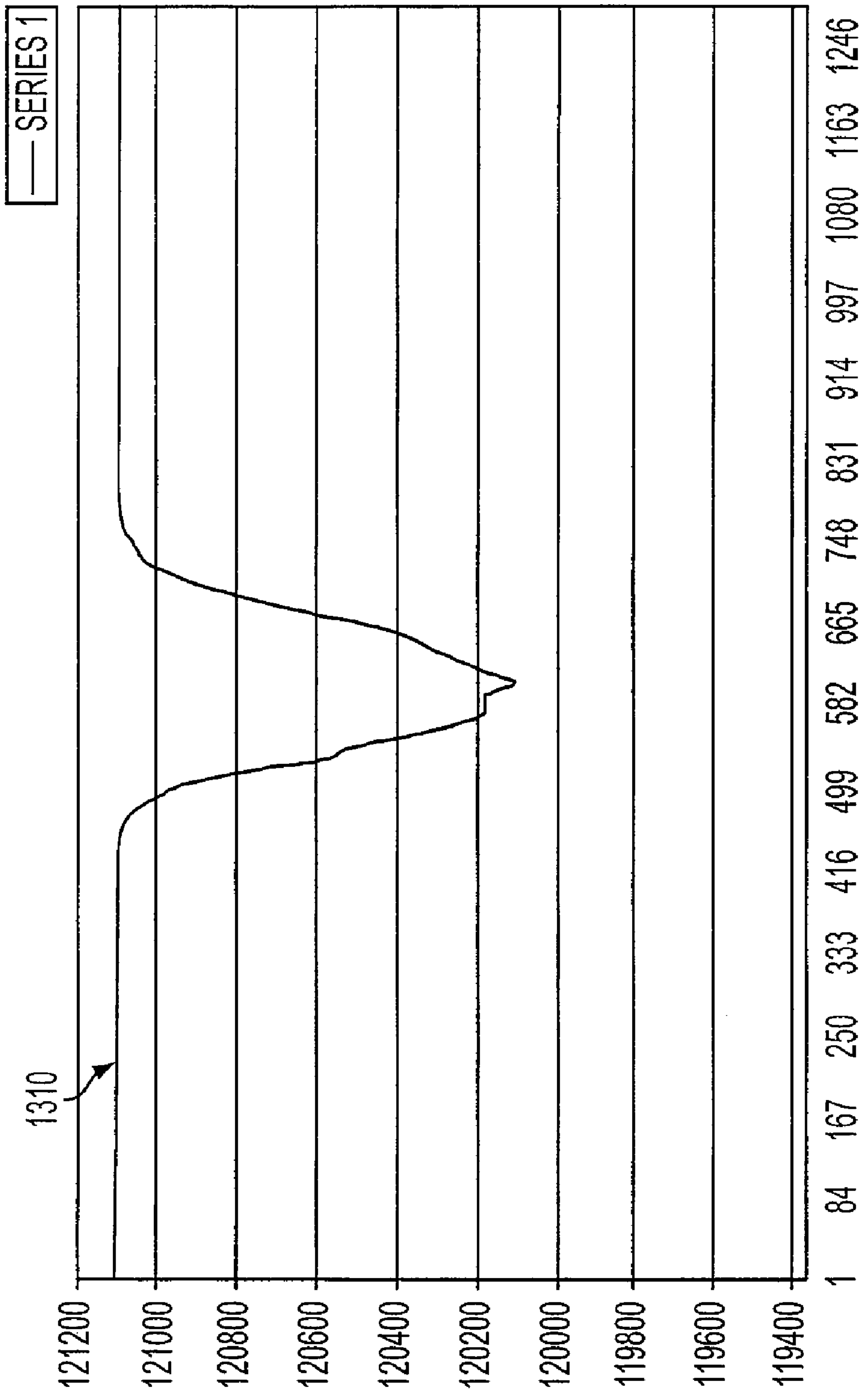
FIG. 13 depicts exemplary signature information of a vehicle traveling over an enforcement loop.

FIG. 13 depicts an exemplary signature information of the same vehicle traveling over an enforcement loop or an intelligent queue loop. Note that curve 1310 exhibits similar pattern of inductance change over time as those characterized by curves 910, 1010, 1110.

FIG. 8 depicts an exemplary wheel assembly information of a two-axle vehicle traveling over a wheel assembly loop at ten miles per hour. Curve 810 indicates changes in inductance as the vehicle travels over the wheel assembly loop. First peak 812 indicates the detection of a front wheel of the vehicle. Second peak 814 indicates the detection of a rear wheel of the vehicle.

FIG. 12 depicts an exemplary wheel assembly information of a two-axle vehicle traveling over a wheel assembly loop. Curve 1210 indicates changes in inductance as the vehicle travels over the wheel assembly loop. First peak 1212 indicates the detection of a front wheel of the vehicle. Second peak 1214 indicates the detection of a rear wheel of the vehicle.

FIG. 14 depicts other exemplary wheel assembly information of a two-axle vehicle traveling over a wheel assembly loop. Curve 1410 indicates changes in inductance as the vehicle travels over the wheel assembly loop. First peak 1412 indicates the detection of a front wheel of the vehicle. Second peak 1414 indicates the detection of a rear wheel of the vehicle.

Figure 21:
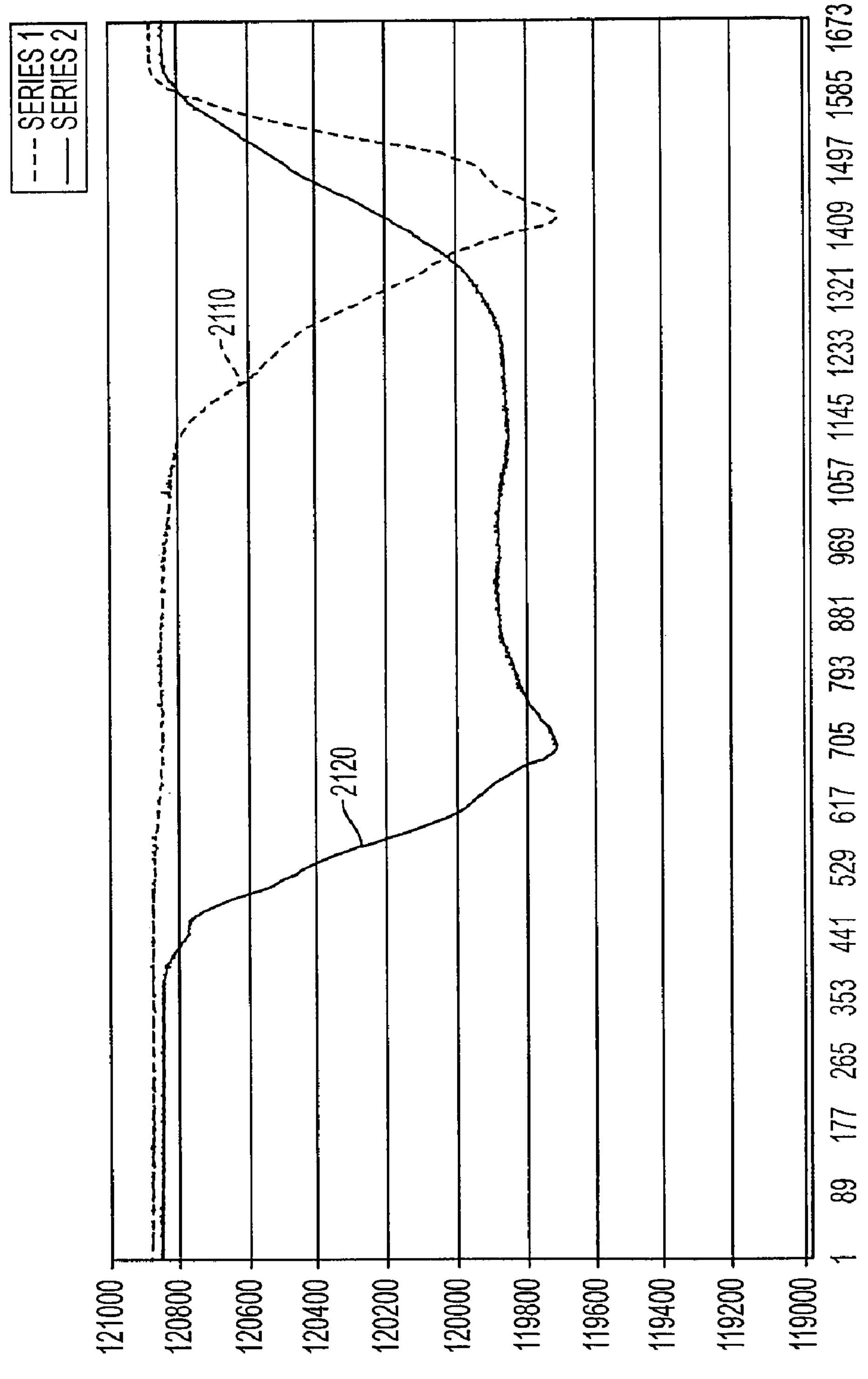
FIG. 21 depicts exemplary initial signature information indicating a vehicle traveling at one speed over a signature loop and an exemplary subsequent signature information indicating the same vehicle traveling at another speed over an intelligent queue loop.

Referring now to FIG. 21, initial curve 2110 characterizes a vehicle traveling at a first speed over a signature loop. Subsequent curve 2120 characterizes the vehicle slowing down significantly when it was detected by an intelligent queue loop 240. Both curve 2110 and curve 2120 have identical lowest inductance between 119600 units and 119800 units, indicating that each of curve 2110 and curve 2120 characterizes the same vehicle.

Figure 22:
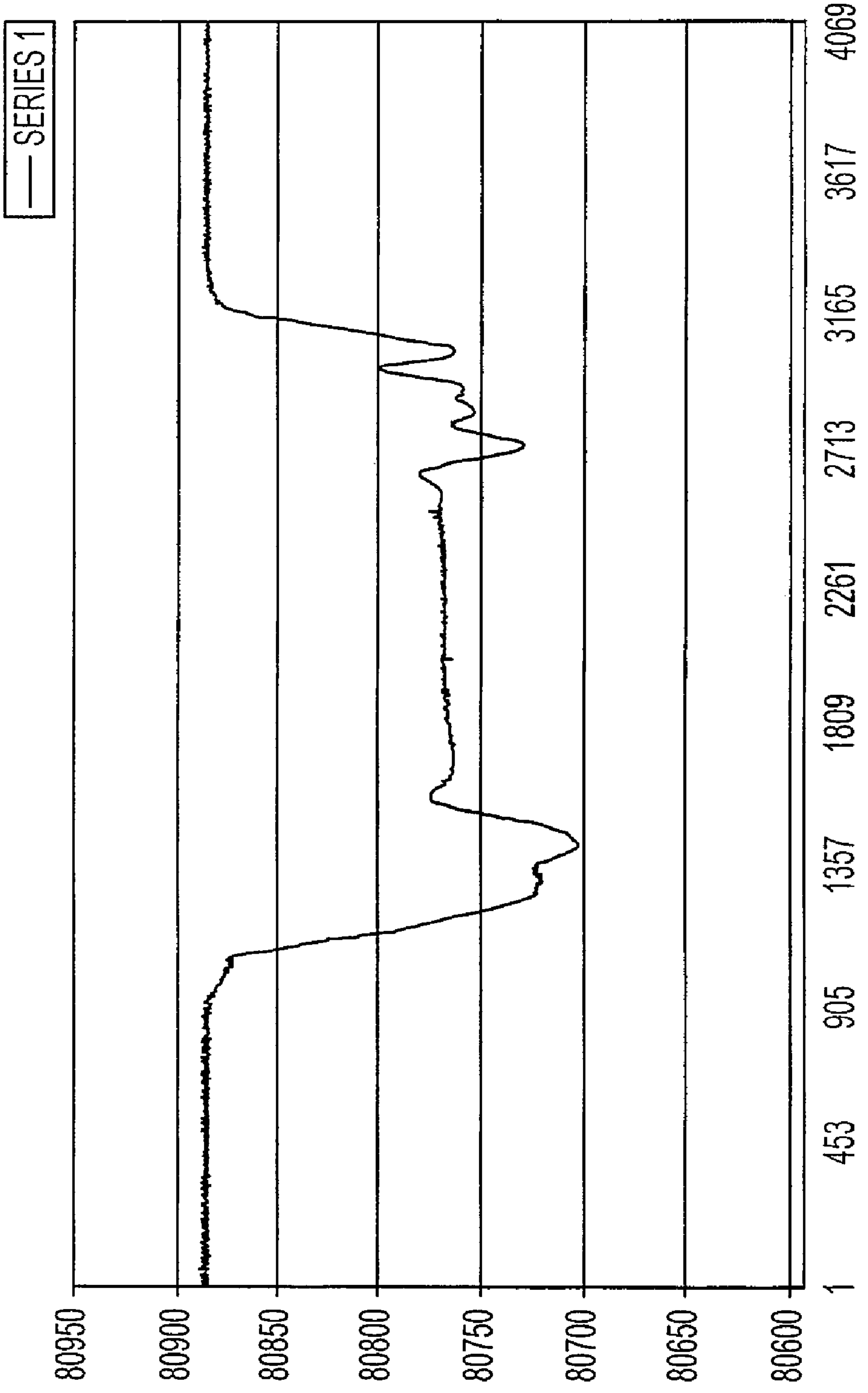
FIG. 22 depicts exemplary signature information of a four-axle vehicle.
Figure 23:
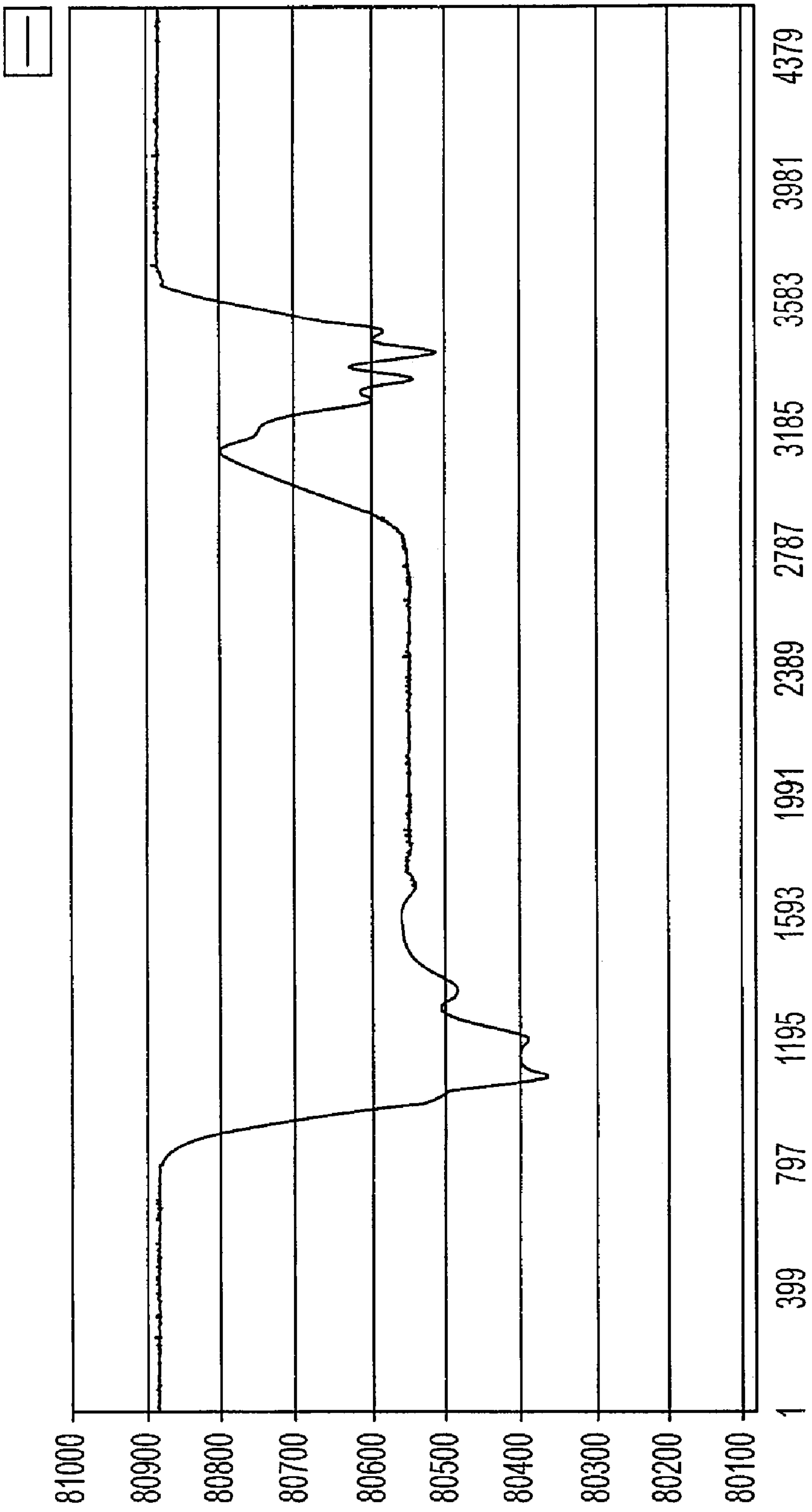
FIG. 23 depicts exemplary signature information of a vehicle towing a two-axle trailer.
Figure 24:
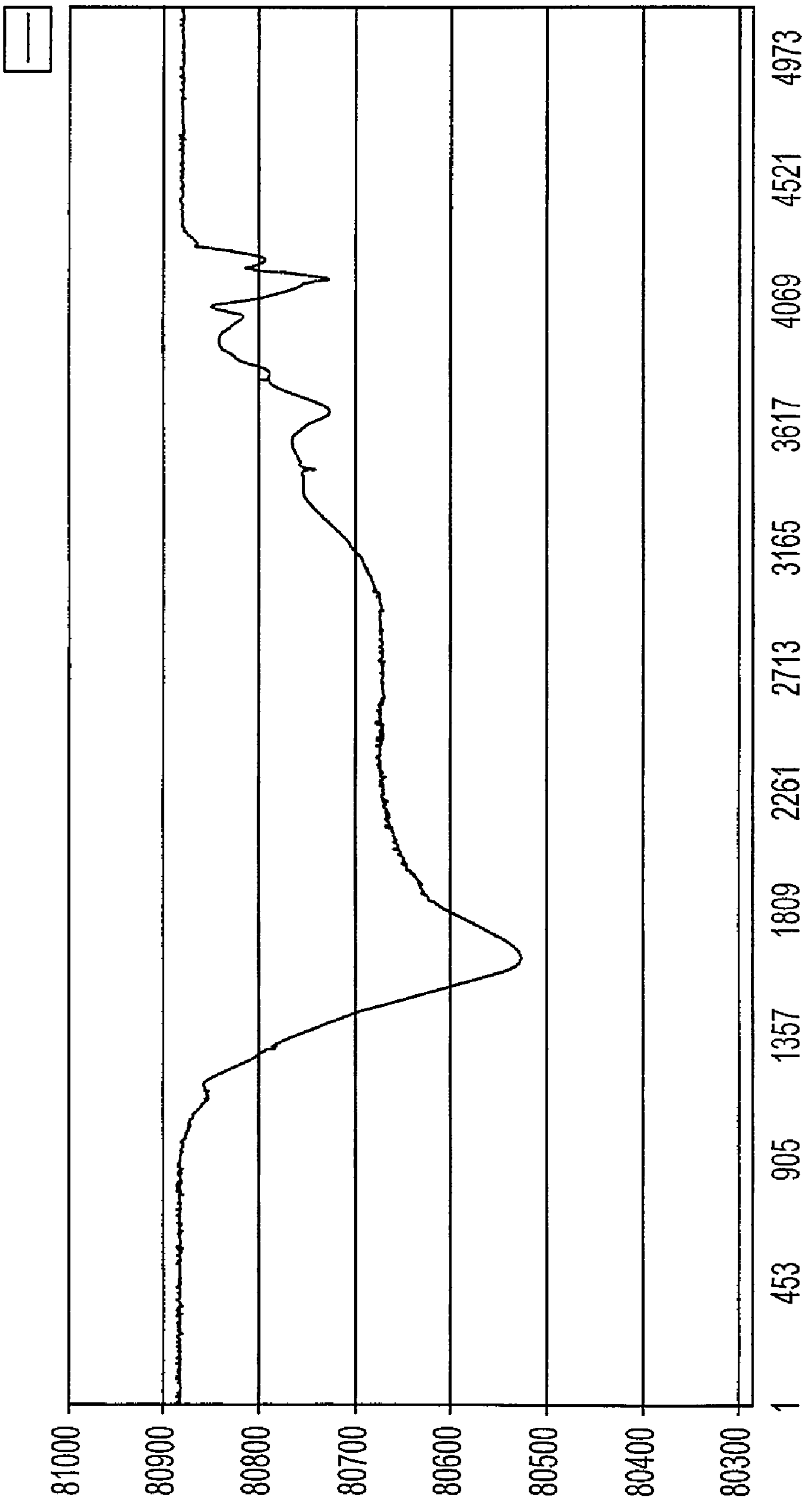
FIG. 24 depicts exemplary signature information of a five-axle truck.
Figure 25:
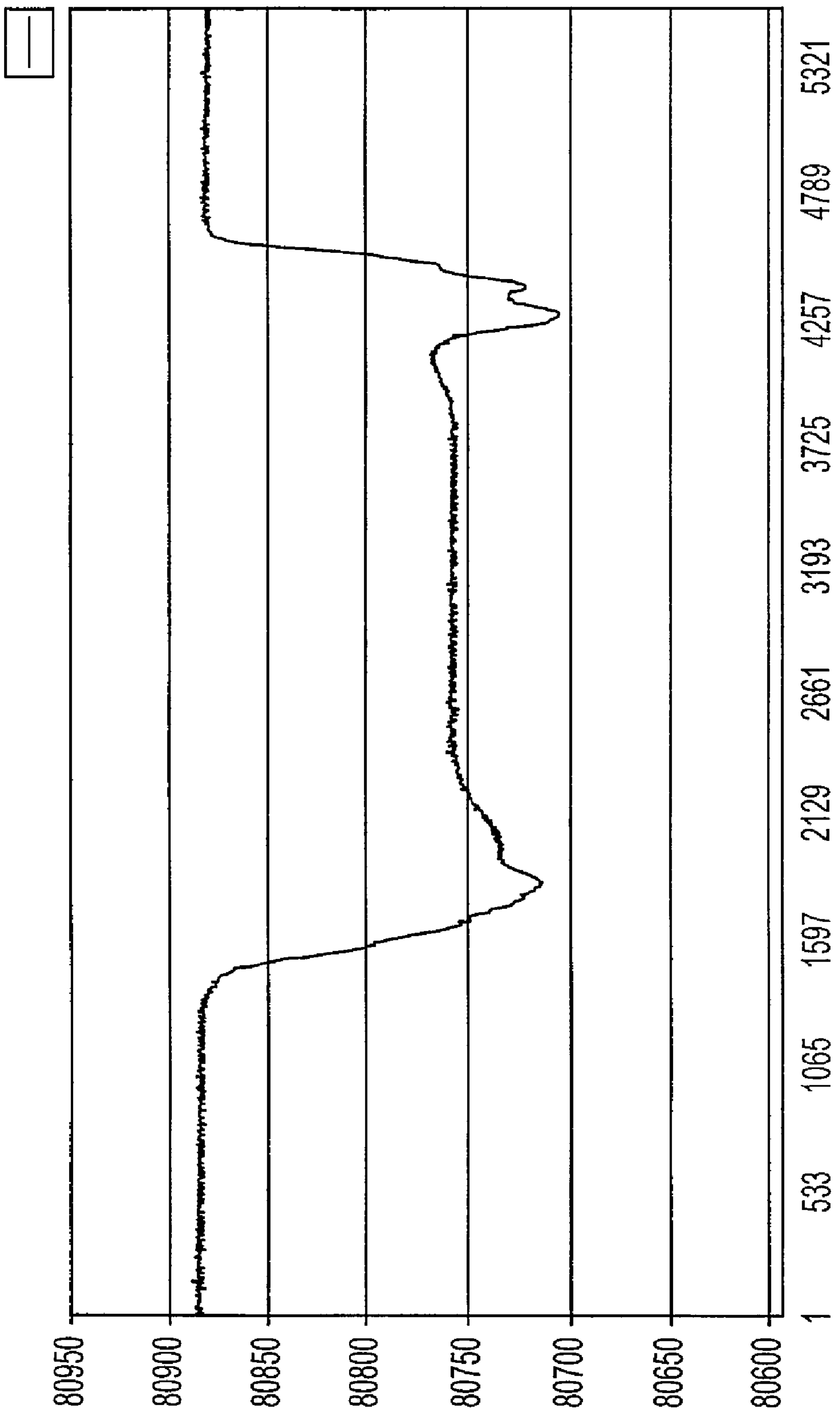
FIG. 25 depicts exemplary signature information of a three-axle dump truck as detected by an intelligent queue loop.

FIGS. 22-25 are additional exemplary inductance vs. time plots representing signature information of different categories of vehicles. FIG. 22 depicts an exemplary signature information of a four-axle vehicle. FIG. 23 depicts an exemplary signature information of a vehicle towing a two-axle trailer. FIG. 24 depicts an exemplary signature information of a five-axle truck. FIG. 25 depicts an exemplary signature information of a three-axle dump truck.

Referring back to FIG. 2, intelligent vehicle identification unit 270 comprises a microprocessor. The microprocessor is preferably capable of gathering data from one or more distinct inductive loop measurement and processing units such as loop detector 260. One example of loop detector 260 is a microprocessor that provides an oscillating circuit. Loop detector 260 can be incorporated into intelligent vehicle identification unit 270. Loop detector 260 receive the profile information from classification loop array 200 and the subsequent signature information from intelligent queue loop 240. Furthermore, intelligent vehicle identification unit 270, given the signals received (which comprises the profile information and the subsequent signature information), can perform various calculations on the signals to determine core information about a vehicle passing over the inductive loops such as relative vehicle mass, vehicle length, average passing speed of the vehicle, direction of movement of the vehicle, number of axles present on the vehicle, and the spacing between subsequent axles on the vehicle.

Intelligent identification unit 270 is in communication with display and local interface 272 and remote access and interface 274. Intelligent identification unit 270 has access to a vehicle library comprising predefined vehicle classifications or categories, and their associated fares. The vehicle library can be modified through a graphical user interface associated with intelligent identification unit 270. Modification of the vehicle library can involve, for example, adding, deleting, and editing of vehicle categories. The modification can be performed through a computer associated with a local area network with which intelligent vehicle identification unit 270 is associated. Preferably, the modification can also be performed through a computer associated with a wide area network with which intelligent vehicle identification unit 270 is associated.

Once the information received from loop detector 260 is processed by intelligent vehicle identification unit 270, the resultant signature data of the vehicle is utilized in a comparison engine. The comparison engine employs both stored typical vehicle signatures for various distinct categories of vehicles and neural network processing to intelligently associate the exact data received with a representative vehicle signature previously defined. Also, the initial signature information is stored for later comparison with the subsequent signature information received from intelligent queue loop 240.

After processing this data against the vehicle library and through the neural network processing, the microprocessor assigns a distinct classification identifier to the vehicle and internally queues the data thus received and awaits a detection signal from intelligent queue loop 240. The vehicle library is preferably stored in a database accessible by intelligent vehicle identification unit 270.

Once the subsequent signature information is received from intelligent queue loop 240 by the microprocessor, the microprocessor performs an analysis on this signature information to see if it properly represents the next internally queued vehicle for purposes of ascertaining that the vehicle arriving at payment point 290 is the same vehicle that the system expects to be arriving at payment point 290. Under one circumstance, a vehicle, e.g., a motorcycle, could potentially pass over classification loop array 200 and then exit toll lane 100 early. In another instance, the vehicle could potentially miss passing over classification loop array 200 and move into toll lane 100 at a later point, thus missing being correctly classified by the system beforehand. Intelligent queue loop 240 is utilized in both circumstances to detect such queuing anomalies.

The microprocessor that is utilized to analyze the various loop signatures can preferably send data to another main processing device to gather data, control traffic flow, or otherwise process the data in a meaningful manner. In a toll collection embodiment of the invention, this collection processing device would be another microprocessor unit designed to assimilate various input data and toll collection device control to assist in collecting proper fare amounts for vehicles passing through the toll lane.

If a vehicle crosses intelligent queue loop 240 and is not recognized as the next classified vehicle, the microprocessor will check any other queued classified vehicles to see if the signature matches any other vehicles thus queued. If the subsequent signature information matches a later vehicle, then the microprocessor will assume that any earlier queued vehicles have exited the lane after crossing classification loop array 200 and will discard those vehicles from the queue.

If a vehicle crosses intelligent queue loop 240 and is not recognized as the next classified vehicle or as any of the vehicles subsequent in the vehicle classification queue, the microprocessor will then make the assumption that the vehicle entered toll lane 100 late and that it was not properly classified. A new vehicle classification record will then be inserted into the queue at that point and marked such that the system does not reliably know what type of vehicle is currently at the head of the queue.

If a vehicle entered toll lane 100 late, thus causing an anomaly in the proper queuing of vehicles, an appropriate message will be sent from the microprocessor to the main processing device so that the main processing device can make an appropriate decision based on the type of anomaly that occurred in queuing and present the toll attendant with the appropriate information for making an informed decision on how to handle the errant vehicle, if the toll lane is a manual collection lane. The collection-processing device must make a decision on the expected toll based on rules established by the authority (default fare) if the main processing device is utilized to automatically operate a toll collection lane without the use of a toll attendant.

Other than the previously specified anomaly situation in queuing, the microprocessor will normally pass information regarding the next queued vehicle to the toll collection processing device. The processing device receives this classification identifier from the inductive loop control microprocessor and cross-references the classification identifier against a cross-reference database of identifiers and toll classifications as defined by the tolling authority. This cross-reference action is used to assign a particular authority classification and, thus, an appropriate fare amount expected for the vehicle.

Since many vehicles with distinct classification identifiers are of the same general type as it pertains to the local tolling authority's fare structure, this cross-reference action serves to reduce the number of distinct vehicle classifications to just those distinct classifications and associated fare amounts as defined by the tolling authority. For example, a particular tolling authority might assign the same general classification to a motorcycle and a passenger car even though these two vehicles would generate two distinct classification identifiers or profile information.

Once the collection processing device has received and cross-referenced the vehicle data internally, it will communicate the appropriate classification and fare expected for the vehicle to the toll attendant if the lane is operating in a manual operational mode. If the toll lane is operating in an automatic mode, the data will be used to communicate to any attached automatic toll collection equipment the expected fare amount that the vehicle operator must present to gain passage through toll lane 100.

In order to provide the cross-reference database utilized in the toll collection processing device, a user program is provided with the corresponding toll management system. This program allows the toll authority to select each vehicle type that is distinctly identified by the loop system microprocessor program and match it with one of the predefined or predetermined classifications set up by the authority, which subsequently defines the amount of the fare expected for that vehicle type.

The user program can preferably be adapted to employ the use of digital photographs for each type of vehicle to further illustrate the exact type of vehicle (or vehicles) which would fall under each category of vehicles classified by the loop system microprocessor for visual reference. The authority personnel would then create the cross-reference table by matching up each loop microprocessor classification with the corresponding authority classification. FIGS. 17-20 are exemplary screenshots of such information.

Additionally, for vehicles with too many axles to be classified by the authority's base classification system, the cross-reference table also allows the user to define the additional number of axles to add to the base classification axle count to determine the total fare for such vehicles.

As the user completes the cross-reference process utilizing the user program for such purposes, the data is saved to the plaza system database and subsequently distributed to each toll lane processing computer for subsequent use in cross-referencing subsequent vehicles for automatic classification purposes.

Preferably, intelligent identification unit 270 includes management software tools. The software tools enable every transaction (e.g., each vehicle's passing through the toll lane) to have a complete audit trail. Tracking each transaction increases the accuracy of the revenue collection process.

The system shown in FIG. 2 further comprises payment point 290, which is preferably located upstream of toll gate 252, but downstream of classification loop array 210 in direction 130. Payment point 290 may be equipped with an automated toll collection mechanism. Alternatively, payment point 290 may be staffed with a toll attendant. When an appropriate fare is received at payment point 290, toll gate 252 opens to allow the vehicle to continue to move in direction 130. It is noted that other traffic control apparatus may be used in lieu of toll gate 252. For example, traffic lights may be used.

As disclosed above, the capability to charge different toll fees for different vehicle types at payment point 290 without a toll attendant is possible with the present invention.

For convenience, a system of the present invention as shown in FIG. 2 may be hereinafter referred to as an intelligent vehicle identification system (IVIS). The IVIS of the present invention can have a number of embodiments including but not limited to those shown in FIGS. 2-5.

The IVIS, as implemented in FIGS. 2-5, combines hardware and software to identify or classify a vehicle using an arrangement of inductive loops. The shapes, layout, and number and type of loops in each of the arrangements can vary depending on how the toll lane is to be used. For example, different layouts and designs may be required for slow speed and high speed toll lanes.

Figure 3:
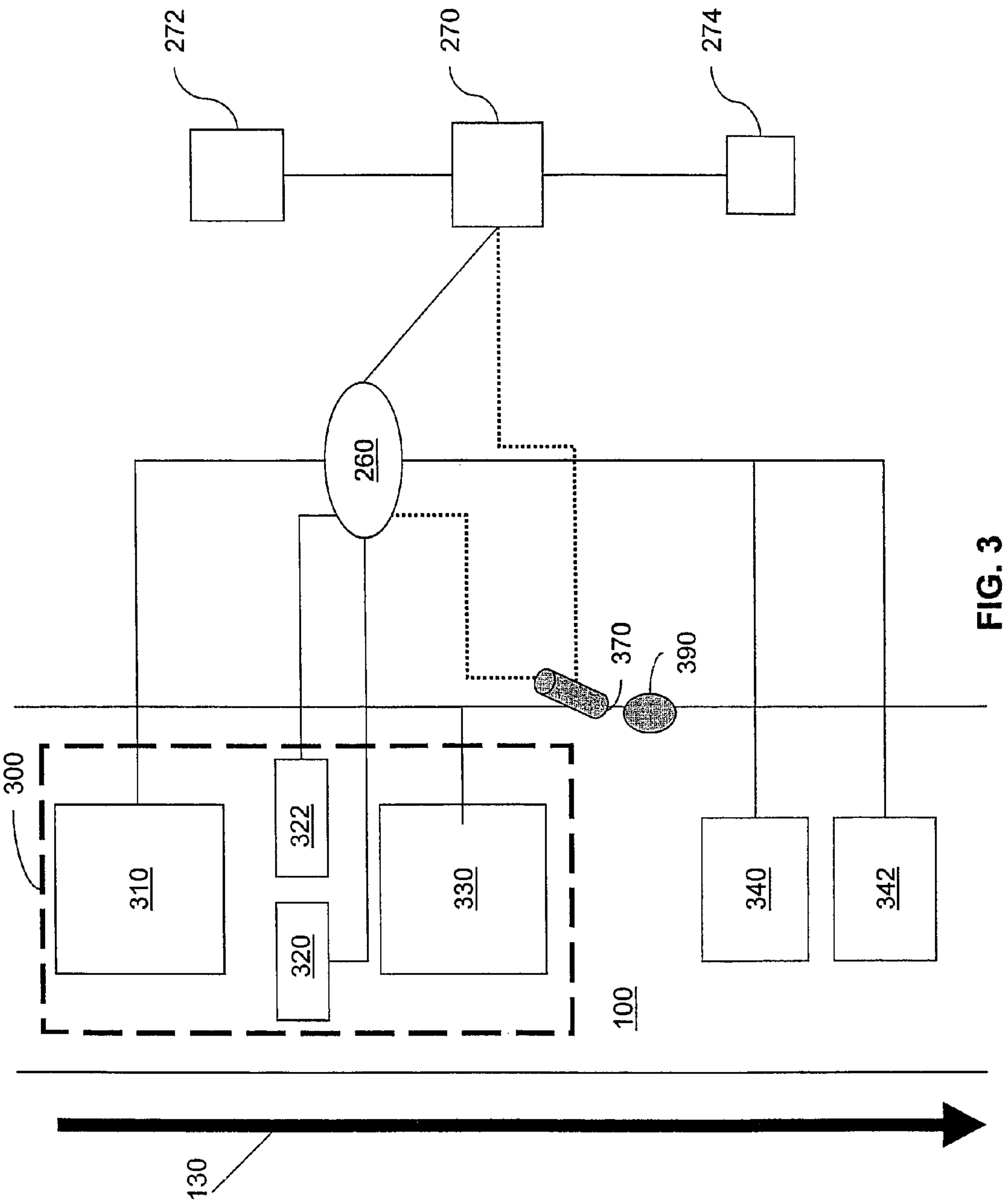
FIG. 3 is a schematic diagram illustrating another embodiment of the present invention as implemented in a toll road application.

In FIG. 3, for example, classification loop array 300 is adapted to indicate changes in electromagnetic field which can be processed to produce profile information of a vehicle that travels over it in direction 130. The profile information includes initial signature information, which is produced based at least in part on data collected by front signature loop 310 and rear signature loop 330, as well as wheel assembly information which is produced based at least in part on data collected by left wheel assembly loop 320 and right wheel assembly loop 322. One or more of an axle count, axle spacing, speed, and height of axles from the surface of the toll lane can be determined using the profile information. The data collected by the loops is provided to loop detector 260 for processing. Furthermore, loops 340 and 342 can also be adapted to indicate changes in electromagnetic field which can be processed to produce subsequent signature information at locations downstream of payment point 390.

Each of the wheel assembly loops 320 and 322 is designed to detect primarily tires and wheel assemblies of a vehicle. The small concentrated field width of each of the wheel assembly loops 320 and 322 is obtained by controlling the spacing between the wire turns. Preferably, the spacing ranges between four and seven inches. The wheel assembly loops are designed in accordance with the range of ground clearance present in the vehicle population. Preferably, the single wire that is used to form each wheel assembly loop is looped at least twice, thus creating two overlapping layers of wire for each wheel assembly loop.

Design of wheel assembly loops 320 and 322 depends on a number of factors. The factors include characteristics of vehicles anticipated for the toll lane at which the loop is to be installed. The characteristics include number of axles, distance between axles, speed of vehicle through the toll lane, height of chassis from top of roadway, and other attributes of vehicles detectable by inductive loops.

Vehicle separation loops 340 and 342 are designed to be used to gain additional information on the target vehicle. For example, vehicle separator loops 340 and 342 can determine the beginning and end of a vehicle by analyzing the percent in change of inductance. Also, the magnitude of the percent change in inductance is proportional to the chassis size and distance from the vehicle separation loops 340 and 342. In addition, vehicle separation loops 340 and 342 can be used to, as it's name suggests, "separate" each vehicle one from another.

The use of vehicle separation loops 340 and 342 provides vehicle presence, vehicle speed, and chassis length information. A special signal discriminator is preferably provided with the two processed signals received from vehicle separation loops 340 and 342. Preferably, the signal discriminator processes this information and compares the vehicle speed, chassis length, axles, and chassis height information being collected from vehicle separation loops 340 and 342. The signal discriminator considers several factors during this process. For example, the percent in the change of inductance is used to sense the beginning of a vehicle and the end of a vehicle. Also, the magnitude of the percent change in inductance is proportional to the bottom chassis height and distance from each of the loops. For example, a motorcycle being followed closely by a car or truck would have a significant difference in the percent of inductance change. The movements or speed of the vehicle is also measured on each of these loops. The movements or speed of the vehicle is determined as a function of percent change of inductance over time. These two factors are used to calculate the speed of the vehicle. When the vehicle is not moving or static the percent change in inductance becomes constant.

These constant values for the percent change of inductance appear as flat horizontal lines when displayed on an inductance vs. time plot in which the Y-axis represents the percent change in inductance and the X-axis represents time. A single vehicle or a vehicle towing another vehicle will normally maintain the same speed. When two vehicles are following each other in close proximity, the vehicles typically have somewhat different speeds or start and stop independently of each other. The signal discriminator measures these differences to separate the vehicles. Also the length of the vehicle chassis is calculated to determine if it is a single vehicle.

Again, this processor is unique since it performs this function independently, provides outputs and transfers the information within the IVIS. This information can be used to provide volume counts. This process can be used in tolling or other applications to replace light curtains, optical scanners, video detectors, and microwave detectors.

A single vehicle or a vehicle towing another vehicle will normally maintain the same speed. When two vehicles are following each other in close proximity, the vehicles typically have different speeds. Vehicle separation loops 340 and 342 measure these differences to separate the vehicles. Also, the length of the vehicle chassis is calculated to verify the existence of one or multiple vehicles. Accordingly, vehicle separation loops 340 and 342 can be used in the tolling application to replace light curtains, optical scanners, video detection, and microwave detectors that are currently in use.

The loop signal processor and discriminator (LSP&D) unit preferably has two or more channels of detection that compares the information processed on a continuous basis to determine when a vehicle ends and when a new vehicle starts. The end of the vehicle is used to end the collection of the transaction information. The LSP&D has the ability to determine the beginning of a vehicle, the end of a vehicle and distinguish when two vehicles are traveling in close proximity to each other and/or a vehicle is towing another vehicle. The LSP&D processes information from two loops and compares the information to determine if the information represents a single vehicle or multiple vehicles. When the end of the vehicle is determined the processor can set a timer based on the speed of the vehicle.

In a different arrangement in which loop 342 is an enforcement loop, as the timer completes its countdown, violation enforcement camera 370, which is in communication with enforcement loop 342, receives the signal output to take a picture.

Enforcement loop 342 is designed to work with camera 370 as part of a violation enforcement system. If a vehicle leaves separation loop 340 before the fare is collected at payment point 390, camera 370 takes a photograph of the vehicle when the vehicle triggers enforcement loop 342. Preferably, camera 370, enforcement loop 342, vehicle separation loop 340, and payment point 390 are located such that the photograph would clearly show the license plate of the vehicle.

Intelligent vehicle identification unit 270 in one embodiment of the present invention may be an assembly of electronic equipment and software that can control other equipment, store vehicle information, and distribute vehicle information to other devices or remote locations using an integrated remote access. Intelligent vehicle identification unit 270 can be adapted to assemble collected data from classification loop array 300 and one or more of vehicle separation loops 340 and 342 to create a composite signature information for the vehicle. One exemplary composite signature is shown in FIG. 21.

This collective body of profile information can include tire information, axle count, axle spacing, chassis height, chassis length, and vehicle speed. The vehicle record is associated with a vehicle type or combination vehicle type (i.e., motorcycle, car, car with trailer) from a database or vehicle library of available signatures. The database is accessible to intelligent vehicle identification unit 270. The vehicle type is then placed into a toll category, defined by the toll authority, to generate the proper fare for the vehicle. This is then used to drive the toll system, prompting the toll attendant when using a manual embodiment, or notifying the driver of the vehicle when using an automated embodiment, of the proper fare which is due.

Again, the vehicle types and categories are definable by the toll authority. Each vehicle type is placed in a category using the graphical user interface associated with intelligent vehicle identification unit 270. The graphical interface includes a library of vehicle types or vehicle combinations using captured digital images of the local vehicle population. The user interface may be a local interface, e.g., local interface 272. The user interface may also be a remote interface, e.g., remote interface 274. The visual interface allows the assignment of the magnetic and/or inductive composites of the vehicle records into different categories by selecting from a menu of captured images. The graphical user interface is a display of digital images of different vehicle categories that are used to represent groups of vehicle types. A group of these categories make up a vehicle library. New vehicle types can be added to the intelligent vehicle identification unit by incorporating the captured image and vehicle signature into the vehicle library. Exemplary screenshots of the vehicle library are shown as FIGS. 17-20.

An intelligent vehicle queuing system of the present invention can be used to insure proper matching of designated toll amounts to each vehicle. The queuing system profiles the approaching vehicle at payment point 390 and compares the data with the profile information held in queue by intelligent vehicle identification unit 270. If the profile is found to be an incorrect match, intelligent vehicle identification unit 270 attempts to properly match the indicated profile with other vehicles waiting in queue, thus insuring that the profiled vehicle is properly associated with the system's indicated amount of fare.

Figure 4:
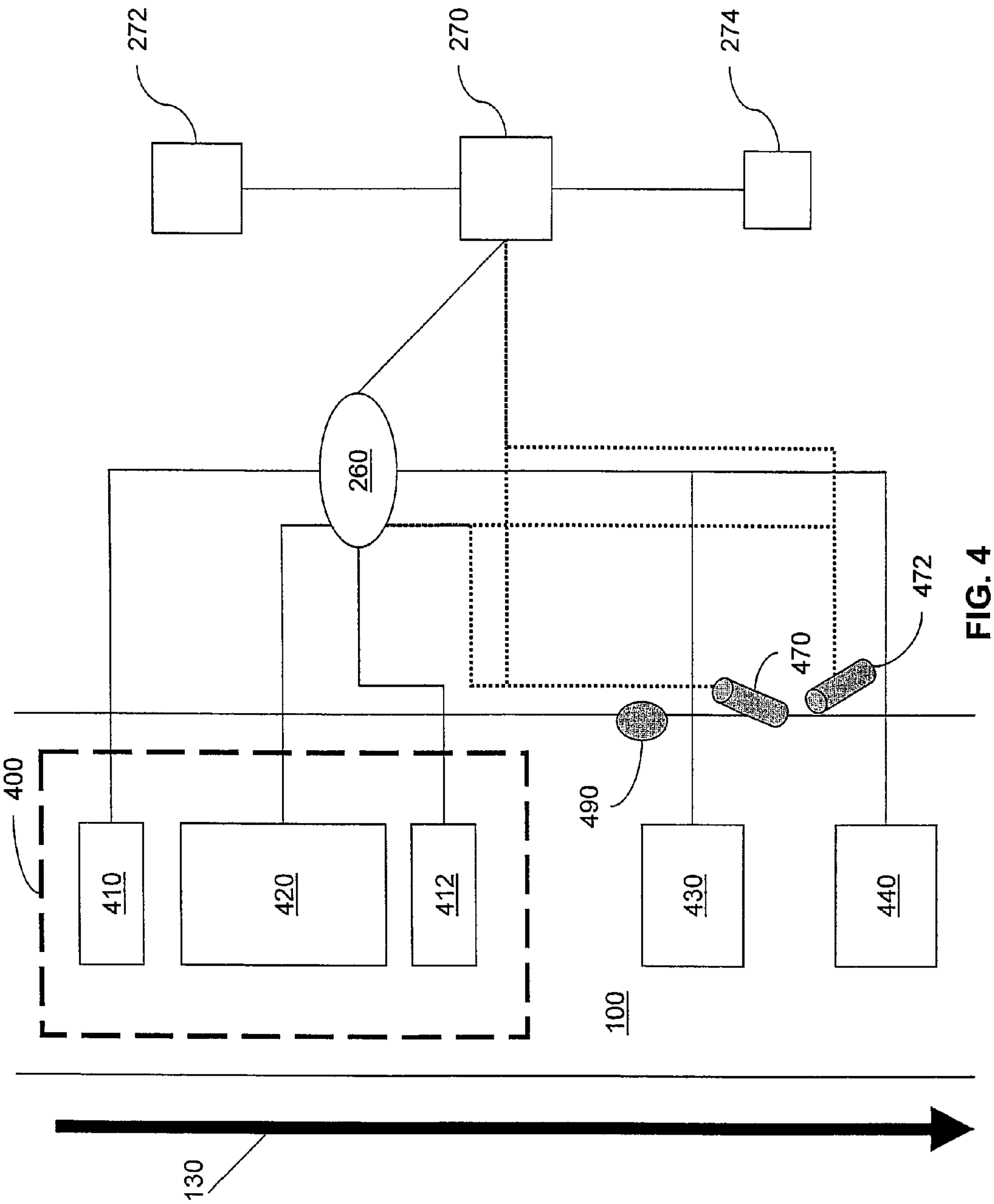
FIG. 4 is a schematic diagram illustrating another embodiment of the present invention as implemented in a toll road application.

FIG. 4 is a schematic diagram illustrating another embodiment of the present invention as implemented in a toll road application. In this embodiment, classification loop array 400 comprises front wheel assembly loop 410, signature loop 420, and rear wheel assembly loop 412. Furthermore, the embodiment shown in FIG. 4 comprises intelligent queue loop 430 and enforcement loop 440, payment point 490, rear view camera 470, and front view camera 472. These components are laid out such that rear view camera 470 and front view camera 472 can capture a photograph for vehicle violation enforcement purposes.

Figure 5:
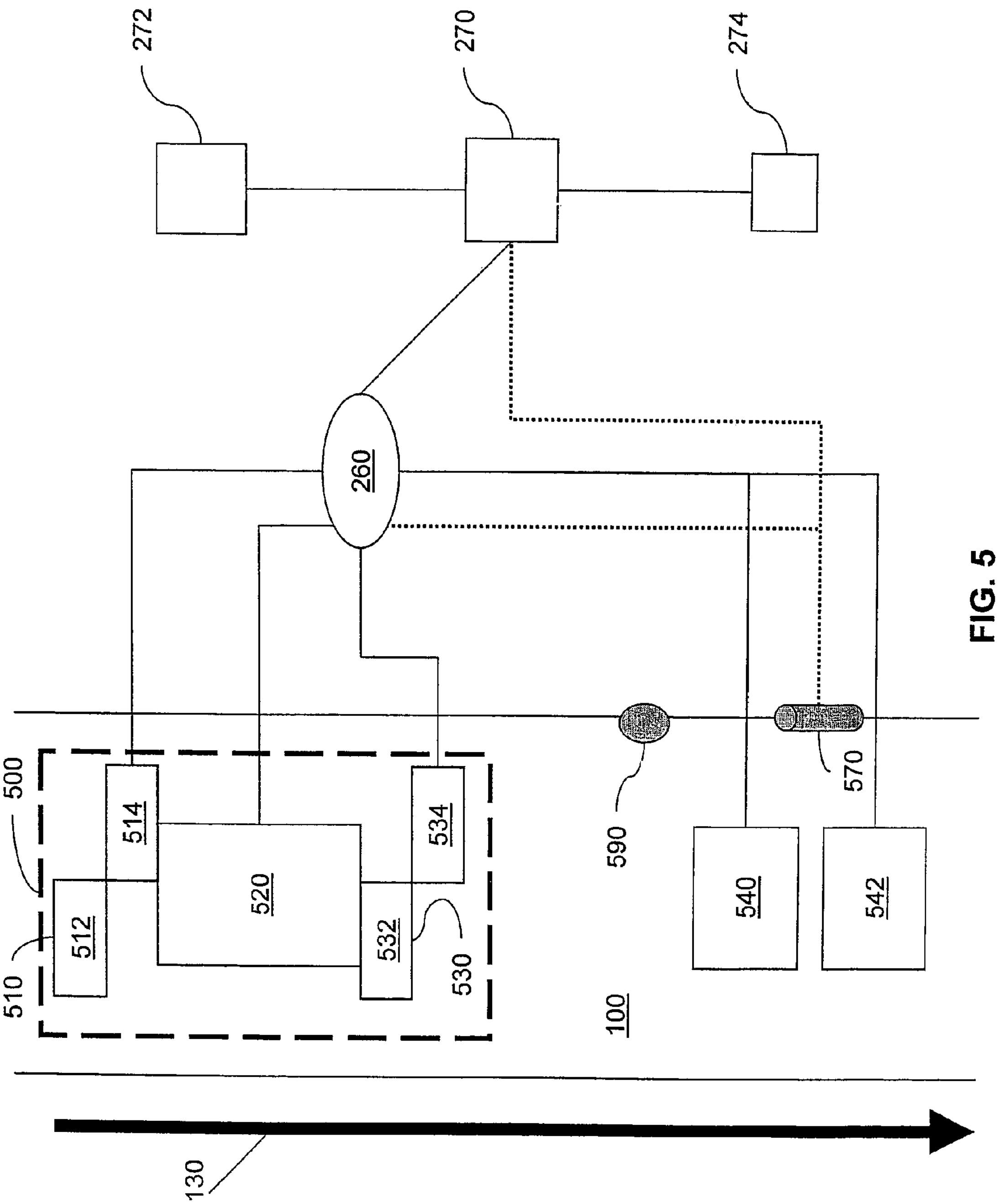
FIG. 5 is a schematic diagram illustrating another embodiment of the present invention as implemented in a toll road application.

FIG. 5 is a schematic diagram illustrating another embodiment of the present invention as implemented in a toll road application. In this embodiment, classification loop array 500 comprises one or more bi-symmetrical offset wheel assembly loops 510 and 530. Each of the bi-symmetrical offset wheel assembly loops 510 and 530 has a left member and a right member. For example, front bi-symmetrical offset wheel assembly loop 510 includes left member 512 and right member 514. Similarly, rear bi-symmetrical offset 530 comprises left member 532 and right member 534. Each of the bi-symmetrical offset wheel assembly loops 510 and 530 preferably has a leading edge offset and a trailing edge offset.

The offset of the left member and the right member of each of these bi-symmetrical offset wheel assembly loops is designed to capture left wheel information and right wheel information at two different instances in time. A more accurate average speed, axle separation, and other axle information can be calculated based on data collected by these bi-symmetrical offset wheel assembly loops 510 and 530.

As indicated in FIG. 5, classification loop array 500 can work with additional loops 540 and 542. As used in different arrangements, one or both additional loops 540 and 542 may be an intelligent queue loop, a vehicle separation loop, an enforcement loop, and a gate loop.

One or more of additional loops 540 and 542 can be adapted to work with camera 570 and payment point 590. A photograph of a vehicle can be captured for violation enforcement purposes if an appropriate fare is not received at payment point 590 when the vehicle is detected by additional loops 540 and 542.

Figure 15:
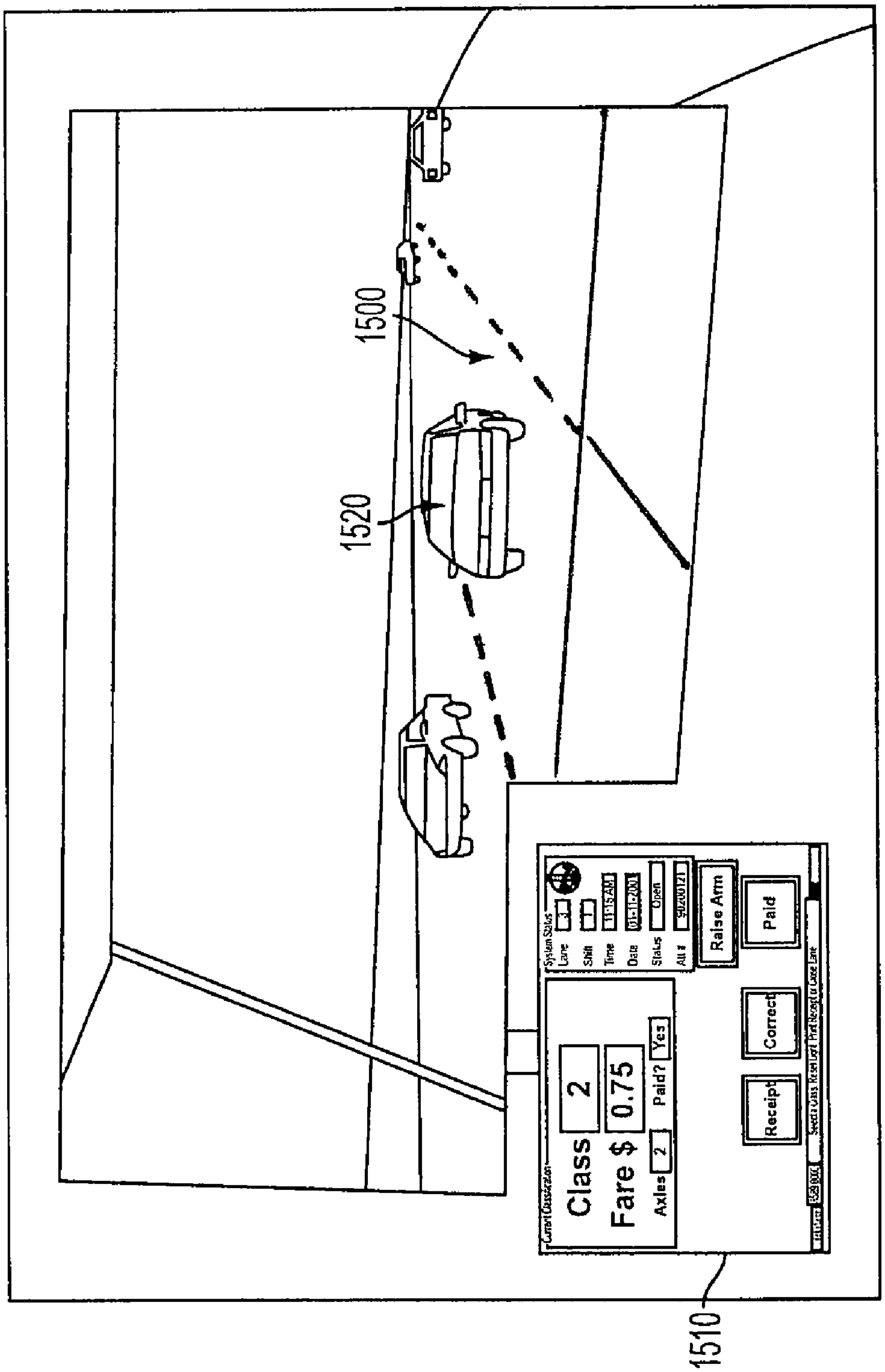
FIG. 15 is a diagram showing a view from a toll collection station indicating that as a vehicle approaches the toll collection station, the vehicle is classified and a fare is determined without input from a toll attendant.

FIG. 15 is a diagram showing a view from a payment point indicating that as vehicle 1520 approaches the payment point that is associated with toll lane 1500, vehicle 1520 is classified and a fare is determined and shown on display 1510 without input from a toll attendant.

Figure 16:
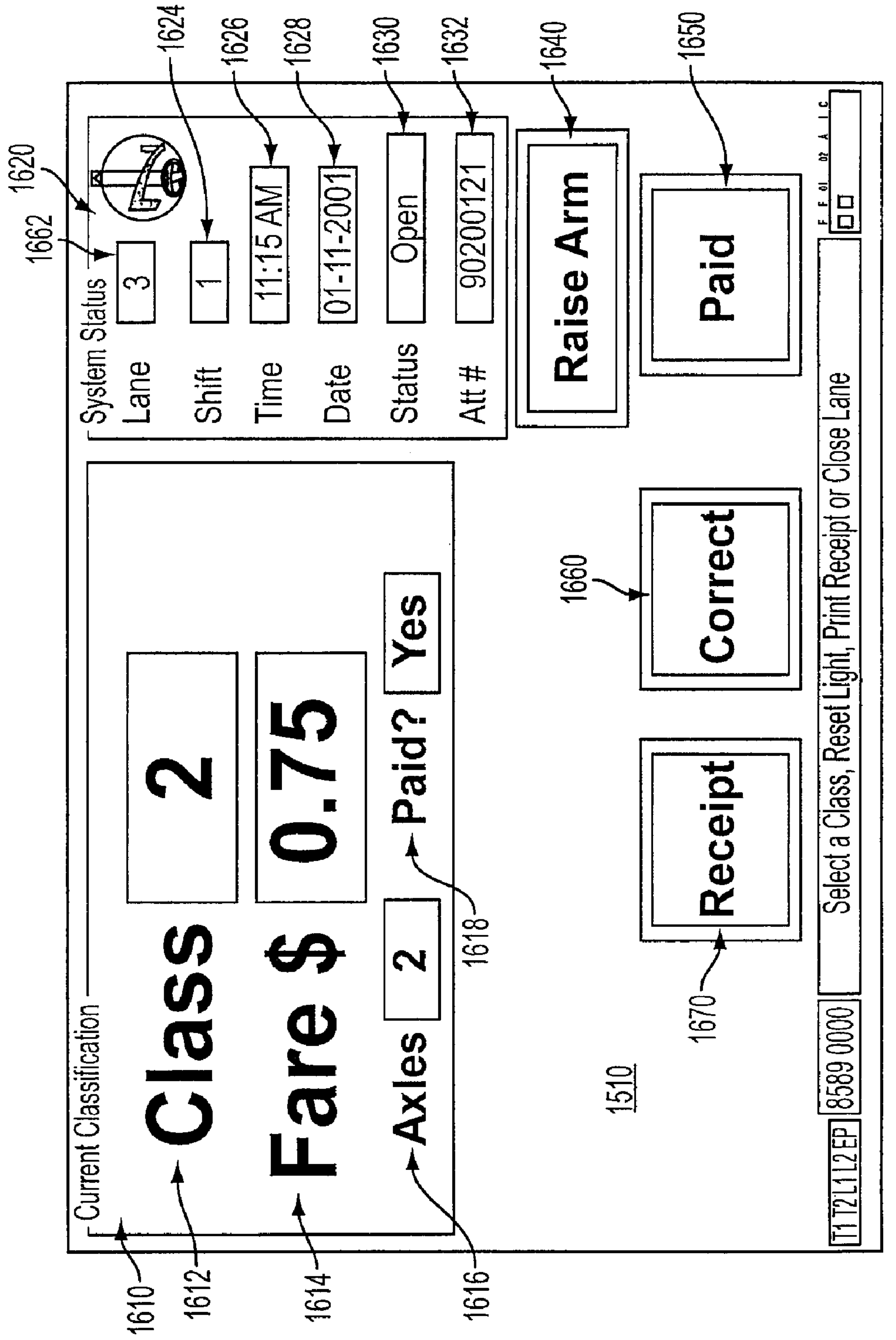
FIG. 16 is a screenshot indicating the classification for the vehicle shown in FIG. 15 and a fare associated with the classification.
Figure 17:
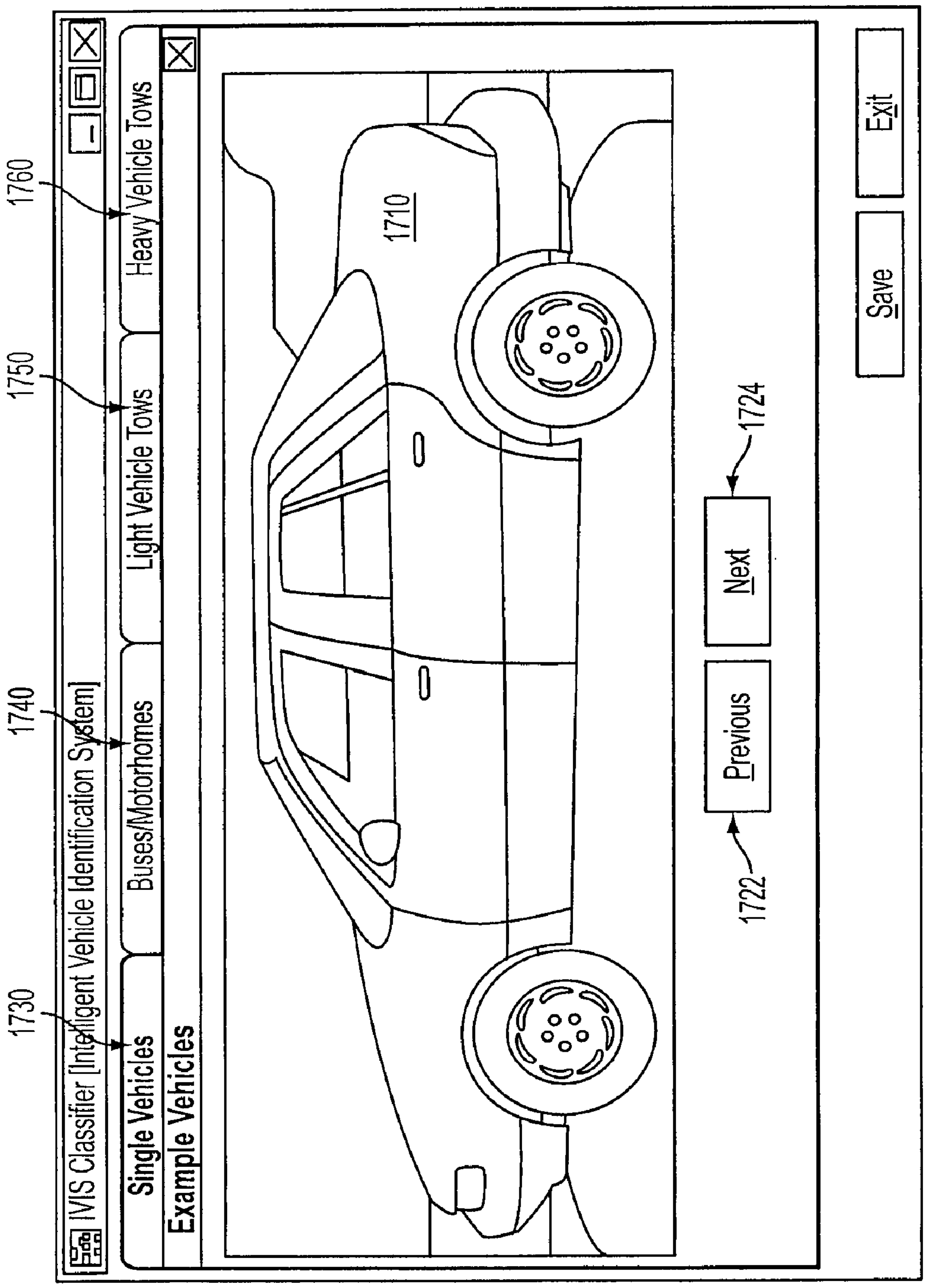
FIG. 17 is a screenshot showing an image of a vehicle category retrievable from a vehicle library that is accessible to an intelligent vehicle identification unit.
Figure 18:
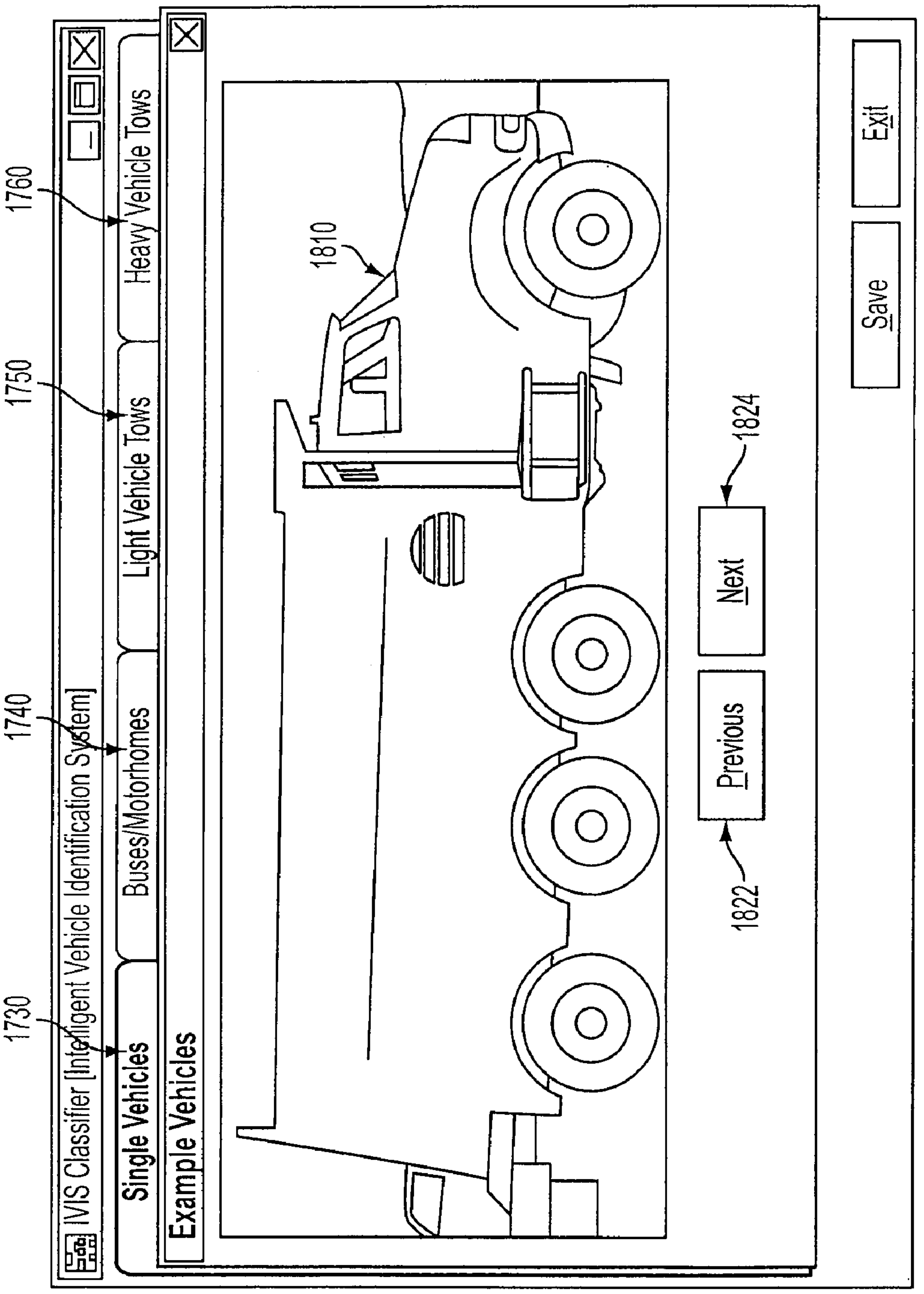
FIG. 18 is a screenshot showing an image of another vehicle category retrievable from a vehicle library that is accessible to an intelligent vehicle identification unit.
Figure 19:
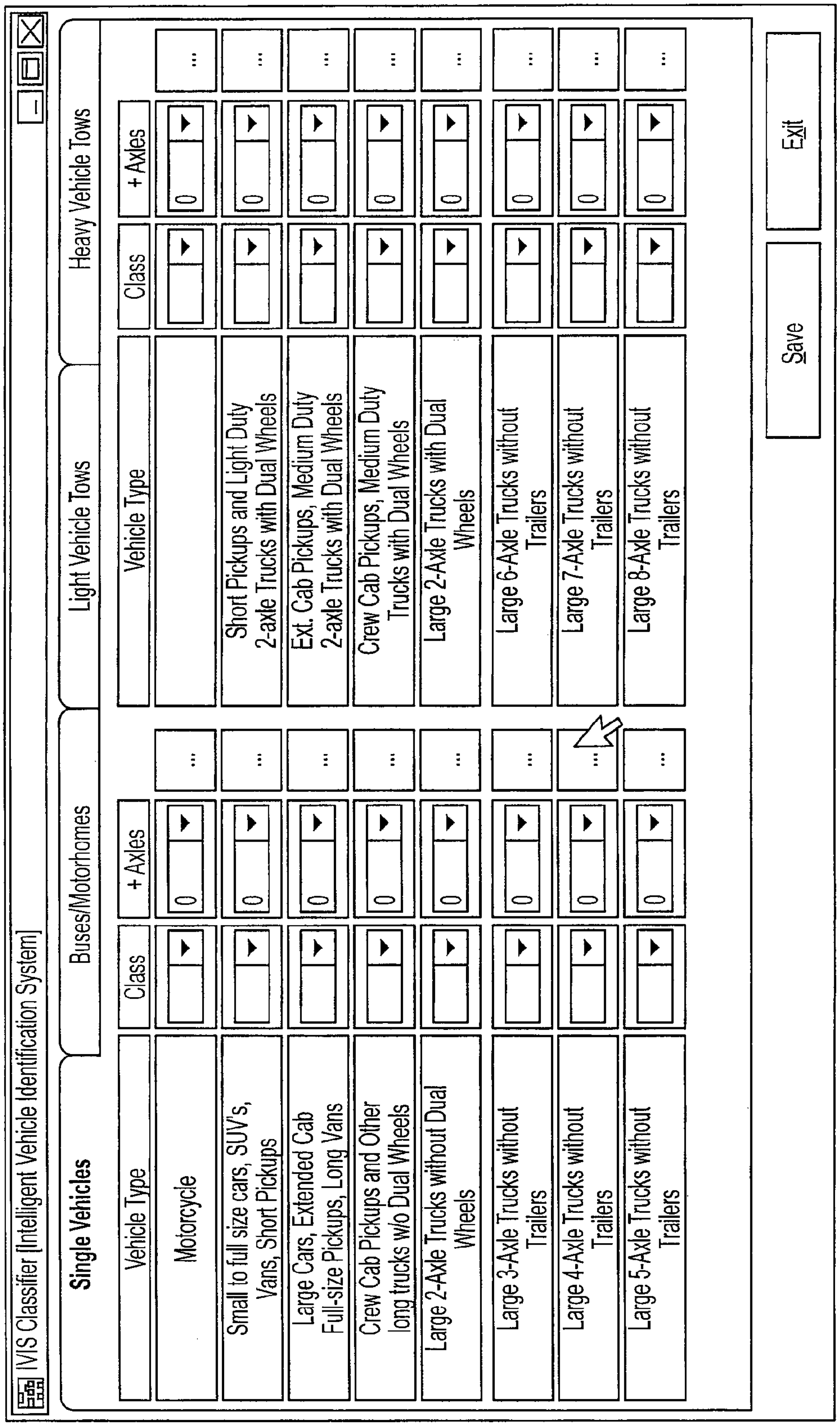
FIG. 19 is a screenshot of the intelligent vehicle identification unit of the present invention, indicating that the vehicle library can be reviewed, updated, or otherwise modified through a graphical user interface.
Figure 20:
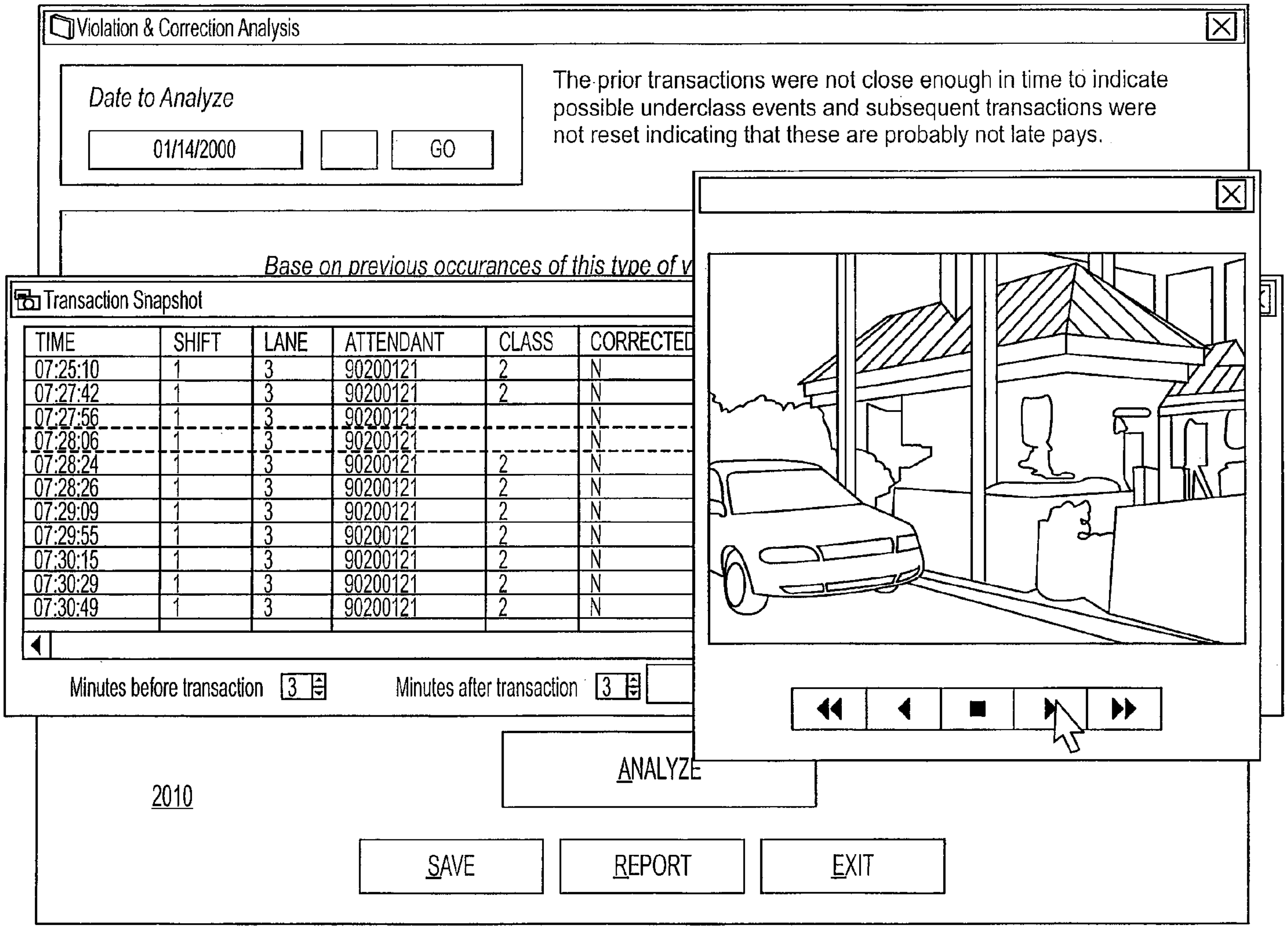
FIG. 20 is a screenshot of the intelligent vehicle identification unit of the present invention, illustrating that details of each transaction record can be stored in a database.

FIG. 16 is a screenshot of display 1510 indicating classification 1612 for vehicle 1520 and fare 1614, which is associated with classification 1612. As indicated on FIG. 16, display 1510 can be adapted to display a number of records associated with a transaction. Areas 1610 comprises fields 1610-1618. Field 1612 can display the class or category of vehicle 1520 as identified using the profile information of vehicle 1520. Field 1614 can be used to display the fare associated with the classification shown in field 1612. In addition, fields 1616 can be used to display an axle count associated with vehicle 1520. Field 1618 can be used to indicate whether the fare has been received at a payment point associated with toll lane 1500.

Area 1620, which comprises fields 1622 through 1632, can be used to display specifics of the transaction. For example, field 1622 is used to indicate that lane 1500 is Lane No. 3 of the particular toll plaza. Field 1624 can be used to indicate which shift of workers is on duty. Fields 1626, 1628 can be used to display the time and date on which the transaction occurs. Field 1630 can be used, for example, to indicate the status of a toll gate or other status of the toll lane. Field 1632 can be used to indicate which, if any, toll attendant is on duty. This information can be used to increase accountability among toll attendants.

In some embodiments, field 1640 can be used to manually operate a toll gate by a toll attendant. In an embodiment in which a toll attendant is staffed at toll lane 1500, field 1650 can be adapted to close the transaction after the toll attendant verifies that the toll has been paid. Field 1660 can be adapted, for example, to be pressed by the toll attendant in a situation in which classification made by the IVIS is verified by the toll attendant. Finally, a toll attendant or an operator of the vehicle can press a field 1670 to obtain a receipt.

Figure 26:
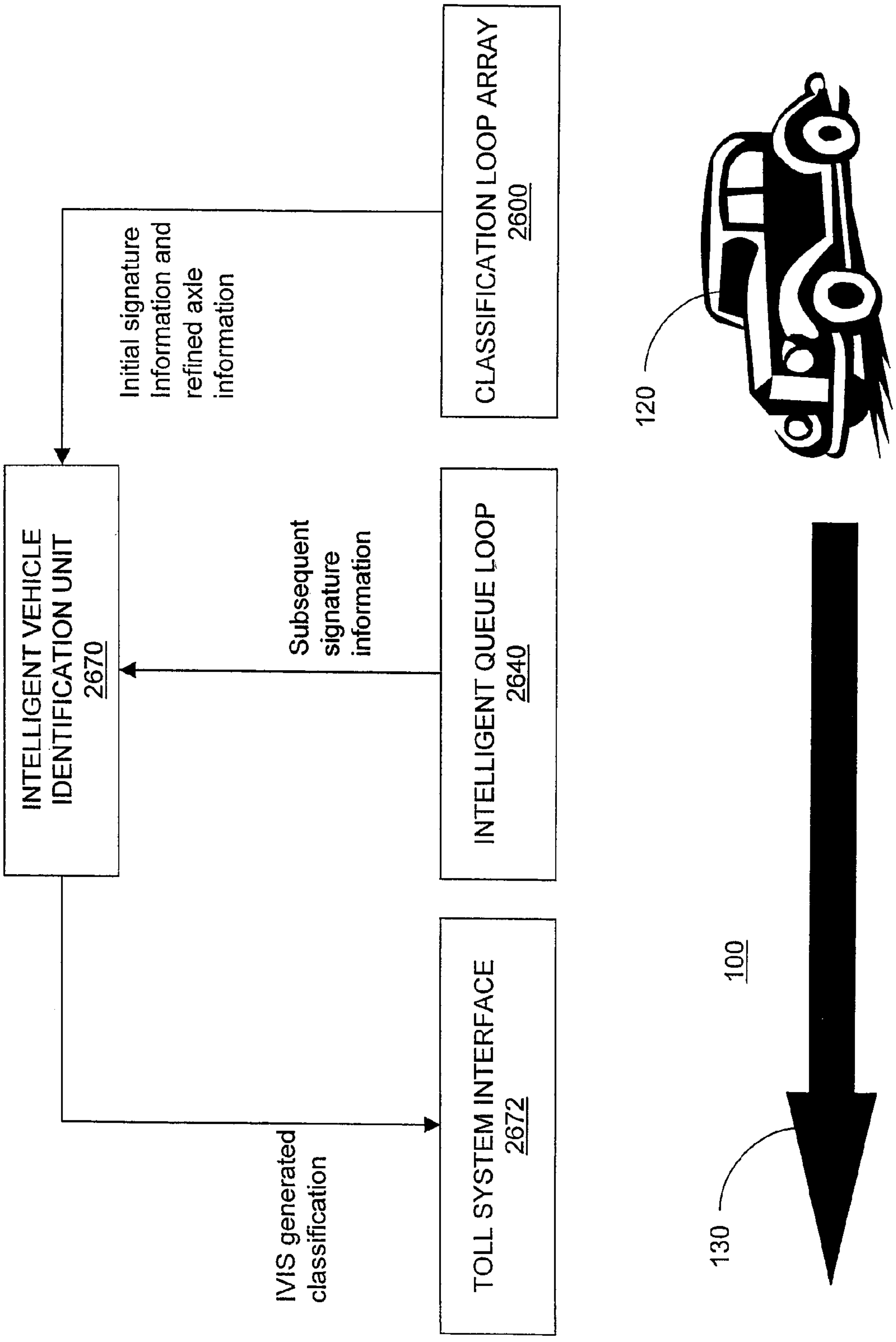
FIG. 26 is a schematic diagram showing the flow of information among various components of the present invention.

In FIG. 26, as vehicle 120 travels in direction 130 along toll lane 100 and passes over classification loop array 2600, vehicle 120's profile information is collected by intelligent vehicle identification unit 2670. Intelligent vehicle identification unit 2670 organizes the raw profile data and generates a classification for vehicle 120. As vehicle 120 then passes over the intelligent queue loop 2640, a second set of profile information is gathered by intelligent vehicle identification unit 2670. This profile is matched with profiles in queue generated by the classification loop array 2600. Intelligent vehicle identification unit 2670 then forwards the proper classification and/or toll amount to toll system interface 2672 as the vehicle approaches the payment point.

Overview of the '972 Application [Patent, do we Incorporated by Reference the '972 Patent so we can Properly Refer to it in these Paragraphs?]

Among other things, the present CIP application discloses additional design and configurations of loops that can be adapted for use in conjunction with the IVIS disclosed in the '937 application. The present CIP application further provides methods for installing the loops. The loops associated with the present CIP application are referred to hereinafter as ferromagnetic loops. It is noted that the present invention is not limited to vehicles identification and classification although the preferred embodiments disclosed herein relate to such purposes.

Figure 27:
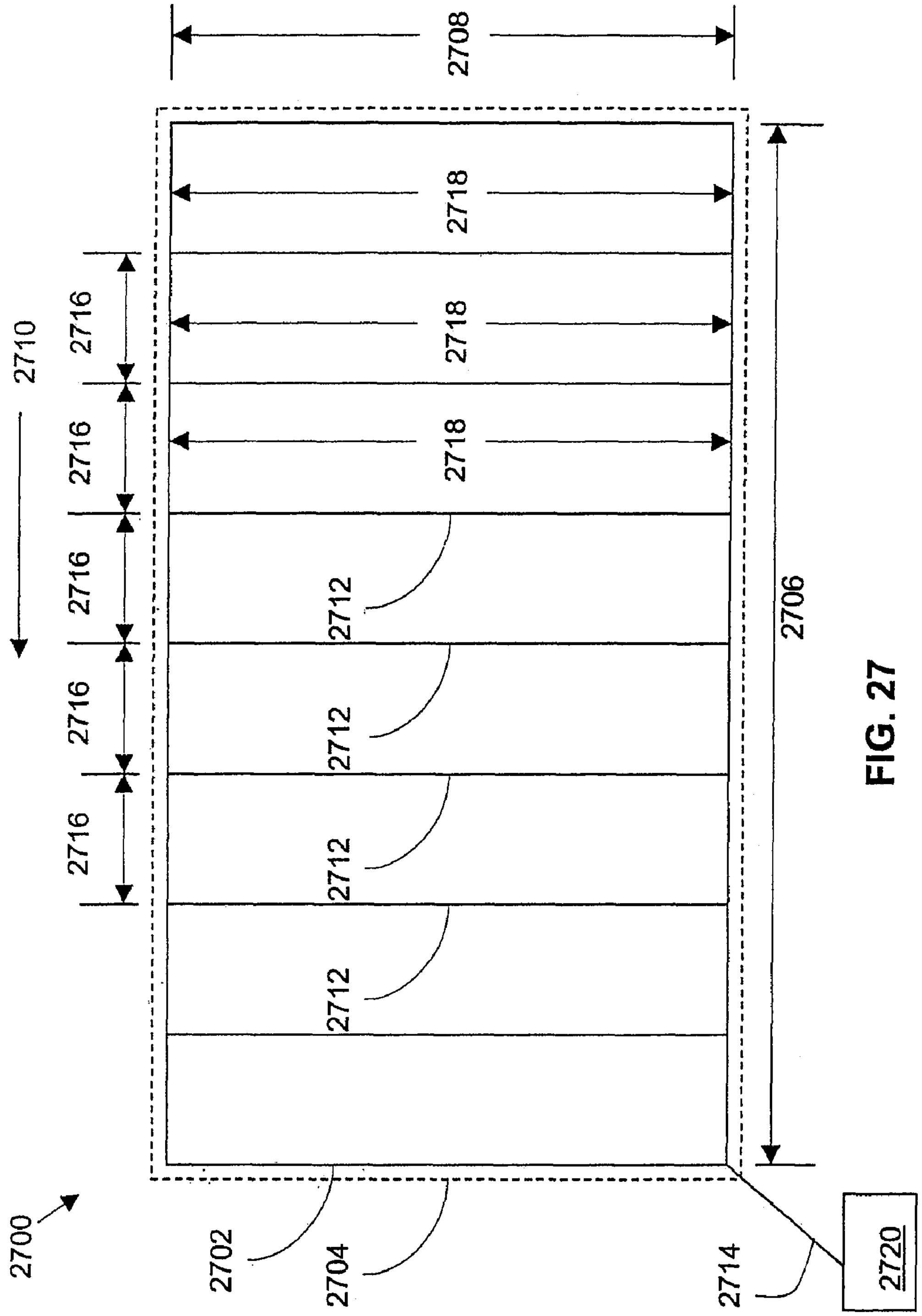
FIG. 27 is schematic diagram showing characteristics associated with a ferromagnetic loop of the present invention.
Figure 40:
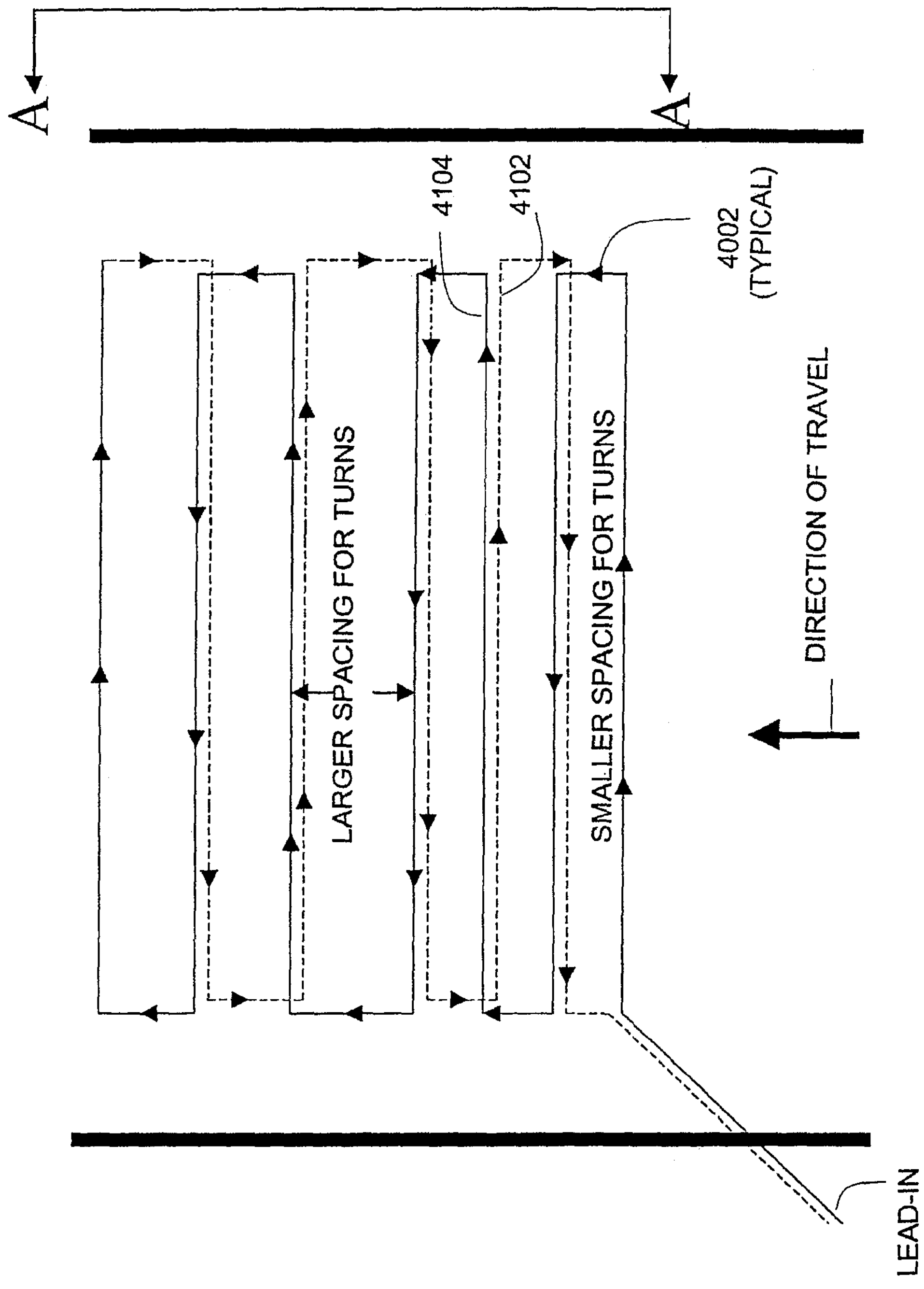
FIG. 40 is a schematic diagram showing how a continuous wire can be shaped in a serpentine manner to form a ferromagnetic loop of the invention.

In a specific implementation for vehicle detection applications, the present invention provides a ferromagnetic loop that is installed on a travel path for detection of vehicles moving in a direction along the travel path. In the specific implementation as shown in FIG. 27, ferromagnetic loop 2700 is characterized by continuous wire 2702, which is shaped in a serpentine manner within footprint 2704. FIG. 40, which is described further below, demonstrates the serpentine characteristics of continuous wire 2702. Footprint 2704 has footprint length dimension 2706, which is parallel to direction 2710 and footprint width dimension 2708, which is perpendicular to direction 2710. Continuous wire 2702 forms multiple contiguous polygons 2712 within footprint 2704. Each of multiple contiguous polygons 2712 is characterized by polygon length dimension 2716 that is parallel to direction 2710 and polygon width dimension 2718 that is perpendicular to direction 2710. Polygon length dimension 2716 may also be referred to as a spacing dimension. Loop 2700 has lead-in 2714. Lead-in 2714 connects loop 2700 to loop detector 2720. A frequency associated with ferromagnetic loop 2700 is affected when a vehicle (not shown) moves across footprint 2704 in direction 2710. Loop detector 2720 is adapted to output frequency vs. time plots based on information received from loop 2700.

In one preferred embodiment, each polygon width dimension 2718 is substantially equal to footprint width dimension 2708 and a sum of all polygon length dimensions 2716 is substantially equal to footprint length dimension 2706. In one embodiment, all polygon length dimensions 2716 are equally long. In a different embodiment, at least one of polygon length dimensions 2716 is longer than at least one other polygon length dimension 2716. In other words, the spacing dimension between any two contiguous polygons may be the same or vary. For toll road implementation purposes, footprint length dimension 2706 can range from about 10 inches to about 56 inches. Footprint width dimension 2708 can range from about 24 inches to about 144 inches. Preferably, polygon length dimension 2716 ranges from about three inches to about eight inches. Preferably, polygon width dimension 2718 ranges from about 24 inches to about 144 inches.

A ferromagnetic loop of the present invention such as loop 2700 can be adapted to collect a large variety of information associated with vehicles that move over it. Specifically, the ferromagnetic loop can, among other things, detect the spacing or the distance between two successive wheel assemblies of a vehicle, count the total number of wheel assemblies associated with the vehicle, calculate the vehicle speed, and determine a category of the vehicle based on the characteristics of the vehicle. The ferromagnetic loop is designed to maximize the detection of the wheel assemblies while minimizing the detection of the vehicle chassis. As a result of its enhanced capabilities for detection of wheel assemblies, the ferromagnetic loop can be adapted for use in, among other applications, traffic law enforcement, toll road operations, vehicle classification for data collection, and traffic management. One unique characteristics of the ferromagnetic loop of the invention is that one single loop can be used to replace the combination of piezo electric or resistive axle sensors, road tube, treadles, and multiple figure-of-eight or dipole axle loops that are currently used to detect wheels and axles.

Review of Various Wheel Sizes

Figure 28:
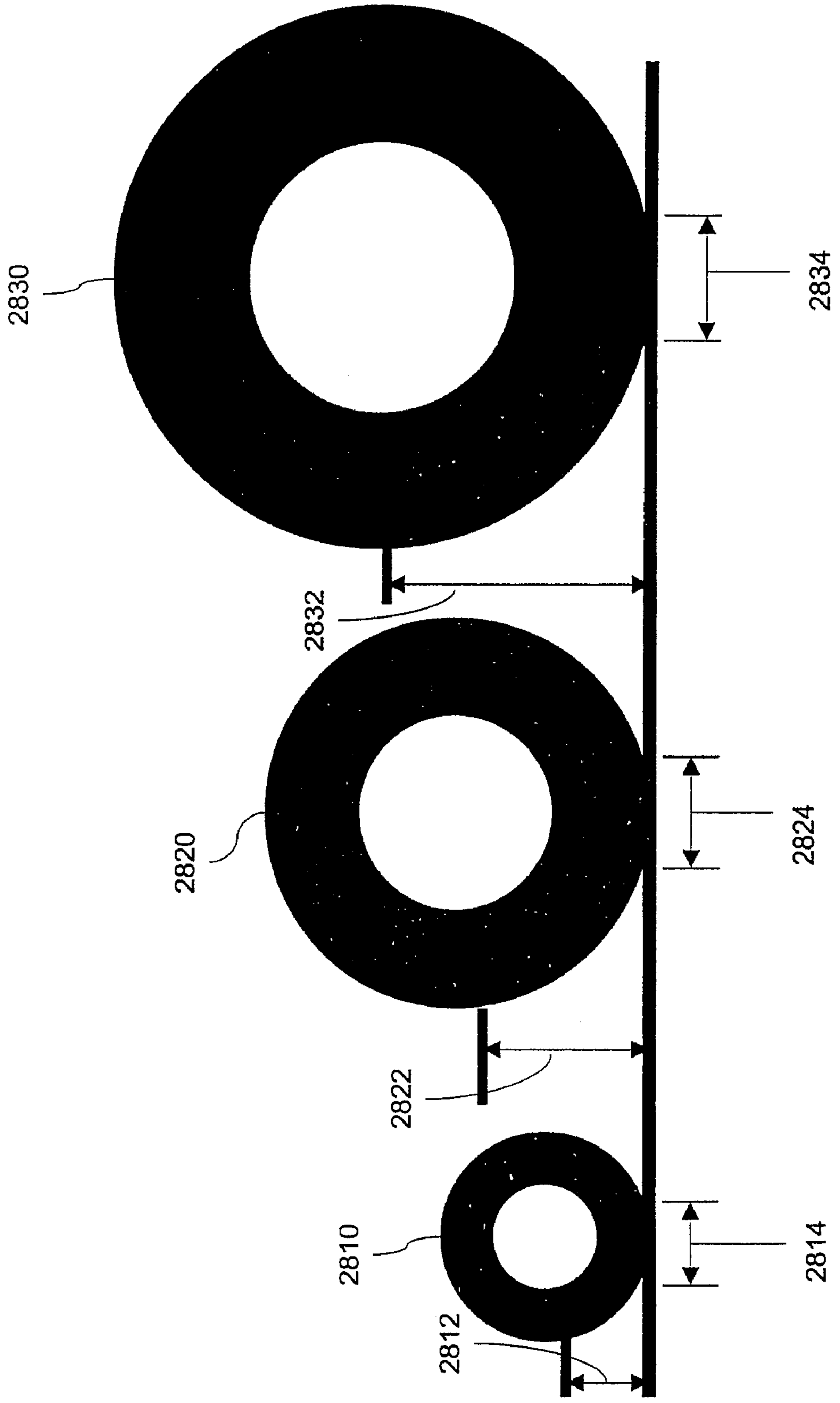
FIG. 28 is schematic diagram showing different wheel sizes of typical vehicles.

FIG. 28 is a schematic diagram showing different wheel sizes of typical vehicles that can be found on the highways. As illustrated in FIG. 28, the length of the bearing surface of each wheel (e.g., lengths 2814, 2824, and 2834) is proportional to the diameter of the wheel. Similarly, the chassis height of the vehicle (e.g., heights 2812, 2822, 2832) is also proportional to the diameter of the wheel and the length of bearing surface. Three typical wheel sizes found in random traffic are illustrated in FIG. 28. Automobile wheel 2810 is smaller than pickup truck wheel 2820, which is smaller than large truck wheel 2830. Automobile chassis height 2812 is shorter than pickup truck chassis height 2822, which is shorter than large truck chassis height 2832. Similarly, bearing surface length 2814 for automobile is shorter than bearing surface length 2824 for pickup truck, which is shorter than bearing surface length 2834 for large truck.

As shown in Table 1 below, the range for vehicle wheel diameters as found in random traffic can range from about 12 inches to about 44 inches in diameter. Typical length of a tire bearing surface or the length of contact area of a vehicle tire with the road can range between about 6 inches and about 12.5 inches.

Table 1 below summarizes selected categories of vehicles and their associated dimensions.

TABLE 1

| Type of Vehicle | Typical Wheel Diameter (inches) | Typical Chassis Height (inches) | Typical Bearing Surface (inches) |
|---|---|---|---|
| Trailers | 12 to 26 | 6 | 6 |
| Motorcycles | 12 to 23 | 6 | 9 |
| Automobiles | 23 to 26 | 7 | 8 |
| Pick-ups and SUVs | 26 to 30 | 9 | 9 |
| Light trucks | 30 to 32 | 12 | 10 |
| Large trucks | 40 to 44 | 15 | 12.5 |

Review of Existing Inductive Loop Technology

During the development of the ferromagnetic loops of the present invention, the inventors conducted a series of tests to evaluate inductive response that are obtainable by existing loop designs. For example, the inventors evaluated the performance of the inductive loops disclosed in U.S. Pat. No. 5,614,894 issued to Daniel Stanczyk on Mar. 25, 1997 (hereinafter "the Stanczyk patent"). In addition, the inventors evaluated the performance of the loop designs disclosed in WIPO Publication Nos. WO 00/58926 and WO 00/58927 (both published on Oct. 5, 2000) (hereinafter "the Lees applications"). The results of these tests and evaluations are described below.

In each of the tests conducted, the same loop detector was used to measure the results. In other words, no operating changes was made to the loop detector from test to test. Thus, the only variable that existed during the tests was the design of each of the loops being tested. The objective was to understand the technology disclosed in the Stanczyk patent and the Lees applications. Specifically, the limitations of these known technologies for detecting and counting vehicle wheels in random traffic were evaluated.

To illustrate the effectiveness of the loop designs disclosed in the Stanczyk patent and the Lees applications, and to demonstrate advantages of the present invention, the inductance changes obtained from each technology were plotted using the same loop detector. Each of the graphs or plots disclosed herein represents the changes in the loop circuits as a plot of frequency on the Y axis and time on the X axis. In other words, each of these graphs illustrates the effect of a vehicle traveling over a loop in a traveling lane.

The Stanczyk Patent

Figure 29:
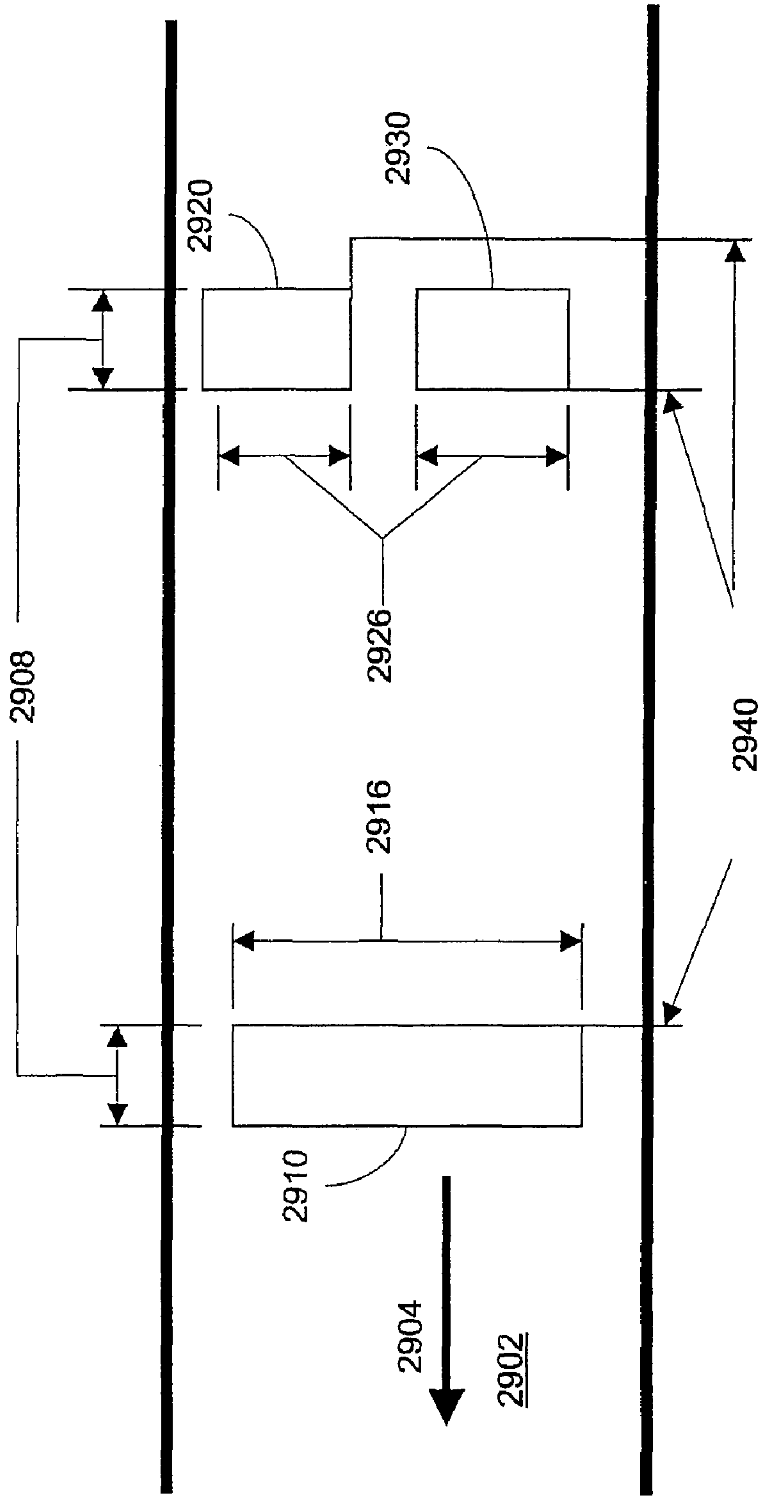
FIG. 29 is schematic diagram showing the layout of a known inductive loop design.

The Stanczyk patent discloses inductive loops having a rectilinear shape. Loops 2910, 2920, and 2930 shown in FIG. 29 illustrate typical rectangular shapes of this loop geometry. Each of the rectilinear loops consists of one or several turns of wire.

Loop 2910, which has a wider width dimension 2916, can detect the wheels from the left and right sides of a vehicle traveling on roadway 2902 in direction 2904. Loops 2920 and 2930 (each having a narrower width 2926) are designed to detect separately the left wheels and the right wheels of the vehicle. The Stanczyk design uses an ideal loop length 2908 of 0.3 meter (11.81 inches) for heavy vehicles and 0.15 meter (5.91 inches) for light vehicles. Each of these loop length dimensions is shorter than the bearing surface length of the vehicle wheels to be detected. This design provides a short travel time as wheels move through the inductive field of the loop, and it limits the sample size available for the wheel detection. Dimension 2908 affects the field height of the loop circuit. If dimension 2908 of this loop design is increased to a size larger than the diameter of the wheels it is designed to detect the field height of the loop detection is also increased. This is a limitation to the Stanczyk patent because when length dimension 2908 is increased, a stronger detection of the vehicle chassis is resulted, which inhibits the detection of wheels.

Therefore, the loop disclosed in the Stanczyk patent is limited by its geometric design since its performance is dependent on the bearing surface of the wheel of the vehicles being detected. In random traffic, vehicles have wheels that range from 12 inches to 40 inches in diameter with bearing surface widths ranging from six to 12.75 inches. To properly detect all the different vehicle wheel sizes in random traffic, multiple rectilinear loops of the Stanczyk patent would be required in the roadway. In other words, multiple loops each with a different length dimensions 2908 would be required to provide wheel detection for all vehicles that exist in random traffic. Using the technology disclosed in the Stanczyk patent, a single loop size will not work on both large wheeled trucks and smaller wheeled vehicles. For example, when a loop that has a specific length dimension 2908, which is designed to detect a tire bearing surface of 12 inches, the loop cannot be used to detect tires with a bearing surface of 7.5 inches long.

Figure 29A:
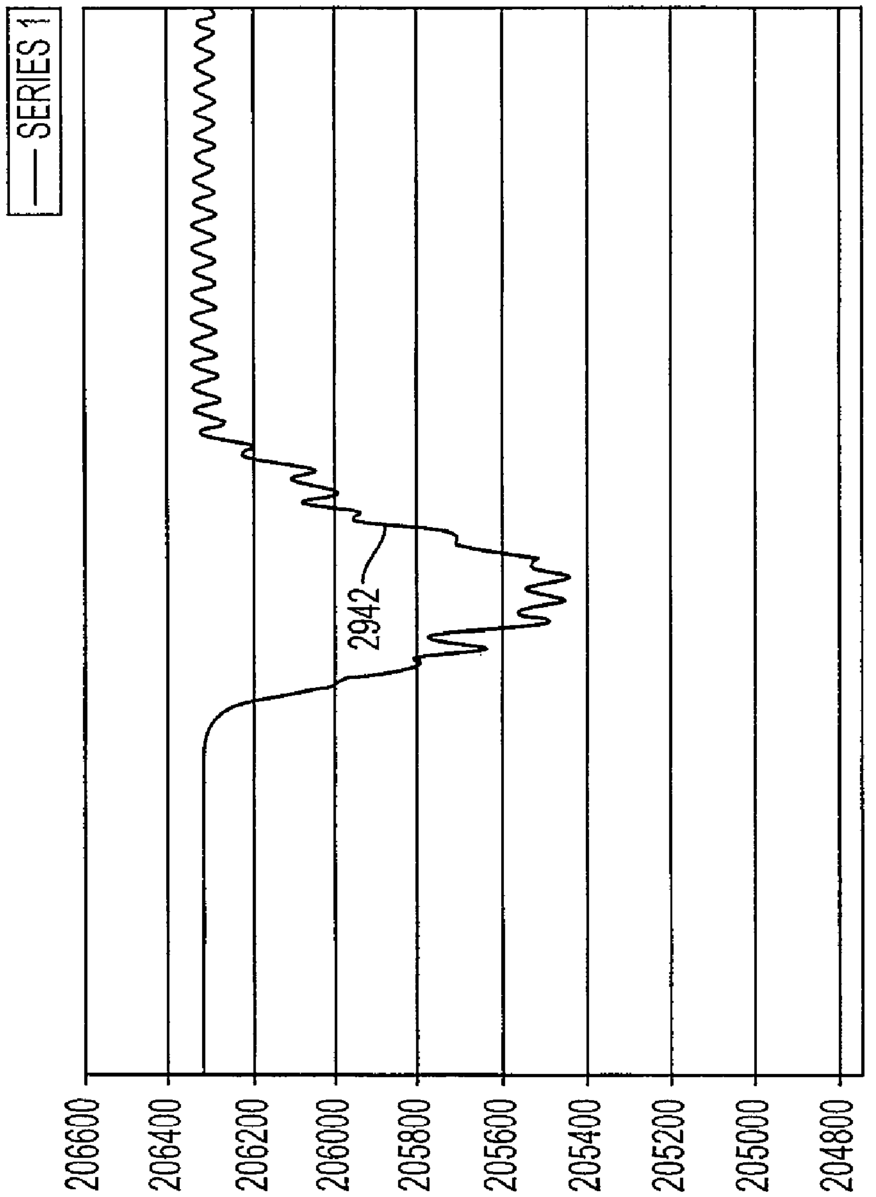
FIGS. 29A, 29B, 29C, 29D, and 29E are frequency vs. time plots obtained using known loops of an existing technology.
Figure 29B:
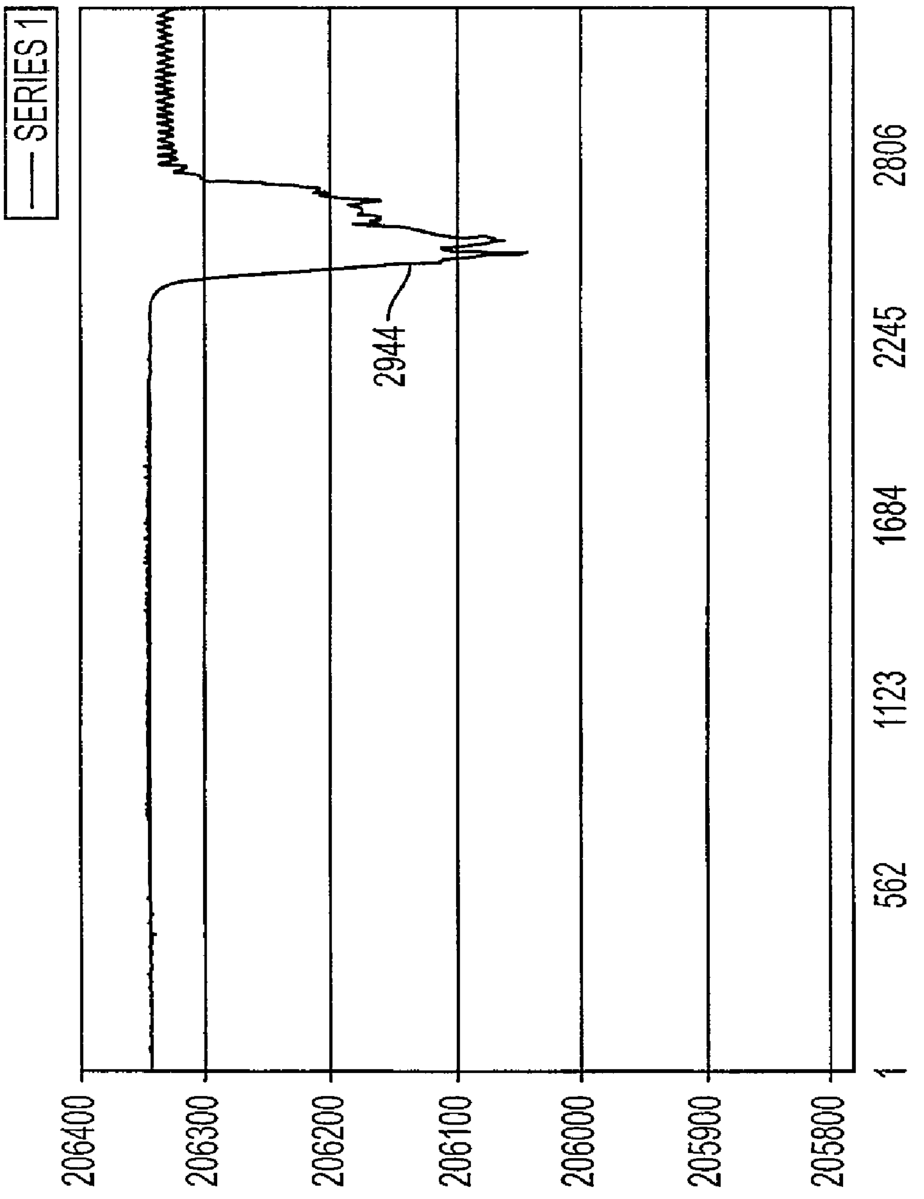
Figure 29C:
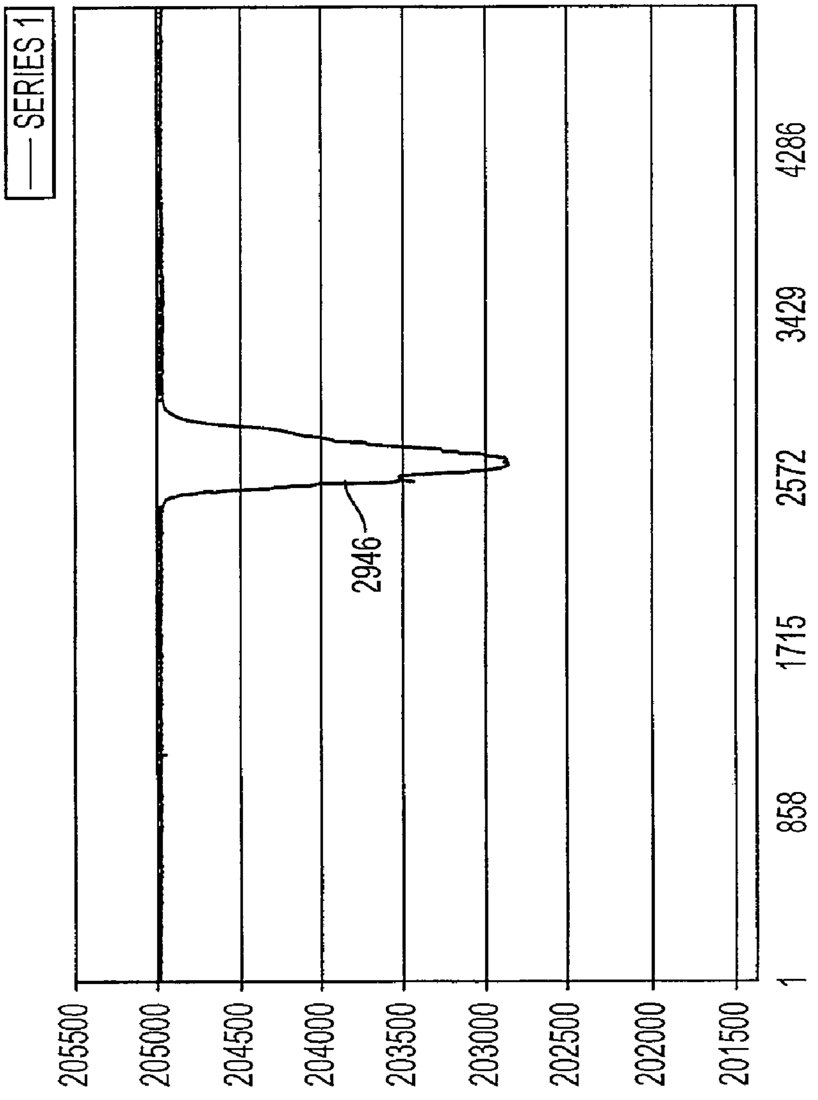

FIGS. 29A-29C are frequency vs. time plots obtained from the use of a rectangular loop in accordance with the teaching of the Stanczyk patent. The rectangular loop that was used to generate plot 2942 shown in FIG. 29A was 10 feet wide by 10 inches long and it had two turns. When a car with a tire diameter larger than 10 inches traveled over this loop, eddy currents created by the car chassis were detected by the loop. As shown on plot 2942 in FIG. 29A, it was impossible to determine the presence of wheel assemblies of the car due to strong detection of the chassis.

Similarly, plot 2944 shown in FIG. 29B illustrates the detection of a pickup truck (with a tire diameter of 26 inches) traveling over the same loop. Again, the detection of the vehicle wheels was impossible because the eddy currents created by the chassis could not be separated. This explains why the length of the loop circuit, or dimension 1 as shown in FIG. 1 of the Stanczyk patent must be smaller than the diameter of the wheel being detected. (See Stanczyk patent, Abstract and col. 2, lines 61-64.) This is because when the length of the loop (dimension 2908 shown in FIG. 29 of the present invention or dimension 1 shown in FIG. 1 of the Stanczyk patent) is increased to a size larger than the diameter of the wheel being detected, the loop senses the chassis of the vehicle, making it impractical to be used as a sensor for counting wheels. Plot 2946 shown in FIG. 29C further illustrates this observation as a vehicle having a wheel diameter of 24 inches was detected using a loop 10 feet wide by 20 inches long. As indicated in FIG. 29C, wheel assemblies of the vehicle were not discernable on plot 2946 even though the loop length has not exceeded the wheel diameter of 24 inches.

Figure 29D:
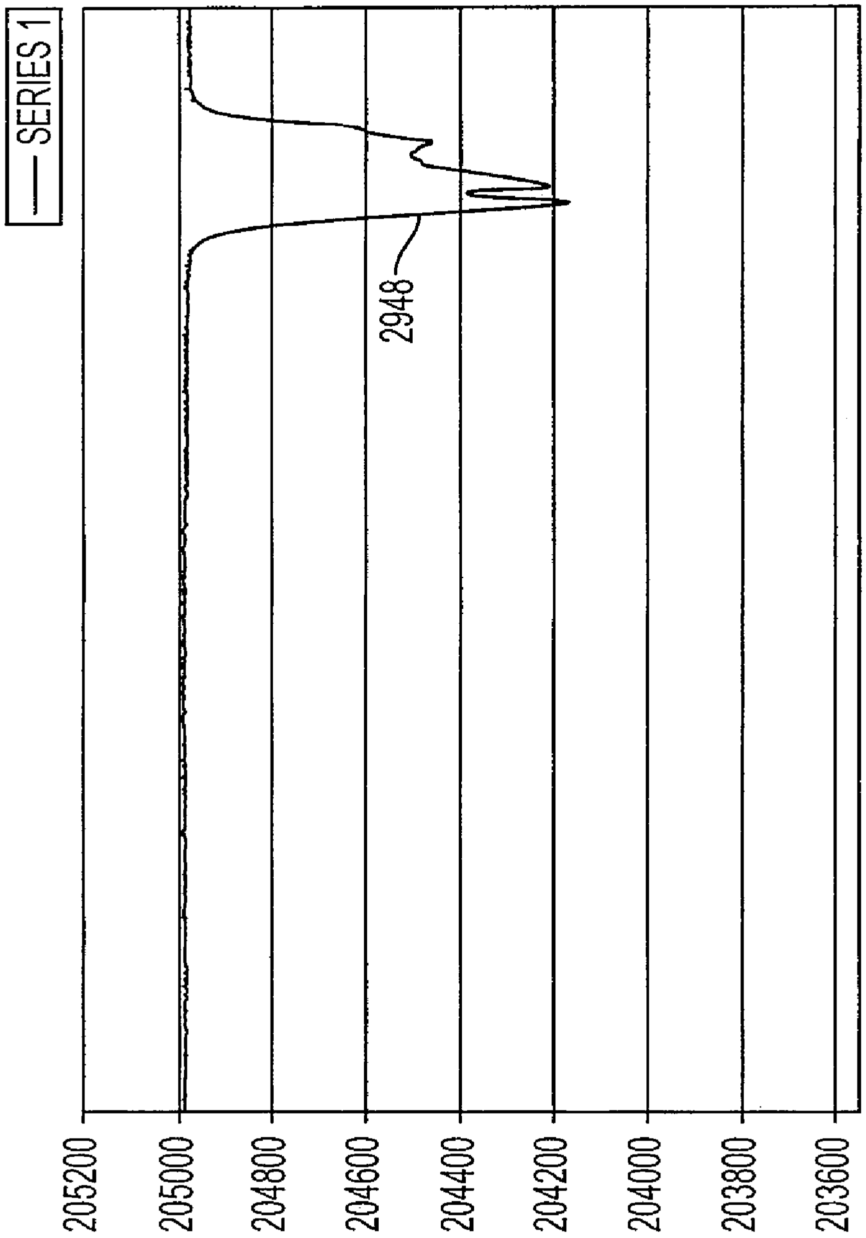
Figure 29E:
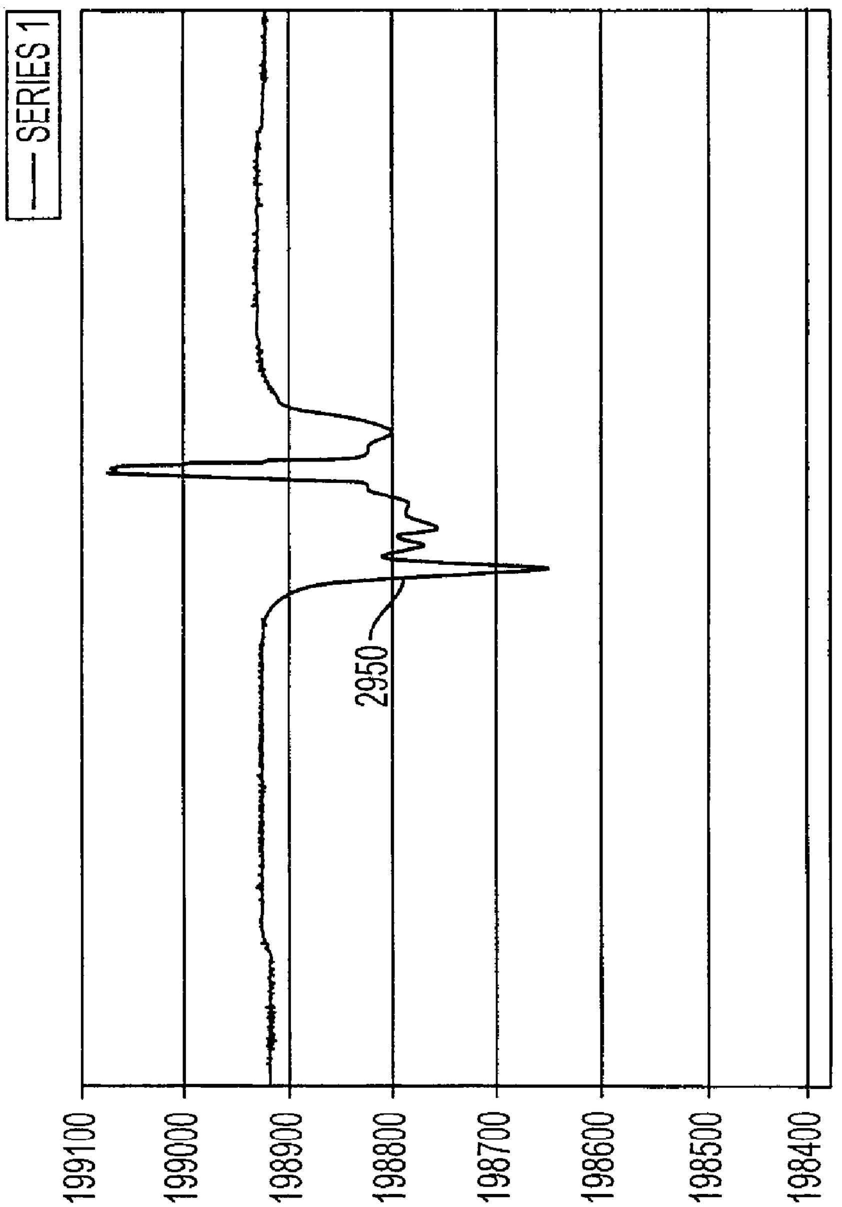

Plot 2948 shown in FIG. 29D demonstrates that vehicle wheels can be detected if the loop length (dimension 2908) is significantly shorter than vehicle wheel diameter. In FIG. 29D, the rectangular loop was 10 feet by 20 inches and the pickup truck had a wheel diameter of 29.5 inches. The tire bearing lengths for the rear and front wheels were 9.75 inches and 10.25 inches, respectively. As shown in FIG. 29D, the front and rear wheel assemblies are discernable from plot 2948 because the frequency fluctuation associated with the wheels on the pickup truck can be distinguished from the frequency associated with the chassis eddy currents. Plot 2950 shown in FIG. 29E illustrates a parcel delivery truck (with a wheel diameter of 30 inches) traveling over a loop 10 feet wide by 20 inches long. Even though the wheel assemblies were detected, the eddy currents from the chassis were also detected. Thus, while the loop was suitable to detect a smaller wheel, it can not be used to detect larger wheels without also detecting the vehicle chassis of the vehicle with large wheels. Therefore, FIGS. 29D and 29E indicate that more than one loop size would be required to detect the various wheels sizes found in random traffic.

Accordingly, the rectilinear design of the Stanczyk patent has geometric constraints that limit the size of sample or sensing area. This limits the sample length of the each wheel and prevents the ability to accurately measure the speed of the vehicle. When the length of the loop is increased, the field height increases and eddy currents also increase making this design not practical to calculate wheel speed on a single loop. As indicated in the Abstract and in at least Col. 2, lines 61-64, the Stanczyk patent specifically teaches that the length of the loop must be smaller than the diameter of the wheel. The preferred length of the loop tends to be limited to the bearing length of the tire, or the tire bearing lengths tend to be longer than the loop length, to provide distinct wheel detection.

In addition, the rectangular design of the Stanczyk patent uses multiple turns of wire around the perimeter, and the design is limited to a length that is shorter than the diameter of the wheel it is detecting. As the length of the loop is made small, the loop would detect smaller vehicles but not larger ones.

In contrast to the Stanczyk patent, as explained below, the ferromagnetic loop of the present invention offers greater flexibility in size and shape of the loop geometry and provides a longer travel area for the wheel paths. As explained below, a single ferromagnetic loop of the present invention is capable of detecting different size wheels found in random traffic. Significantly, the length of a ferromagnetic loop of the present invention can be greater than the diameter of the wheel being detected. Thus, it is possible to use a single ferromagnetic loop of the present invention to detect the entire population of wheels in random traffic. The loop can also detect the difference between single-tire and dual-tire assemblies. Also, the longer loop sample time associated with the ferromagnetic loop provides the ability to calculate speed using just a single loop.

The Lees Applications

Figure 30:
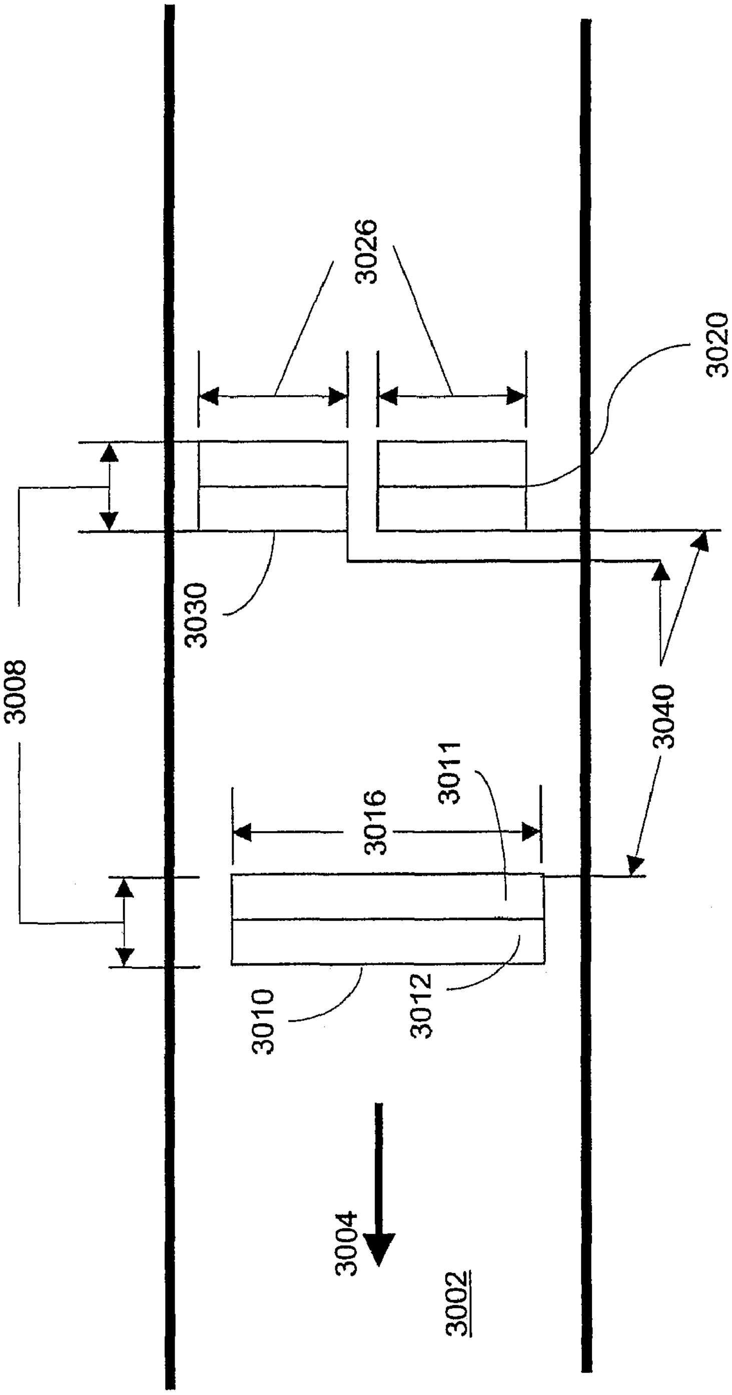
FIG. 30 is schematic diagram showing the layout of another known inductive loop design.

The figure-of-eight loop design (also referred to hereinafter as the dipole loop design) disclosed in the Lees applications has a central winding, with the two outer segments in the direction of travel having a length shorter than about 23.6 inches (or about 60 cm), and preferably about 17.7 inches (or about 45 cm). FIG. 30 illustrates the typical loop geometry in accordance with the Lees applications. Loop 3010 illustrates the use of a single loop to detect both left and right wheels of the vehicle. Loop 3010 has front segment 3011 and rear segment 3012. Loops 3020 and 3030 are used to separately detect the left wheels and the right wheels, respectively. Each of loops 3020 and 3030 also has front and a rear segments.

Figure 30A:
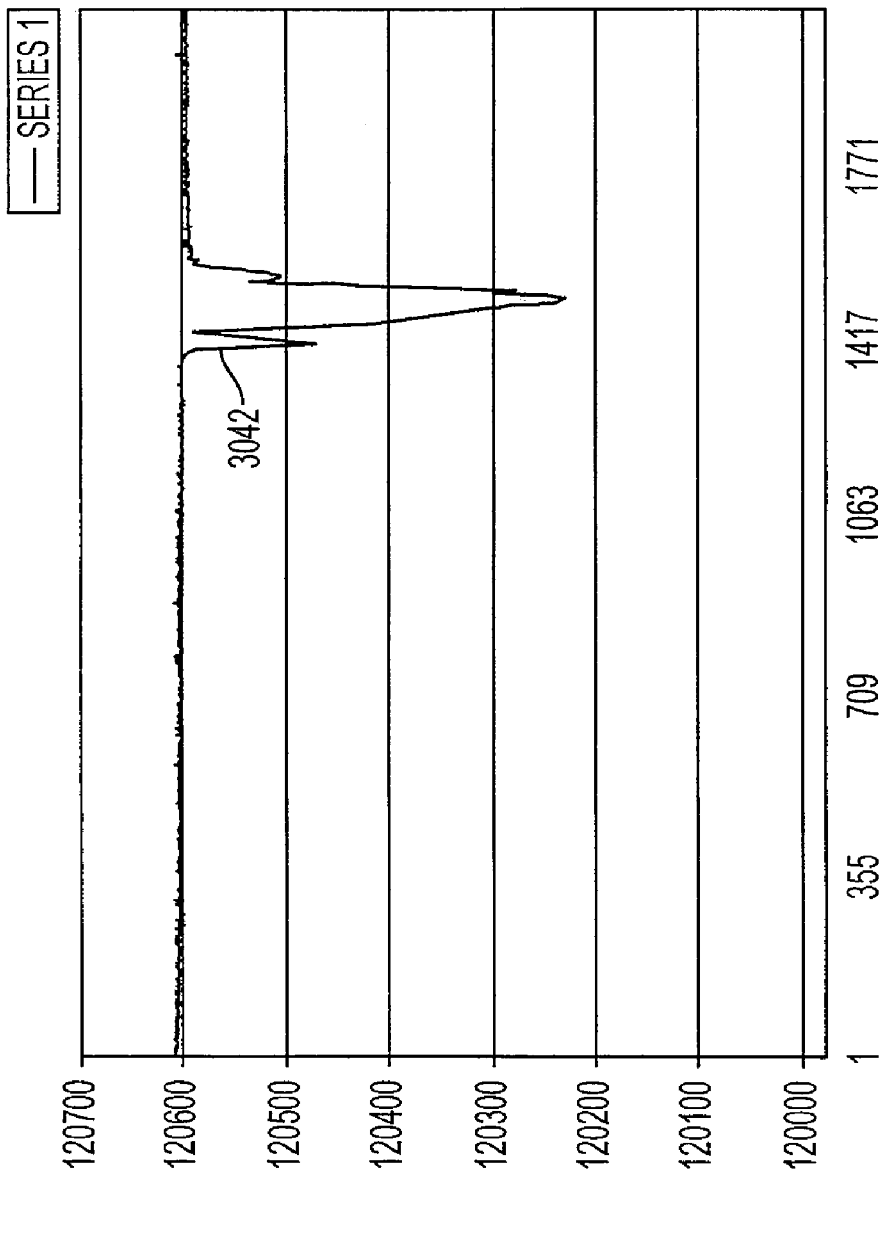
FIGS. 30A, 30B, 30C, 30D, and 30E are frequency vs. time plots obtained using known loops of an existing technology.
Figure 30B:
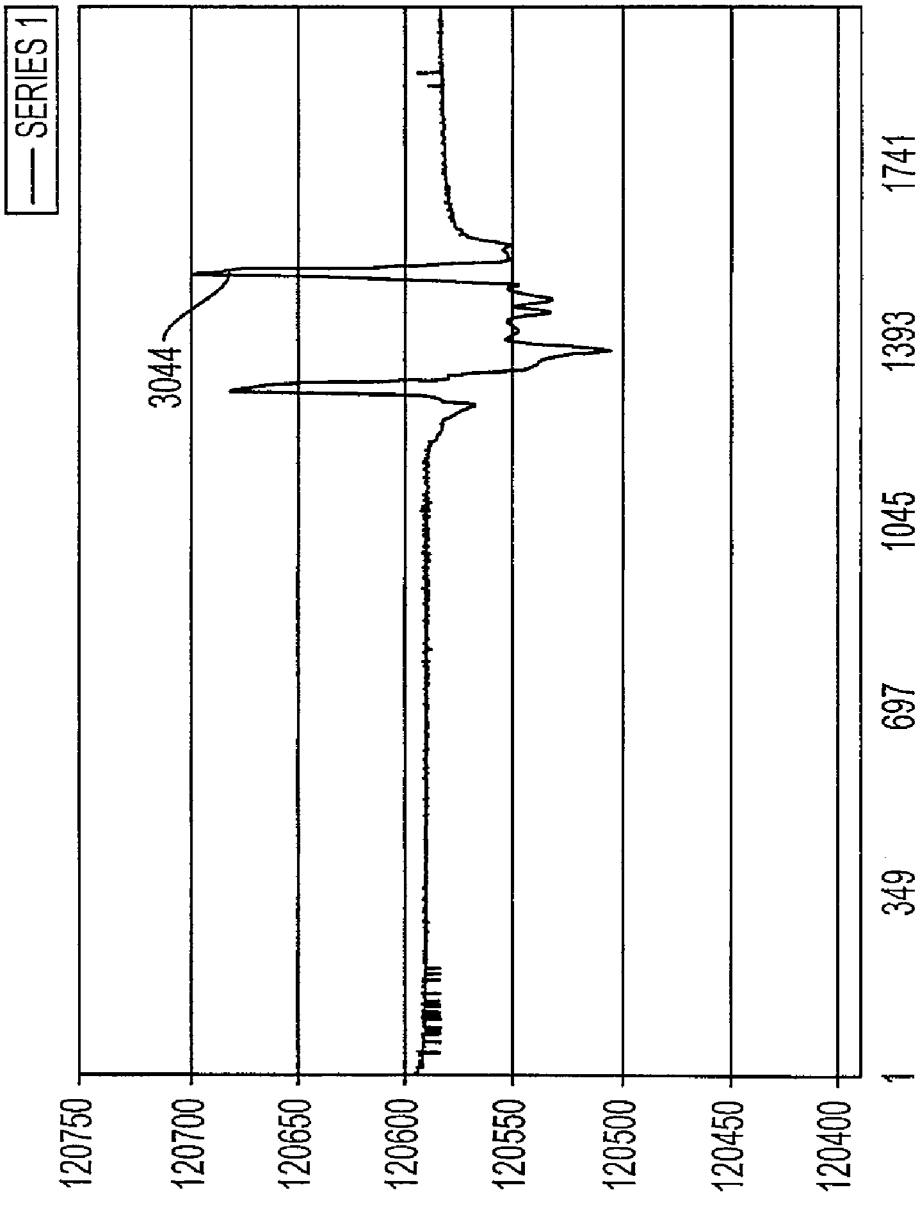
Figure 30C:
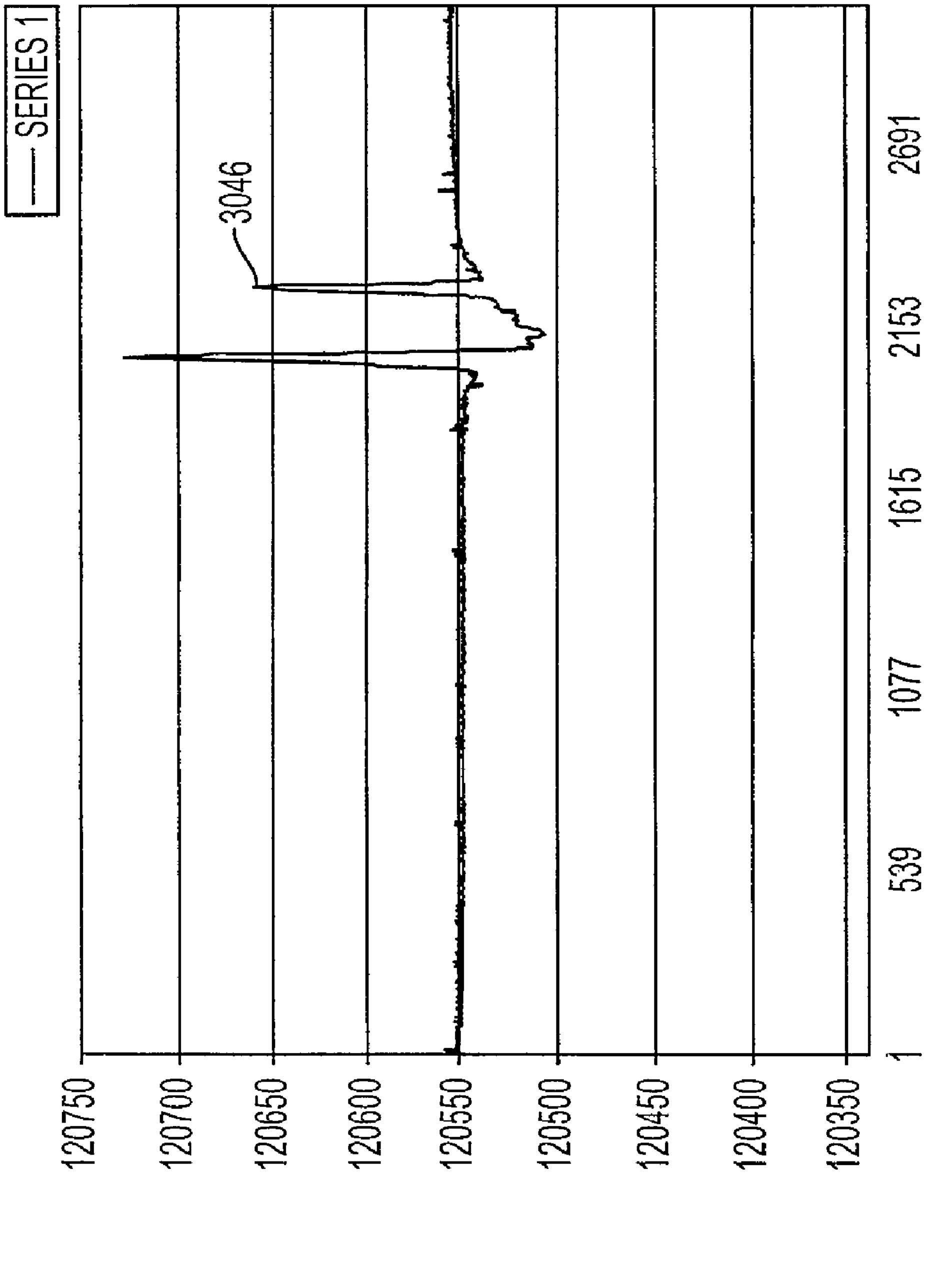

A figure-of-eight loop similar to loop 3010 with dimensions 10 feet wide by 18 inches long (i.e., each front segment 3011 and rear segment 3012 is nine inches long), built and installed in accordance with the Lees applications, was used for evaluation purposes by the inventors. Plot 3042 shown in FIG. 30A is a frequency versus time plot that was obtained during the detection of a car traveling over the loop. As shown on plot 3042, the detection of wheels was not well defined. The same loop was used to detect the wheels on a pickup truck with a larger wheel diameter. As indicated by plot 3044 shown in FIG. 30B, a loop of this size provided improved wheel detection on the larger size wheels. As indicated by plot 3046 shown in FIG. 30C, this loop size also provided good wheel detection on truck wheels having a diameter of 30 inches. The truck associated with FIG. 30C had dual wheel assemblies on the rear axle. The 10 feet wide by 18 inches long loop detected the wheels on the truck but does not reflect any difference in amplitude from the front to the rear dual tires.

For the dipole (figure-of-eight shape) loop with the dimensions of 10 feet by 18 inches, the test results indicated that it is not suitable for detection of small-wheeled vehicles. The wheels are not clearly defined in plots generated by this loop because the chassis of vehicles with small wheels lowers the frequency of the loop circuit.

As further explained below, the ferromagnetic loop of the present invention is different from the loops disclosed in the Lees applications since the geometry allows the loop's length to be longer than the diameter of the wheel to be detected. Furthermore, a single loop design can detect the different wheel sizes. It should be noted that the design of the present invention also has the ability to detect dual wheels. The amplitude of the front wheel can be compared to the rear wheel to determine the presence of dual tires on the rear axle using the ferromagnetic design of the present invention.

Figure 30D:
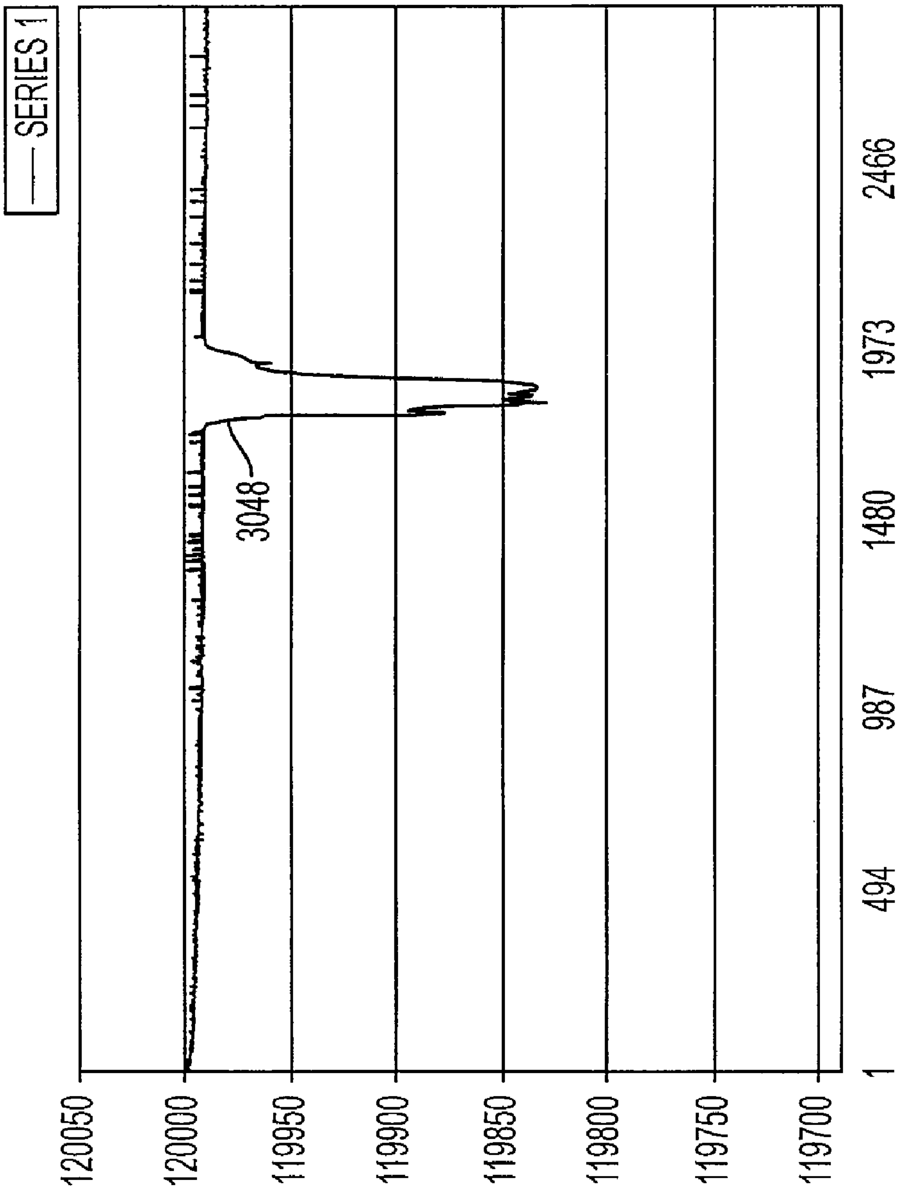
Figure 30E:
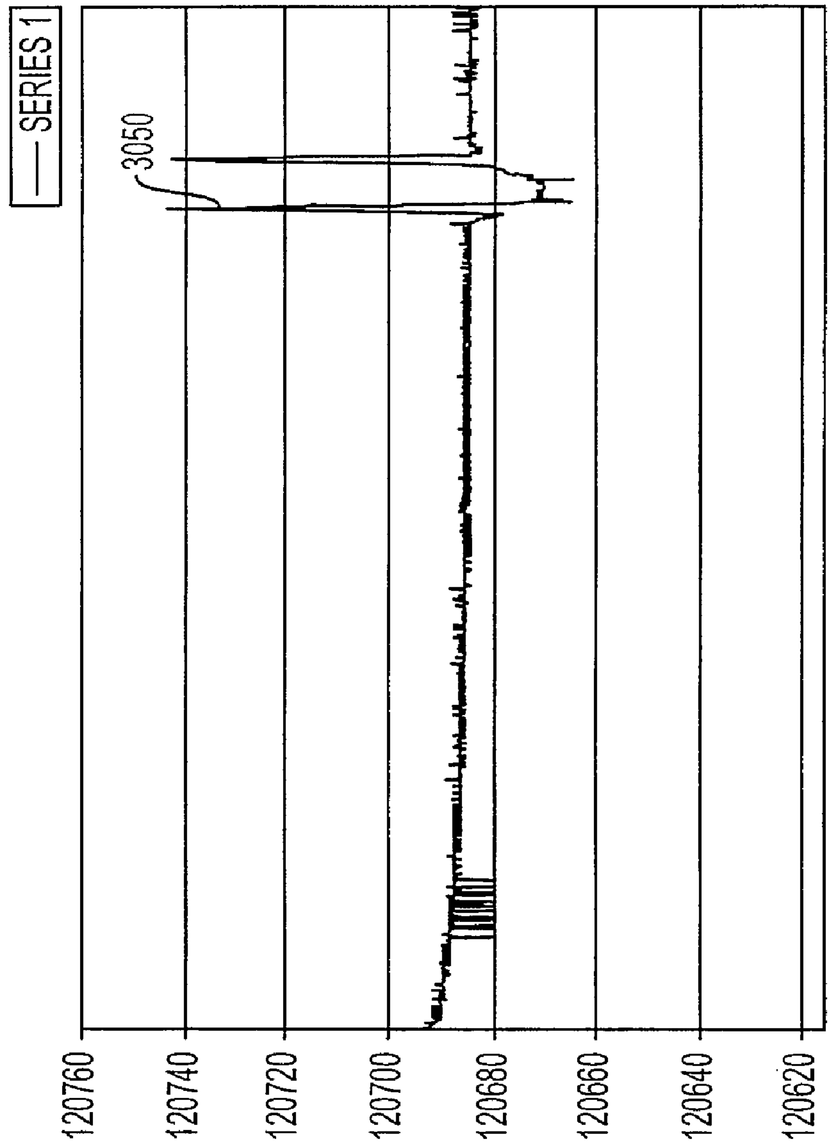

Plot 3048 shown in FIG. 30D shows the detection of a car traveling over a five feet wide by 18 inches long dipole loop (e.g., loop 3020). As shown in FIG. 30D, wheels of the car were not properly detected using a loop of this size. Plot 3050 shown in FIG. 30E shows that a five feet wide by nine inches long loop was able to detect the same wheels that were not detected in FIG. 30D. FIGS. 30D and 30E demonstrate that different lengths of the dipole loop were required to detect different wheel sizes.

Figure 30F:
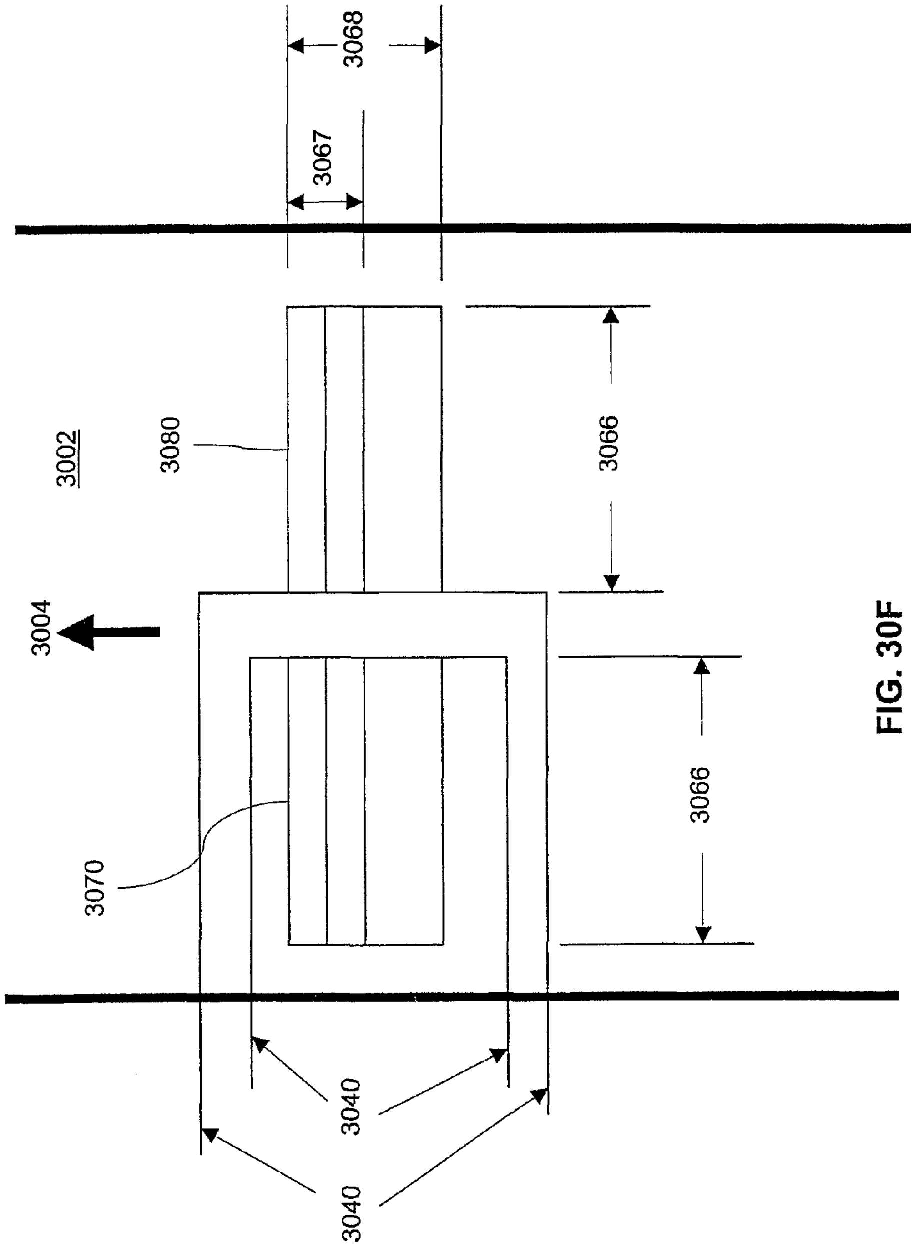
FIG. 30F is schematic diagram showing the layout of a known “coil within a coil design” loop technology.

FIG. 30F illustrates the use of inductive loops with a "coil within a coil" design. The design includes a left pair of loops 3070 and a right pair of loops 3080 to count wheels. Each pair of loops 3070 and 3080 includes a smaller dipole loop nine inches long (dimension 3067) and approximately five feet wide (dimension 3066) and a larger dipole loop 18 inches long (dimension 3068) and approximately five feet wide (dimension 3066). A total of four wheel loops were used per lane and therefore four lead-ins 3040 are indicated. When each loop used in this wheel detection design was examined on an individual basis, the results indicated that the smaller loop nine inch long detected small wheels of cars and the larger loop 18 inches long detected larger wheels.

For the smaller dipole loop with the dimensions of nine inches by five feet, the test results revealed that this loop design has a low field height with a stronger field in the center of the loop. Thus, the ability to detect wheels on vehicles was biased to small vehicle wheels, which are normally found on cars and small trailers. Accordingly, this loop design does not detect the wheels of vehicles with larger diameters, such as those found in pickup trucks, small trucks, and other larger vehicles.

For the larger dipole loop with the dimensions of 18 inches by five feet, the test results revealed that this loop design has a slightly higher field height with a stronger field in the center of the loop. The detection of wheels on small vehicles (e.g., cars) was not very clear, however, because the higher field found in this loop design was influenced by the chassis of the vehicle. This influence caused the frequency of the loop circuit to be lowered. The wheels were not clearly defined since the chassis effect and the wheel effect tend to cancel each other out. However, this design does provide better detection of vehicles that have larger wheels and more ground clearance.

Thus, the "coil within a coil" design (i.e., a smaller loop with dimension 3067 located within a larger loop with dimension 3068) as referenced in the Lees applications relies on two separate loop sizes to detect smaller and larger wheels. The use of four loops per lane is designed to detect the entire vehicle population, but the arrangement is dependent on both the nine and 18 inches long dipole loop design to detect the different sizes of the wheels found in the vehicle population. Also, these designs have a smaller dimension in the direction of travel than the wheel diameters. This provides a short signal sample rate from the wheels.

In contrast, and as explained below, the ferromagnetic loop of the present invention requires only a single loop to detect all the different wheel sizes that exist in random traffic. The ferromagnetic loop design also has the ability to provide wheel detection and vehicle speed on the same loop.

Ferromagnetic Loops of the Present Invention

Various configurations and designs of the ferromagnetic loops disclosed herein can be used for difference purposes. One exemplary purpose of the preferred embodiments of the invention, as described below, is to detect, identify, and classify vehicles. In the preferred embodiments, the ferromagnetic loop is adapted to communicate with a signal-processing device (e.g., a loop detector) to generate an electromagnetic field in a traveling path of a vehicle, measure the changes in frequency and inductance associated with the vehicle passing over the ferromagnetic loop, and output the results. The results can be used to determine, among other things, various characteristics of the vehicle including, for example, number of axles, distances between axles, and speed.

A preferred embodiment of the ferromagnetic loop has a unique loop geometry that provides a flux field. The loop circuit and geometry creates a flux field that responds to the ferromagnetic loop effect of wheel assemblies on vehicles. This ferromagnetic effect results in an inductance increase and frequency increase that can be detected by a loop signal-processing device (e.g., loop detector 260 shown in FIG. 2) in communication with the ferromagnetic loop. The changes in inductance and frequency can be quantified and used for characterization of vehicles.

Key elements of the ferromagnetic loops of the invention include the magnetic strength of the flux field height and length. The shallow installation of the wire and wire orientation of the coil in permanent and temporary installations is very important for optimal performance of the ferromagnetic loop design. The flux field created by the loop circuit is concentrated and low to the road surface to maximize the ferromagnetic effect of the wheel assemblies and minimize the eddy currents created by vehicle chassis.

The increase in inductance is detected by the ferromagnetic loop and the information can be used to count wheel assemblies. The ferromagnetic effect occurs when a ferrous object is inserted into the field of an inductor and reduces the reluctance of the flux path and therefore, increases the net inductance and frequency. This loop design and geometry responds to the wheel assemblies in this manner.

The geometry of the loop wire turnings can be oriented in different directions relative to the direction that vehicles travel in order to vary the response of the loop sensor to the vehicle wheels. The geometry and orientation of the loop wires can be designed to minimize ground resistance. For example, as the presence of reinforcing steel (a ferrous material) affects the magnetic field of the loop, the orientation of the lines of flux created by the loop geometry can be changed to minimize the environmental influences of the reinforcing steel. This is reflected in the wire turnings that are diagonal to the travel direction of the vehicle and diagonal to the typical orientation of reinforcing steel used in pavement design. This is an important design feature since it can help to reduce the magnetic influence that reinforcing steel has on the lines of flux created by the loop and improve the loops circuit response to wheels assemblies.

The ferromagnetic loops as disclosed herein provides a number of improvements over existing inductive loops. For example, the ferromagnetic loops can be made to have various unique geometric shapes and coil spacing (of the wire used in the wire turnings) to obtain a desirable flux field. Preferred embodiments of the ferromagnetic loops of the invention include the following characteristics:

A unique design of molded loops that incorporates a locking mechanism or an anchor to secure the loops in permanent installations.

A design of a single loop that has the ability to detect vehicle wheel assemblies and provide the distinction between single tire assemblies, dual tire assemblies, and grouped axles.

A design that is capable of providing wheel speed, vehicle speed, axle spacing, number of axles, and vehicle classification with a single loop.

A unique sensor arrangement and sensor spacing using two ferromagnetic loops that pairs two axle vehicles together by providing loop detections on both loops at the same time or in extremely close proximity of each other therefore greatly simplifying the vehicle classification process in congested traffic.

DISCLOSURE OF PREFERRED EMBODIMENTS

Figure 31:
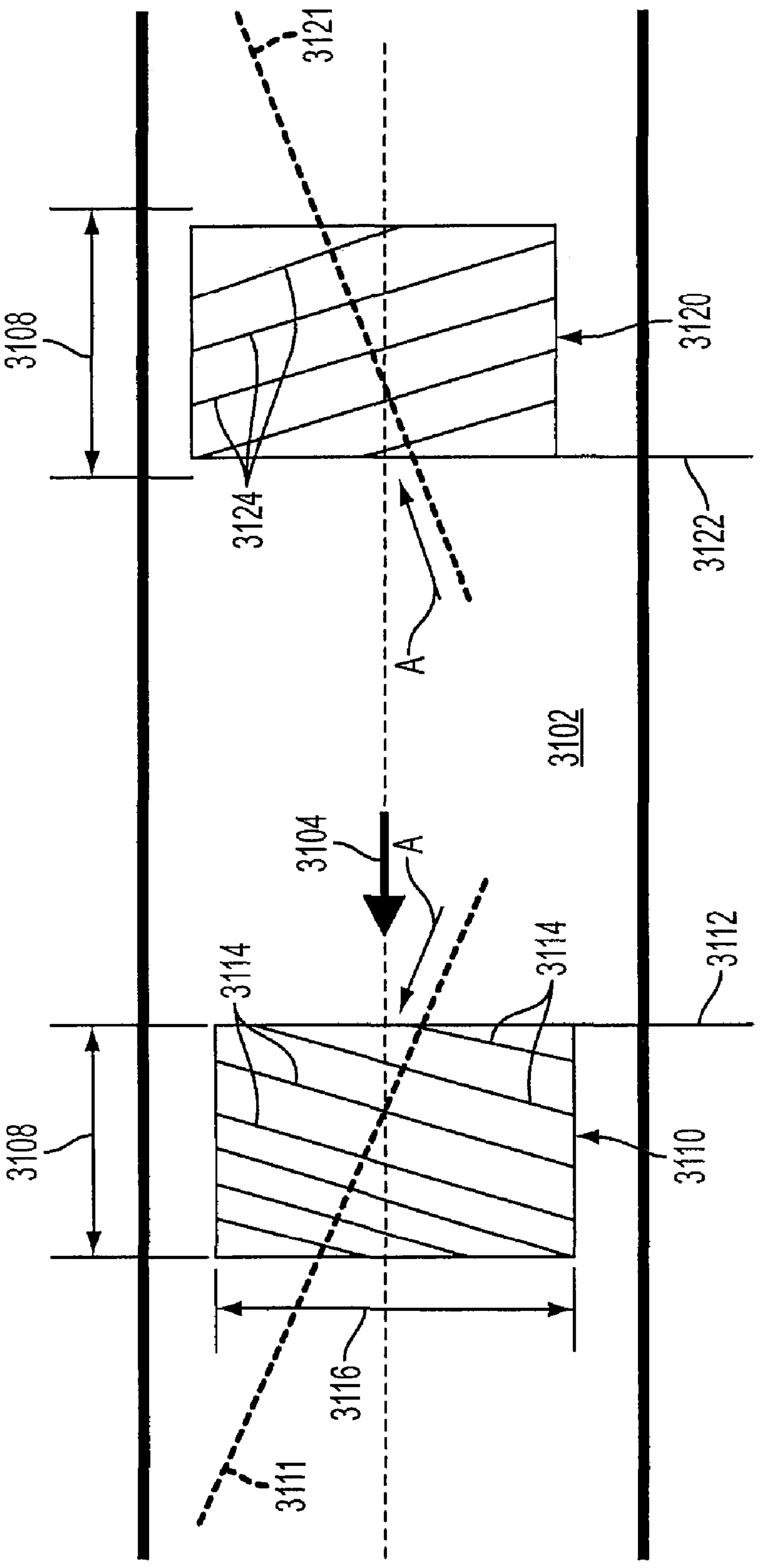
FIG. 31 is schematic diagram illustrating a layout of two ferromagnetic loops of the present invention.

FIG. 31 is a schematic diagram illustrating a layout of two ferromagnetic loops of the invention. Path 3102 is a roadway on which vehicles travel in direction 3104. Path 3102 may be a toll lane, a driveway, the entrance to a parking garage, a high-occupancy (HOV) lane, and the like. Gradient diagonal loop 3110 and regular diagonal loop 3120 are located on path 3102 in such a way that one or more of the wheel assemblies of a vehicle will pass over loops 3110 and 3120 when traveling on path 3102 in direction 3104. Although shown together in FIG. 31, only one of loops 3110 and 3120 is sufficient to implement the invention.

In this embodiment, each of loops 3110 and 3120 has wire turnings that are oriented in a diagonal manner relative to direction 3104. Note that each of polygonal axis 3111 and polygonal axis 3121 forms angle A with direction 3104. In other words, the contiguous polygons confined with a footprint of the loop form angle A with the direction. Angle A can range between zero and 90 degrees. Specifically, angle A can be, for example, 30 degrees, 45 degrees, or 60 degrees. The diagonal orientation of the wire turnings helps null or minimize the environmental influences that reinforcing steel has on the lines of flux (to the extent that the reinforcing steel are present and embedded within path 3102).

Note that gradient diagonal loop 3110 and regular diagonal ferromagnetic loop 3120 have different loop configurations. Regular diagonal loop 3120 has uniform spacing dimensions 3124 between wire turnings. In other words, the parallel diagonal lines within the footprint of loop 3120 have the same distance from each other. This uniform loop spacing provides detection in random traffic but can be designed for detection of specific wheel sizes. For example, the spacing can be one that which is optimum to detect the presence of a tractor-trailer in a traffic lane in which tractor-trailers are prohibited. Gradient diagonal loop 3110 is characterized by varying spacing dimension 3114, which are represented by different widths of spacing between the parallel diagonal lines within the footprint of loop 3110. The different spacing used in loop 3110 improves the loop circuit field by increasing the sensing range from small to large wheels on a single ferromagnetic loop design. The shorter or narrow sections detect small wheel assemblies and the longer or wider sections detect larger wheels. The gradient loop configuration is suitable for detecting a wide range of vehicle categories. Preferably, spacing dimensions 3114 and 3124 ranges between about three inches and about eight inches.

Loops 3110 and 3120 are associated with lead-ins 3112 and 3122, respectively. Lead-ins 3112 and 3122 are in communication with one or more loop detector, a device previously disclosed in the '937 application (e.g., detector 260 shown in FIG. 2).

Figure 31A:
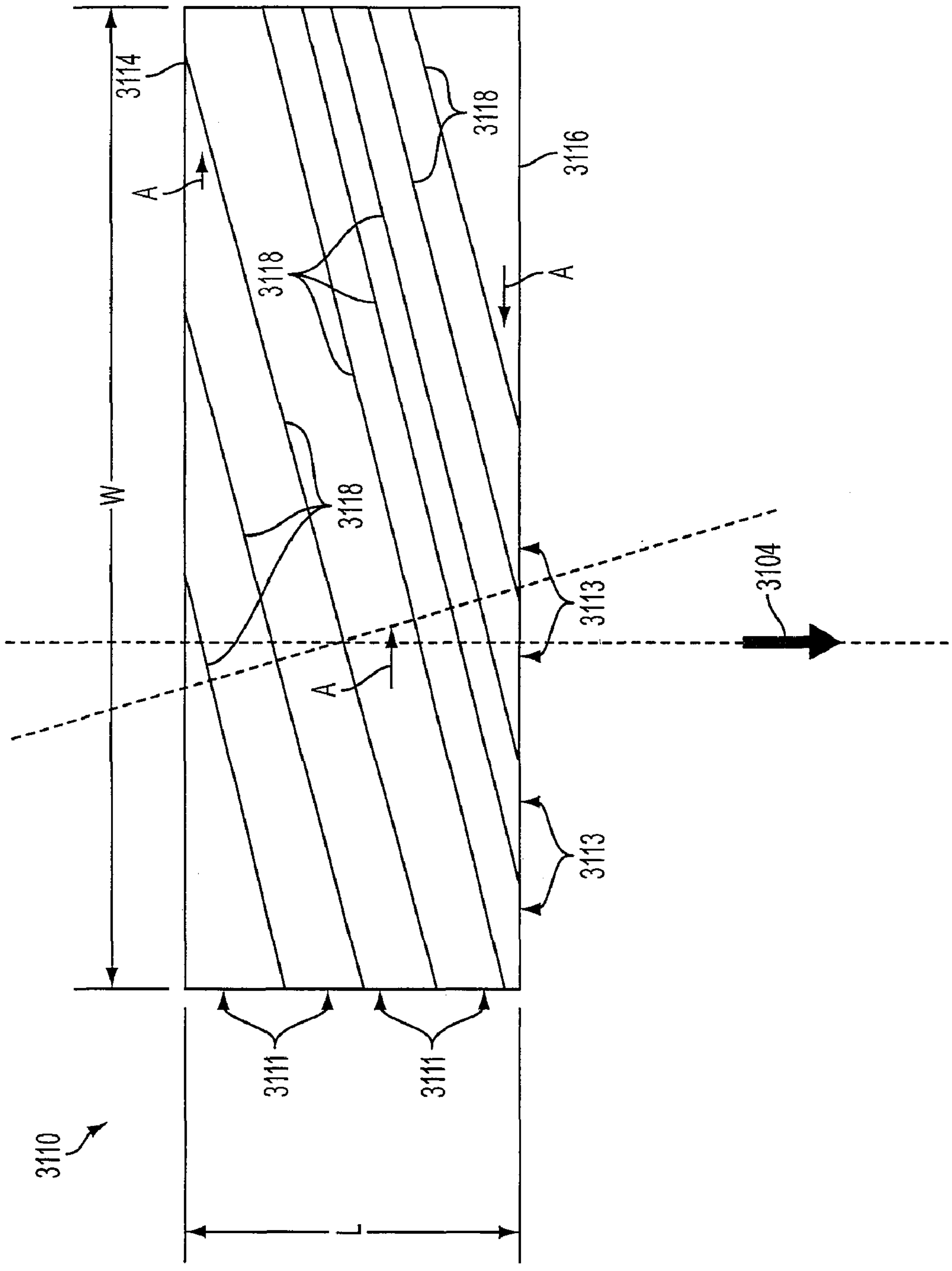
FIG. 31A is schematic diagram illustrating a gradient diagonal loop of the present invention.

FIG. 31A is a schematic diagram illustrating gradient diagonal loop 3110 in greater details. As shown in FIG. 31A, loop 3110 has width W. A typical dimension for width W is about 10 feet. Width W can vary depending on specific applications. Leading edge 3114 and trailing edge 3116 are separated by length L. A typical length L is about 32 inches. Depending on specific applications, the separation between leading edge 3114 and trailing edge 3116 (i.e., length L) can vary. For example, distance L can be longer or shorter than 32 inches.

In the specific embodiment shown in FIG. 31A, wire turnings 3118 (the diagonal lines within the footprint of loop 3110) are parallel, and each of wire turnings 3118 forms an angle A with respect to leading edge 3114 and trailing edge 3116. Angle A can range between zero and 90 degrees. For example, angle A can be about 30 degrees. In addition, wire turnings 3118 have at least two spacings. Wider spacings 3111 can be about seven inches wide between two adjacent wire turnings 3118. The spacing is suitable for detection of larger vehicles such as buses, large trucks and the like. Narrower spacing 3113 can be about 3.5 inches wide between two adjacent wire turnings 3118. This spacing is suitable for smaller vehicles such as trailers, small cars, SUV, pick up trucks, and the like.

Figure 31B:
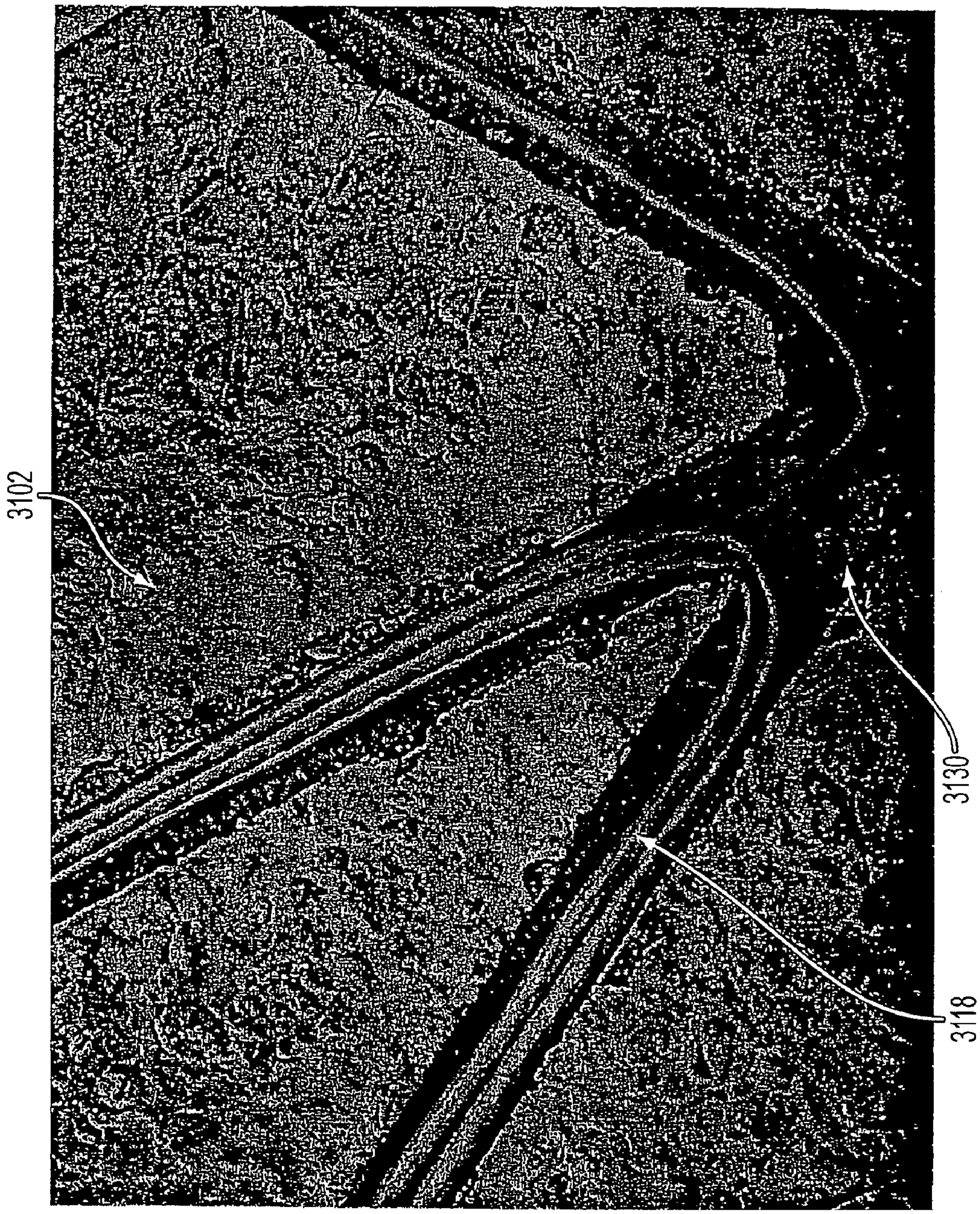
FIG. 31B is schematic diagram showing an installation of the ferromagnetic loop of the present invention.

FIG. 31B is a schematic diagram showing the unique installation of the wire coils. Wire turnings 3118 are installed in slots 3130 in path 3102. Slots 3130 can be about 0.5 to about 0.75 inches wide and about one inch deep. Note that wire turnings 3118 are installed parallel to the surface of path 3102 and laid side-by-side with each slot 3130 (see also FIG. 41).

Figure 32:
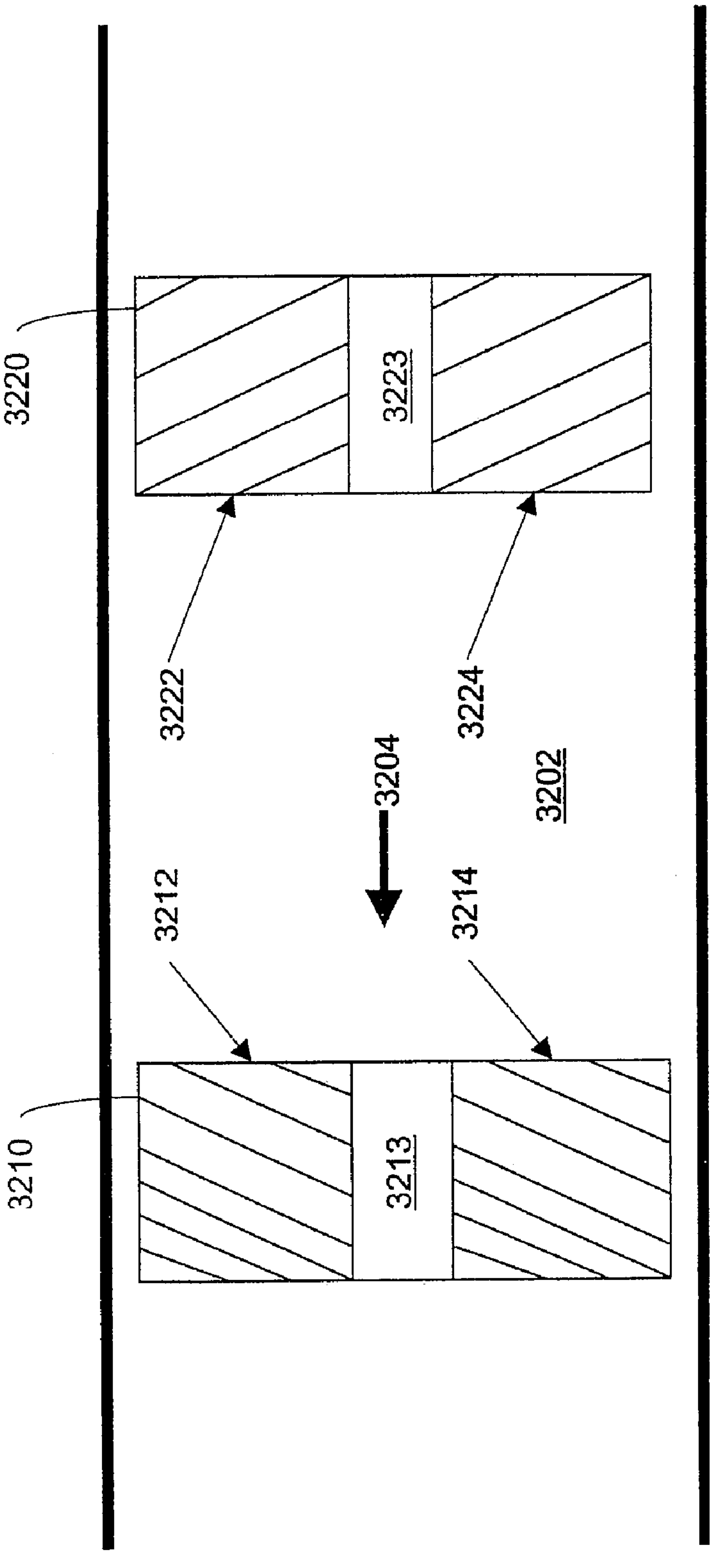
FIG. 32 is schematic diagram showing a different embodiment of the present invention.

FIG. 32 is a schematic diagram illustrating another embodiment of the invention. This layout is preferable in locations that require a wider detection area. For example, this layout is desirable if traveling path 3202 is greater than 11 feet wide. As shown in FIG. 32, each of ferromagnetic loops 3210 and 3220 contains more than one portion or segment. For example, left ferromagnetic loop 3210 includes right segment 3212 and left segment 3214. Similarly, right ferromagnetic loop 3220 includes right segment 3222 and left segment 3224. This design provides a wider area of detection without using additional wire in central regions 3213 and 3223. This two-segment design provides detection in two wheel paths. In other words, each of right segments 3212 and 3222 detects the right wheels of a vehicle traveling in direction 3204. Similarly, each of left segments 3214 and 3224 detects the left wheels of the vehicle traveling in direction 3204.

The ferromagnetic loop is designed to detect primarily the wheel assemblies by providing an increase in the frequency and inductance of the loop circuit thereby maximizing the ferromagnetic effect. The design provides detection of the entire range of wheel sizes illustrated in FIG. 28 using a single loop circuit. The loop is designed to have a low field height that minimizes the eddy currents created by the chassis traveling through the coils field of flux.

The ferromagnetic effect of the present invention is illustrated in frequency vs. time plots shown in FIGS. 33, 33A, 34, 35, 36, 37, and 38. It is noted that these plots and subsequent plots disclosed herein were produced using the same signal-processing device that was used to generate the plots shown in FIGS. 29A, 29B, 29C, 29D, 29E, 30A, 30B, 30C, 30D, and 30E. No adjustments were made to the signal-processing device for generating the plot shown in FIG. 33 and the subsequent plots, which are described in Example Numbers 1 through 46 below. The only variable was the loop circuit and the geometry of the loop circuit. The scale for each of these plots is 5.5 milliseconds per point on the time or X-axis. The Y-axis represents the resonant frequency (in Hertz) of the loop circuit. The information presented in each of these plots was provided as a serial output using a sample time of 5.5 milliseconds. The information can also be made available as a discrete output from the signal-processing unit to be processed to count wheel assemblies.

Example No. 1

Figure 33:
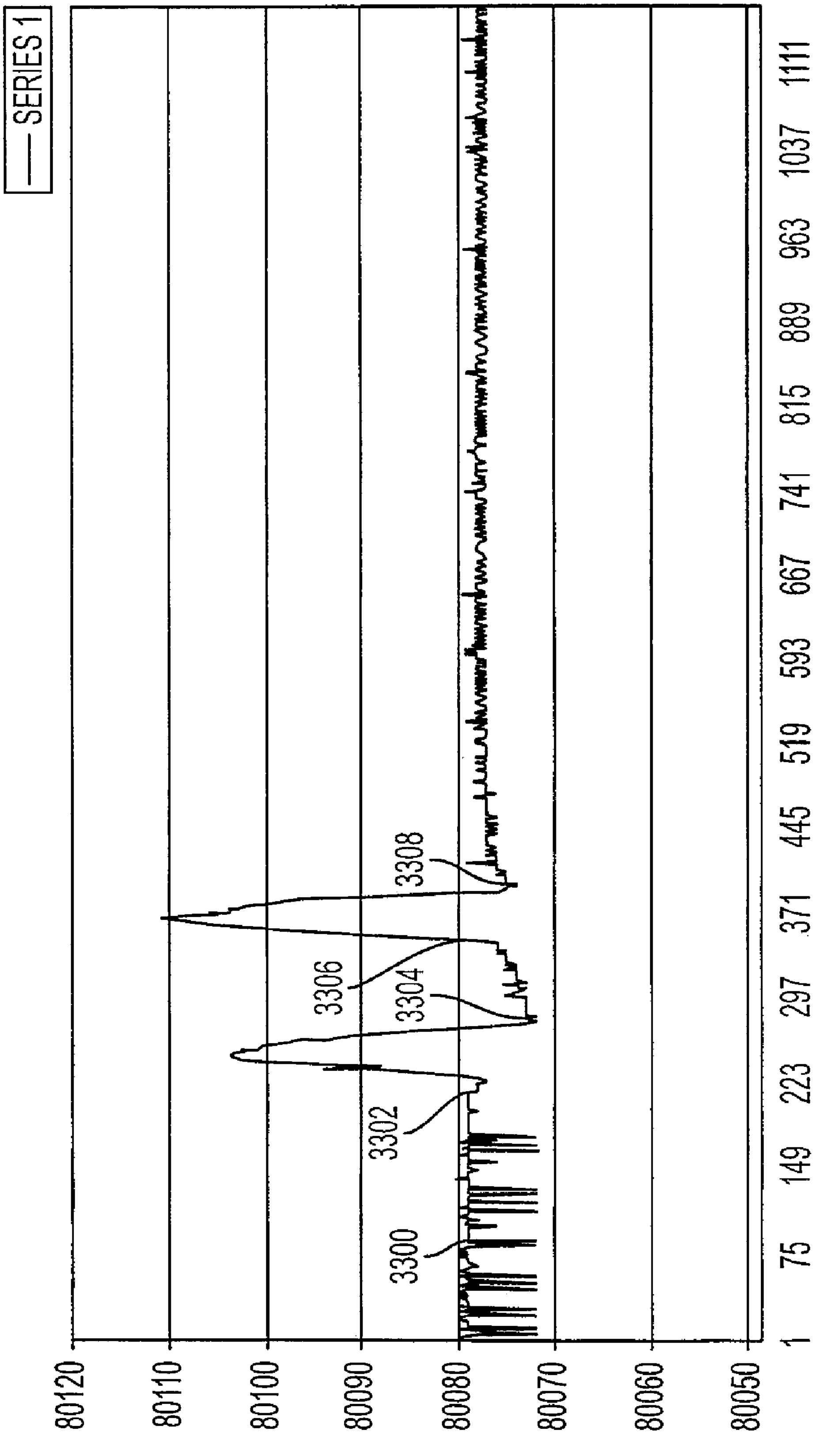
FIGS. 33, 33A, 34, 35, 36, 37, and 38, are frequency vs. time plots produced using a ferromagnetic loop of the present invention.

Plot 3300 shown in FIG. 33 illustrates the detection of an automobile. The time that the front wheels of the automobile were detected occurred between point 3302 (where x1=228 and y1=80078) and point 3304 (where x2=274 and y2=80104) on plot 3300. This represented a detection sample length that was 253 milliseconds long (i.e., (x2−x1) multiplied by 5.5) and a change in frequency of 26 hertz (i.e., y2−y1). The time that the rear wheels of the car were detected occurred between point 3306 where x3=348 and point 3308 where x4=390 on plot 3300. This represented a sample length of 227 milliseconds and a frequency change of 33 hertz. [can't find any reference to this being changed in a previous application].

Example No. 2

Figure 33A:
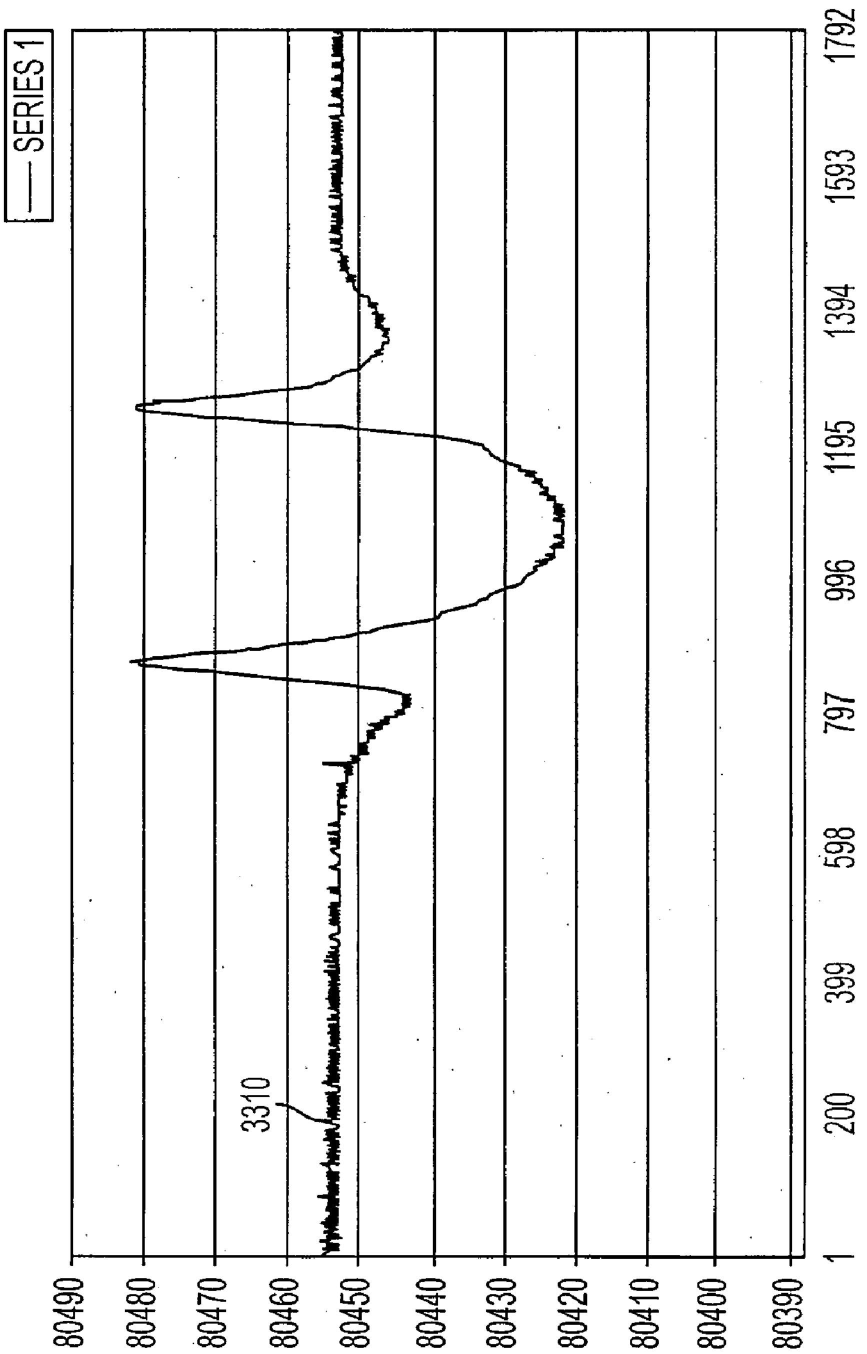

Plot 3310 shown in FIG. 33A demonstrates the detection of a smaller car with a lower ground clearance that passed over the same ferromagnetic loop discussed in Example No. 1. As shown on plot 3310, the first wheel was detected between points where x1=830 and x2=928, with a sample length of 539 milliseconds and a frequency change of 35 hertz. The second wheel was detected between points where x3=1214 and x4=1317, with a sample length of 566 milliseconds and a frequency change of 38 Hertz. The eddy currents created from the chassis were detected between points where x2=928 and x3=1214, which had the opposite effect, which lowered the frequency by 23 hertz.

Example No. 3

Figure 34:
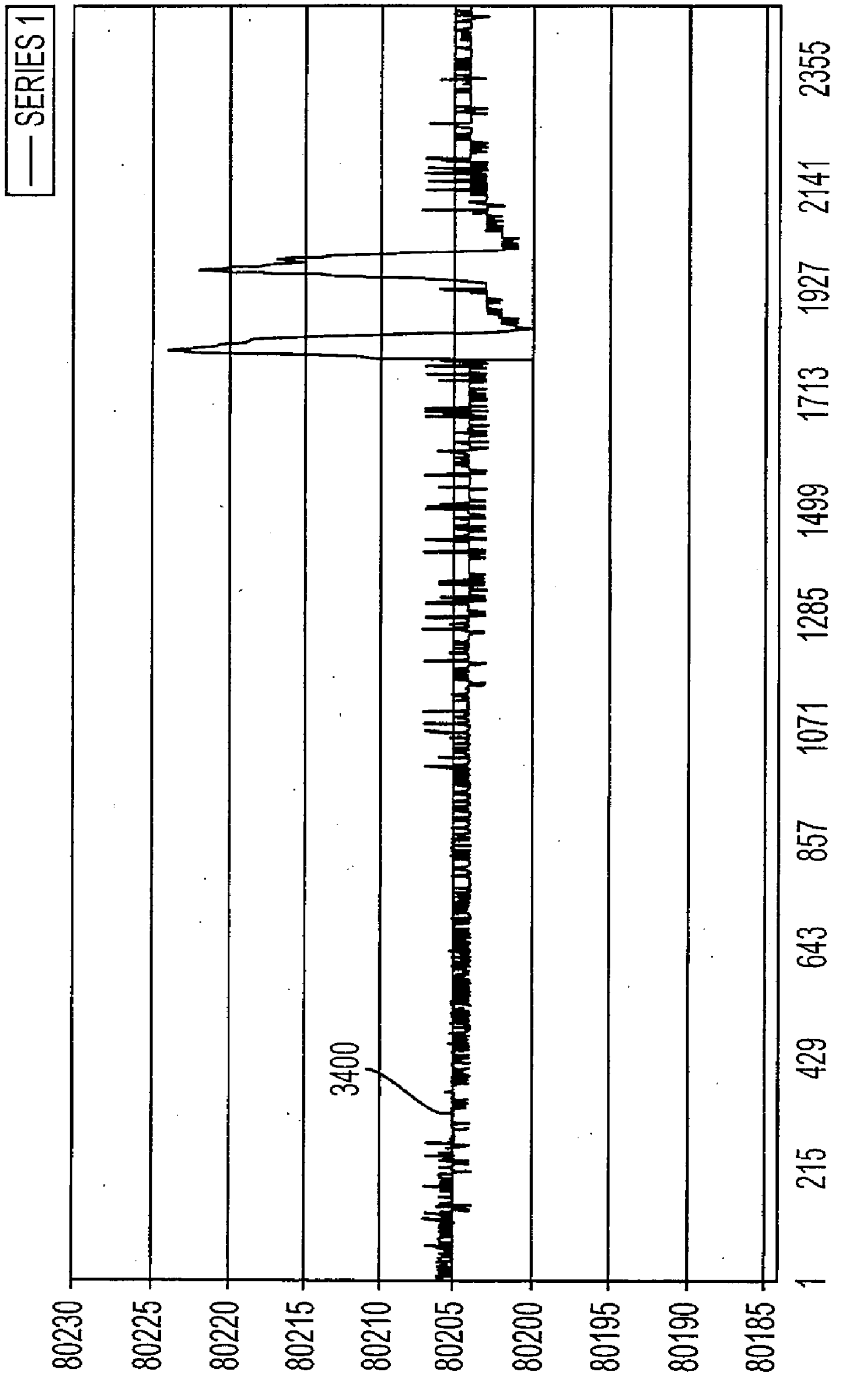

Plot 3400 shown in FIG. 34 demonstrates the detection of the wheel assemblies of a pickup truck traveling at 10 mph over the same loop. The front wheel assemblies were detected at the between points where x1=1795 and x2=1850. This represented a sample length of 303 milliseconds for the front wheel assembly. The rear wheel assemblies were detected at the time between points where x3=1954 and x4=2011. This represented a sample length of 314 milliseconds for the rear wheel assembly.

In plots shown in FIGS. 35-38, the ferromagnetic loop used to detect the vehicle was 10 feet wide by 28 inches long. The ferromagnetic loop used had diagonal turnings with equal spacing. Information associated with the vehicle was collected by the ferromagnetic loop after the vehicle stopped prior to traveling over the loop and then proceeded to move over the loop. During the vehicle detection period, the acceleration of the vehicle was reflected in the decreasing sample lengths of the wheel detections. The sample length and loop geometry provided vehicle speed on the basis of the length of the loop and the length of the sample.

Example No. 4

Figure 35:
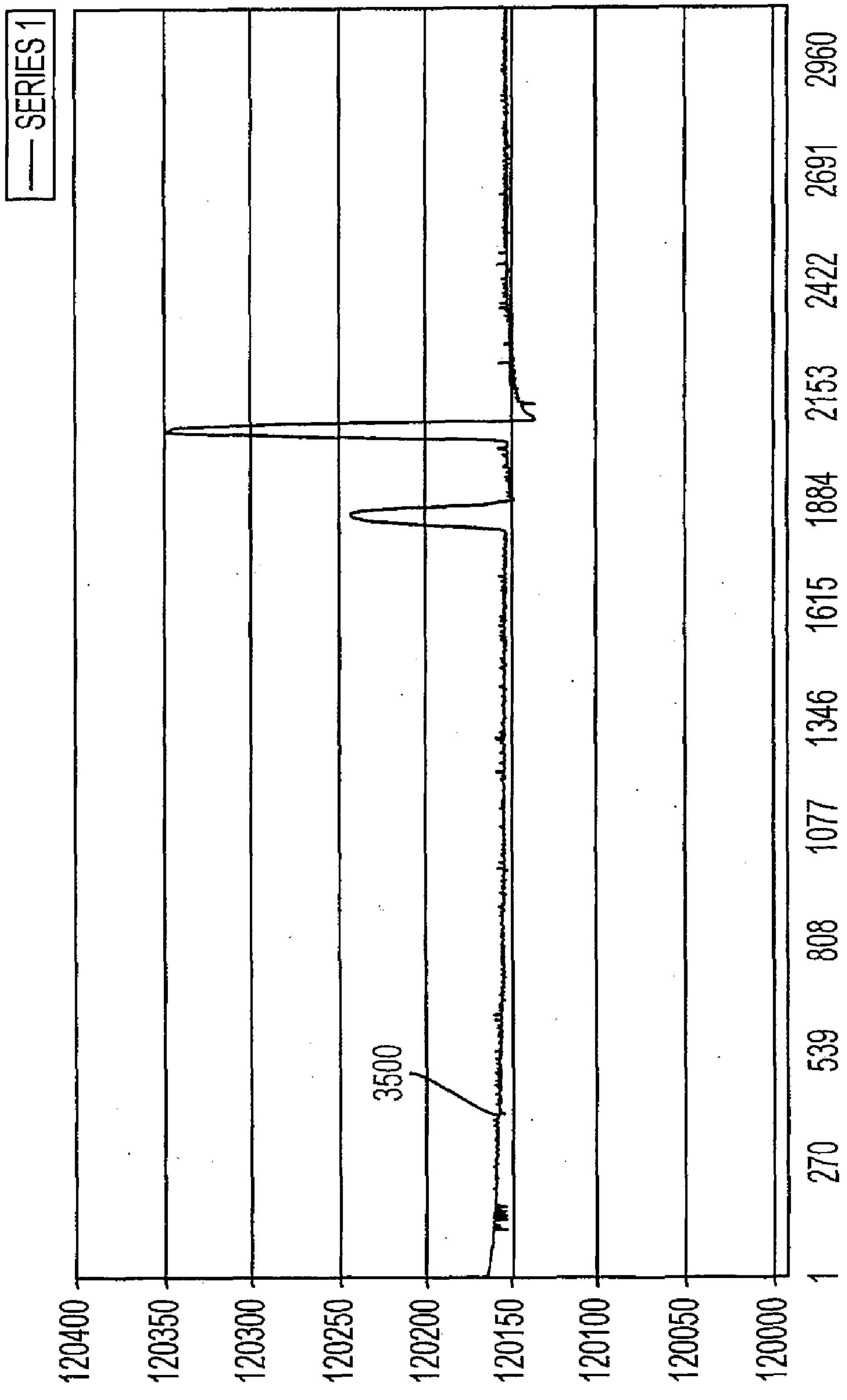

Plot 3500 shown in FIG. 35 demonstrates the detection of a two-axle truck. Plot 35 shows that the front set of wheels of the two-axle track were detected between points where x1=1818 and x2=1883, a sample length of 358 milliseconds. The rear set of wheels were detected between points where x3=2036 and x4=2082, a sample length of 253 milliseconds. This vehicle was detected while accelerating and that is why the sample lengths are different. The shorter sample time indicates the rear of the vehicle was traveling faster over the loop than the front wheel assembly did. This vehicle also had dual wheel assemblies (i.e., two tires per wheel hub) on the rear axle. This is indicated by the difference in the frequency change when comparing the front frequency change of 89 Hertz and the rear frequency change of 198 Hertz.

Example No. 5

Figure 36:
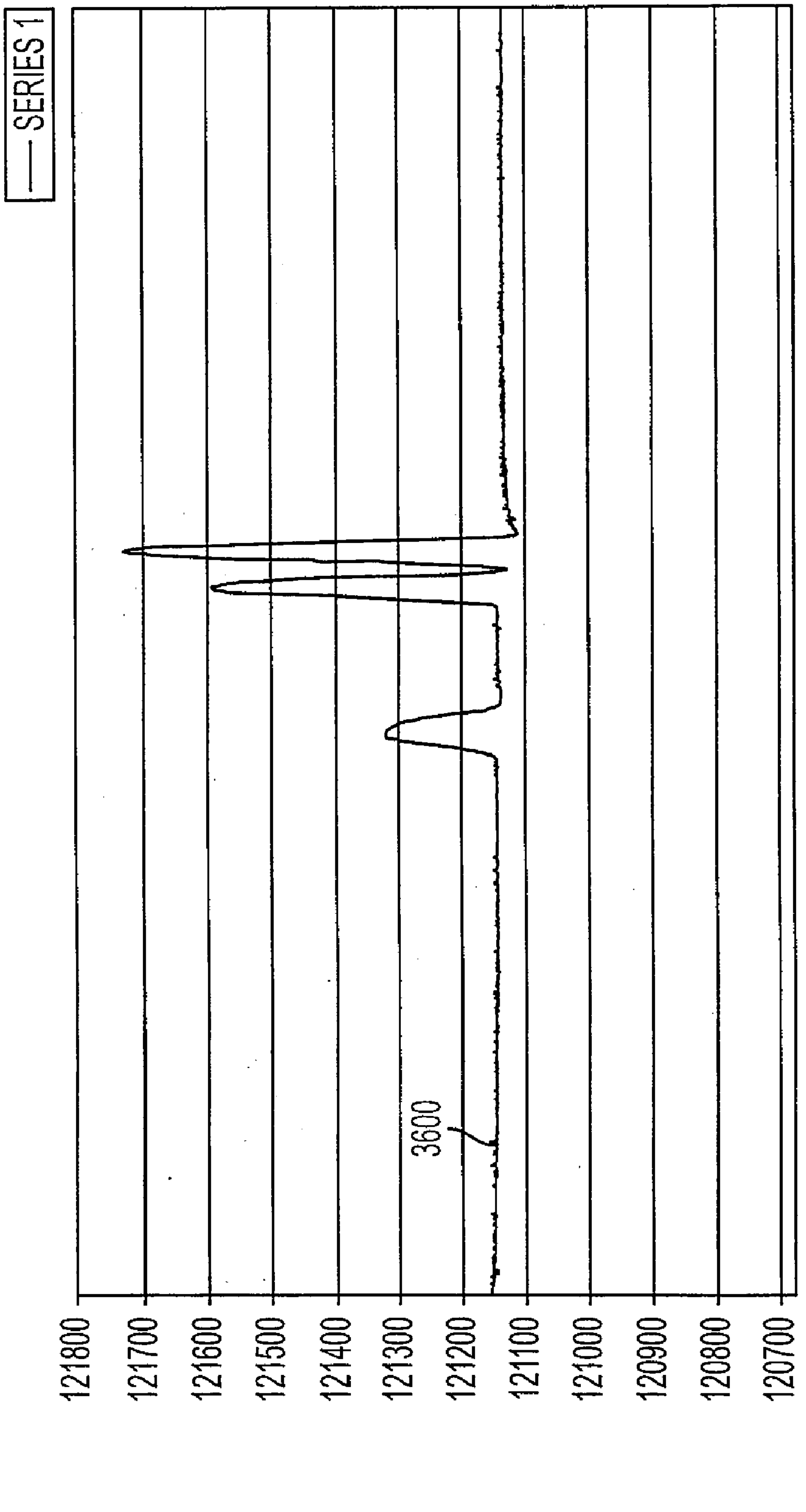

Plot 3600 shown in FIG. 36 demonstrates the detection of a three-axle truck. The front wheels were detected between points where x1=882 and x2=966 with a sample length of 366 milliseconds. The second set of wheels were detected between points where x3=1129 and x4=1185 with a sample length of 308 milliseconds. The third set of wheels were detected between points where x5=1191 and x6=1245 with a sample length of 297 milliseconds. This vehicle was detected while accelerating and that is why the sample lengths are different. The short sample time indicates the rear of the vehicle was traveling faster over the loop than the front wheel assembly did. This vehicle also had dual wheel assemblies on the rear two axles, which is indicated by the difference in the frequency change when comparing the front frequency change of 178 Hertz, second frequency change 418 Hertz, and the third frequency change of 597 Hertz.

Example No. 6

Figure 37:
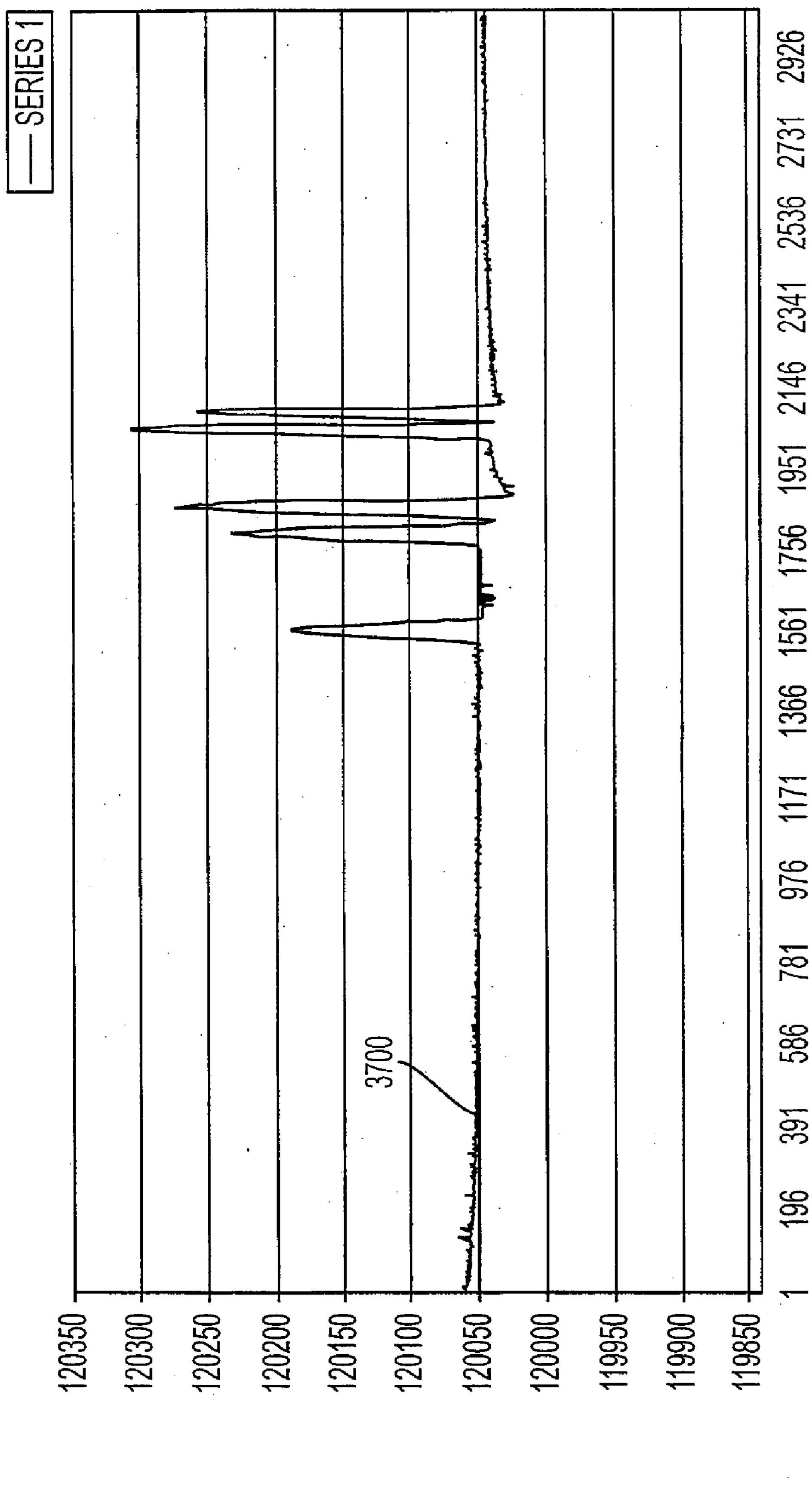

Plot 3700 shown in FIG. 37 demonstrates the detection of a five-axle truck. The front set of wheels was detected between points where x1=1531 and x2=1593 with a sample length of 341 milliseconds and frequency change of 139 Hertz. The second set of wheels was detected between points where x3=1766 and x4=1817 with a sample length of 281 milliseconds and a frequency change of 172 Hertz. The third set of wheels was detected between points where x5=1827 and x6=1876 with a sample length of 270 milliseconds and a frequency change of 216 Hertz. The fourth set of wheels was detected between points where x7=2016 and x8=2059 with a sample length of 172 milliseconds and a frequency change of 254 Hertz. The fifth set of wheels was detected between points where x9=2059 and x10=2095 with a sample length of 198 milliseconds and a frequency change of 209 Hertz. This vehicle was detected while accelerating and that is why the sample lengths are different. The short sample time indicates the rear of the vehicle was traveling faster over the loop then the front wheel assembly. This vehicle also had dual wheel assemblies on the second through fifth sets of wheels, which is indicated by the difference in the frequency changes.

Example No. 7

Figure 38:
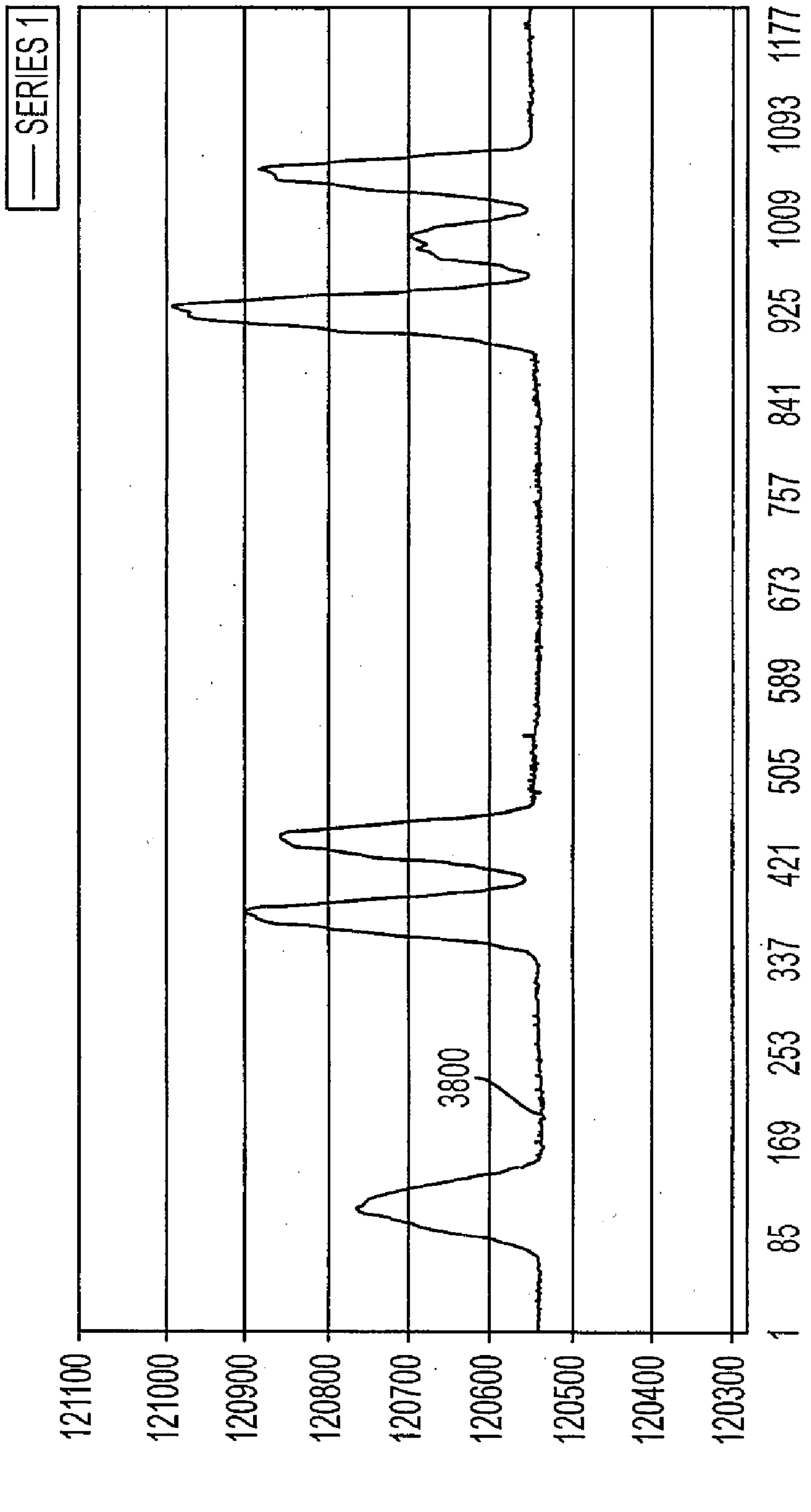

Plot 3800 shown in FIG. 38, demonstrates the detection of a six-axle truck. The front set of wheels detected from points where x1=73 and x2=158 with a sample length of 468 milliseconds and frequency change of 218 Hertz. The second set of wheels was detected between points where x3=346 and x4=404 with a sample length of 319 milliseconds and a frequency change of 327 Hertz. The third set of wheels was detected between points where x5=411 and x6=479 with a sample length of 374 milliseconds and a frequency change of 290 Hertz. The fourth set of wheels was detected between points where x7=894 and x8=954 with a sample length of 330 milliseconds and a frequency change of 418 Hertz. The fifth set of wheels was detected between points where x9=961 and x10=1018 with a sample length of 314 milliseconds and a frequency change of 121 Hertz. The sixth set of wheels was detected between points where x11=1022 and x12=1079 with a sample length of 314 milliseconds and a frequency change of 317 Hertz. This vehicle was detected while accelerating and that is why the sample lengths are different. The short sample time indicates the rear of the vehicle was traveling faster over the loop than the front wheel assembly.

Figure 39:
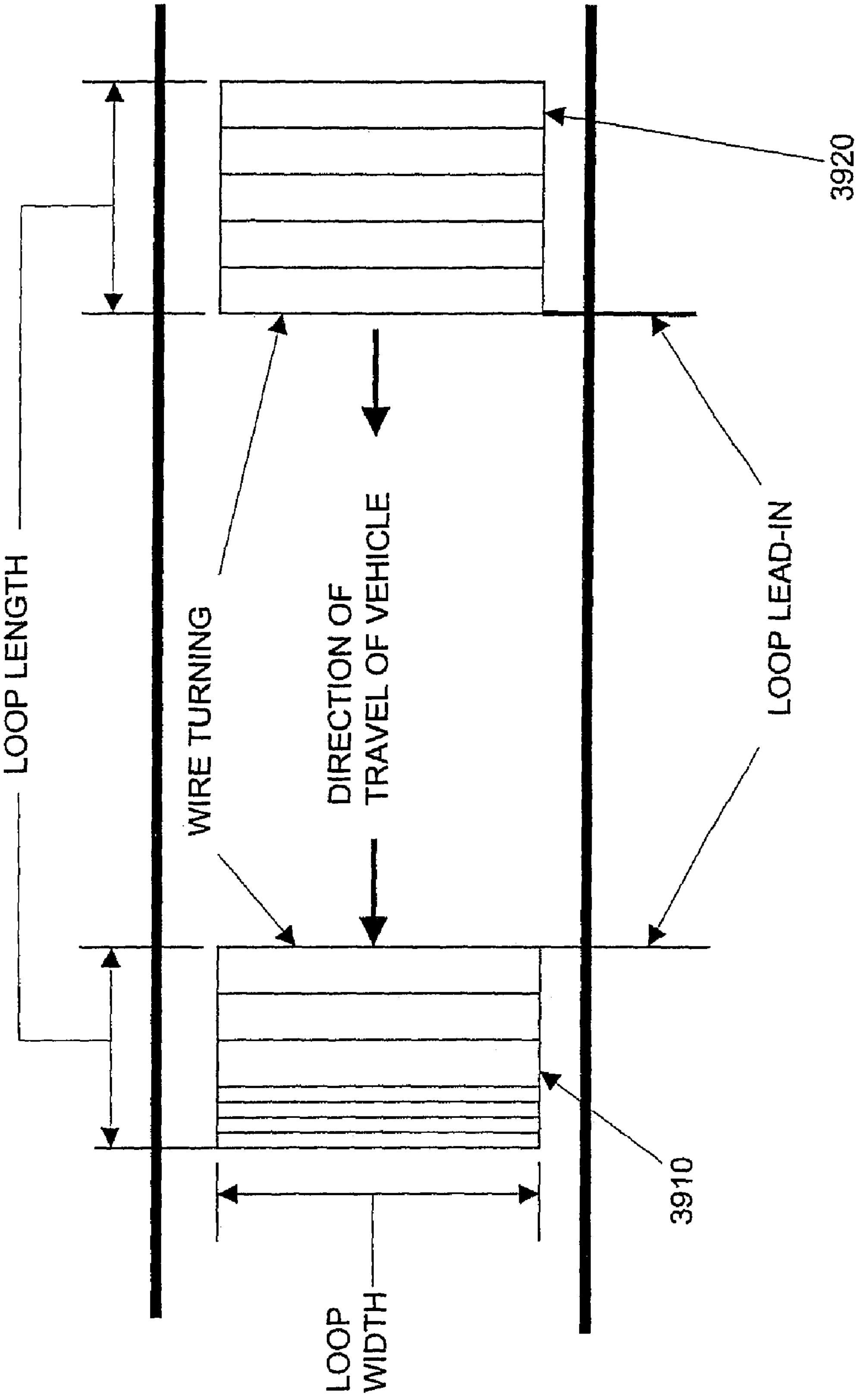
FIG. 39 is schematic diagram showing different embodiments of the present invention.

The wire turnings in this ferromagnetic design can also be oriented parallel or perpendicular to the travel direction of traffic. The perpendicular orientation is illustrated in the typical ferromagnetic loop geometry shown in FIG. 39. Loop 3910 shows gradient characteristics having contiguous polygons of different coil lengths. The shorter coil lengths (preferably 3.5 inches) within longer lengths (preferably 7 inches) provide good flux field density for wheel detection. These dimensions are designed specifically for the range of wheel sizes found in random traffic. These dimensions can be adjusted to change the field height of the loop. This unique geometry and method of wire turnings is illustrated in FIG. 40, in which arrows 4002 indicate directions of wire turnings.

Figure 41:
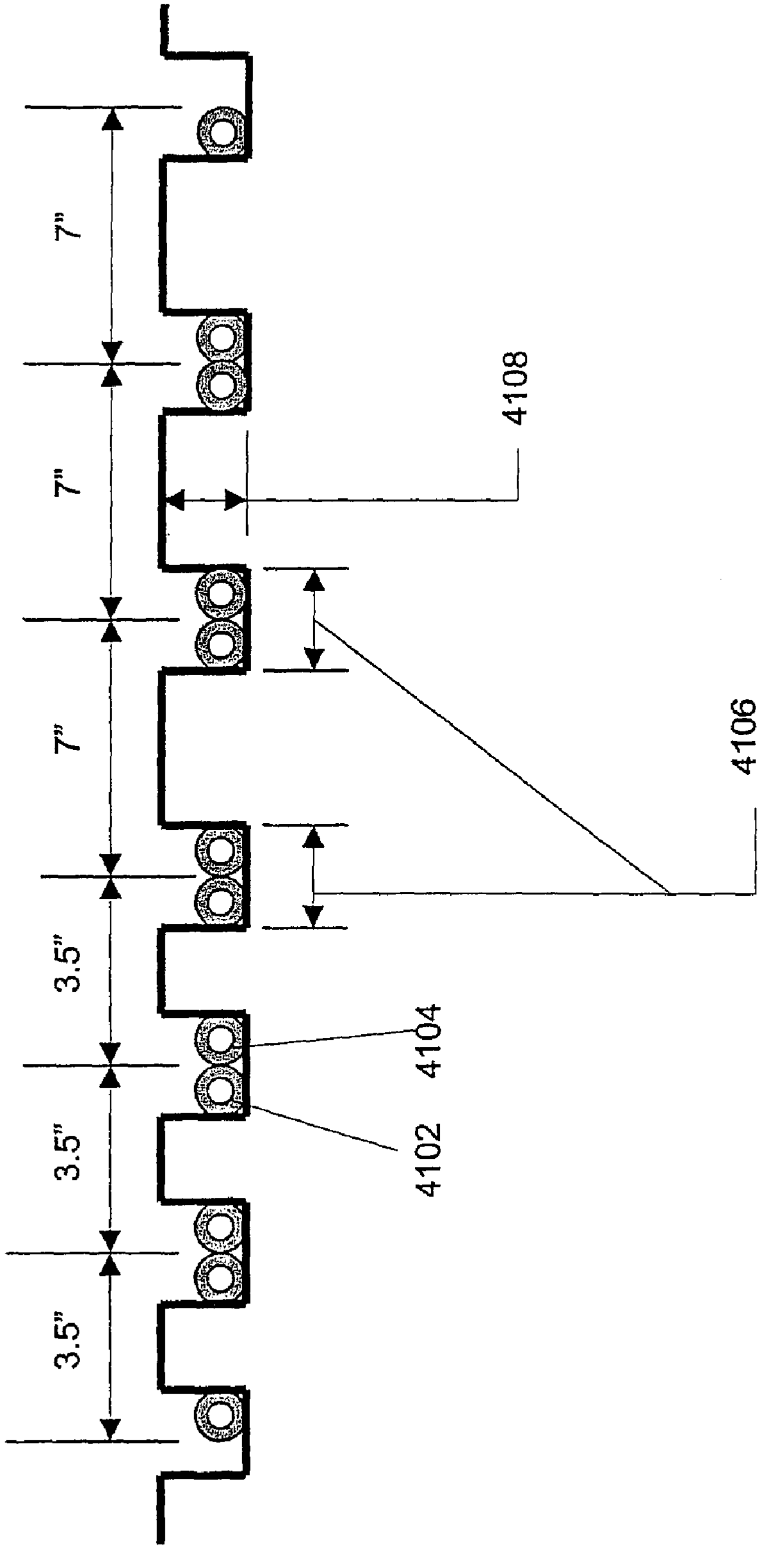
FIG. 41 is a cross-sectional view along line A-A of FIG. 40.

As shown in FIG. 40, the wire is installed in a serpentine manner as indicated by arrows 4002. Preferably, there are at least two complete turns as indicated by a solid line and a dashed line. A cross section of the loop along line A-A is shown in FIG. 41, which indicates the two turns. As indicated in FIG. 41, the wire turnings in each slot 4106 are preferably laid side by side. The spacing illustrated includes coils 3.5 inches and 7 inches long. This provides a unique flux field that can detect a wider range of wheel sizes than a single spacing can. This loop has a field height that provides an even field strength and has the ability to detect small vehicle wheels like those found on trailers as well as larger wheels such as those found on pickup trucks and larger vehicles.

Figure 42:
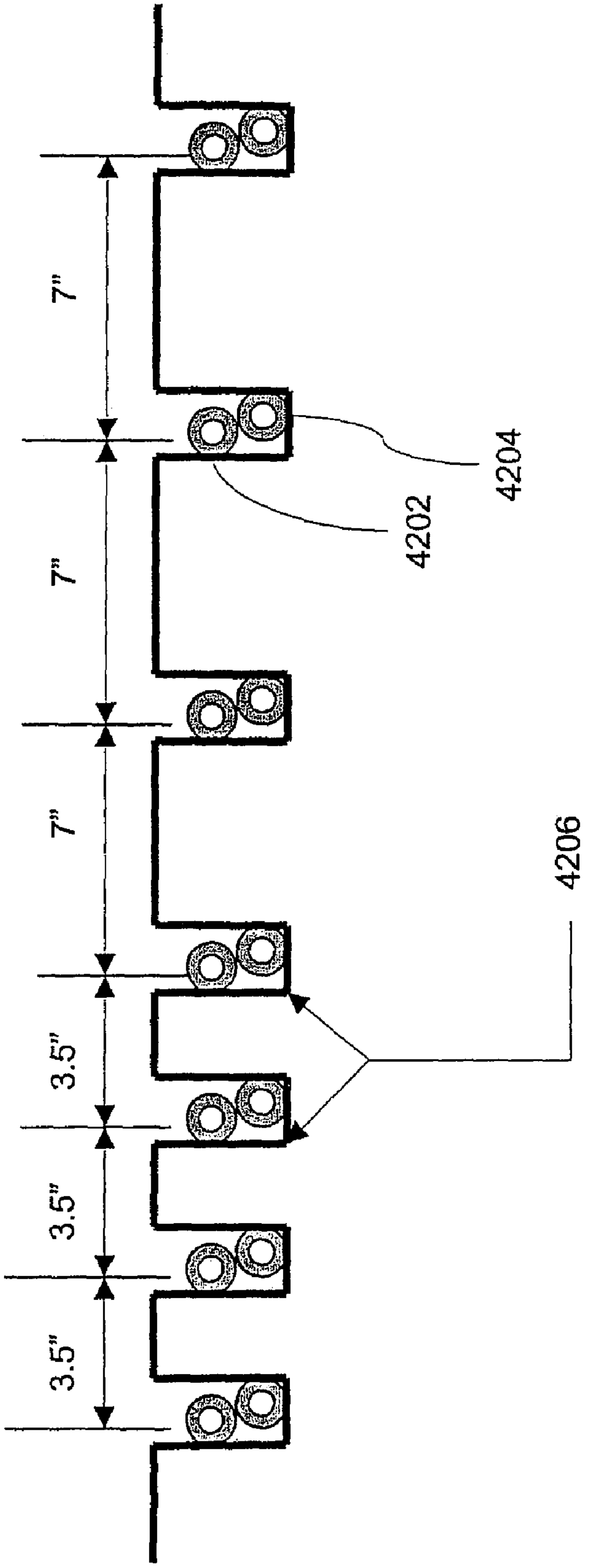
FIG. 42 is an alternative cross-sectional view along line A-A of FIG. 40.

The preferred method of installation involves installing the wire within one inch of the road surface. In other words, depth 4108 is preferably about one inch. It is also preferable to install the wire turnings parallel to the road surface (i.e., wire turnings 4102 and 4104 are side-by-side as shown in FIG. 41) and not perpendicular to the road surface (i.e., wire turnings 4202 are on top of wire turnings 4204 as shown in FIG. 42). A saw cut ¾ inches wide is preferable for slots 4106. The serpentine method used to make the wire turnings helps keep the wire turnings horizontal to the road and in close proximity to the wheels being detected. FIG. 42 illustrates the ferromagnetic loop being installed in a typical saw cut 4206 used for an inductive loop (note that one wire turning is on top of the other wire turning). The performance of the loop design shown in FIG. 42 will not provide the maximum desired wheel detection when the loop design is installed using conventional loop installation saw depths of 1½ to 2 inches deep. In FIG. 42, the cross-sectional view shows the results of using a conventional saw cut 0.125 inches wide instead of the preferred 0.75 inches wide.

Figure 43:
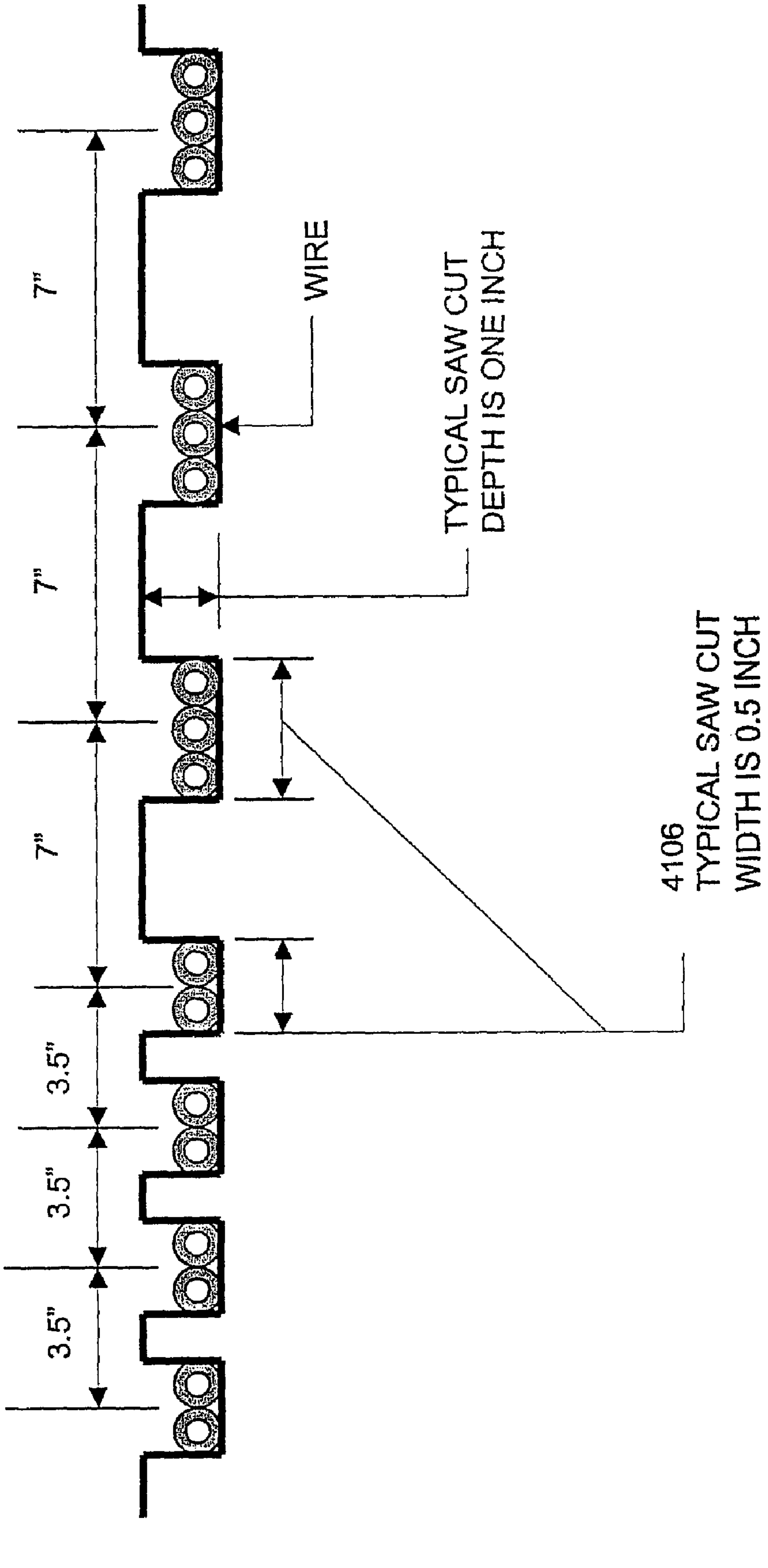
FIG. 43 is another alternative cross-sectional view along line A-A of FIG. 40.

The number of wire turnings can be increased in the gradient in order to increase the detection response of smaller or larger wheels by increasing the number of wire turns in a particular spacing. This increases the field of flux at the appropriate level. This is illustrated in FIG. 43, which shows two or more wire turnings in slots 4106 with 7 inch spacing for the detection of larger wheels and dual wheel assemblies. Plots shown in FIGS. 43A-43D demonstrate the detection of vehicles using the gradient loop design shown in FIG. 43.

Example No. 8

Figure 43A:
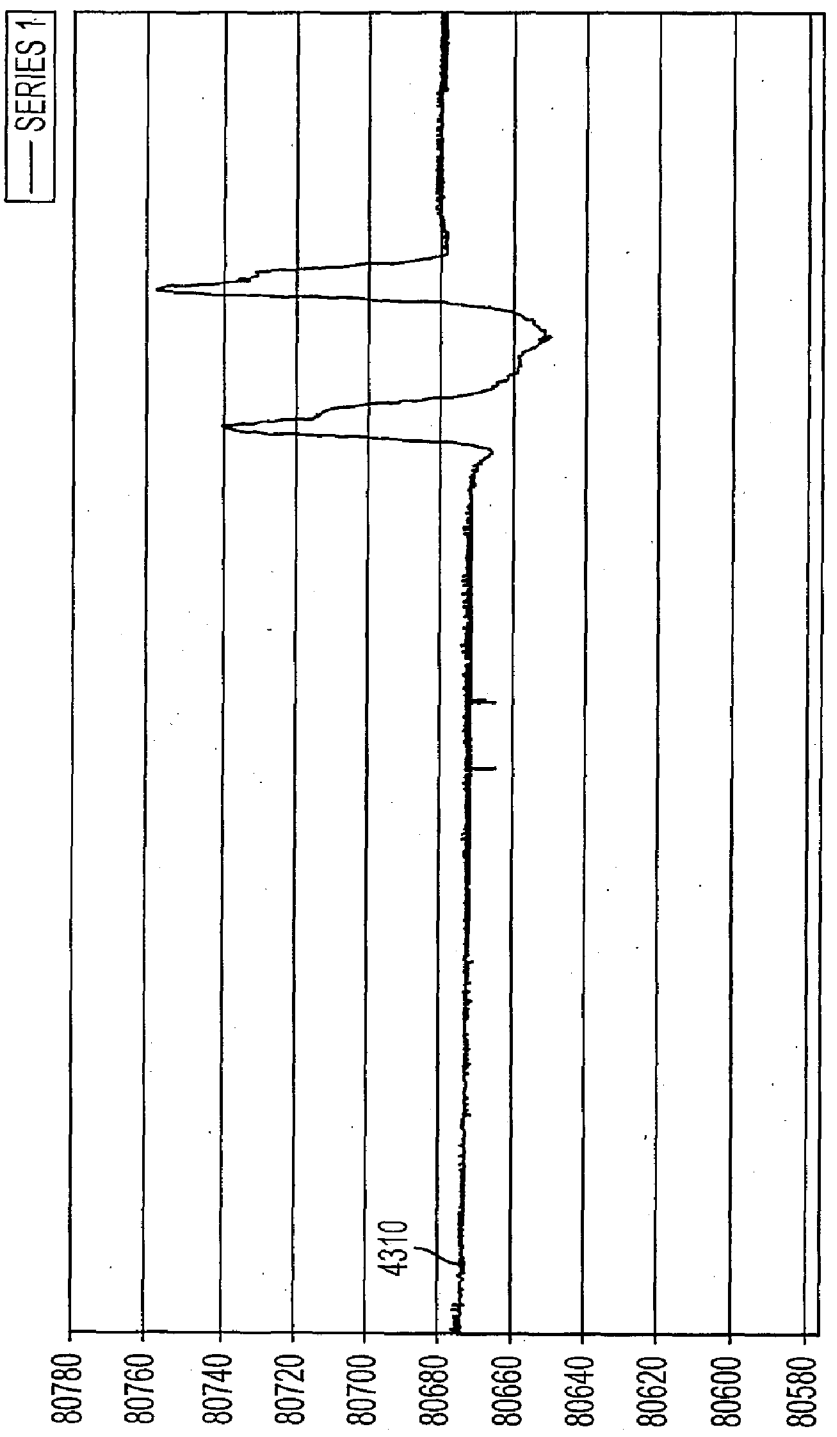
FIGS. 43A, 43B, 43C, and 43D are frequency vs. time plots produced using a ferromagnetic loop of the present invention.

Plot 4310 shown in FIG. 43A demonstrates the detection of a car using a gradient loop 10 feet wide by 31.5 inches long. The approximate wheel diameter on the car was 24 inches. The first tire was detected between points where x1=1643 and x2=1750. The second wheel was detected between points where x3=1902 and x4=1999.

Example No. 9

Figure 43B:
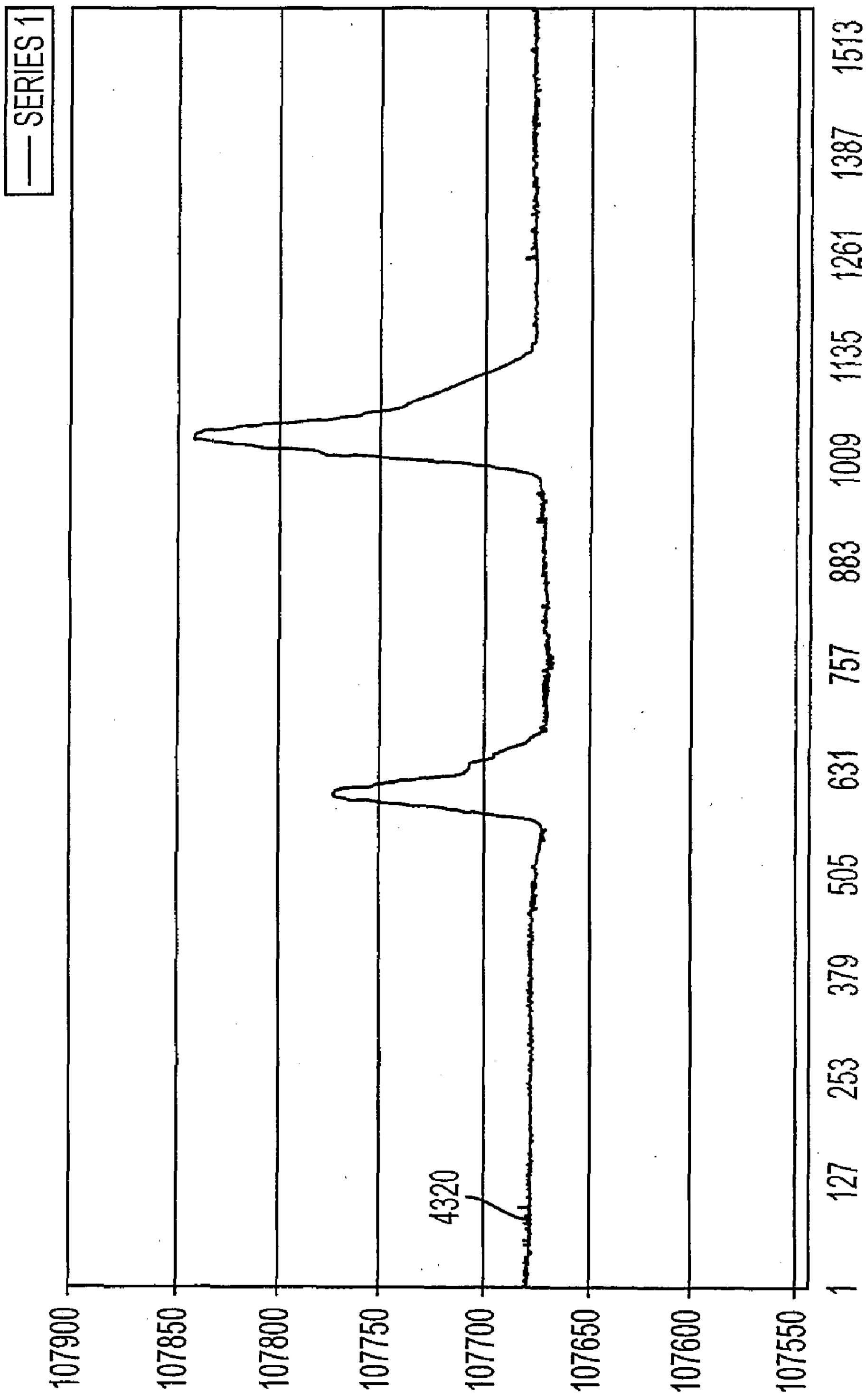

Plot 4320 shown in FIG. 43B illustrates the detection of the wheels of a pickup truck with dual tire assemblies on the second axle using the gradient loop 10 feet wide by 31.5 inches long. The approximate wheel diameter on this vehicle was 29 inches. The first tire was detected between points where x1=568 and x2=682. The second wheel was detected between points where x3=994 and x4=1153. The amplitude for the first wheel was 96 hertz and the amplitude for the second wheel was 152 hertz. The second wheel detection was greater because of the presence of the dual tire assembly.

Example No. 10

Figure 43C:
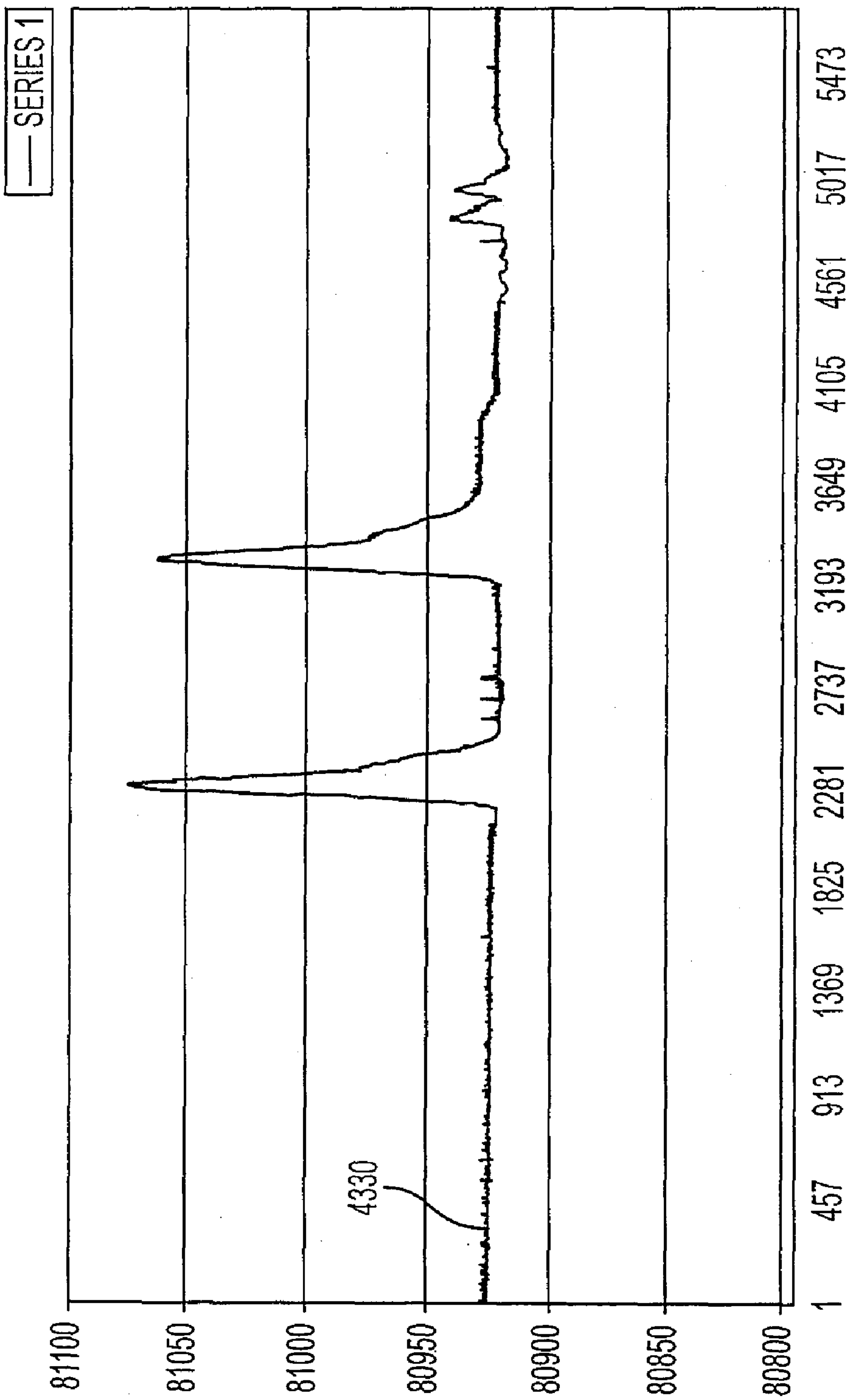

Plot 4330 shown in FIG. 43C illustrates the detection of the wheels of a pickup truck towing a trailer having two axles. The wheel assemblies were detected using the gradient loop 10 feet wide by 31.5 inches long. The approximate wheel diameter on the truck was 29 inches and the trailer wheels were 12 inches in diameter. The first tire was detected between points where x1=2206 and x2=2525. The second wheel was detected between points where x3=3210 and x4=3641. The trailer wheels were detected between points where x5=4795 and x6=4922 and between points where x7=4922 and x8=5067.

Example No. 11

Figure 43D:
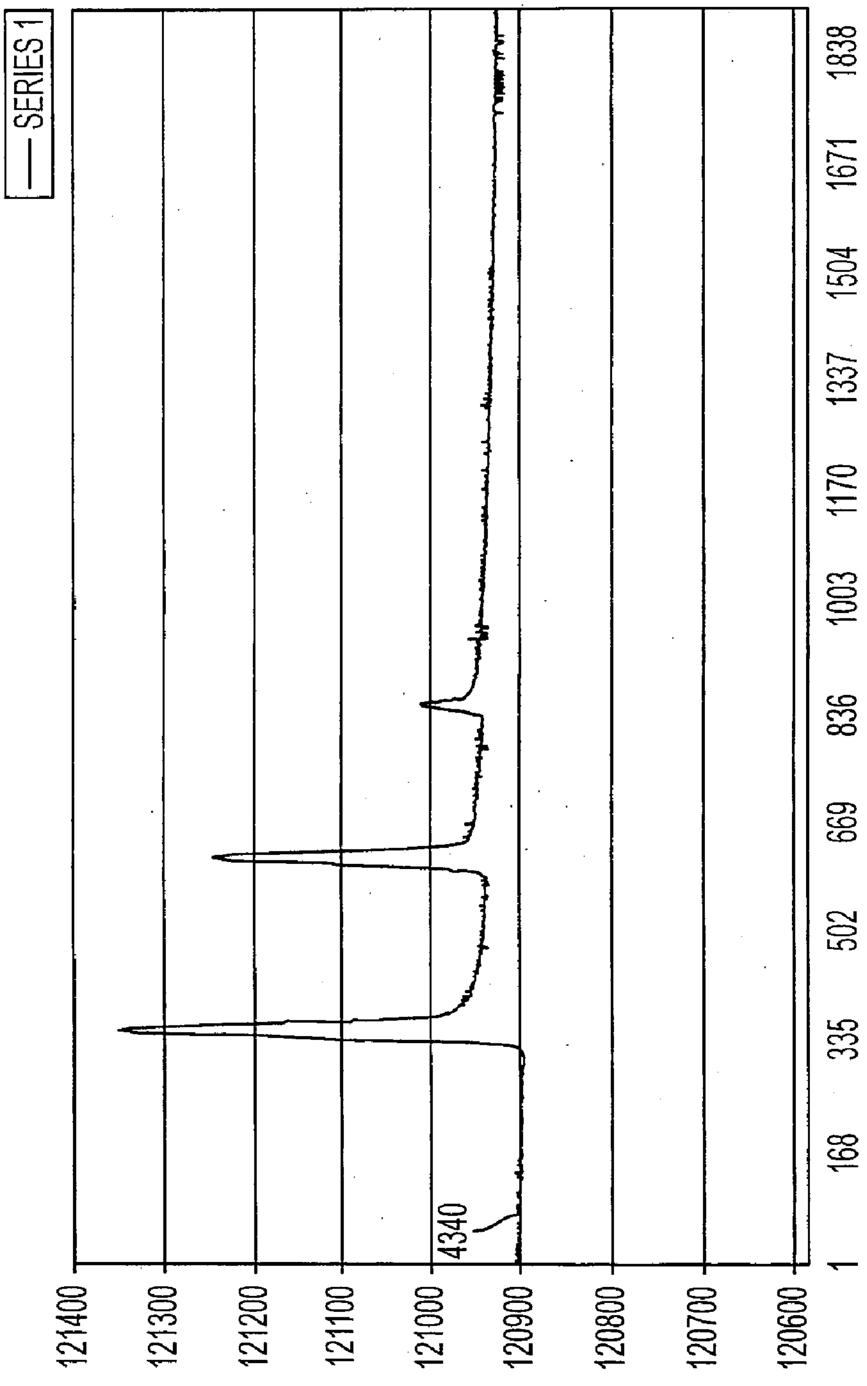

Plot 4340 shown in FIG. 43D illustrates the detection of a pickup truck towing a trailer having one axle. The wheel assemblies were detected using the gradient loop 10 feet wide by 31.5 inches long. The approximate wheel diameter on the truck was 29 inches and the trailer wheels were 12 inches in diameter. The first tire was detected between points where x1=331 and x2=412. The second wheel was detected between points where x3=592 and x4=663 and the trailer wheel was detected between points where x5=832 and x6=876.

Figure 44:
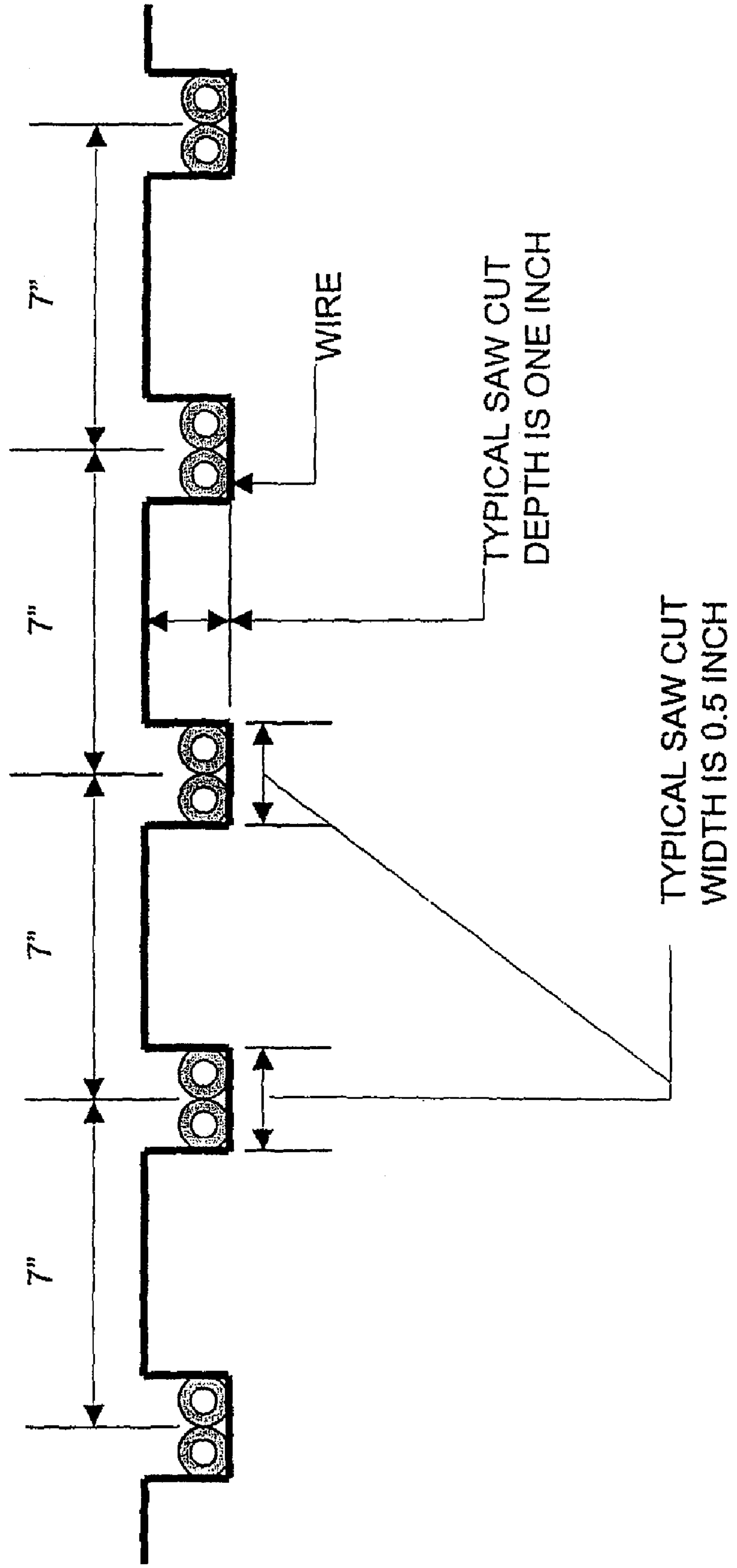
FIG. 44 is a cross-sectional view of a ferromagnetic loop of the present invention.

Referring back to FIG. 39, note that loop 3920 has equal spacing. The cross-sectional view of loop 3920 is illustrated in FIG. 44. Plots shown in FIGS. 44A to 44E show vehicles being detected on ferromagnetic loop that is 28 inches long and 56 inches wide.

The longer loop length can be used to detect grouped axles. Vehicles having two or more axles with a spacing shorter than the loop length can be easily detected on a single loop. The detection of grouped axles results in distinct patterns of detection that is directly related to the axle spacing of the group of axles. The pattern includes such parameters as the number of peaks, amplitude of the peaks, lengths of the peaks, and speed of the wheels.

Example No. 12

Figure 44A:
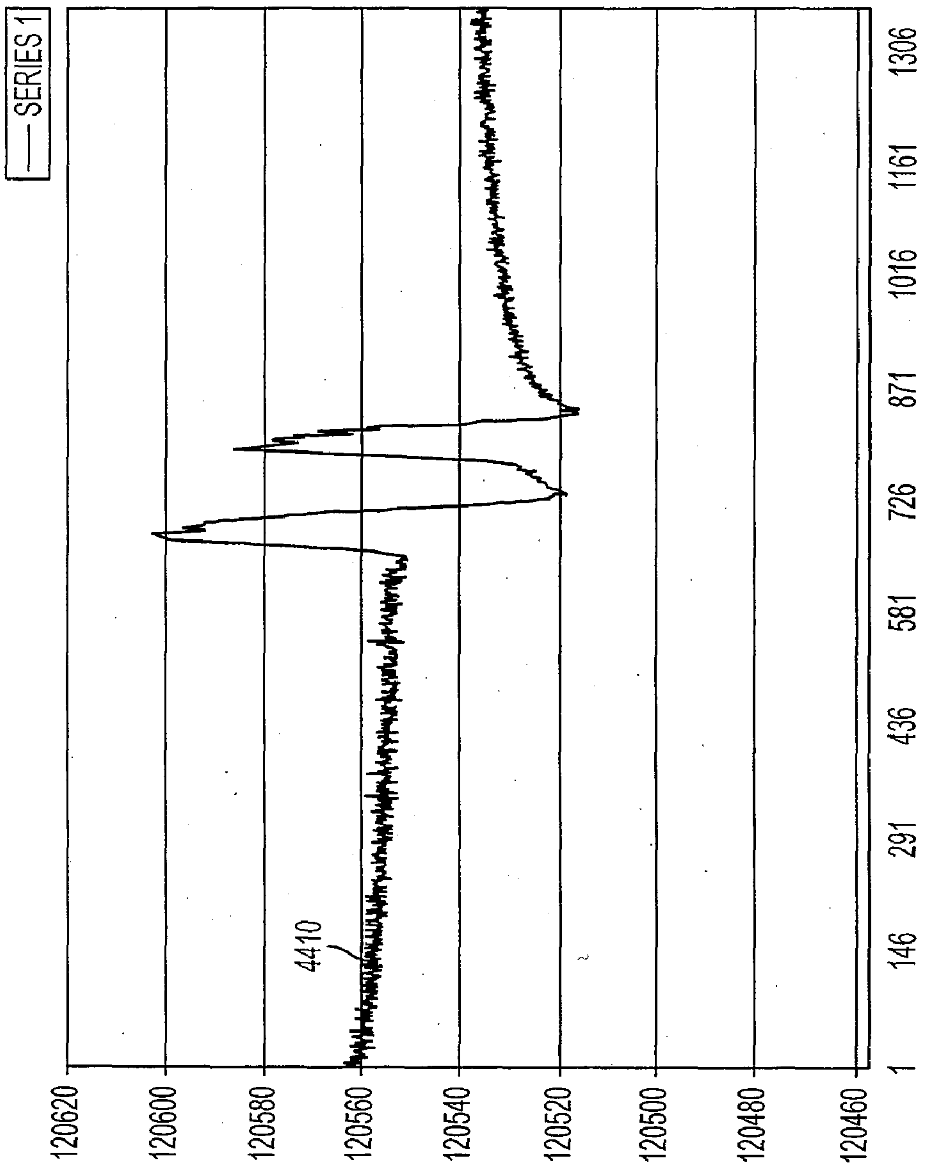
FIGS. 44A, 44B, 44C, 44D, and 44E are frequency vs. time plots produced using a ferromagnetic loop of the present invention.

Plot 4410 shown in FIG. 44A illustrates the detection of a car having two axles using a loop 10 feet wide by 56 inches long having coils with 7 inches of spacing. The approximate wheel diameter on the car was 24 inches. The first wheel was detected between points where x1=656 and x2=726. The second wheel was detected between points where x3=776 and x4=843.

Example No. 13

Figure 44B:
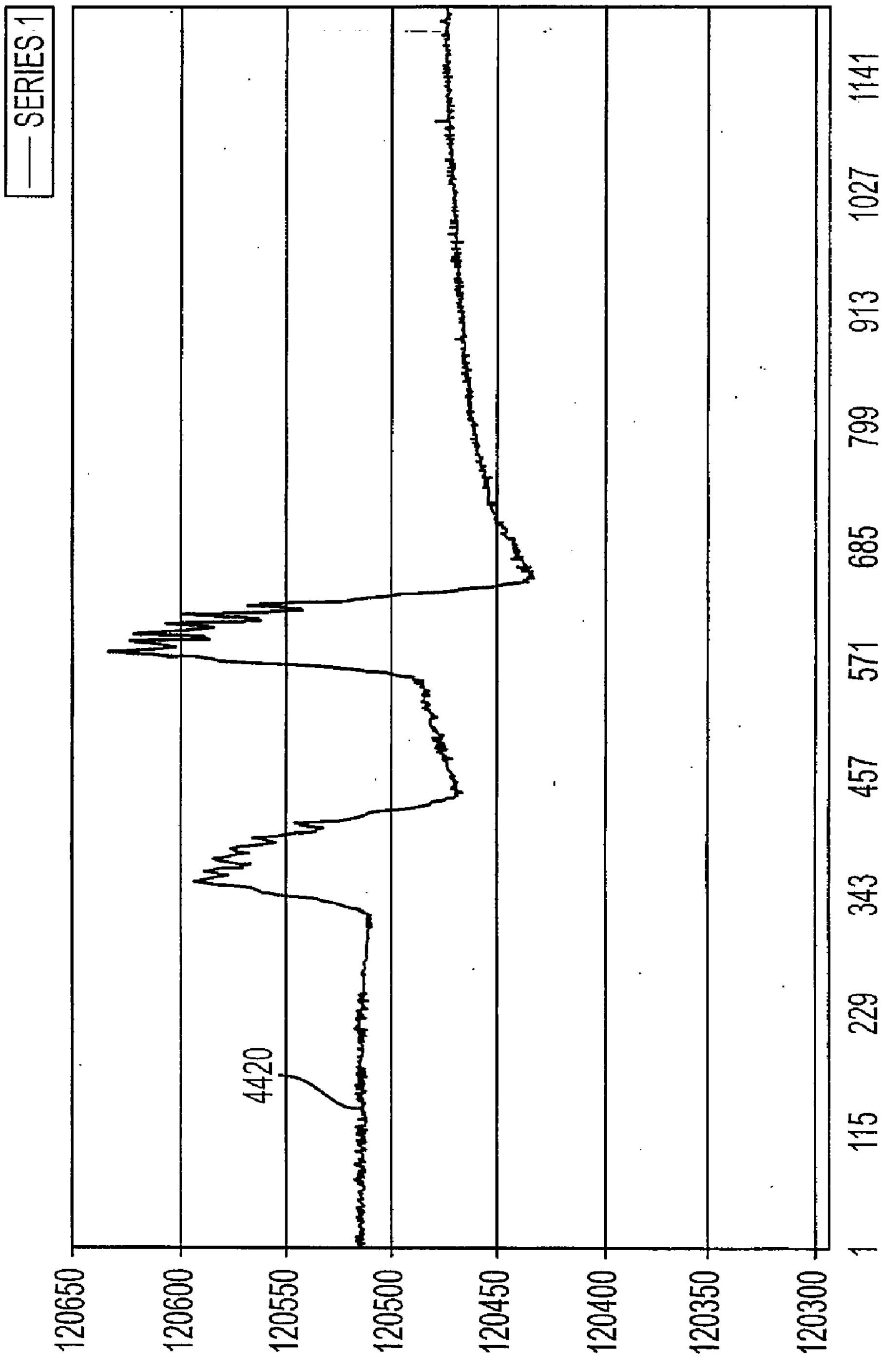

Plot 4420 shown in FIG. 44B illustrates the detection of a truck having two axles using a loop 10 feet wide by 56 inches long having coils with 7 inches of spacing. The approximate wheel diameter on a truck was 40 inches. The first wheel was detected between points where x1=327 and x2=440. The second wheel was detected between points where x3=553 and x4=652. Note that in slow speed conditions the wheel detection contains small peaks that occurred during the wheel detection. The time indicated between two small peaks represents seven inches of wheel travel. This demonstrates the ability of this unique loop geometry to obtain wheel speed information.

Example No. 14

Figure 44C:
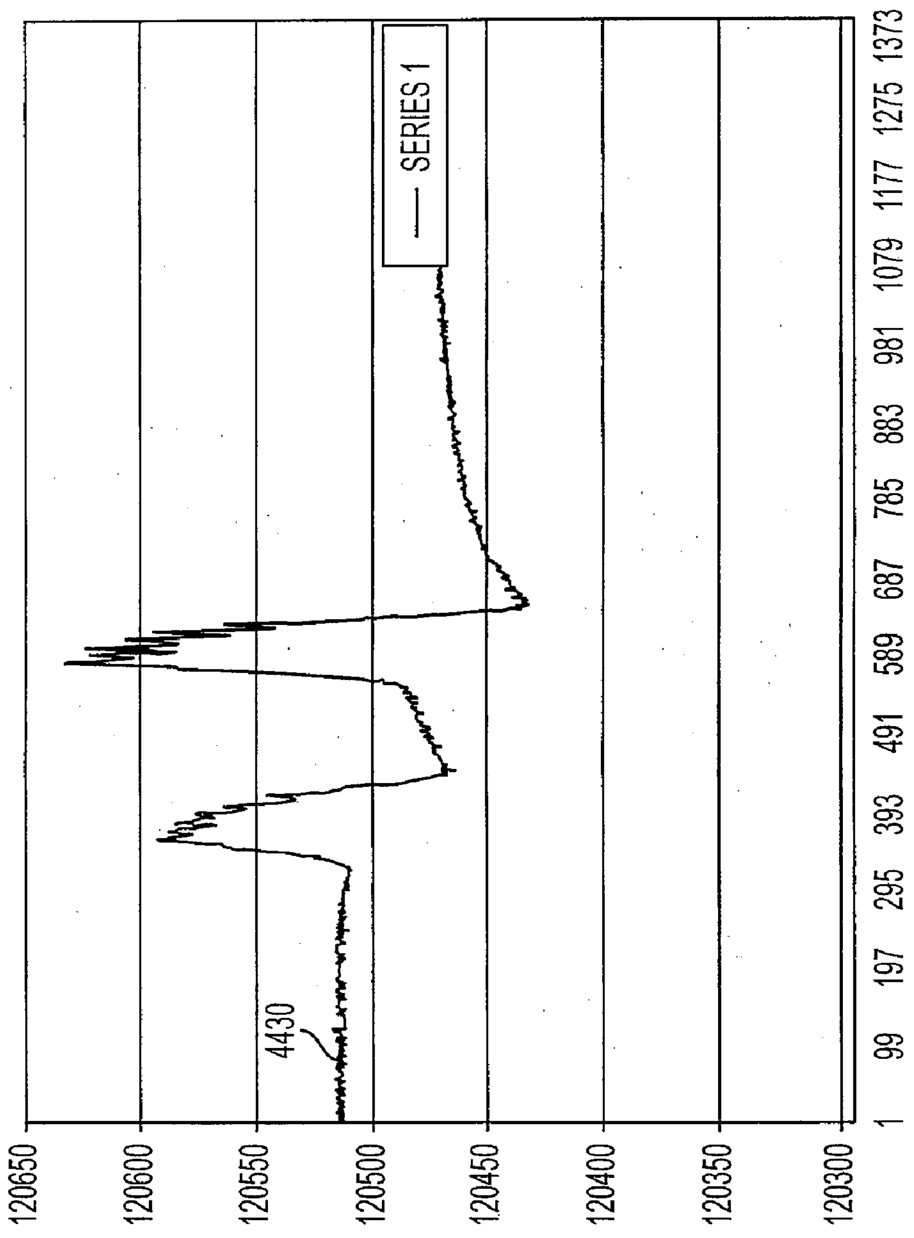

Plot 4430 shown in FIG. 44C illustrates the detection of a truck having two axles and dual tires on the second axle using a loop 10 feet wide by 56 inches long having coils with 7 inches of spacing. The approximate wheel diameter on the truck was 40 inches. The first wheel was detected between points where x1=325 and x2=440. The second wheel was detected between points where x3=555 and x4=649. The amplitude of the first wheel detection was 75 hertz and the amplitude of the second dual wheel detection was 134 hertz. Note that in slow speed conditions the wheel detection contains six small peaks that occurred during the wheel detection. These small peaks represent a seven inches of wheel travel between the peaks. This demonstrates the ability of this unique loop geometry to obtain wheel speed information.

Example No. 15

Figure 44D:
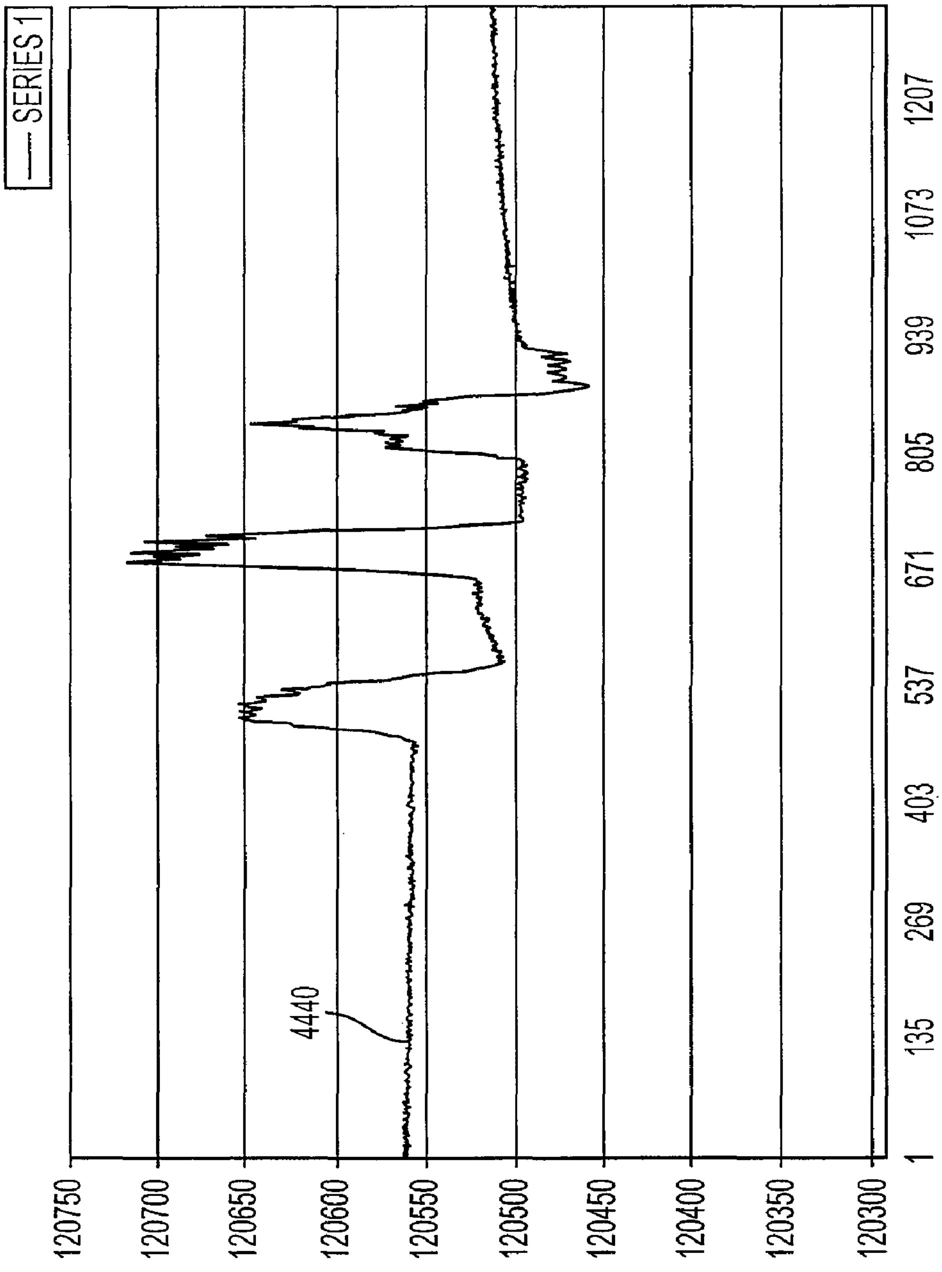

Plot 4440 shown in FIG. 44D illustrates the detection of a pickup truck having two axles with dual wheels on the second axle and towing a two-axle trailer using a loop 10 feet wide by 56 inches long having coils with 7 inches of spacing. The approximate wheel diameter on a truck was 29 inches. The first wheel was detected between points where x1=475 and x2=563. The second dual wheel was detected between points where x3=659 and x4=727. The third wheel was detected between points where x5=795 and x6=835. The fourth wheel was detected between points where x7=835 and x8=876. The amplitude for the first wheel detection was 84 hertz and the amplitude for the second wheel detection was 178 hertz. The wheels of the trailer with two axles were detected between points where x9=795 and x10=835 and between points where x11=835 and x12=876. The wheels being detected at point where x11=835 had an amplitude of 134 hertz. In contrast, the amplitude for the leading edge of the first wheel was 74 hertz and the trailing edge for the second wheel was 78 hertz. The higher amplitude at point where x11=835 is due to the presence of the four trailer wheels on the loop at the same time. The detection of this axle group provides a distinct pattern of detection.

Example No. 16

Figure 44E:
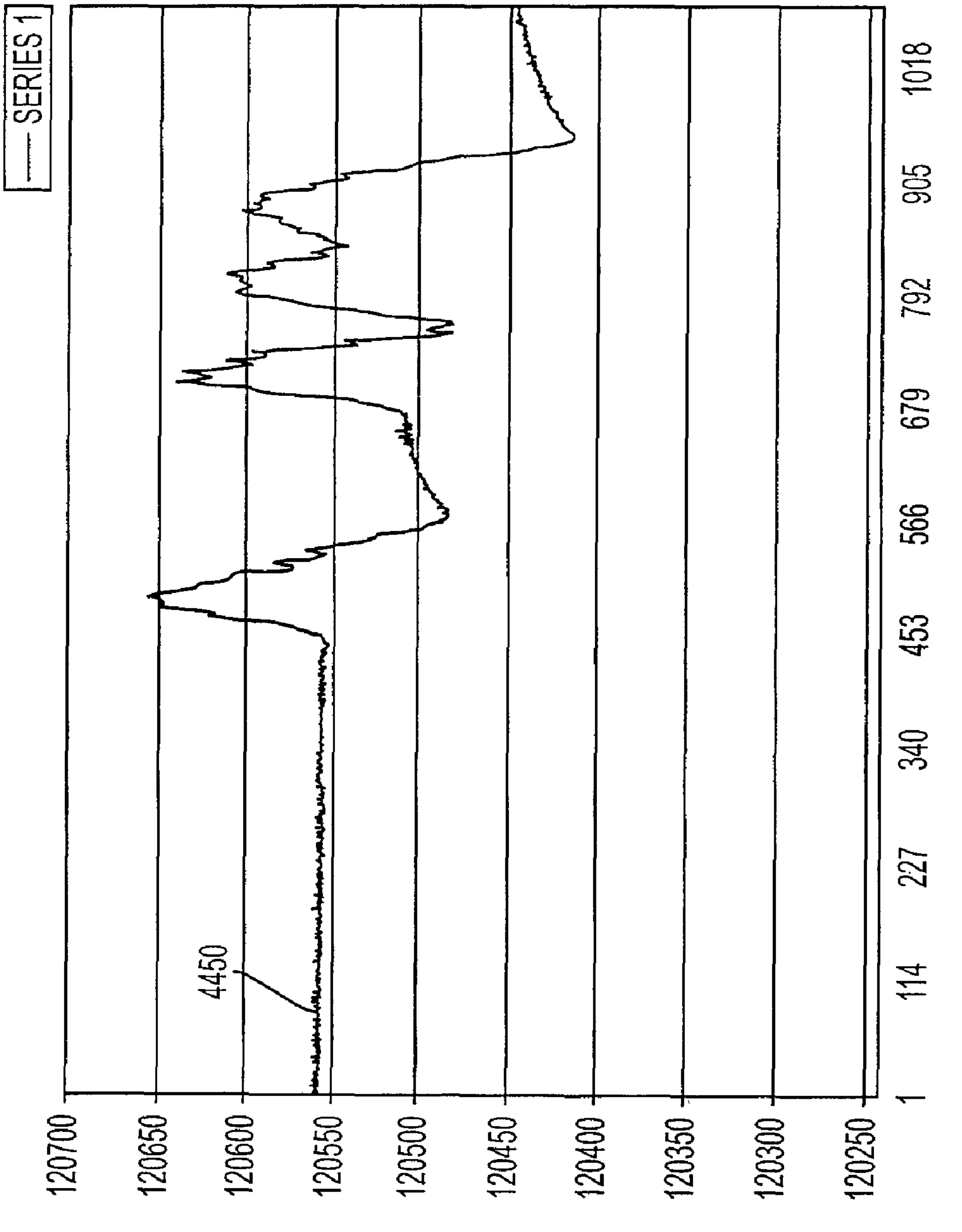

Plot 4450 shown in FIG. 44E illustrates the detection of a truck having four axles using a loop 10 feet wide by 56 inches long having coils with 7 inches of spacing. The approximate wheel diameter on a truck was 39 inches. The first wheel was detected between points where x1=448 and x2=571. The second wheel was detected between points where x3=678 and x4=755. The third wheel was detected between points where x5=766 and x6=842. The fourth wheel was detected between points where x7=842 and x8=949. The spacing between the second axle and third axle was greater than the axle spacing between the third axle and the forth axle on this vehicle. This difference in axle spacing was reflected in the pattern of the detection of the axle group consisting of the third and fourth axles.

This loop design provides good increases in the frequency of the loop circuit when wheels of vehicles travel through the field of the loop even when the length of the loop is made longer than a group of wheels. This unique single loop design provides good wheel detection for the population of vehicles from motorcycles to tractor-trailers. This design can be wide enough to provide detection of both the left and right wheels of a vehicle on a single loop. This efficient design only requires one loop per lane for wheel detection of the entire wheel population. Examples of the different wheel sizes found in random traffic include, for example: motorcycles, 12 to 23 inches in diameter; automobiles, 23 to 26 inches in diameter; pickup or SUV, 26 to 29 inches in diameter; small trucks, 30 to 32 inches in diameter; and large trucks, 40 to 44 inches in diameter.

Figure 45:
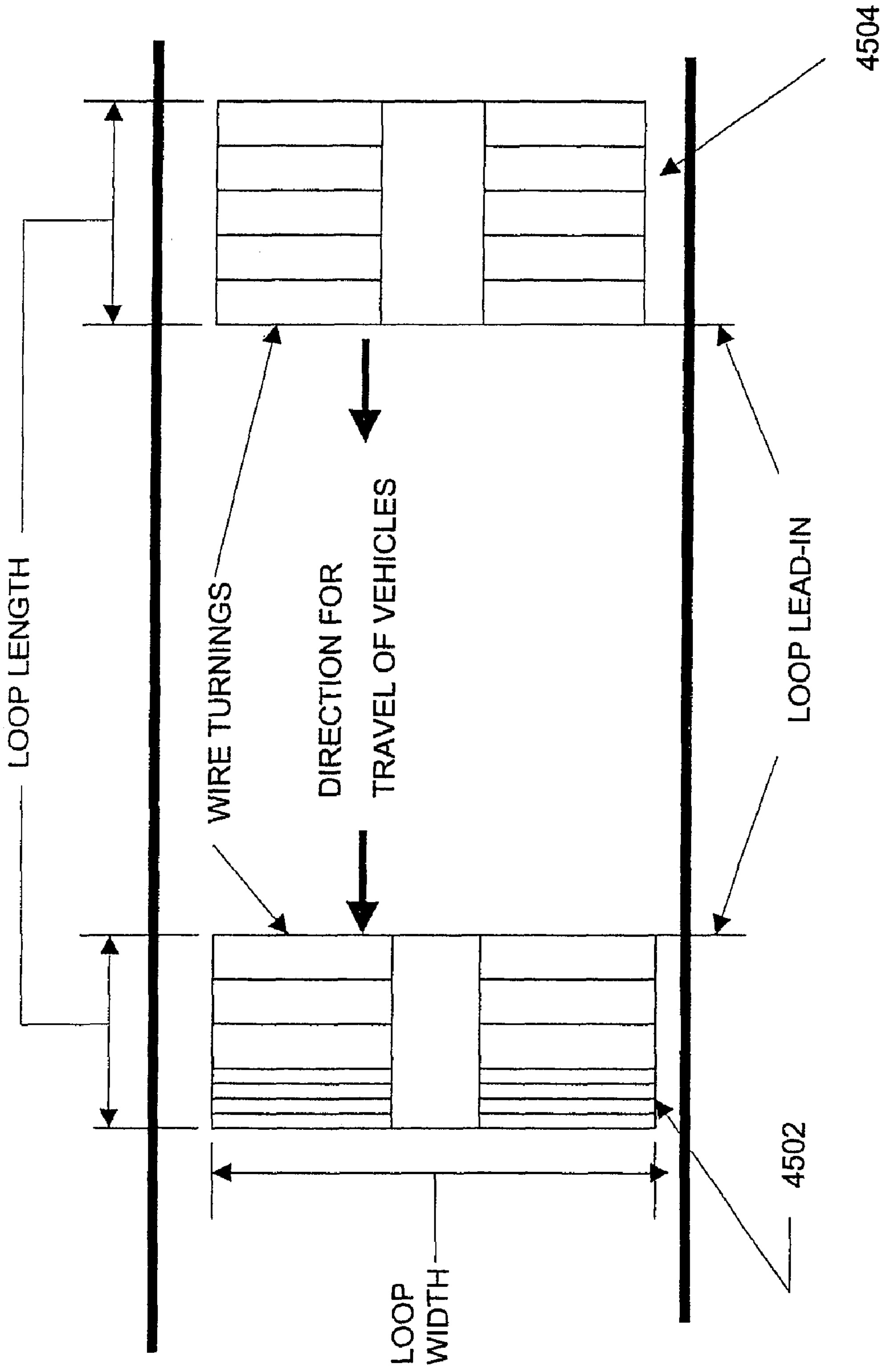
FIG. 45 is schematic diagram showing different embodiments of the present invention.

Both loop geometries, i.e., the gradient spacing and the equal spacing designs, can be installed using one continuous wire in two adjacent segments. This provides detection of the left and right wheel paths in a roadway. This design can be used on wider roadways. The use of two segments reduces the amount of wire in the middle section of the loop. This design provides a wider detection area without dramatically increasing the amount of wire being used. The advantage of not increasing the amount of wire is that adding additional wire does not decrease the loop sensitivity. This is illustrated in FIG. 45 where a loop array has two adjacent loop segments. Loop array 4502 has a gradient of different spacing between the wire turnings. Loop array 4504 has wire turnings with equal spacing.

Plots shown in FIGS. 45A-45I were produced using a loop that is 10 feet wide by 28 inches using the same spacing 7 inches wide.

Example No. 17

Figure 45A:
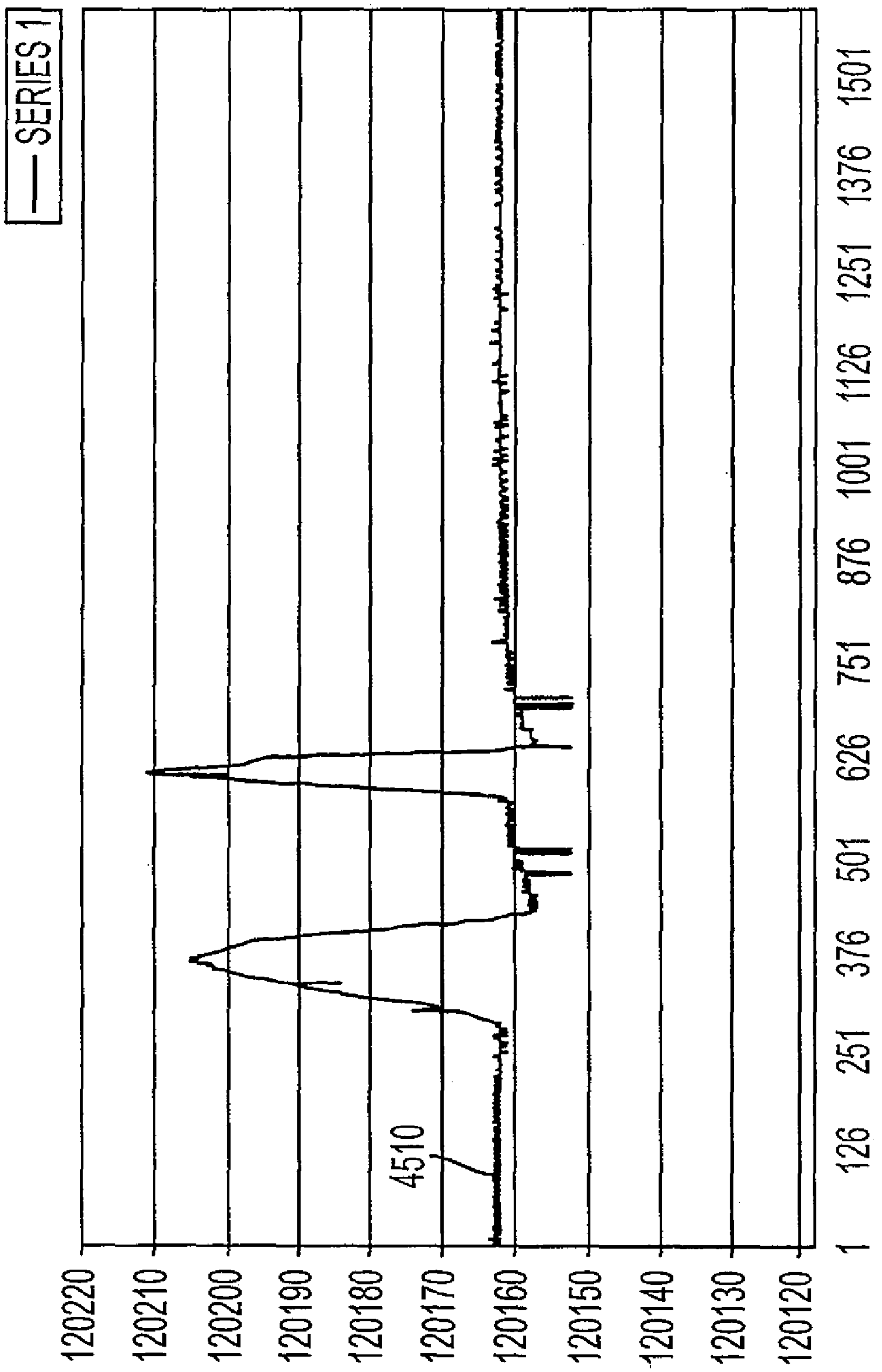
FIGS. 45A, 45B, 45C, 45D, 45E, 45F, 45G, 45H, and 45I are frequency vs. time plots produced using a ferromagnetic loop of the present invention.

Plot 4510 shown in FIG. 45A illustrates the detection of a car having two axles. The approximate wheel diameter on the car was 24 inches. The first wheel was detected between points where x1=290 and x2=435. The second wheel was detected between points where x3=577 and x4=640.

Example No. 18

Figure 45B:
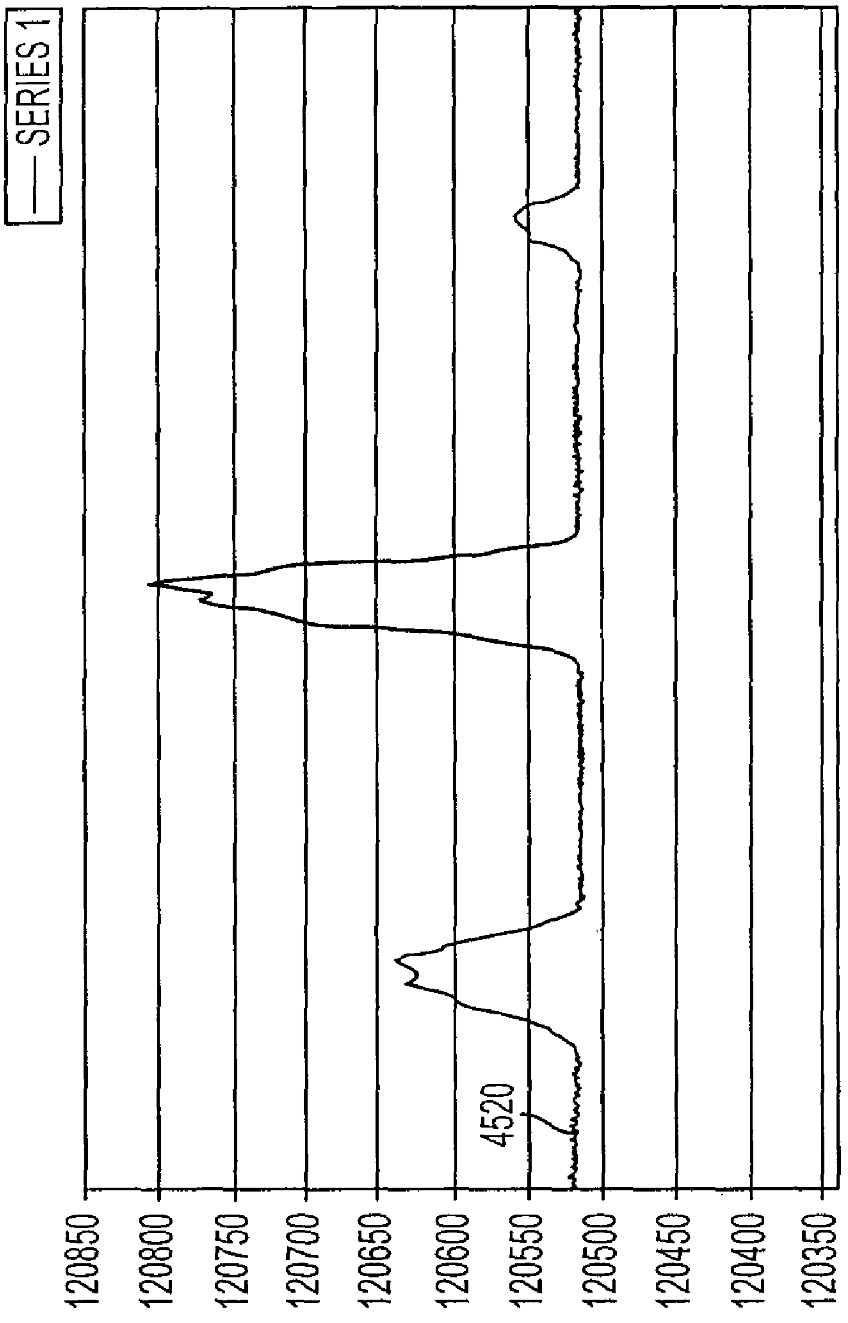

Plot 4520 shown in FIG. 45B illustrates the detection of a pickup truck having two axles. The approximate wheel diameter on the pickup truck was 29 inches. The first wheel was detected between points where x1=591 and x2=638. The second wheel was detected between points where x3=717 and x4=752.

Example No. 19

Figure 45C:
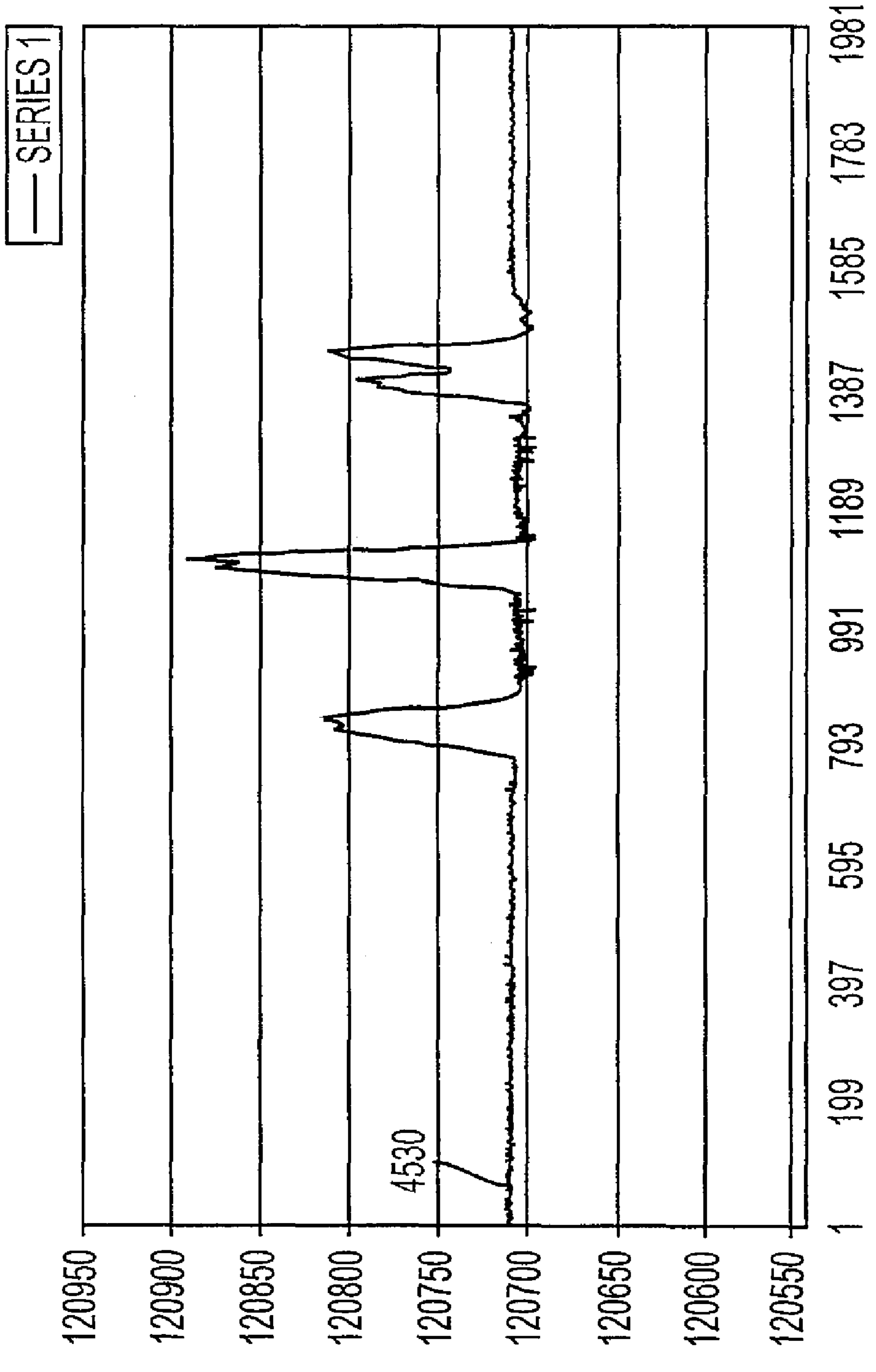

Plot 4530 shown in FIG. 45C illustrates the detection of a pickup truck towing a trailer having two axles. The approximate wheel diameter on the pickup truck was 29 inches. The first wheel was detected between points where x1=774 and x2=878. The second wheel was detected between points where x3=1052 and x4=1144. The trailers wheels were detected between points where x5=1367 and x6=1426 and between points where x7=1426 and x8=1480.

Example No. 20

Figure 45D:
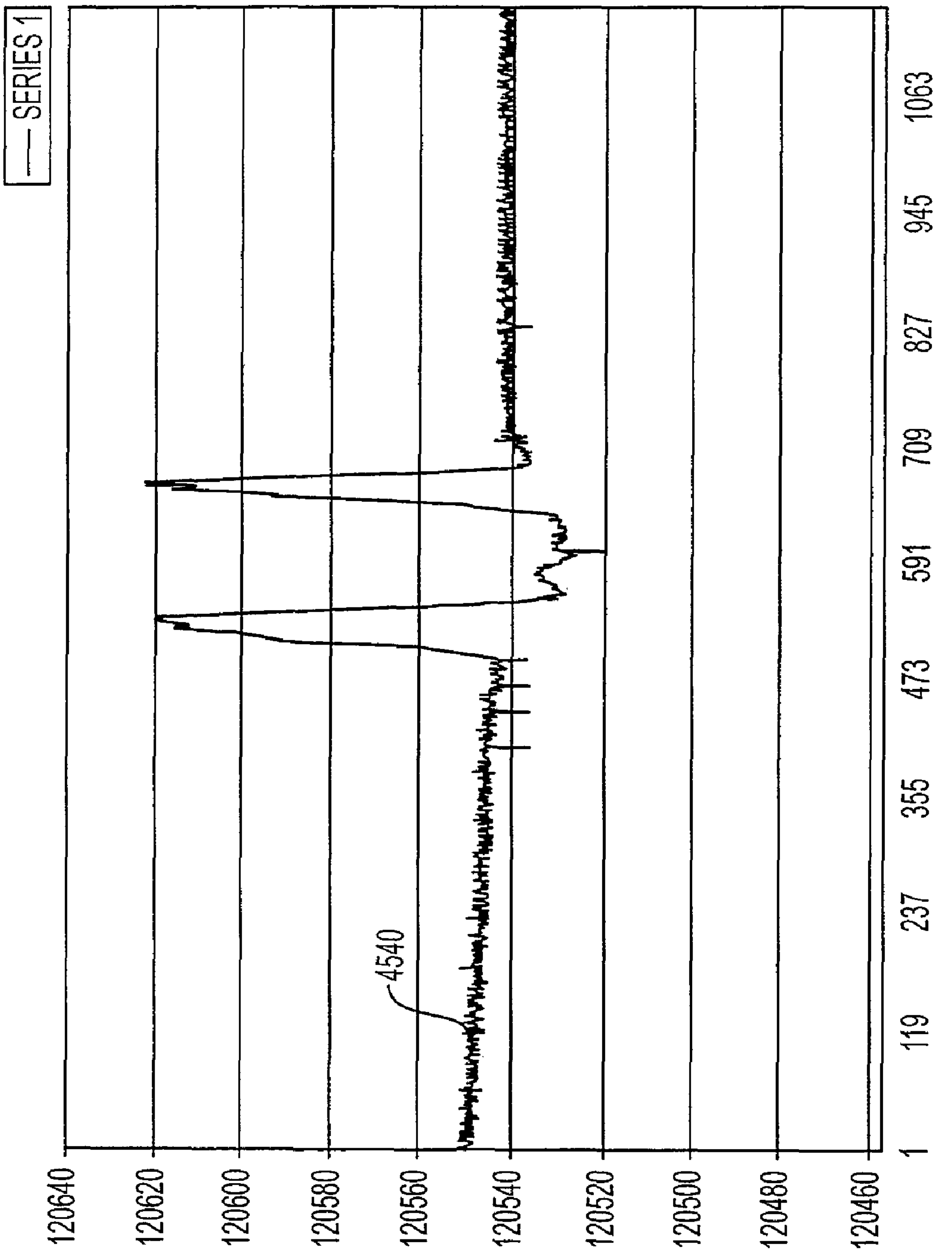

Plot 4540 shown in FIG. 45D illustrates the detection of a SUV having two axles. The approximate wheel diameter on the SUV was 29 inches. The first wheel was detected between points where x1=495 and x2=562. The second wheel was detected between points where x3=641 and x4=696.

Example No. 21

Figure 45E:
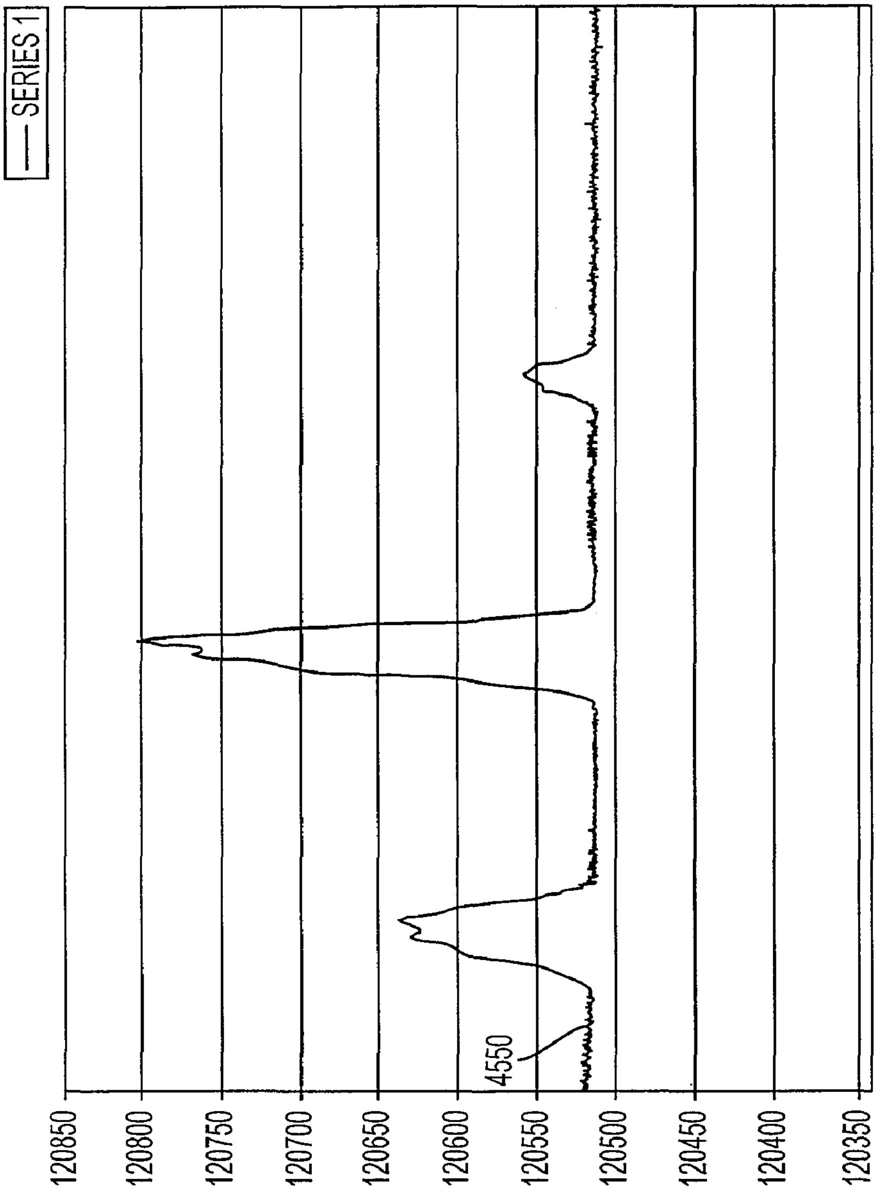

Plot 4550 shown in FIG. 45E illustrates the detection of a truck having two axles and towing a single axle device. The approximate wheel diameter on the truck was 30 inches. The first wheel was detected between points where x1=150 and x2=304. The second wheel was detected between points where x3=556 and x4=692 and the amplitude for this detection was greater because of the presence of the dual tire assembly. The third wheel was detected between points where x5=968 and x6=1055.

Example No. 22

Figure 45F:
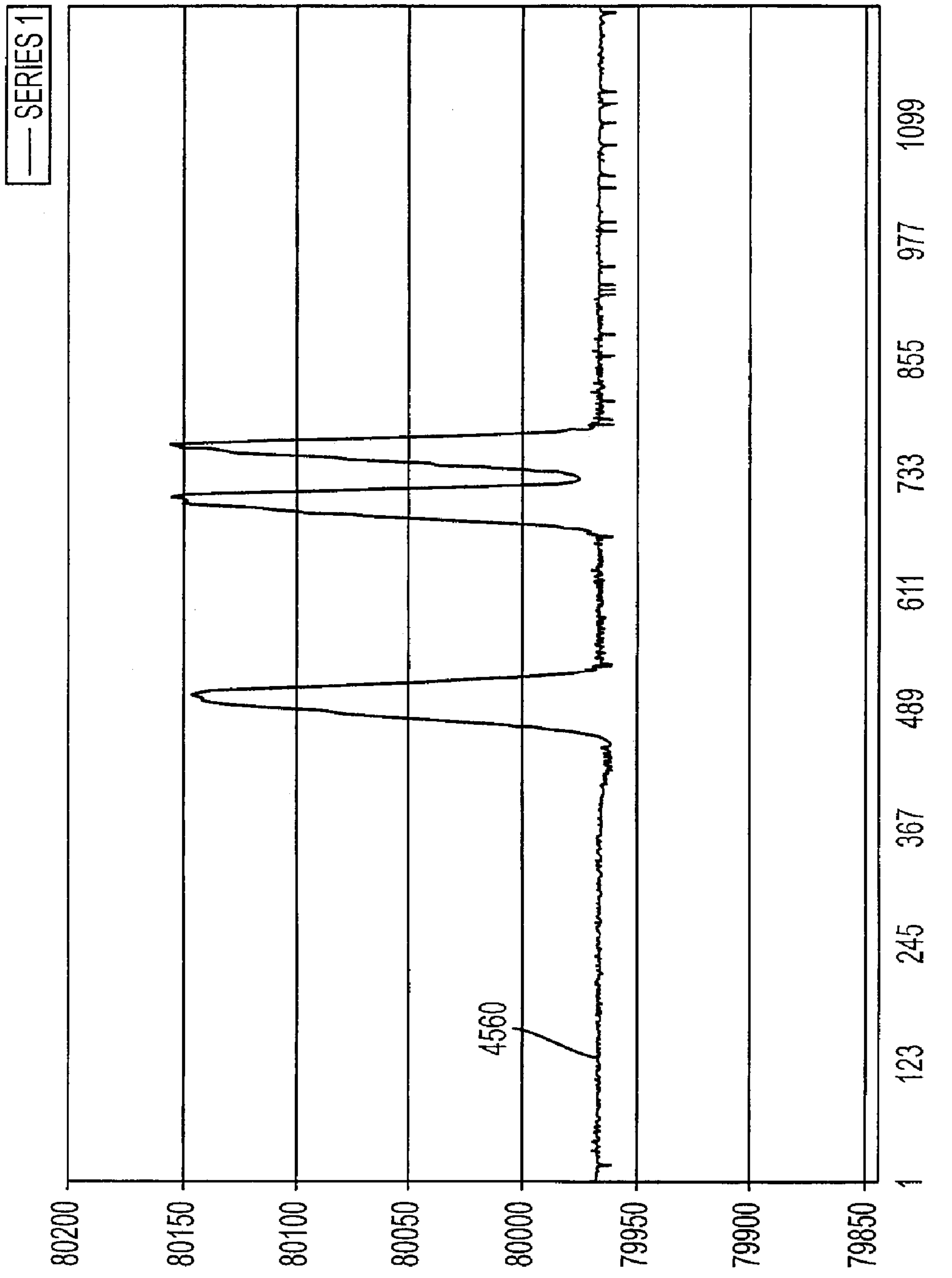

Plot 4560 shown in FIG. 45F illustrates the detection of a truck having three axles. The approximate wheel diameter on the truck was 40 inches. The first wheel was detected between points where x1=462 and x2=533. The second wheel was detected between points where x3=669 and x4=733. The third wheel was detected between points x5=733 and x6=786.

Example No. 23

Figure 45G:
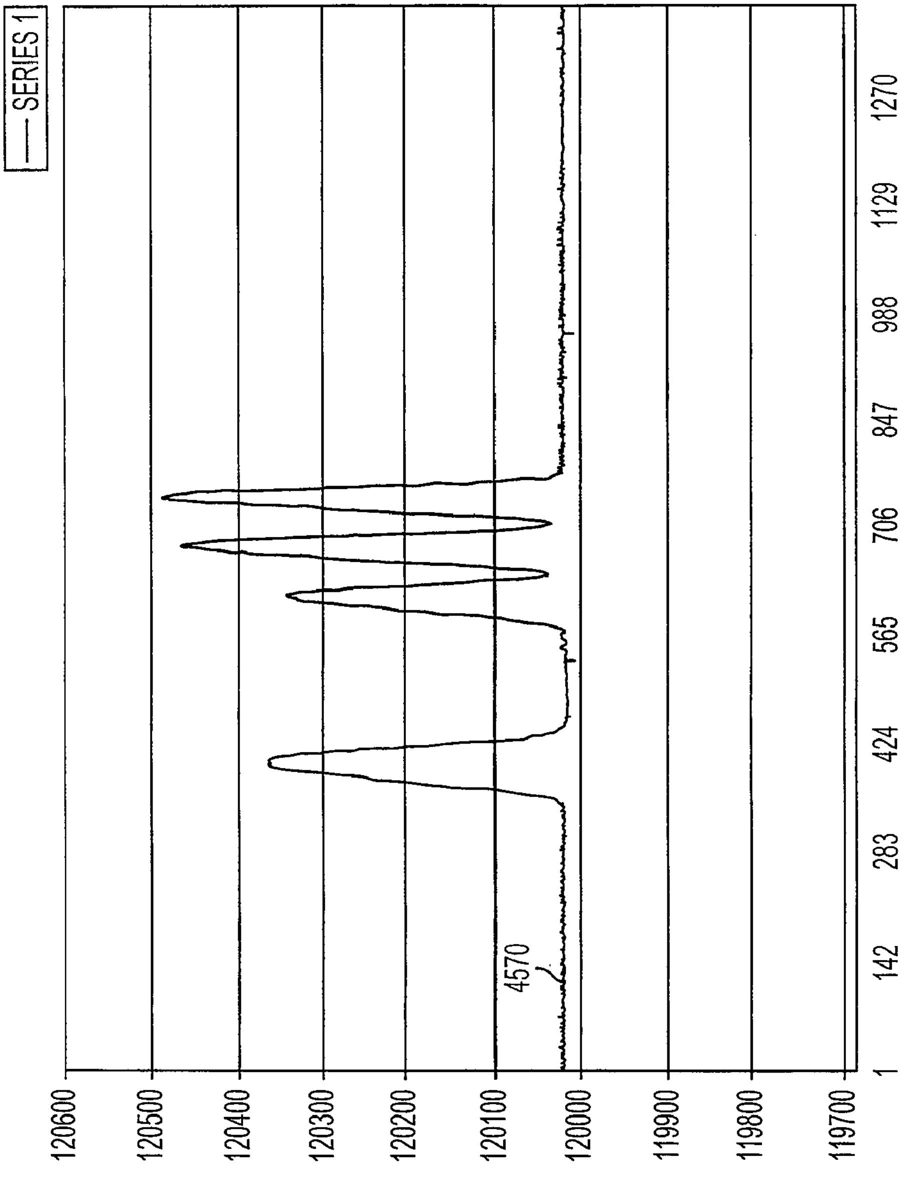

Plot 4570 shown in FIG. 45G illustrates the detection of a truck having four axles. The approximate wheel diameter on the truck was 40 inches. The first wheel was detected between points where x1=347 and x2=448. The second wheel was detected between points where x3=575 and x4=645. The third wheel was detected between points where x5=645 and x6=713. The fourth wheel was detected between points where x7=713 and x8=775.

Example No. 24

Figure 45H:
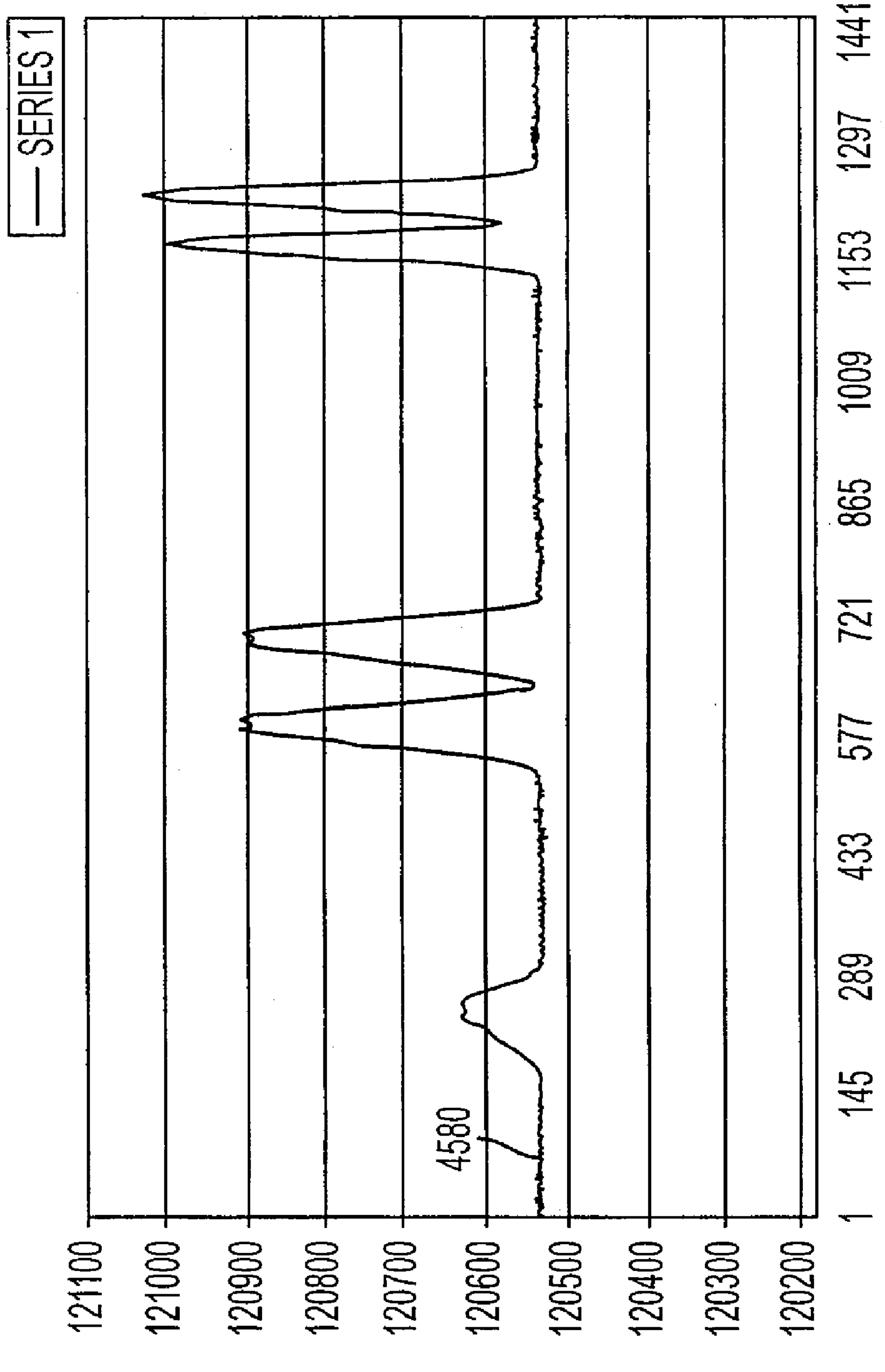

Plot 4580 shown in FIG. 45H illustrates the detection of a truck having five axles. The approximate wheel diameter on the truck was 40 inches. The first tire was detected between points where x1=183 and x2=304. The second wheel was detected between points where x3=544 and x4=647. The third wheel was detected from points where x5=647 and x6=747. The fourth wheel was detected between points where x7=1144 and x8=1207. The fifth wheel was detected between points where x9=1207 and x10=1274.

Example No. 25

Figure 45I:
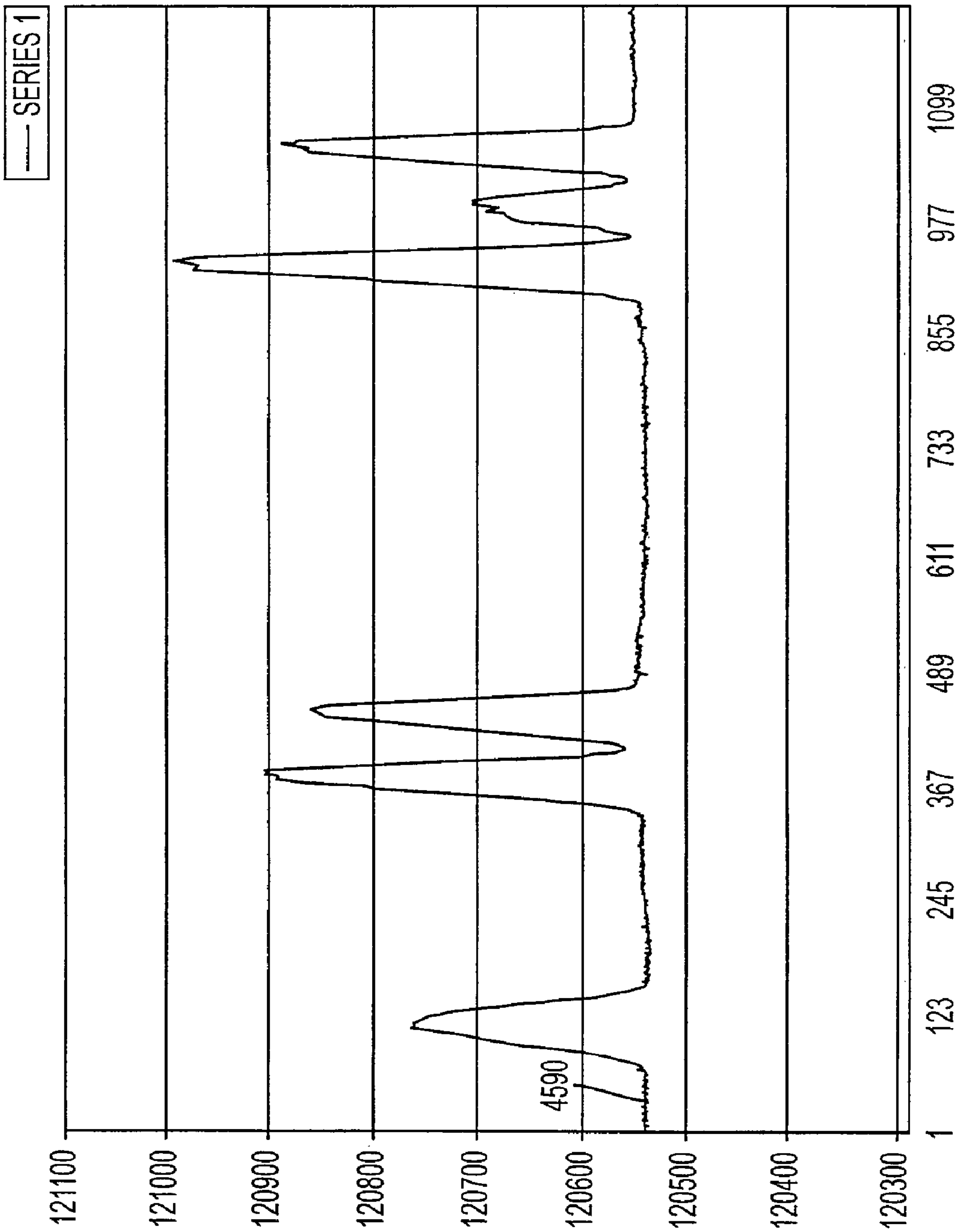

Plot 4590 shown in FIG. 45I illustrates the detection of a truck having six axles. The approximate wheel diameter on the truck was 40 inches. The first wheel was detected between points where x1=70 and x2=1.60. The second wheel was detected between points where x3=340 and x4=411. The third wheel was detected between points where x5=411 and x6=482. The fourth wheel was detected between points where x7=887 and x8=959. The fifth wheel was detected between points where x9=959 and x10=1020. The sixth wheel was detected between points where x11=1020 and x12=1082.

Another unique feature of this design is its ability to increase the length of the loop without dramatically changing the field height. This is very beneficial in supplying a longer sample length time from the loop. The other benefit of having a longer loop length is it provides wheel speed information. The travel path length of the loop is longer than the diameter of the wheels it is detecting. The additional field length provides improved wheel data samples by providing a longer sample length. These longer samples allow more information about each wheel to be processed.

The geometry of the ferromagnetic design can also be used to calculate the speed of the vehicle. The speed can be measured using the length of the sample time as the wheel assembly travels from the leading edge of the loop to the trailing edge of the loop. The sample time is used by the signal analyzer to calculate the speed and provides an accuracy level of plus or minus about four milliseconds. Also, the size and type of wheel assembly can be determined using this loop geometry. The size of the wheel diameter and/or a dual-wheel assembly is reflected in the increased amplitude of the change in the frequency of the loop circuit. All these factors contribute to the area of the curve represented in the graphs for the detection of the wheel. The physical factors about the wheel assembly are represented by the slope and amplitude of the wheel detection. This also allows the processing unit to validate the detection of a wheel and discriminate between an object on a vehicle that is close to the ground but lacks the amplitude and slope to be a valid wheel assembly. This information is supplied on each wheel. In low speed applications or in congestion, this can accurately measure changes in the vehicle speed between the first axle and any of the following axles.

The width of the loop that is perpendicular to the direction of travel can be adjusted to provide the proper width for detection area. The length of the loop can be increased to increase the length of the sample time. The chassis height of the vehicle can also be detected providing the discrimination between cars, pickup, small trucks, or large trucks on a single loop.

Using the ferromagnetic loop of the present invention, it is now possible to detect wheel assemblies and measure vehicle speed using only one single loop. The loop field can be made longer when vehicle wheels travel at high speeds. This change in loop length provides good axle detection even when the loop field length is longer than the diameter of the wheels being detected. The loop length can also be longer than a group of axles. The spacing width of the coils within the loop can be varied to as small as two inches to provide a lower field height. The spacing could also be increased to 20 inches or more to detect very large vehicle wheels. Thus, different coil spacing can be used on a single loop circuit. The benefit of the geometry design is that the field density and uniform field height can be adjusted by changing the spacing. The loop circuit frequency increases when wheels travel through the detection field and this provides easy identification of the wheels.

Figure 46:
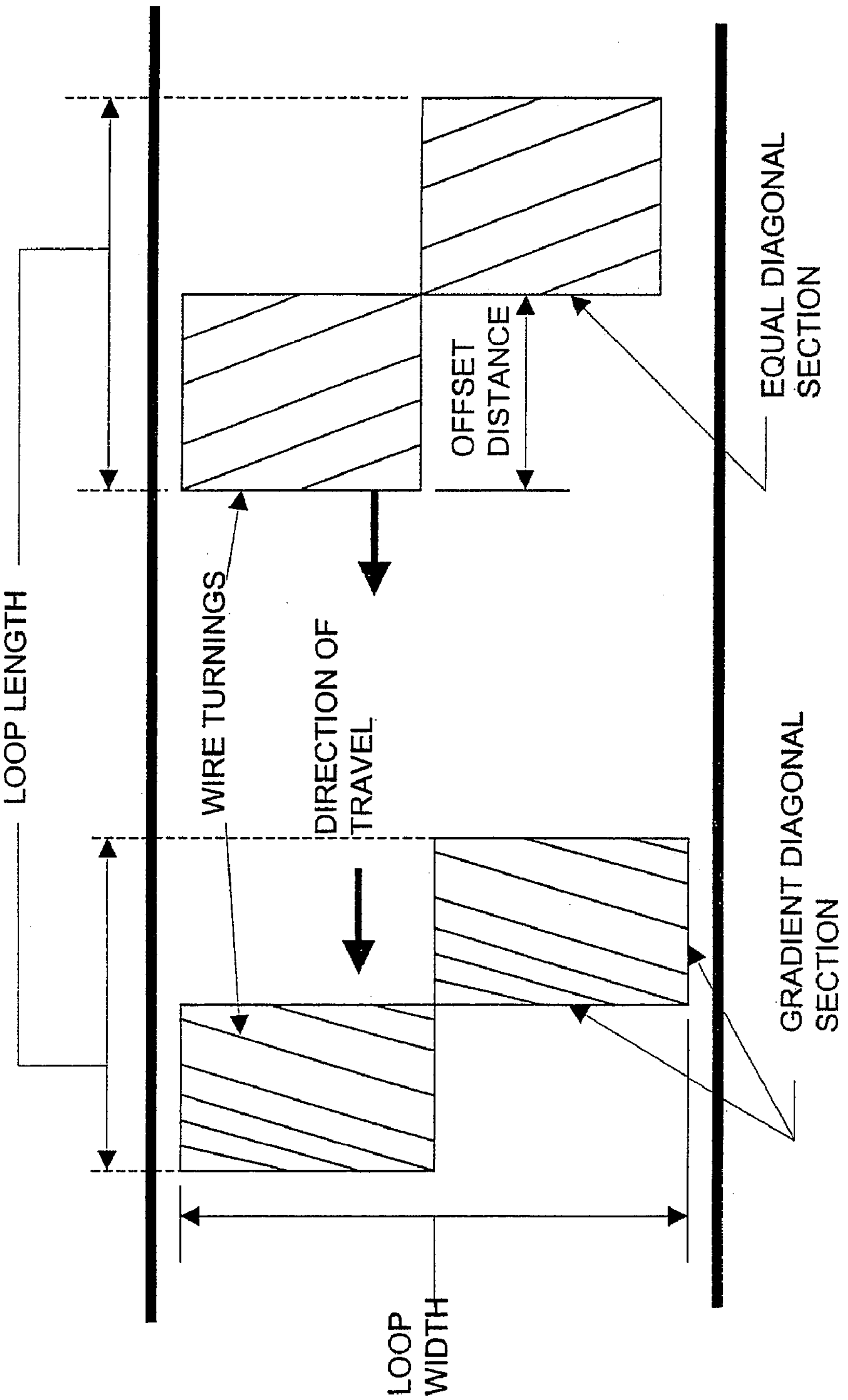
FIGS. 46 and 46A are schematic diagrams showing ferromagnetic loops of the present invention with offset left and right segments.
Figure 46A:
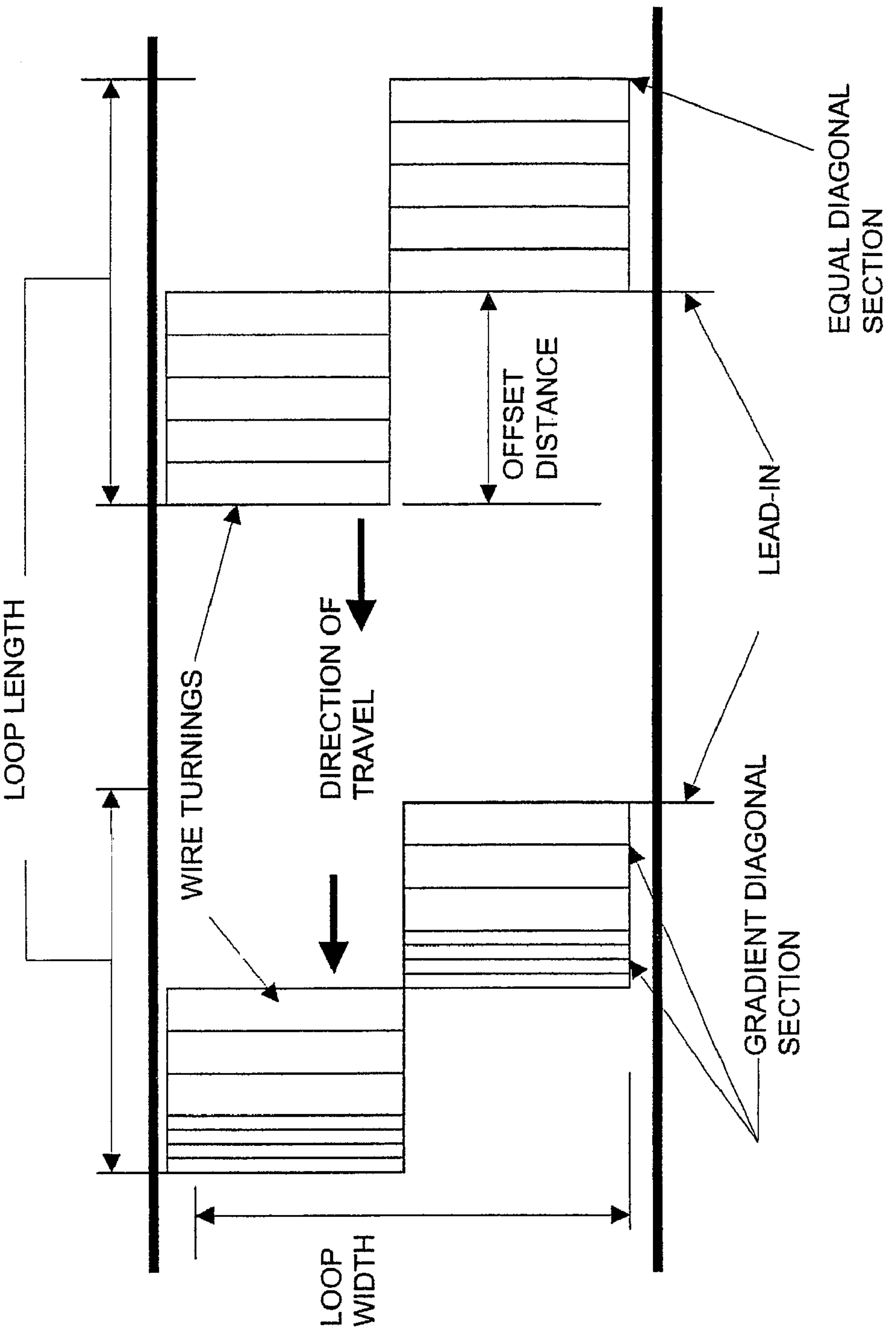

There is another unique loop geometry design that has a bi-symmetrical off-set of the left and right leading and trailing edge of the loop. The left segment of the loop detects the wheels from the left side of a vehicle and the right segment detects wheels from the right side of a vehicle. The use of the offset provides a longer travel distance over the loop and this provides a longer sample time which is desirable particularly at high speeds. In addition, this approach doubles the length of the sample time but only slightly increases the amount of the loop wire by the length of the offset. This loop design is illustrated in FIG. 46. The loops shown in FIG. 46 have wires diagonal to the direction of traffic. However, in other embodiments, the wire need not be diagonal as shown. For example, in FIG. 46A, the gradient and equal coil spacing is oriented perpendicular to the direction of travel.

Figure 46B:
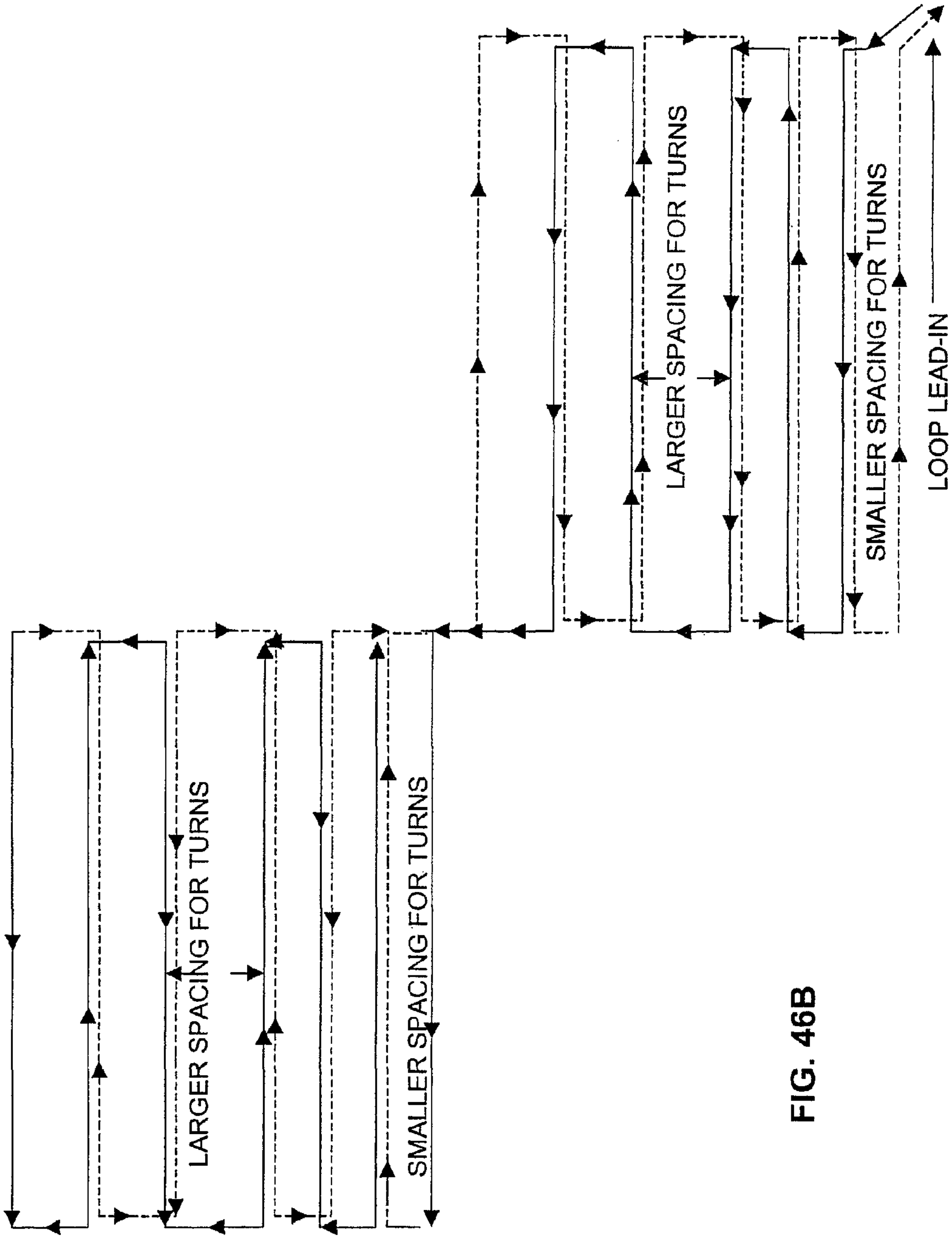
FIGS. 46B, 46C, 46D, 46E, 46F, and 46G are schematic diagrams showing how a ferromagnetic loop of the present invention can be shaped using a continuous wire.

In FIG. 46B, the wire turnings of an offset loop are illustrated.

Figure 46C:
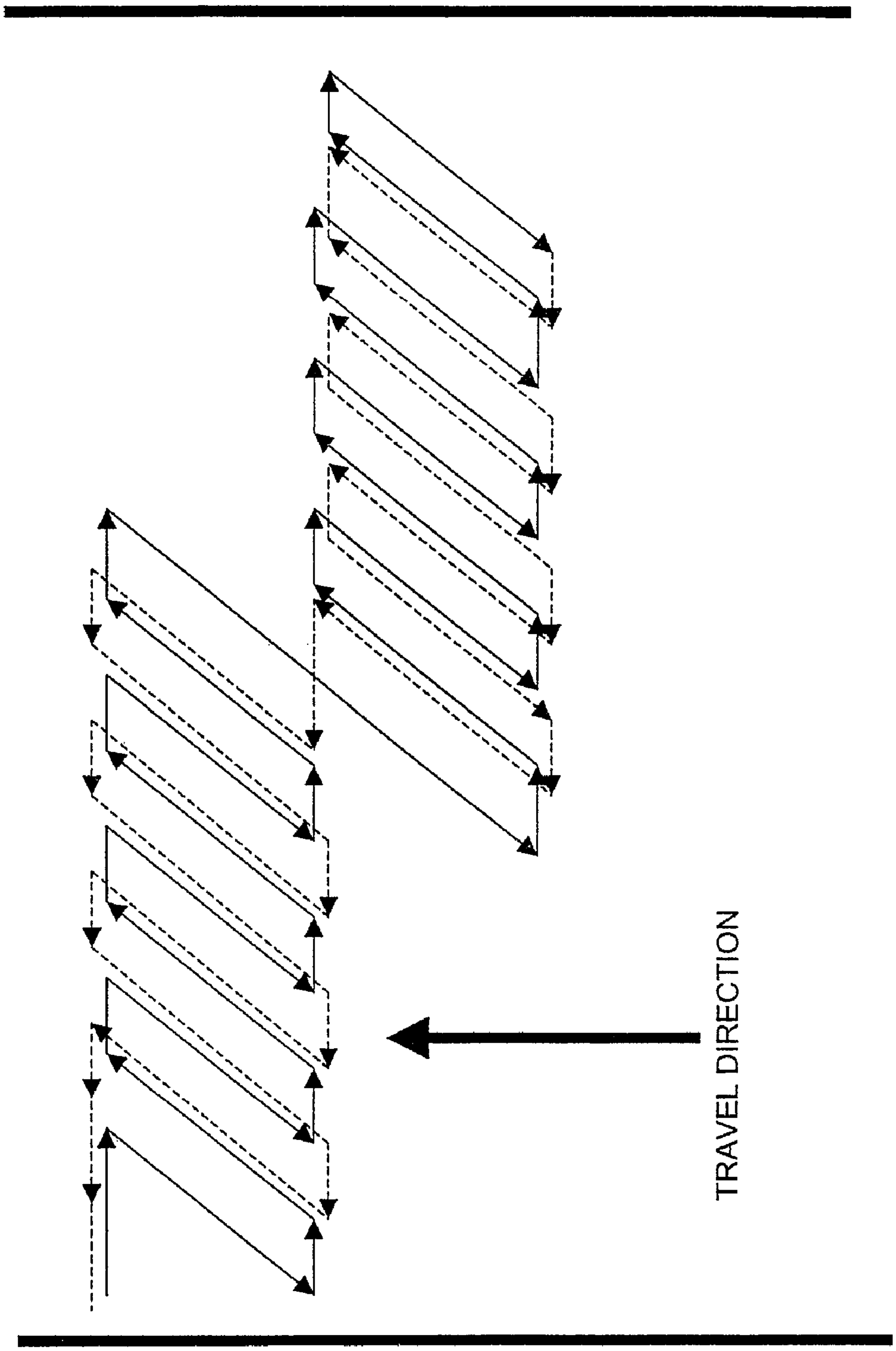

In FIG. 46C, the wire turnings of the offset loop are confined within a footprint with the shape of a parallelogram. This shape provides additional detection in the center of a lane or roadway.

Figure 46D:
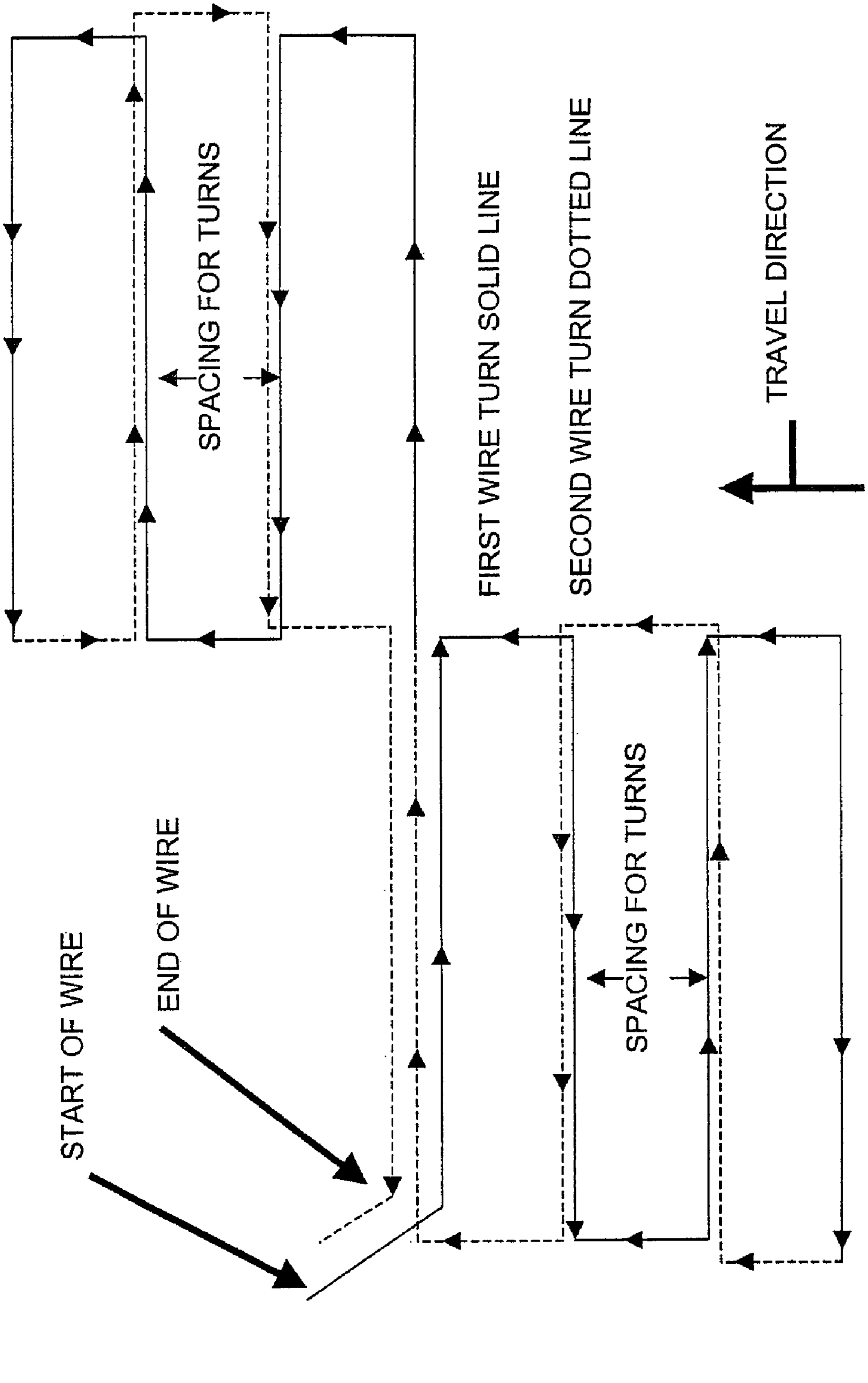

FIG. 46D illustrates the wire turnings with the wire perpendicular to the direction of travel.

Figure 46E:
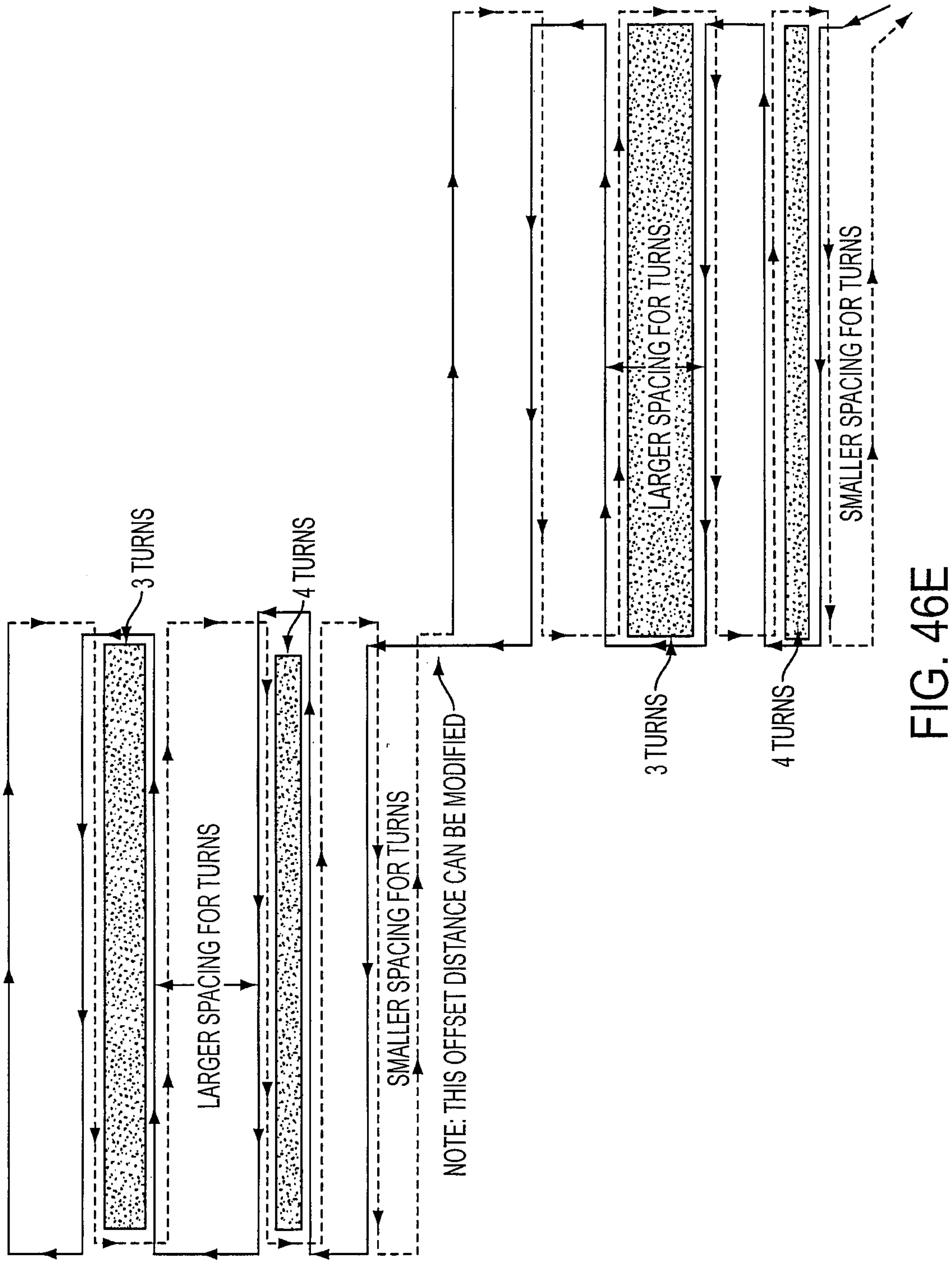

FIG. 46E illustrates the use of additional wire turnings (e.g., three or more turns) that can be used to increase the field strength of the loop in regard to specific wire spacing in the coils.

Figure 46F:
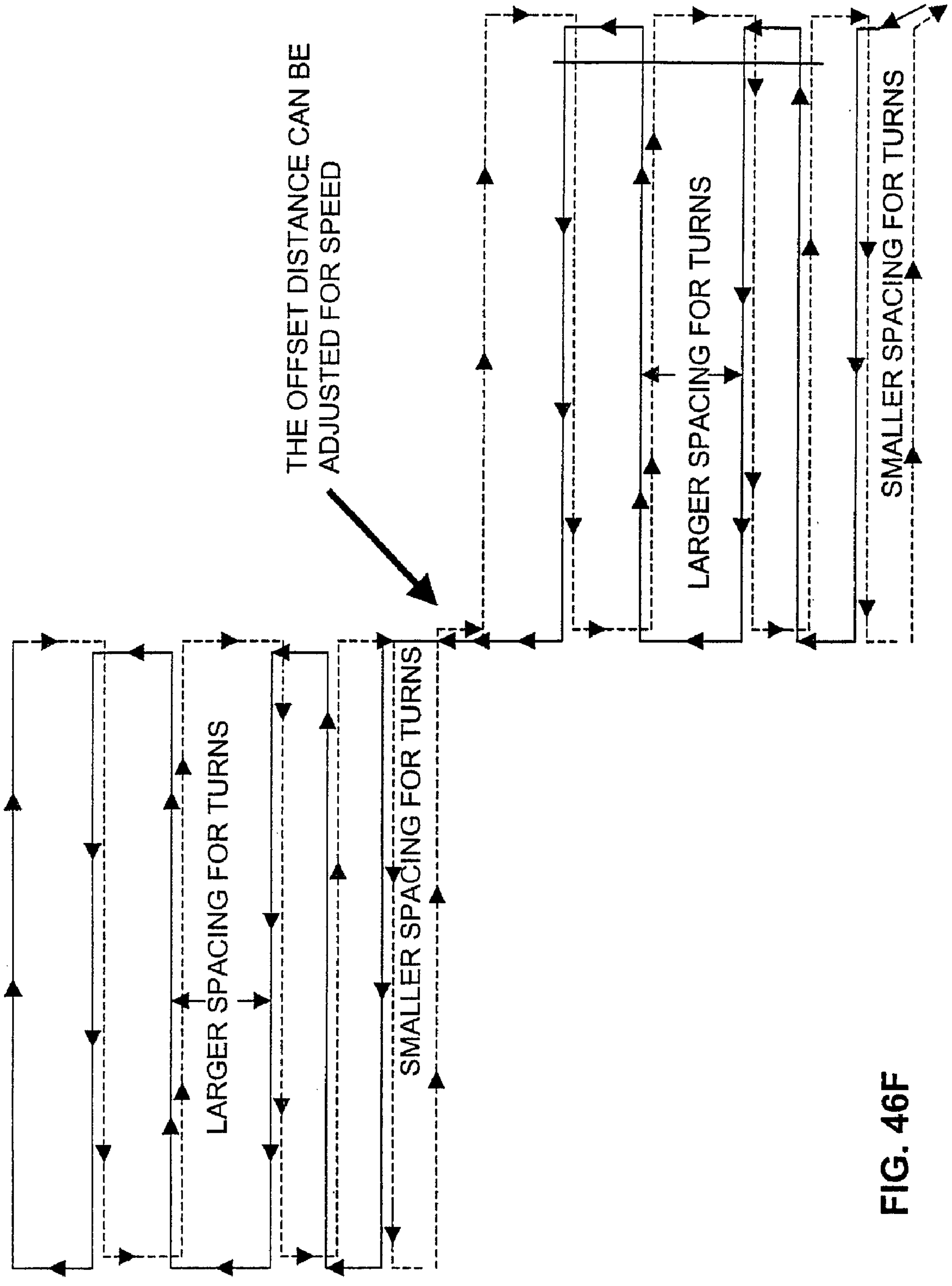

FIG. 46F illustrates the wire turnings of the offset loop gradient characteristic.

Figure 46G:
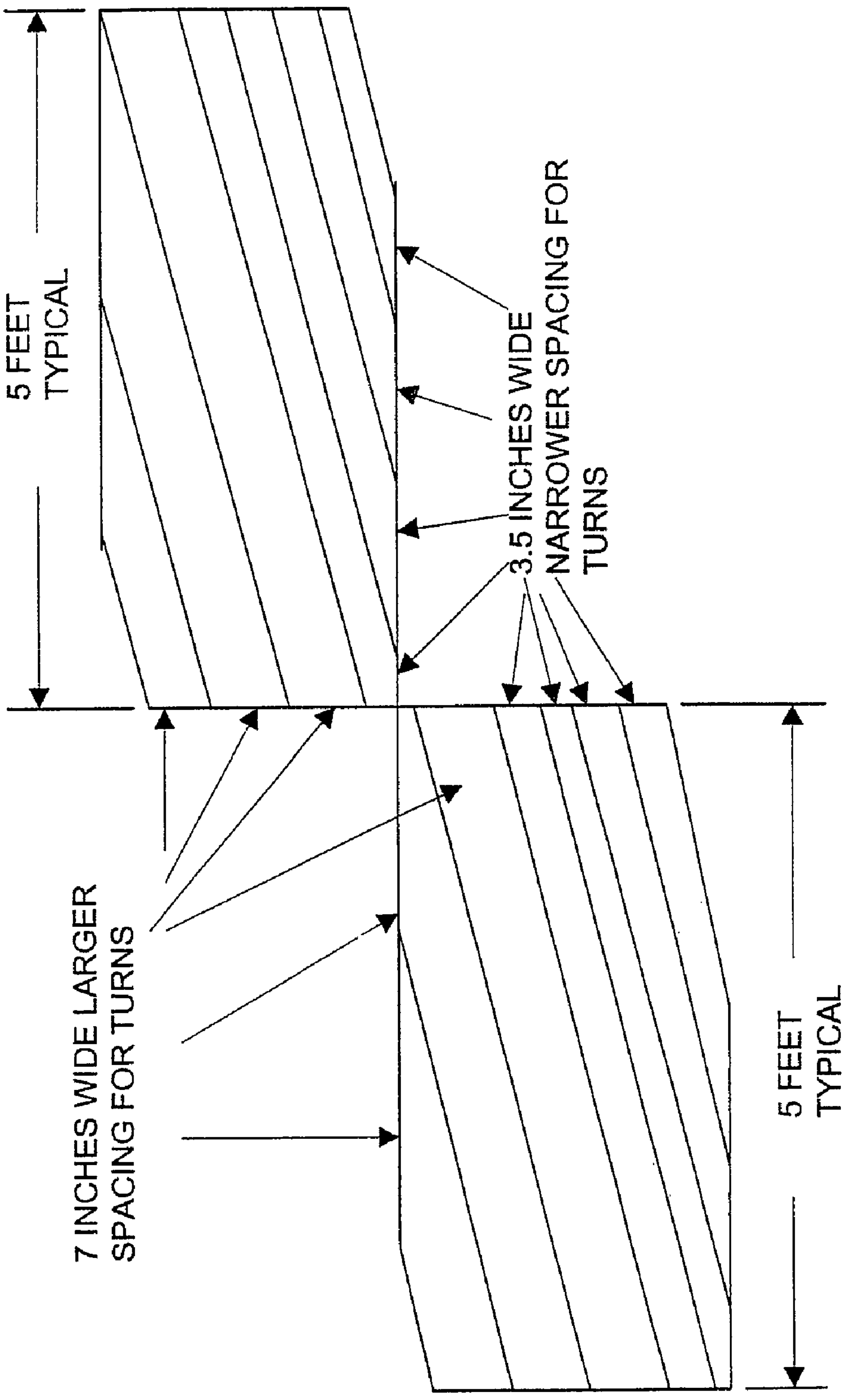

FIG. 46G illustrates the offset gradient loop with diagonal turnings at about 30 degrees to the leading and trailing edge of the loop.

This offset loop design can also be used to calculate the speed of the vehicles. This unique single loop design detects the left wheel and right wheel of an axle assembly at different moments in time. This design provides several methods of calculating the speed on this offset wheel loop. These include loop total activation time, activation time of the left and/or right segment, sample time between left and right activation point, sample time between left and right saturation point, and sample time between left and right deactivation point. This is accomplished by having the left segment of the loop and the right segment of the loop being saturated by the left and right wheel at different moments in time. This difference of time is related to the distance in the offset between the left and right leading edge of the loop. Each wheel provides an increase in the loop circuit frequency during detection. These two increases mark the time it takes for the left and right wheel to travel the distance equal to the offset of the leading edge of the loop.

Also, the total time of the activation of the loop represents the time the vehicle wheel travels the entire length of the loop. These references can be used to calculate the speed of the vehicle (i.e., distance divided by time) on each passing pair of wheels. The axle spacing of the vehicle can also be calculated providing vehicle classification information from a single wheel loop.

Figure 47:
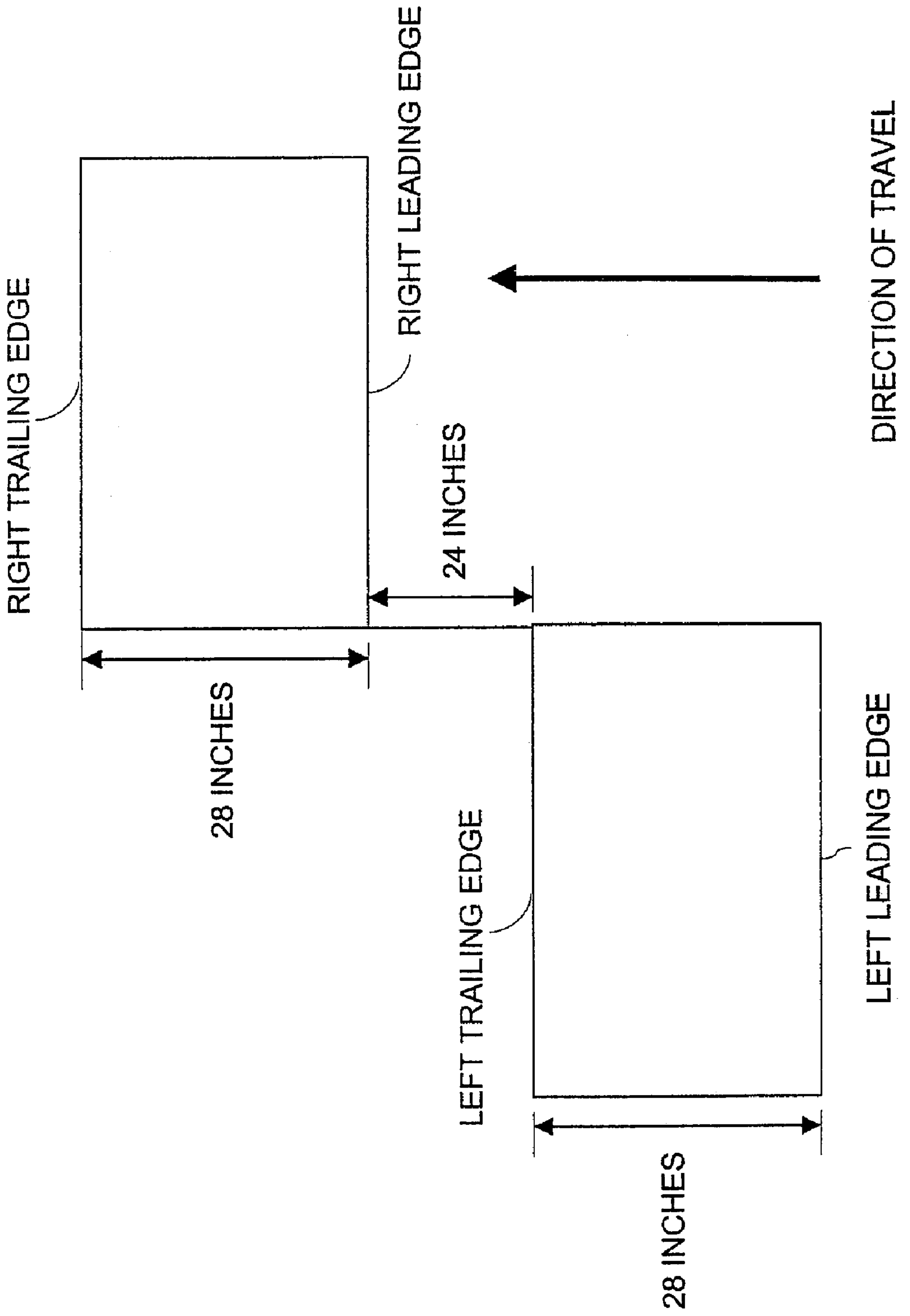
FIG. 47 is schematic diagram showing an offset loop of the present invention having a left segment and a right segment offset by a distance.

Following are examples that illustrate how speed and axle spacing of a vehicle can be determined using a single offset wheel-loop shown in FIG. 47. The single offset wheel loop had a left and right segment each of which was 28 inches long. The loop had an offset length of 24 inches. The distance between the left leading edge and the right leading edge is 52 inches (28+24). Note that the offset distance between the left trailing edge and the right leading edge can range preferably between zero and 46 inches. The effective length of the loop equals 2835 milliseconds at one mile per hour (mph). This is based on the fact that it takes 681.82 milliseconds to travel 12 inches or one foot at one mile/hour, i.e., 1000 milliseconds/seconds×60 seconds/minute×60 minutes/hour×hour/mile×5280 feet/mile, and 681.82 milliseconds/foot×52 inches×1 foot/12 inches=2954.55 milliseconds.

In each of Example Numbers 26 through 32 below, an automobile having a known axle spacing of 8.3 feet was used. The car was driven over the loop using a speed between 10 and 60 mph. The speed of the vehicle was first determined. The axle spacing were then calculated based on the determined speed of the vehicle. The speed was calculated using the activation time between the left and right wheel. The axle spacing was calculated using the sample time between the activation of the first axle and the activation point of the second axle. The spacing was calculated using the vehicle speed measured on the first axle. It should be noted that the speed calculation was available for each passing pair of wheels. This speed information can also be used to determine if the vehicle was accelerating or decelerating as it traveled over the loop. It was also possible to use other or multiple speed points and/or use the average of these points. When this offset distance is used a valley or deactivation period appears on the graph (the frequency vs. time plot) between the left and right wheel detection. When a vehicle that has a group of axles with a spacing that is less then the distance of the offset was detected, an axle group pattern is produced on the graph.

Example No. 26

Figure 47A:
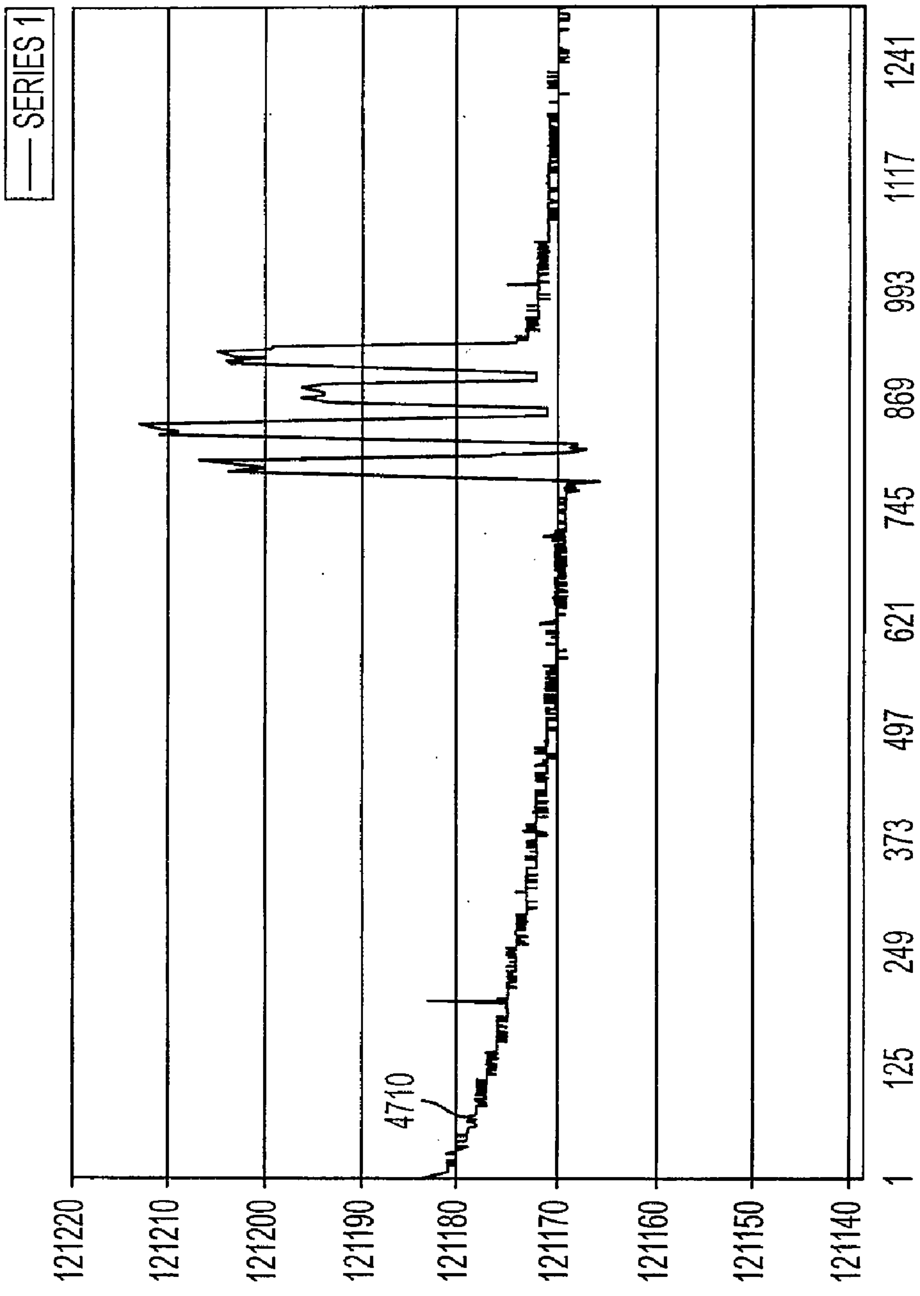
FIGS. 47A, 47B, 47C, 47D, 47E, 47F, 47G, 48A, 48B, 48C, 48D, 48E, and 48F are frequency vs. time plots produced using a ferromagnetic loop of the present invention.

Plot 4710 shown in FIG. 47A illustrates the detection of the car. The first left leading edge activation was at point where x1=774 and the first right leading edge activation was at point where x2=815. This represented a lapse of time of 225.5 milliseconds (i.e., (815−774) multiplied by 5.5). The 225.5 milliseconds sample time was divided into the effective length of the loop value of 2954.55 milliseconds per one mph. This resulted in 13.10 mph (2954.55/225.5) for the vehicle speed. This speed factor was used with the sample time from the activation of the first left leading edge of the first axle at point where x1=774 and the activation of the left leading edge of the second axle at point where x3=855. This represented a sample length of 445 milliseconds ((855−774)×5.5). This resulted in an axle spacing of 8.54 feet.

Example No. 27

Figure 47B:
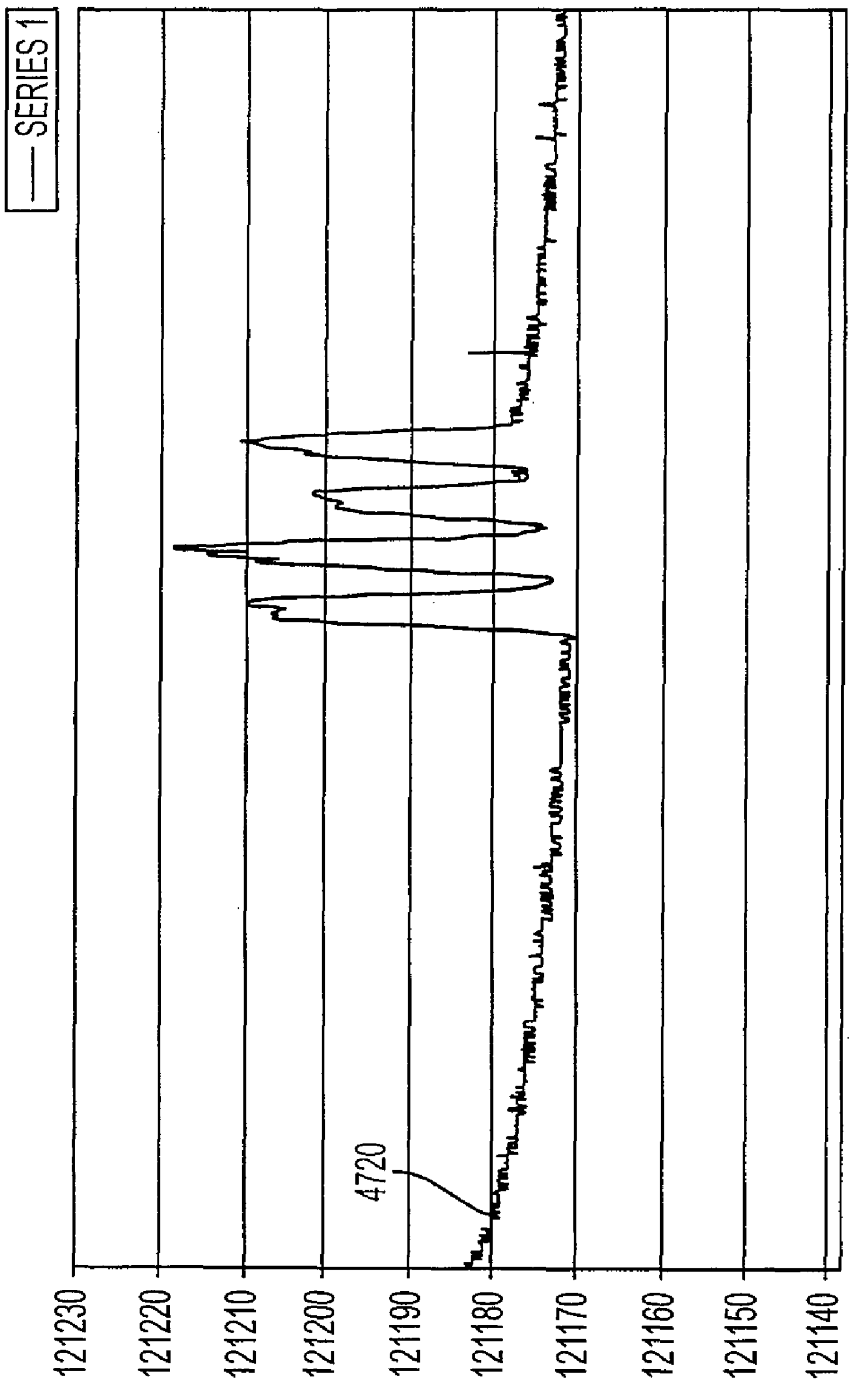

Plot 4720 shown in FIG. 47B illustrates a second detection of the car. The first left leading edge activation was at point where x1=546 and the first right leading edge activation was at point where x2=594. This represented a lapse of time of 264 milliseconds. The 264 milliseconds sample time was divided into the effective length of the loop value of 2835 milliseconds per one mph to provide a result of 11.19 mph for the vehicle speed. This speed factor was used with the sample time from the activation of the first left leading edge of the first axle at point where x1=546 and the activation of the left leading edge of the second axle at point where x3=639. This represented a sample length of 511.5 milliseconds. This resulted in an axle spacing of 8.39 feet.

Example No. 28

Figure 47C:
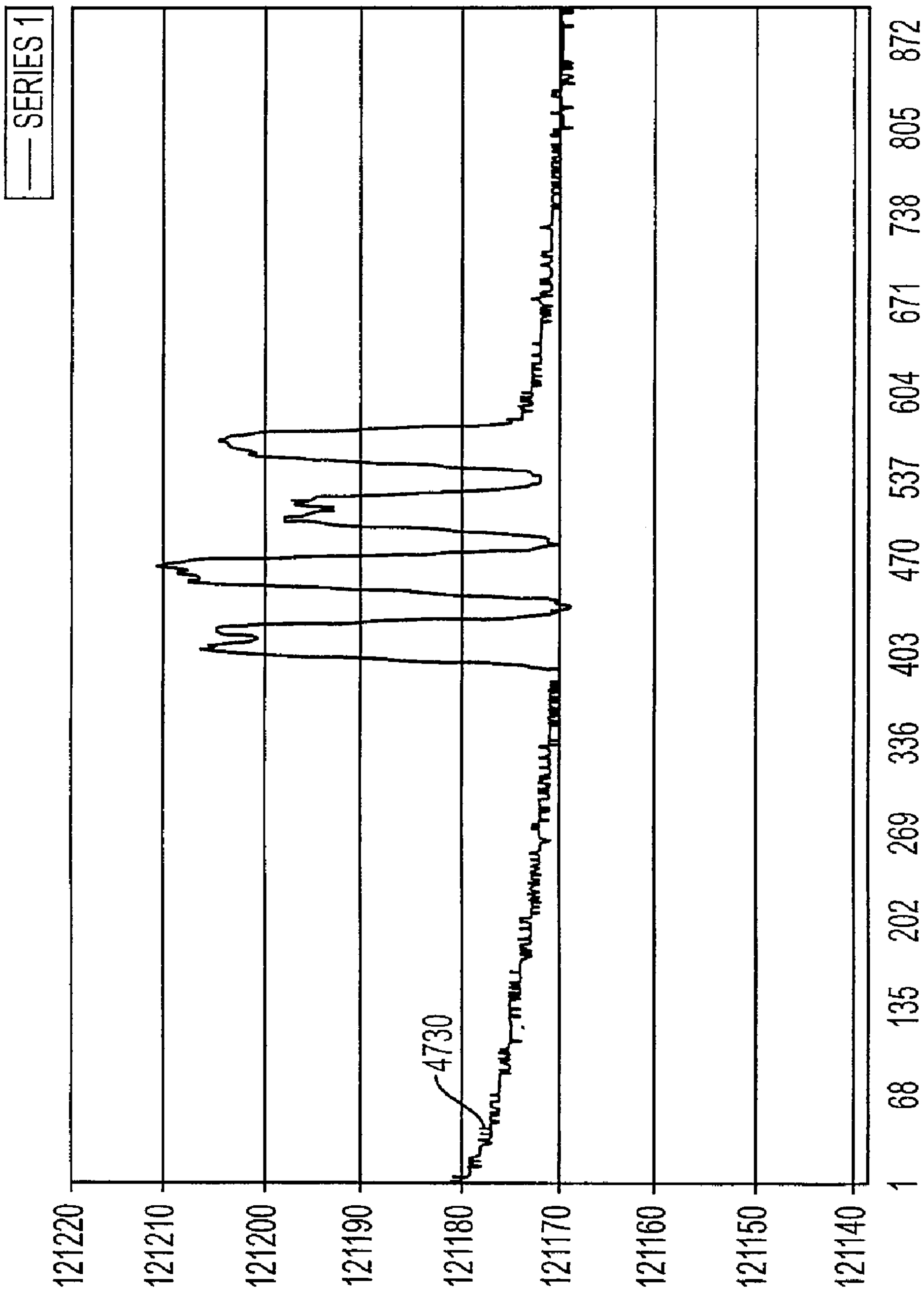

Plot 4730 shown in FIG. 47C illustrates the third detection of the car. The first left leading edge activation was at point where x1=390 and the first right leading edge activation was at point where x2=442. This represented a lapse of time of 286 milliseconds. The 286 milliseconds sample time was divided into the effective length of the loop value of 2954.55 milliseconds per one mph to provide a result of 10.33 mph for the vehicle speed. This speed factor was used with the sample time from the activation of the first left leading edge of the first axle at point where x2=442 and the activation of the left leading edge of the second axle at point where x3=540. This represented a sample length of 539 milliseconds. This resulted in an axle spacing of 8.16 feet.

Example No. 29

Figure 47D:
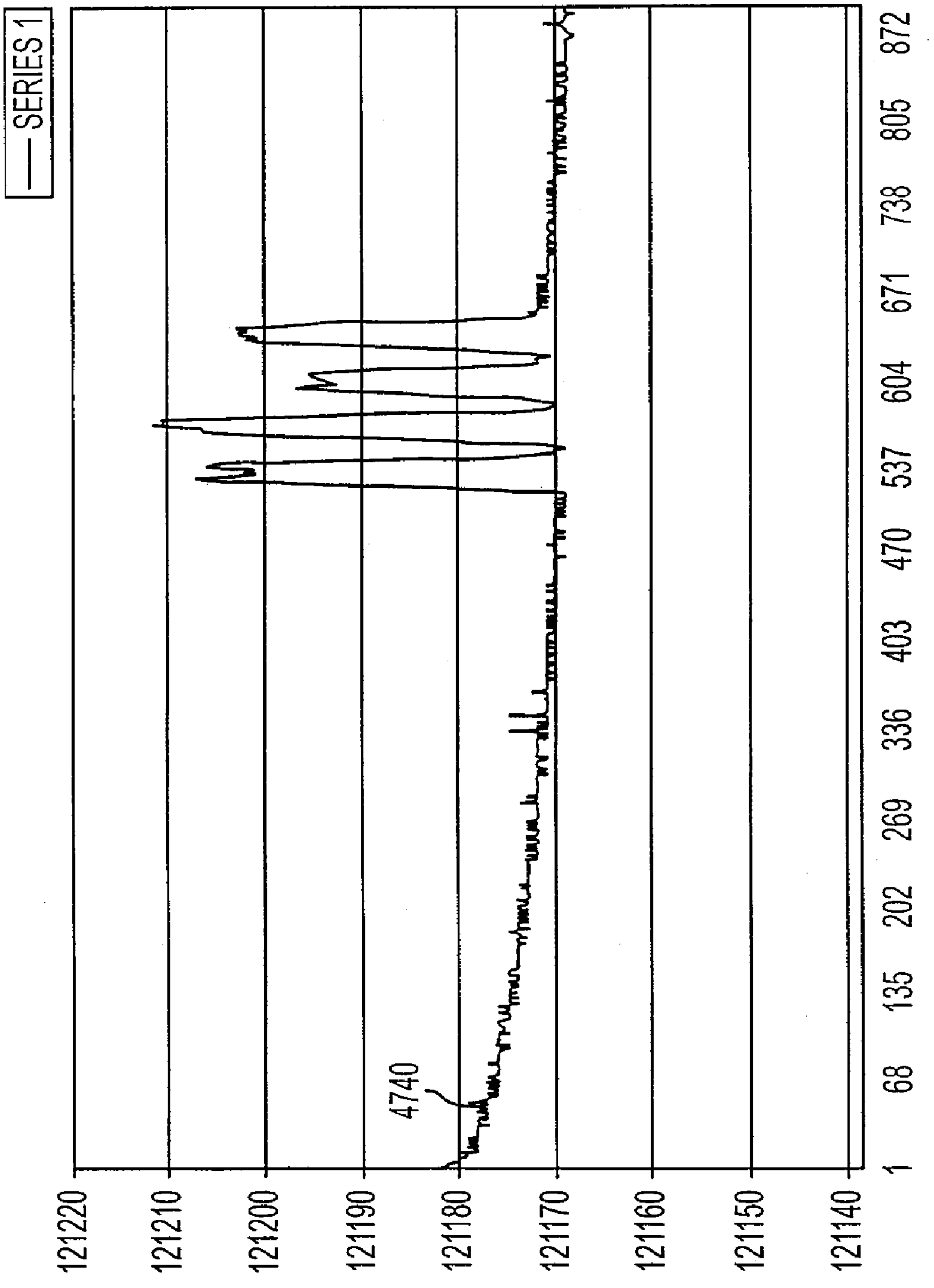

Plot 4740 shown in FIG. 47D illustrates the fourth detection of the car. The first left leading edge activation was at point where x1=518 and the first right leading edge activation was at point where x2=555. This represented a lapse of time of 203.5 milliseconds. The 203.5 milliseconds sample time was divided into the effective length of the loop value of 2954.55 milliseconds per one mph to provide a result of 14.51 mph for the vehicle speed. This speed factor was used with the sample time from the activation of the first left leading edge of the first axle at point where x1=518 and the activation of the left leading edge of the second axle at point where x3=589. This represented a sample length of 391 milliseconds. This resulted in an axle spacing of 8.31 feet.

Example No. 30

Figure 47E:
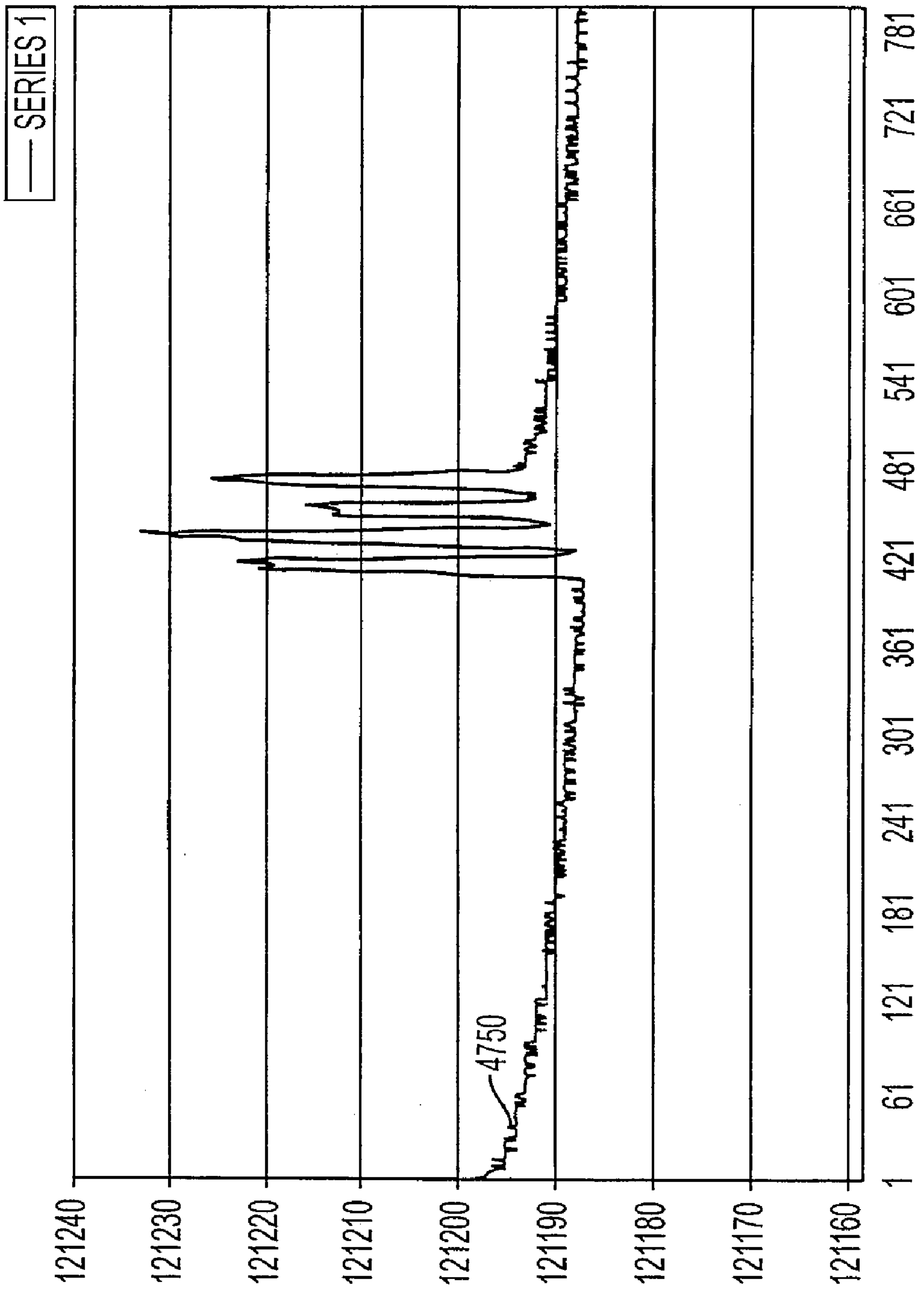

Plot 4750 shown in FIG. 47E illustrates the fifth detection of the car. The first left leading edge activation was at point where x1=409 and the first right leading edge activation was at point where x2=429. This represented a lapse of time of 110 milliseconds. The 110 milliseconds sample time was divided into the effective length of the loop value of 2954.55 milliseconds per one mph to provide a result of 26.85 mph for the vehicle speed. This speed factor was used with the sample time from the activation of the first left leading edge of the first axle at point where x1=409 and the activation of the left leading edge of the second axle at point where x3=447. This represents a sample length of 209 milliseconds. This resulted in an axle spacing of 8.23 feet.

Example No. 31

Figure 47F:
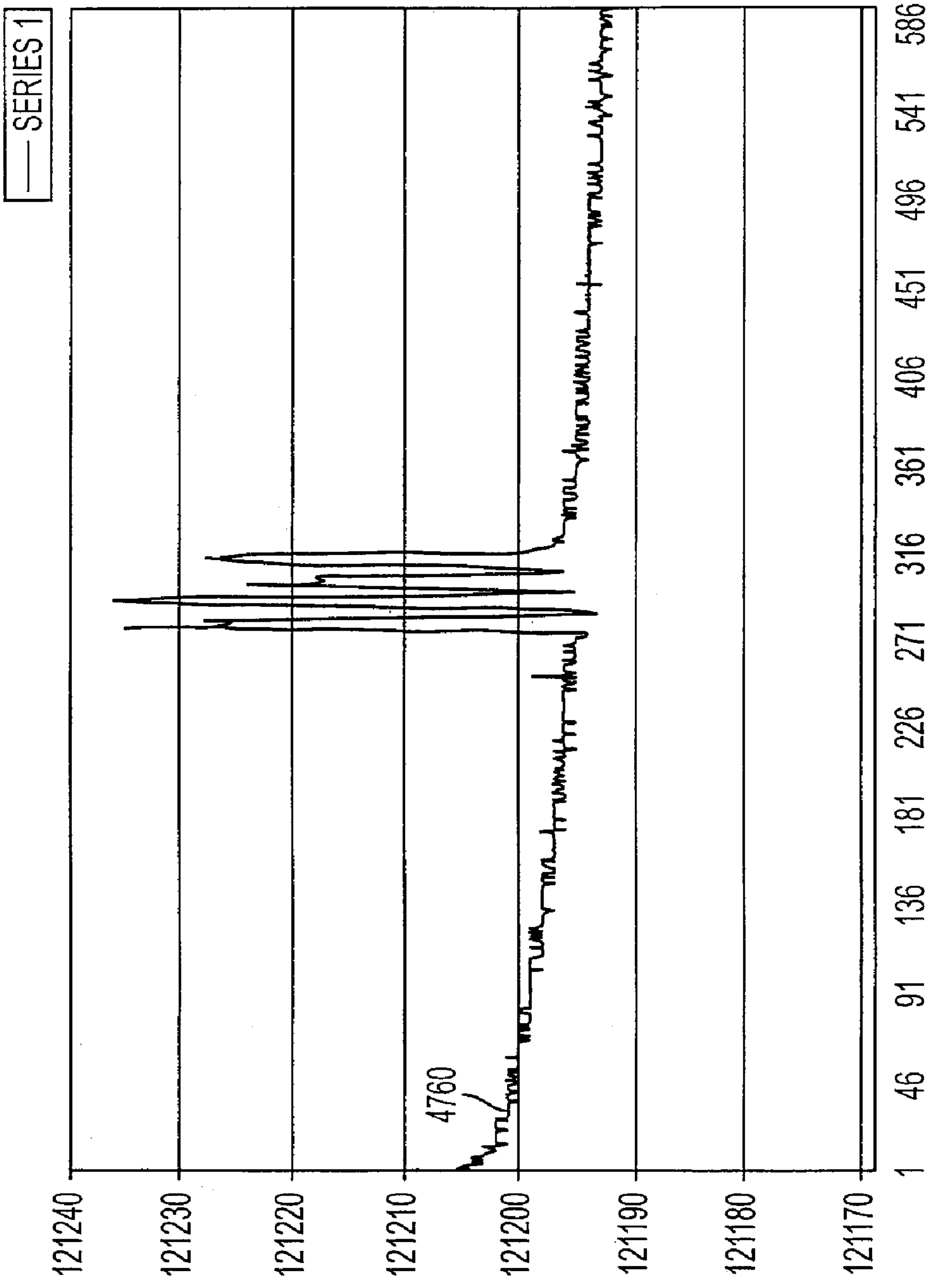

Plot 4760 shown in FIG. 47F illustrates the sixth detection of the car. The first left leading edge activation was at point where x1=275 and the first right leading edge activation was at point where x2=286. This represented a lapse of time of 60.5 milliseconds. The 60.5 milliseconds sample time was divided into the effective length of the loop value of 2954.55 milliseconds per one mph to provide a result of 48.83 mph for the vehicle speed. This speed factor was used with the sample time from the activation of the first left leading edge of the first axle at point where x1=275 and the activation of the left leading edge of the second axle at point where x3=297. This represented a sample length of 121 milliseconds. This resulted in an axle spacing of 8.66 feet.

Example No. 32

Figure 47G:
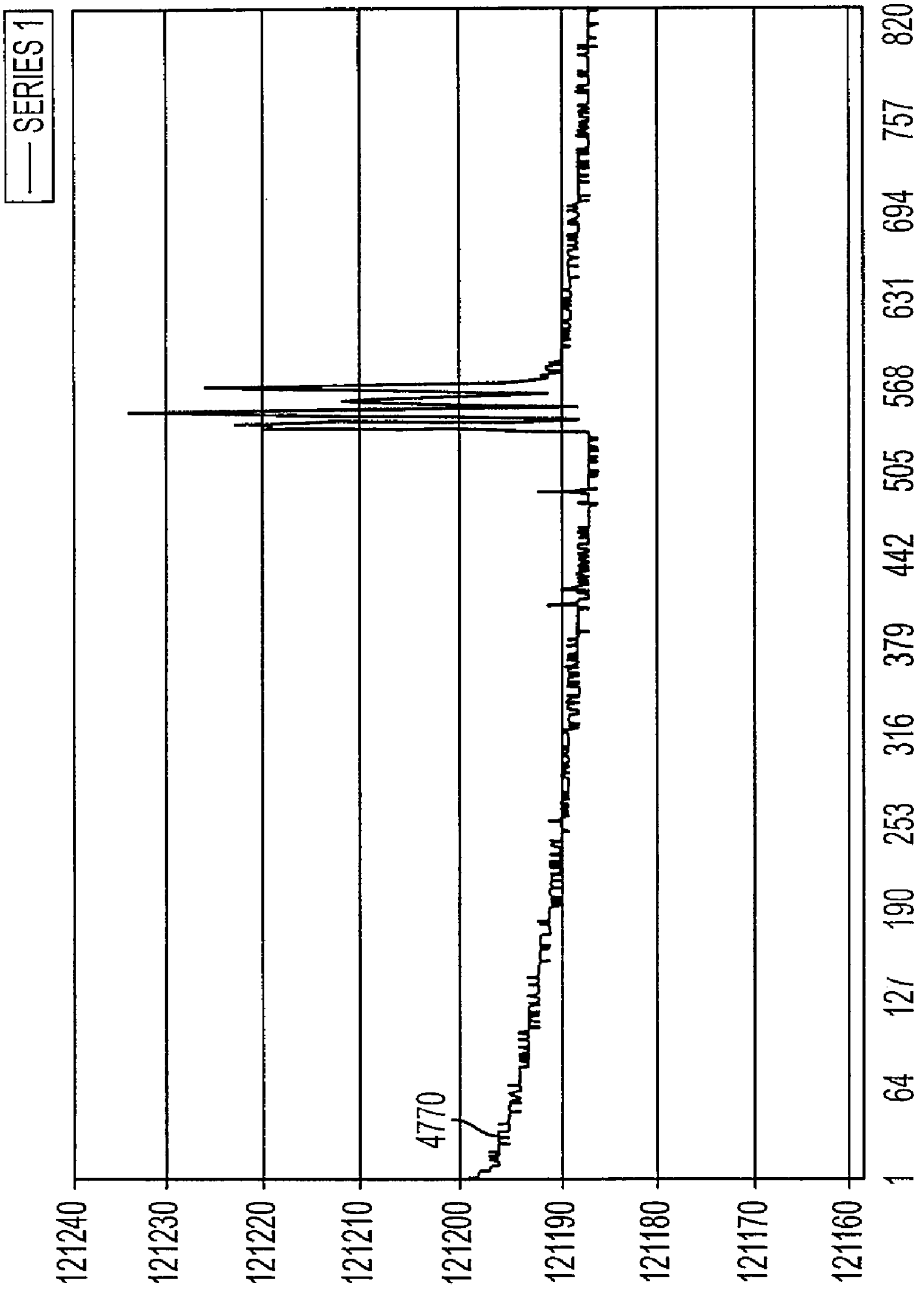

Plot 4770 shown in FIG. 47G illustrates the seventh detection of the car. The first left leading edge activation was at point where x1=536 and the first right leading edge activation was at point where x2=545. This represented a lapse of time of 49.5 milliseconds. The 49.5 milliseconds sample time was divided into the effective length of the loop value of 2954.55 milliseconds per one mph to provide a result of 59.68 mph for the vehicle speed. This speed factor was used with the sample time from the activation of the first left leading edge of the first axle at point where x1=536 and the activation of the left leading edge of the second axle at point where x3=554. This represented a sample length of 99 milliseconds. This resulted in an axle spacing of 8.66 feet.

The slope of the frequency vs. time plot can also be used to calculate the speed of the wheel in slower speed conditions. The slope of the wheel activation (rise over time) and/or wheel deactivation (fall over time) can be calculated and compared to the predetermined values of a loop calibration table or loop calibration factor. The area under the slope of the wheel activation (rise over time) and wheel deactivation (fall over time) can also be calculated and compared to the predetermined values of a loop calibration table or loop calibration factor. These three methods are not as direct as using the left wheel to right wheel saturation points or total activation time to provide calculations for the speed of the vehicle to be measured with each pair of wheels. This sensor is unique in shape and function by providing accurate measurement of vehicle speed using only a single wheel loop. This also provides the ability to supply vehicle classification on a single loop.

The information from one offset loop can be processed to provide axle counts, axle speeds, and axle spacing information. The information is obtained from a single inductive loop and a single loop detector. This loop design makes it possible to provide vehicle classification on the basis of axle detection and axle spacing using a single loop and single channel of detection in a travel lane. The following examples illustrate the vehicle speed and axle spacing being detected on a single offset wheel loop. The speed of the vehicle was calculated and the axle spacing was calculated based on the determined speed of the vehicle. This loop had a left and right segment each 28 inches long and an offset length of 24 inches. The effective length of the loop equals 2954.55 milliseconds at one mph. The speed was calculated using the activation time between the left and right wheel. The axle spacing was determined using the sample time between the activation of the first axle and the activation point of the second axle. The spacing is calculated using the vehicle speed measured on the first axle. It should be noted that the speed calculation is available for each passing pair of wheels. This speed information can also be used to determine if a vehicle is accelerating or decelerating as it travels over the loop. It is also possible to use other sample points or multiple speed points and/or use the average of multiple samples.

In the following Example Nos. 33-38, all the vehicles were accelerating as they traveled over the offset loop.

Example No. 33

Figure 48A:
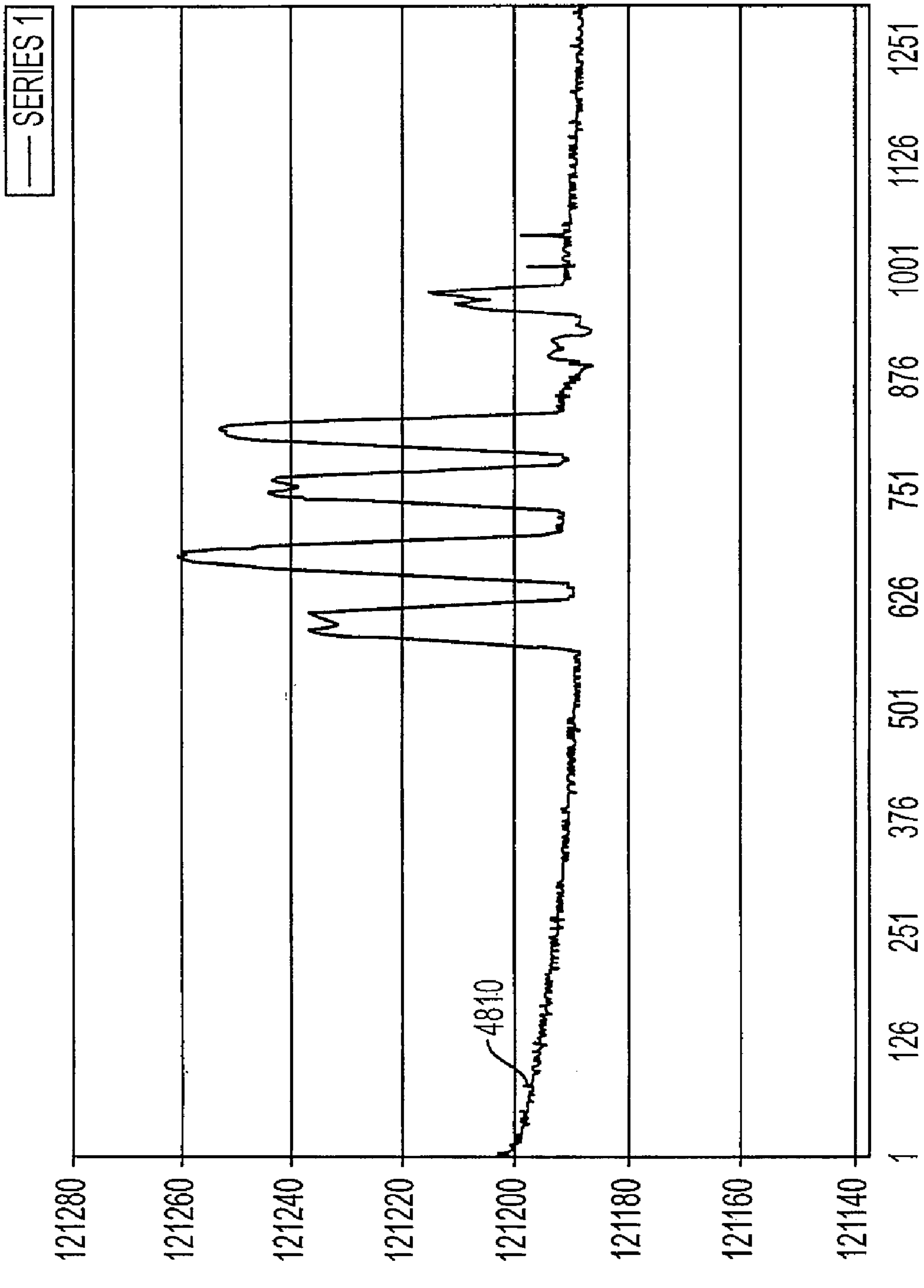

Plot 4810 shown in FIG. 48A illustrates the detection of a car towing a one-axle trailer. The first left leading edge activation was at point where x1=569 and the first right leading edge activation was at point where x2=644. This represented a lapse of time of 412.5 milliseconds. The 412.5 milliseconds sample time was divided into the effective length of the loop value of 2954.55 milliseconds per one mph to provide a result of 7.16 mph for the vehicle speed. This speed factor was used with the sample time from the activation of the first left leading edge of the first axle at point where x1=569 and the activation of the left leading edge of the second axle at point where x3=728. This represented a sample length of 874.5 milliseconds. This resulted in an axle spacing of 9.18 feet.

The sample time to the trailer was 874.5 milliseconds, which represented a spacing of 9.07 feet.

Example No. 34

Figure 48B:
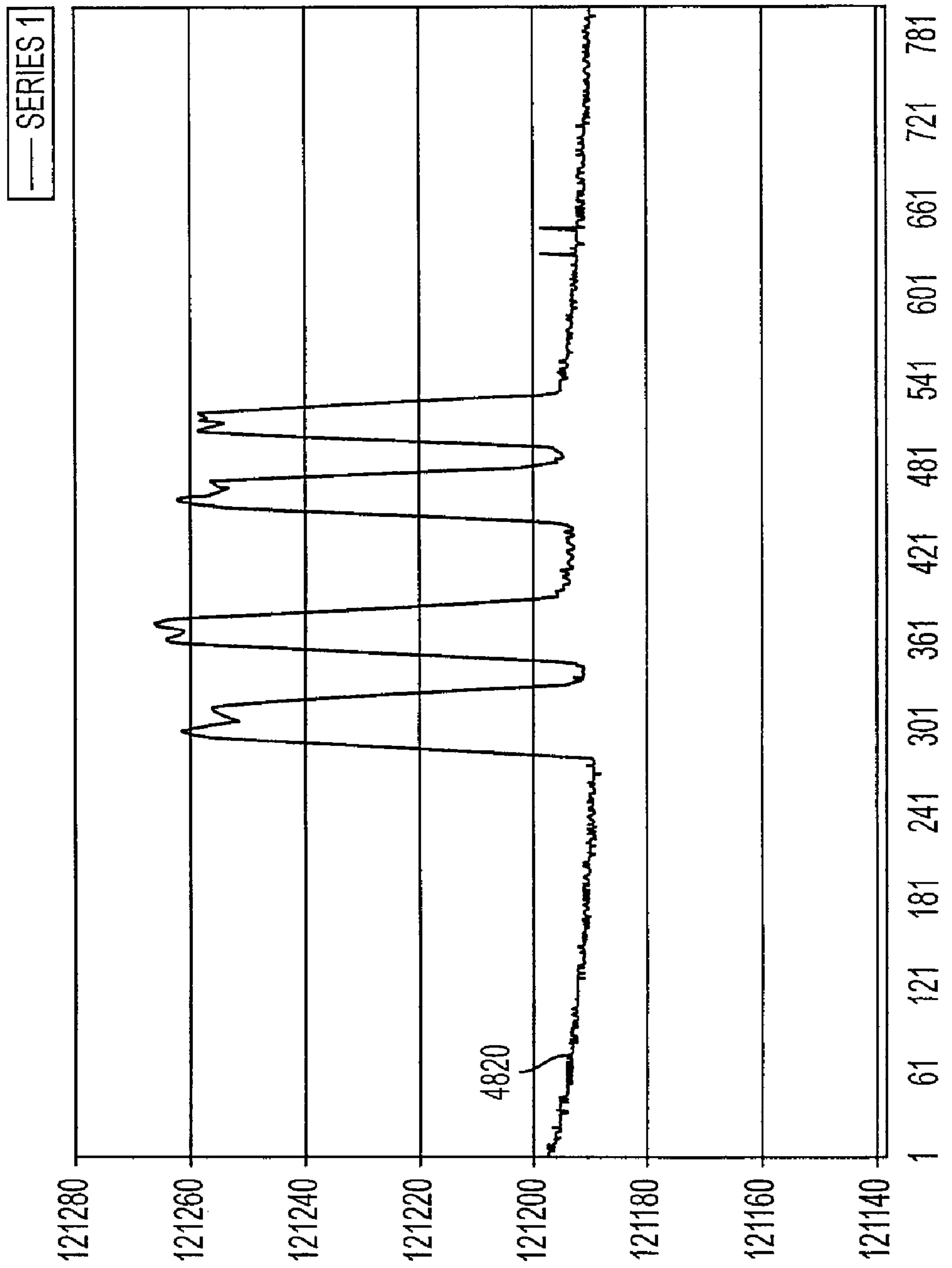

Plot 4820 shown in FIG. 48B illustrates the detection of a pickup truck. The first left leading edge activation was at point where x1=276 and the first right leading edge activation was at point where x2=340. This represented a lapse of time of 352 milliseconds. The 352 milliseconds sample time was divided into the effective length of the loop value of 2954.55 milliseconds per one mph to provide a result of 8.39 mph for the vehicle speed. This speed factor was used with the sample time from the activation of the first left leading edge of the first axle at point where x1=276 and the activation of the left leading edge of the second axle at point where x3=437. This represented a sample length of 885.5 milliseconds. This resulted in an axle spacing of 10.89 feet. The sample time for the second speed was 286 milliseconds, which represented a speed of 10.33 mph.

Example No. 35

Figure 48C:
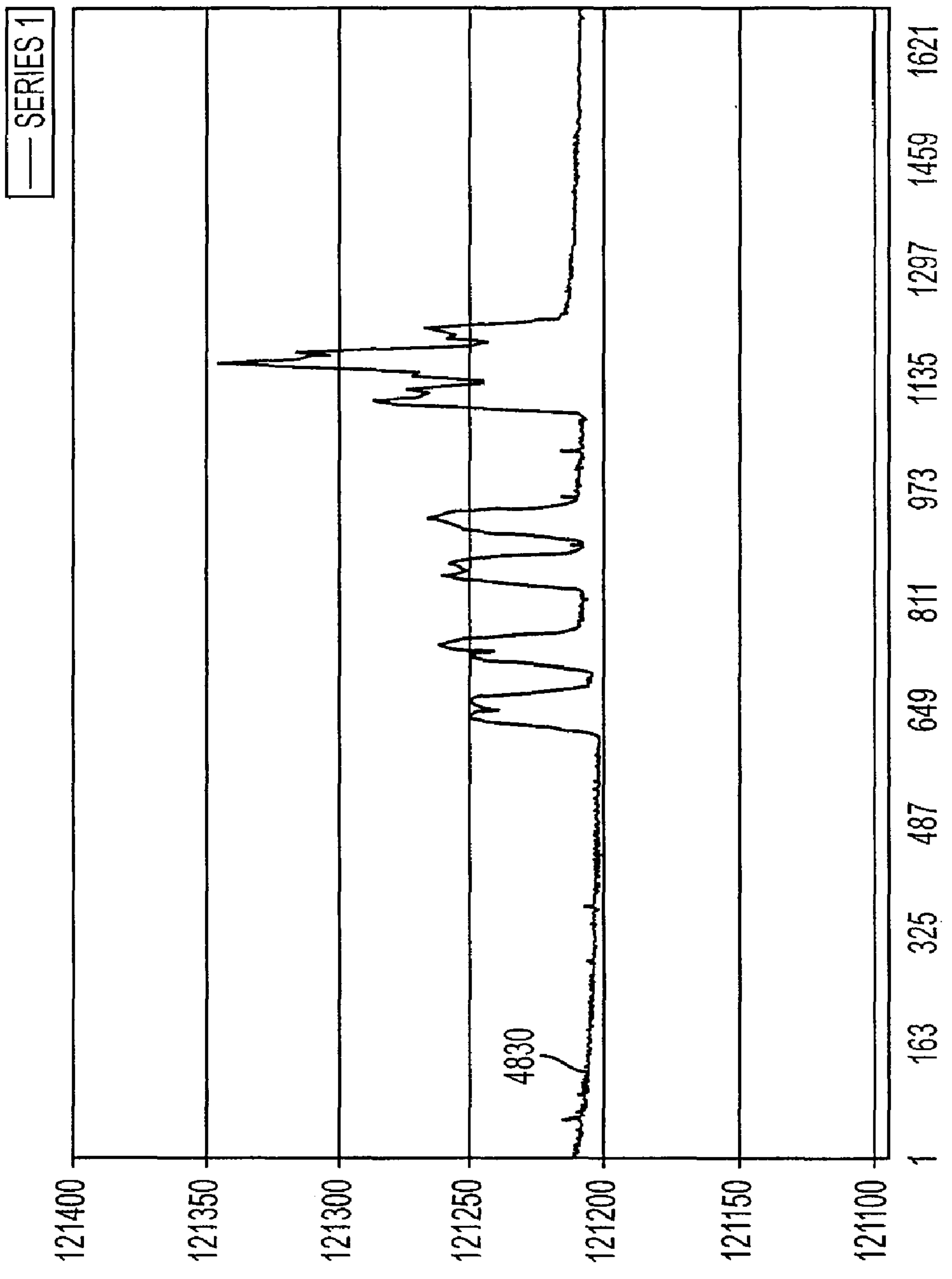
Figure 48D:
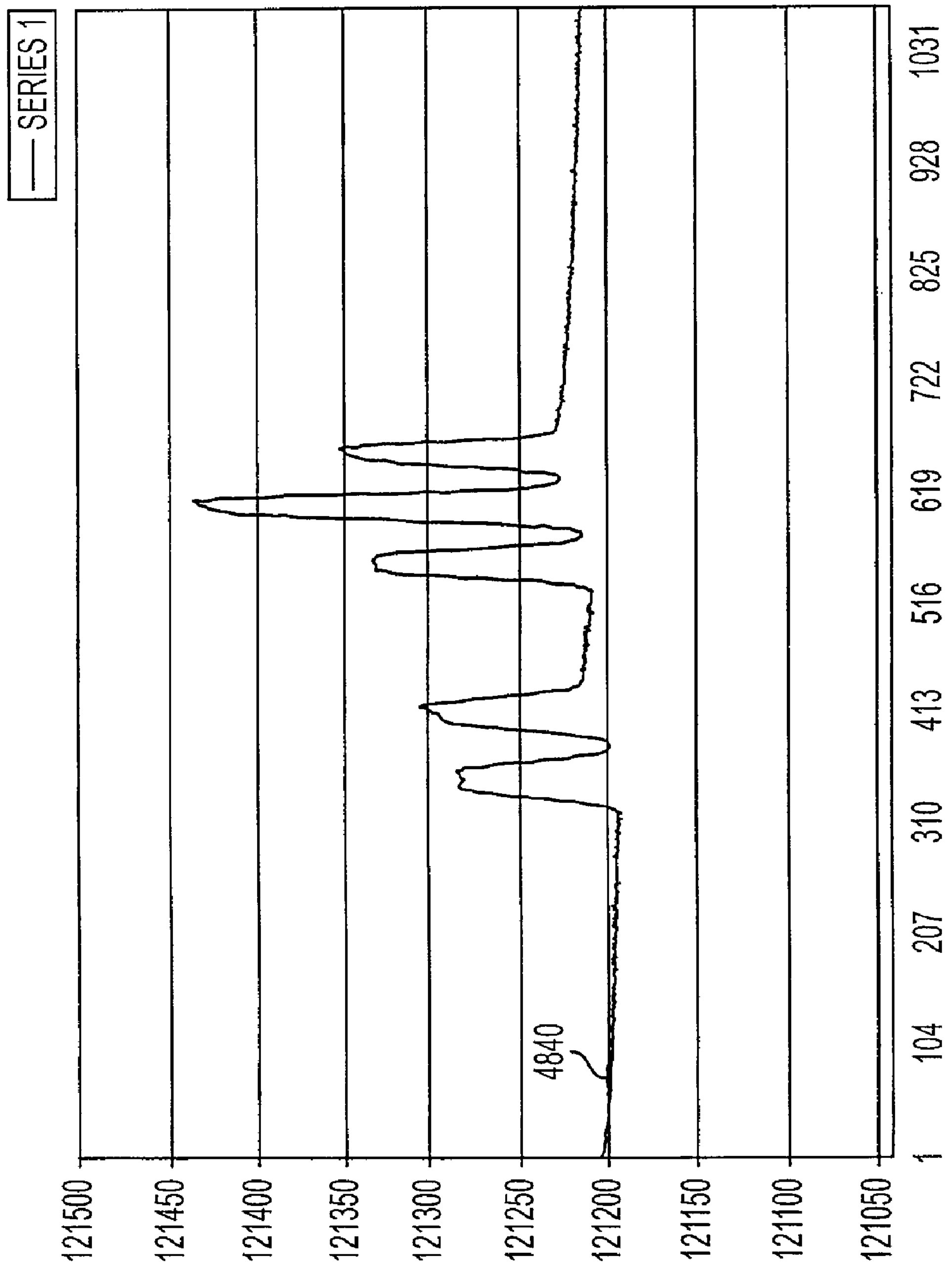

Plot 4830 shown in FIG. 48C illustrates the detection of a pickup truck towing a two-axle trailer. The axle spacing on the trailer produced an axle group pattern on plot 4830 since the axle spacing was shorter than the length of 52 inches. The first left leading edge activation was at point where x1=620 and the first right leading edge activation was at point where x2=710. This represented a lapse of time of 495 milliseconds. The 495 milliseconds sample time was divided into the effective length of the loop value of 2954 milliseconds per one mph to provide a result of 5.96 mph for the vehicle speed. This speed factor was used with the sample time from the activation of the first left leading edge of the first axle at point where x1=620 and the activation of the left leading edge of the second axle at point where x3=827. This represented a sample length of 1138.5 milliseconds. This resulted in an axle spacing of 9.95 feet. The sample time for the second axle speed was 402 milliseconds, which represented a speed of 7.34 mph. The sample time to the first trailer axle was 1419 milliseconds, which represented a spacing of 15.29 feet. The sample time to the second trailer axle is 319 milliseconds, which represented a spacing of 3.43 feet.

Example No. 36

Plot 4840 shown in FIG. 48C illustrates the detection of a truck with 3 axles. The axle spacing between the second and third axle produced an axle group pattern on plot 4840 since the axle spacing was shorter than 52 inches. The first left leading edge activation was at point where x1=326 and the first right leading edge activation was at point where x2=388. This represented a lapse of time of 341 milliseconds. The 341 milliseconds sample time was divided into the effective length of the loop value of 2954.55 milliseconds per one mph to provide a result of 8.66 mph for the vehicle speed. This speed factor was used with the sample time from the activation of the first left leading edge of the first axle at point where x1=326 and the activation of the left leading edge of the second axle at point where x3=530. This represented a sample length of 1122 milliseconds. This resulted in an axle spacing of 14.25 feet. The sample time for the second axle speed was 286 milliseconds, which represented a speed of 10.33 mph. The sample time to the third axle was 275 milliseconds, which represented a spacing of 4.16 feet.

Example No. 37

Figure 48E:
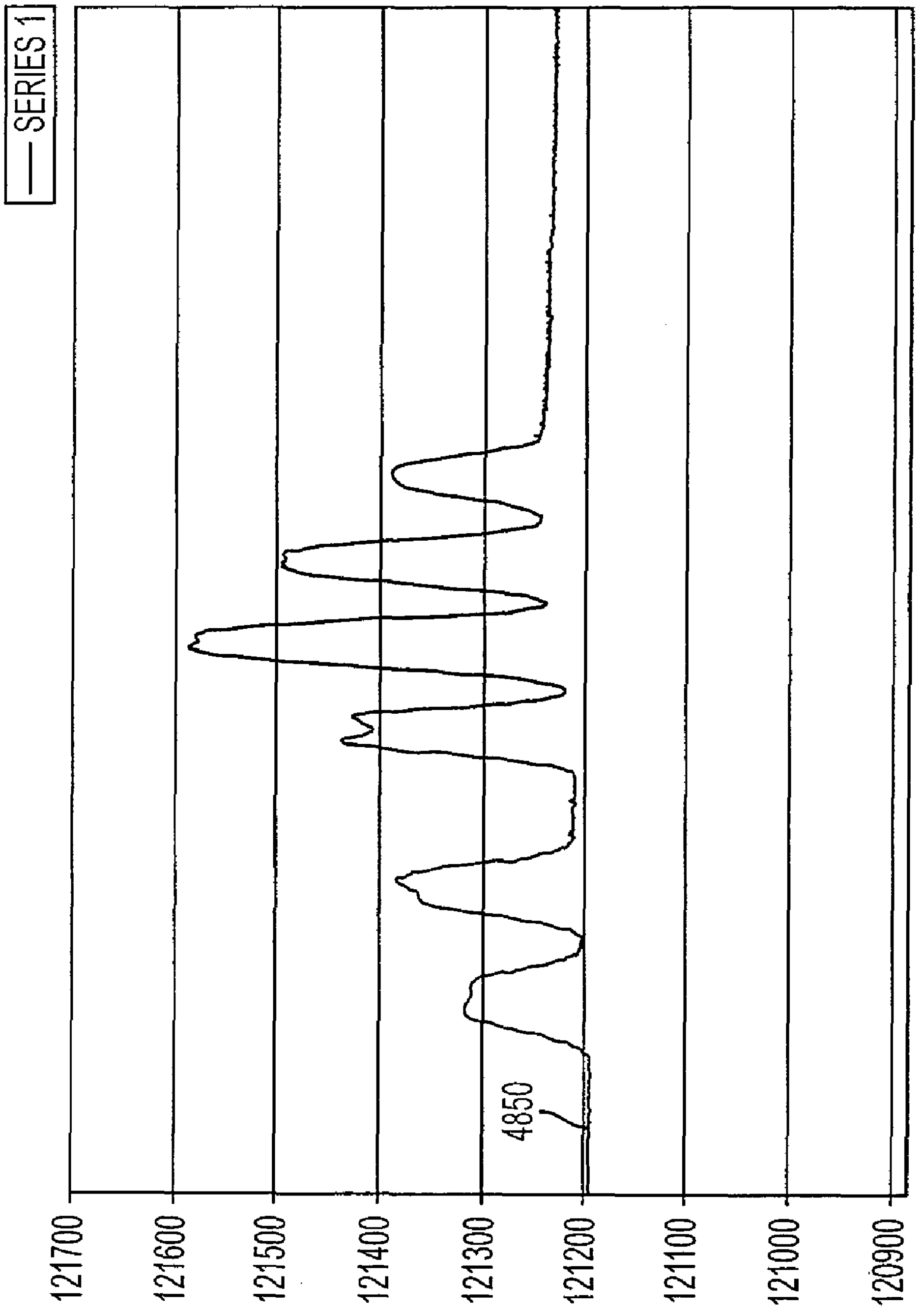

Plot 4850 shown in FIG. 48E illustrates the detection of a truck with 4 axles. The axle spacing between the second, third, and fourth axle produced an axle group pattern since each axle spacing was shorter than 52 inches. The left leading edge activation of the first axle wheel was at point where x1=107 and the right leading edge activation of the first axle wheel was at point where x2=190. This represented a lapse of time of 457 milliseconds. The 457 milliseconds sample time was divided into the effective length of the loop value of 2954.55 milliseconds per one mph to provide a result of 6.46 mph for the vehicle speed. This speed factor was used with the sample time from the activation of the left leading edge of the first axle at point where x1=107 and the activation of the left leading edge of the second axle at point where x3=303. This represented a sample length of 1078 milliseconds. This resulted in an axle spacing of 10.22 feet. The left leading edge activation point of the second axle was at point where x3=303 and the first right leading edge activation of the second axle wheel was at point where x4=364. This represented a sample length of 335.5 milliseconds. This represented a speed of 8.08 mph. The saturation point of the left second axle wheel was at point where x5=321. The saturation point of the left third axle wheel was at x6=389. This represented a sample length of 374 milliseconds and a spacing of 4.83 feet for the third axle. The saturation point of the left third axle wheel was at point where x6=389. The saturation point of the left fourth axle wheel is at point where x7=448. This represented a sample length of 325 milliseconds and a spacing of 3.85 feet for the fourth axle.

Example No. 38

Figure 48F:
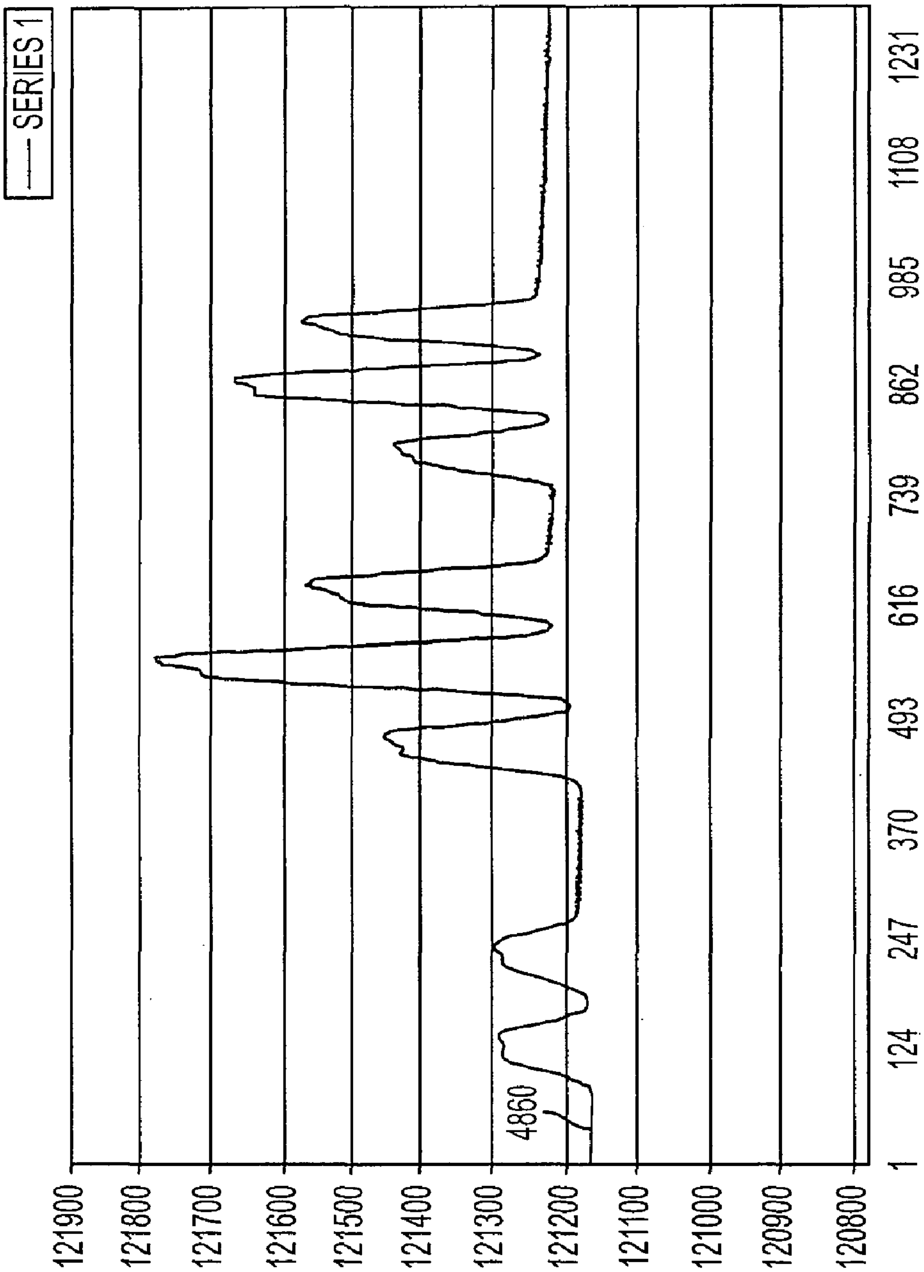

Plot 4860 shown in FIG. 48F illustrates the detection of a truck with 5 axles. The axle spacing on this vehicle produced two axle group patterns between the second and third axles, and between the fourth and fifth axle since each of these axle spacing was less than 52 inches. The left leading edge activation of the first wheel was at point where x1=101 and the first right leading edge activation of the first axle wheel was at point where x2=200. This represented a lapse of time of 545 milliseconds. The 545 milliseconds sample time was divided into the effective length of the loop value of 2954.55 milliseconds per one mph to provide a result of 5.42 mph for the vehicle speed. This speed factor was used with the sample time from the activation of the left leading edge of the first axle at point where x1=101 and the activation of the left leading edge of the second axle at point where x3=428. This represented a sample milliseconds length of 1799 milliseconds. This resulted in an axle spacing of 14.30 feet. The left leading edge activation was at point of the second axle was at point where x3=428 and the first right leading edge activation of the second axle wheel was at point where x4=516. This represented a sample length of 484 milliseconds. This represented a speed of 6.10 mph. The saturation point of the left second axle wheel was at point where x5=476. The saturation point of the left third axle wheel is at point where x6=560. This represented a sample length of 462 milliseconds and a spacing of 4.13 feet for the third axle. The saturation point of the left third axle wheel was point where x6=560. The saturation point of the left fourth axle wheel was at point where x7=643. This represented a sample length of 457 milliseconds and a speed of 6.46 mph. The left leading edge activation was at point of the third axle was point where x8=516 and the first left leading edge activation of the fourth axle wheel was at point where x9=757. This represented a sample length of 1326 milliseconds. This represented an axle spacing of 12.56 feet. The left leading edge activation was at point of the fourth axle was at point where x9=757 and the first right leading edge activation of the fourth axle wheel was at point where x10=833. This represented a sample length of 418 milliseconds. This represented a speed of 7.06 mph. The saturation of the fourth left axle wheel was at point where x11=798, and the saturation of the left axle wheel on the fifth axle was at point where x12=872. This represented a sample length of 407 milliseconds and a spacing of 4.21 feet for the fifth axle.

With respect to the wire spacing and the orientation of the wire for the ferromagnetic loop, a number of factors should be considered. For example, the orientation of the wire turnings with respect to the path on which the wheel travels through the field affects the loop frequency change. When the wire wrappings are parallel to the direction of traffic, the field detects not only the wheels but also the chassis of the vehicles. Using larger spacing in wire turnings that are parallel to the direction of travel affect the loop's ability so that it detects wheels exclusively. However, when the large spacing is used, the chassis of smaller vehicles such as motorcycles and cars with low ground clearance can create eddy currents, which cause the frequency of the loop circuit to lower and thereby reduces detection of wheels. Accordingly, it is desirable to design the spacing of the loop based on anticipated vehicles wheels to be detected. One novel arrangement of the wire spacing is to route the wire at a 30 to 60 degrees angle to the direction of travel. This arrangement reduces the eddy currents from the chassis. As a result, the arrangement provides improved wheel detection and wheel speed information.

Figure 49:
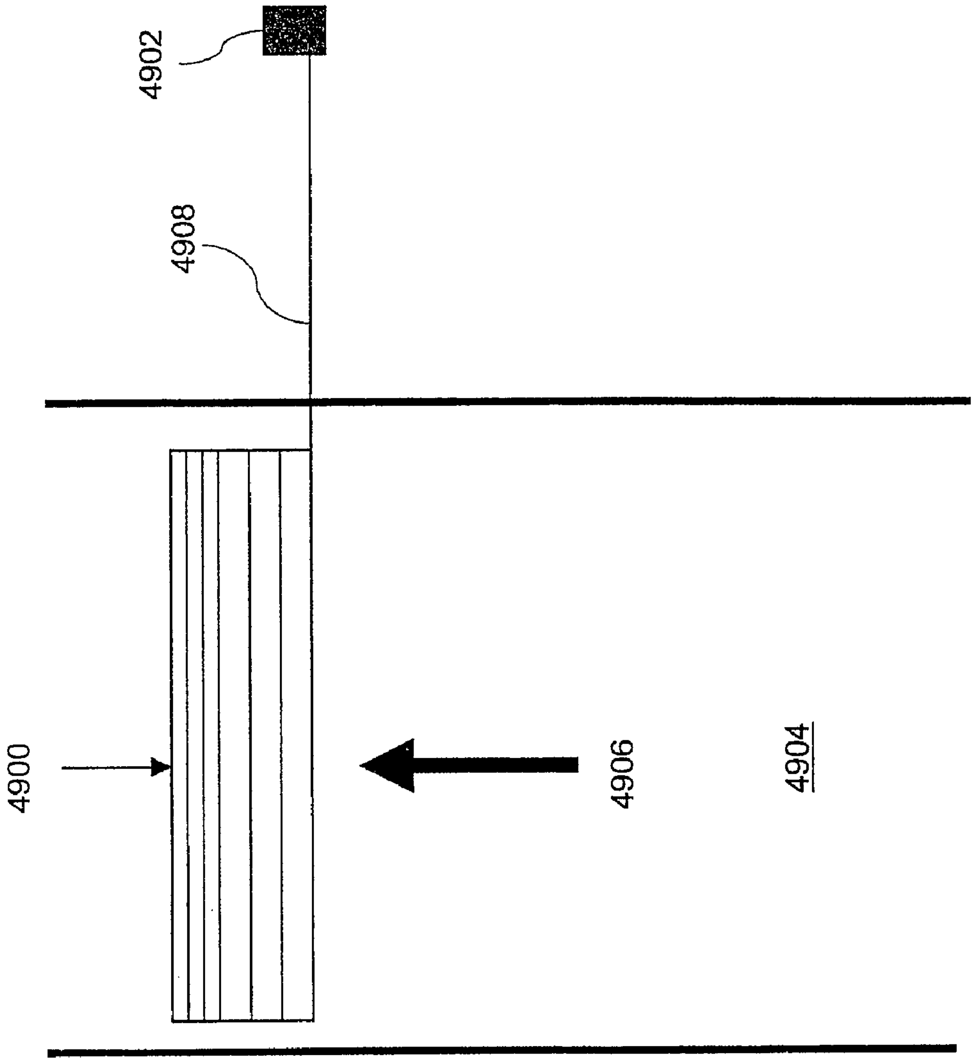
FIGS. 49, 49A, 49B, and 49C are schematic diagrams showing additional embodiments of the present invention.

As discussed above, a ferromagnetic loop of the invention can be used to determine, among other things, the presence, speed, and number of axles of a vehicle. This can be accomplished as shown in FIG. 49. Gradient loop 4900 is installed on path 4904. Gradient loop 4900 is in communication with device 4902 via lead-in 4908. Device 4902 can be a loop detector, a traffic counter, or a traffic classifier. A vehicle (not shown) traveling on path 4904 in direction 4906 is detected by loop 4900 when the vehicle moves over loop 4900.

Figure 49A:
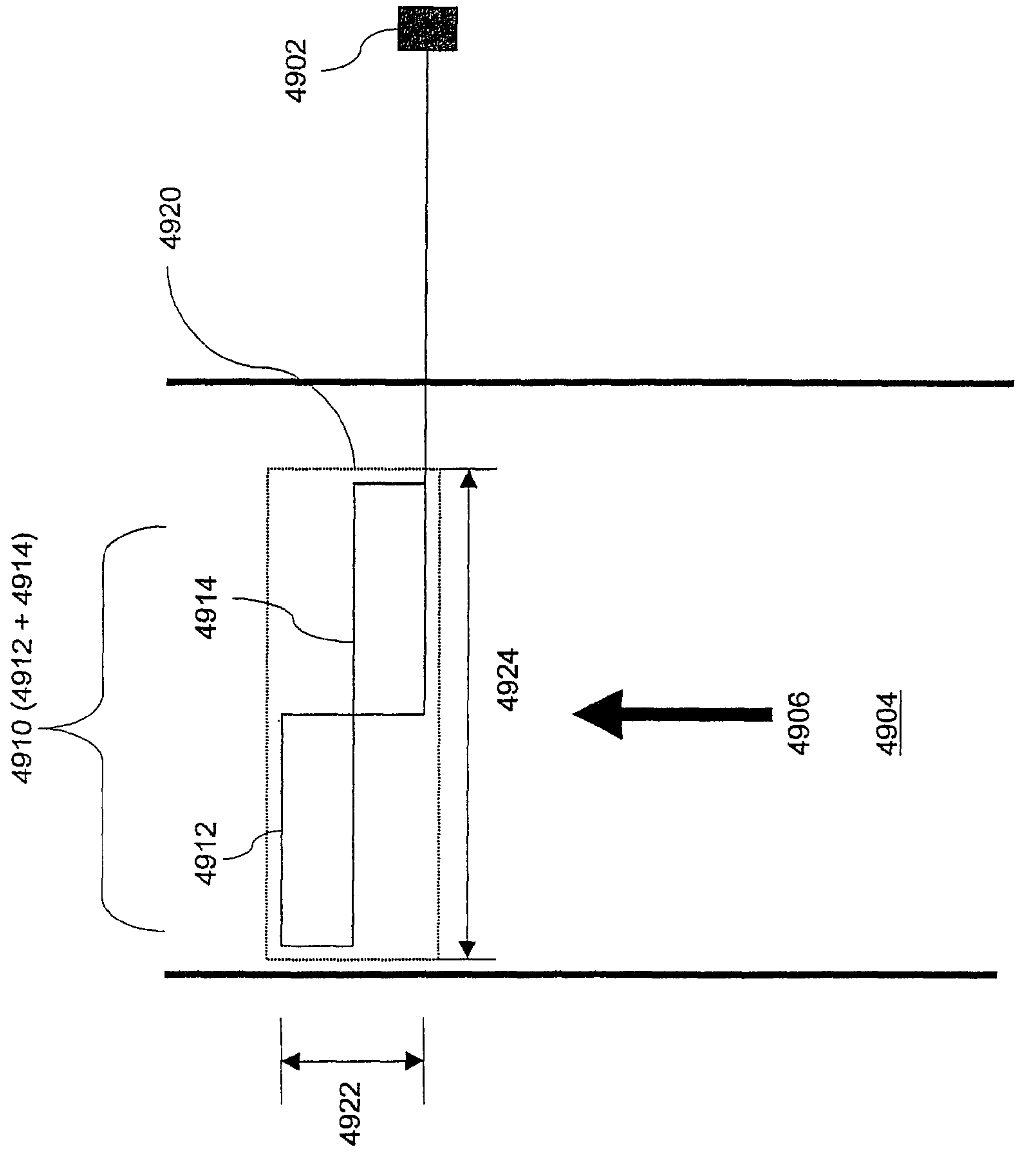

FIG. 49A shows that a ferromagnetic loop can be configured in an offset orientation. For example, loop 4910 may be configured so that it has a left segment 4912 and a right segment 4914.

Figure 49B:
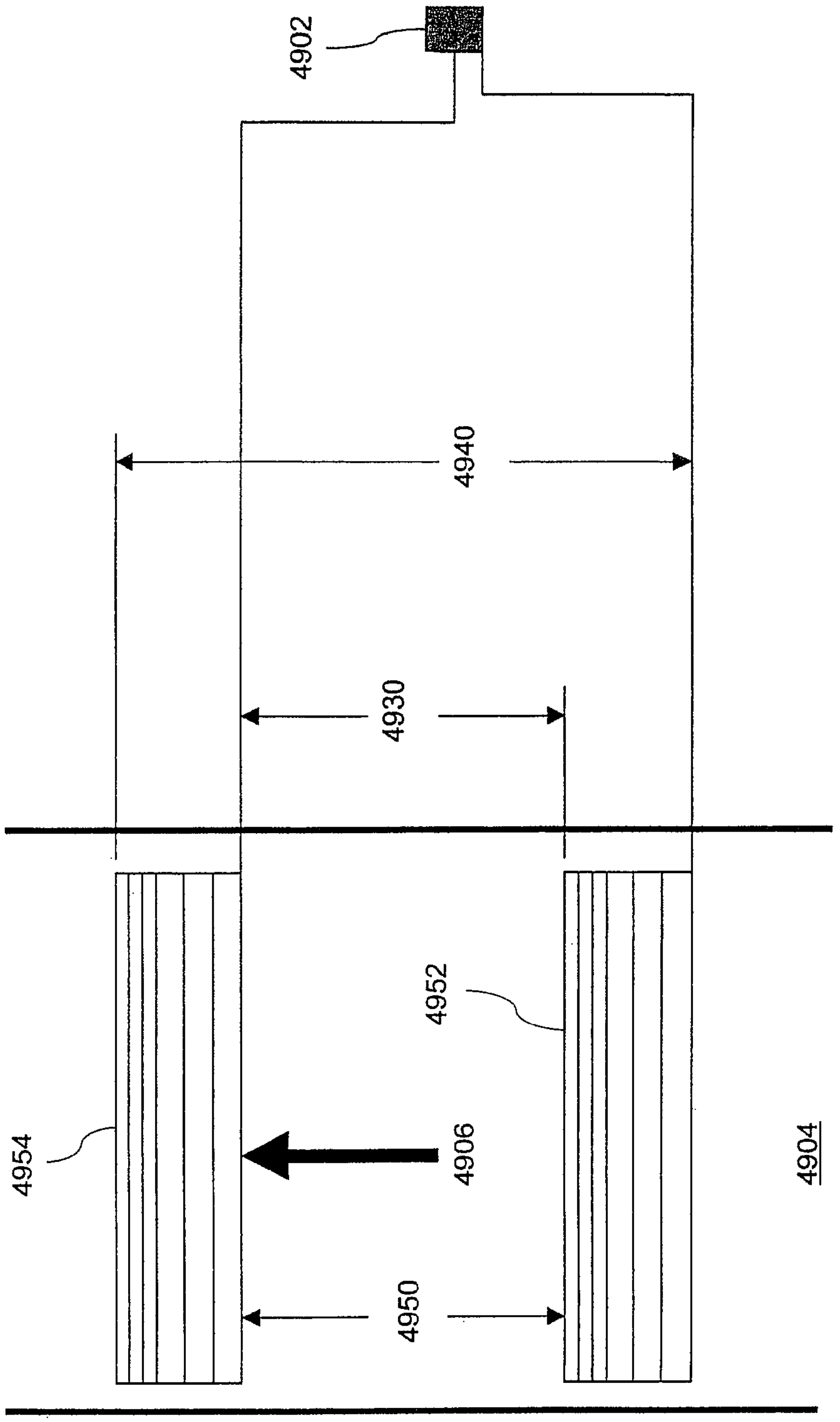
Figure 49C:
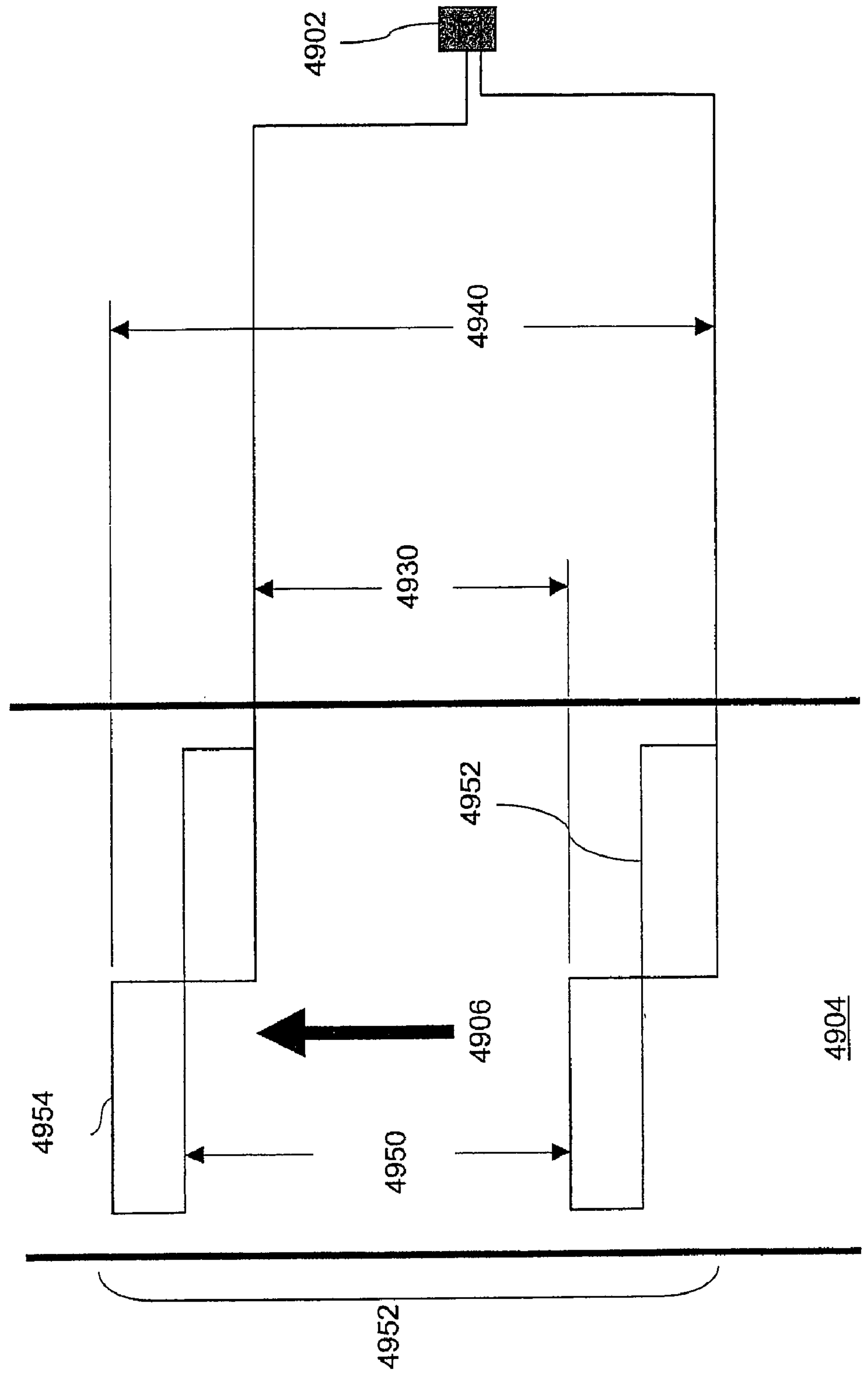

The use of more than one ferromagnetic loop in a roadway can be used to provide vehicle classification. FIGS. 49B and 49C illustrate the use of two wheel loops 4952 and 4954 in loop array 4950 for vehicle classification. Inner spacing 4930 is preferably from about five feet to about eight feet long and outer spacing 4940 should be from about nine feet to about 15 feet. Both loops 4952 and 4954 are in communication with device 4902.

The use of spacings 4930 and 4940 provides sensor activation or deactivation on both wheel loops from the wheels located on the same two-axle vehicle. The wheel detections on the two wheel loops occur at the same time or within a few milliseconds. This provides wheel, wheel assembly, speed, and axle spacing information from the same vehicle during the wheel detection. This wheel information provides critical vehicle information about the vehicle speed and axle spacing that pairs the vehicle axles and greatly simplifies the vehicle classification process by providing matches for the for vehicle classification. The sensor arrangement provides the linking or pairing of front and rear wheels of a vehicle for about 80 to 85% of the vehicles in random traffic. This percentage of vehicles represent the axle spacing for cars, sport utility vehicles, vans, and pickup trucks that have axle spacing that is between the inner and outer spacing of the two wheel loops.

Figure 50:
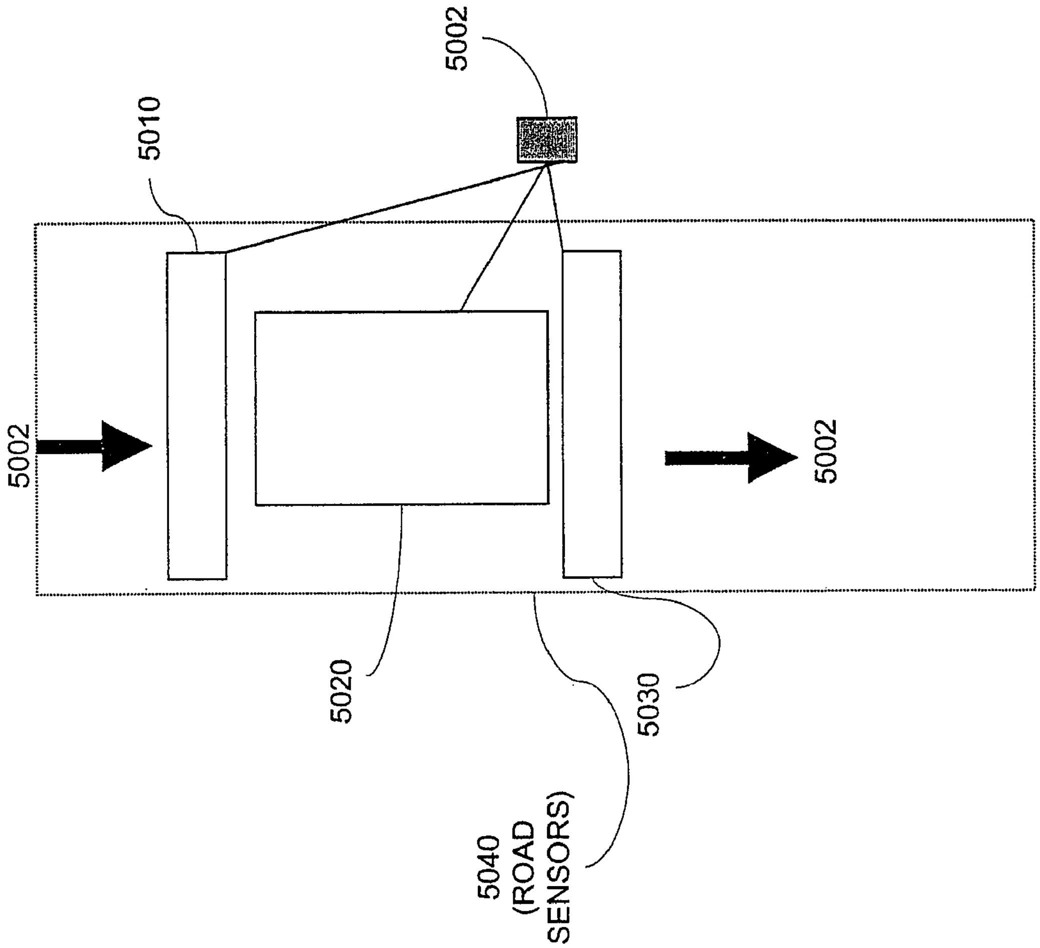
FIGS. 50 and 51 are schematic diagrams showing additional embodiments of the present invention involving loop arrays.

FIG. 50 illustrates the arrangement of a loop array having multiple wheel loops 5010, 5020, and 5030 that have different lengths. This unique sensor arrangement can provide individual wheel information with additional axle group information on a longer loop and individual wheel information on a shorter wheel loop. For example, by combining a wheel loop 56 inches long and a gradient wheel loop 31.5 inches long, the 56-inch loop would provide single axle and axle group information. The second wheel loop would provide axle information. This combination of different sensor lengths would increase the amount of vehicle information about the vehicle. This could have an inner spacing of 84 inches and an outer spacing of 321.5 inches. This wheel information provides critical vehicle information about the vehicle speed, axle spacing, and axle groups. Again, the spacing of these two wheel sensors provides pairs of sensor activations occurring at the same time or within a few milliseconds of each other. This arrangement greatly simplifies the vehicle classification process by providing matches of the vehicle axles and axle groups for the vehicle classification. This sensor arrangement provides linking for about 85 to 90% of the vehicles in random traffic.

Figure 51:
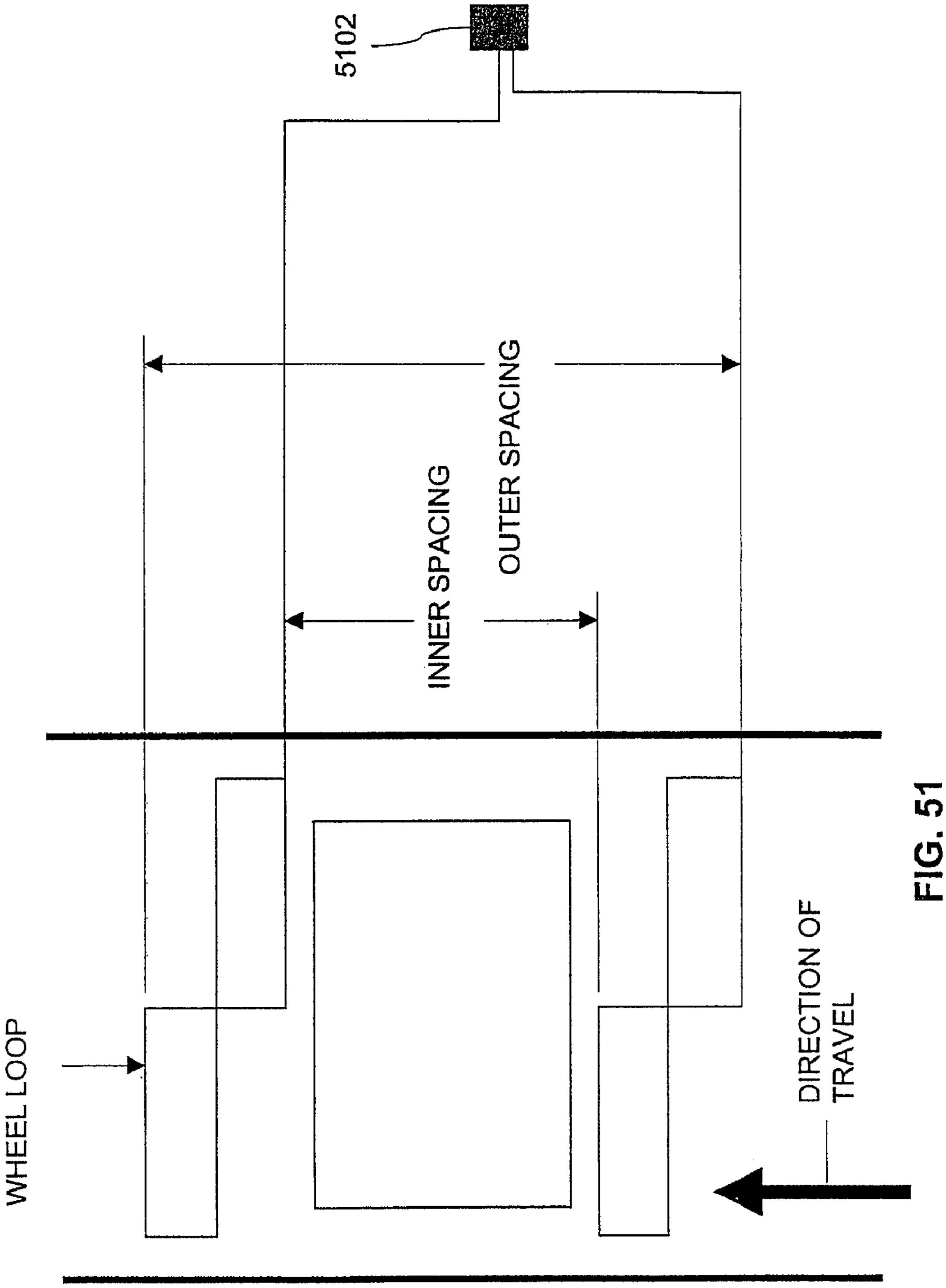

The addition of single rectangular or dipole loop located between the two wheel loops could be used in heavy congested traffic conditions to supply additional vehicle processing information. The rectangular or dipole loop would provide additional vehicle presents detection for axle spacing that are greater than 19 feet long. FIG. 51 illustrates one embodiment of this sensor arrangement that provides additional vehicle processing information.

Installation

The ferromagnetic loops and its various configurations, variations, arrangements, and arrays of loops of the present invention can be installed as a surface mount loop for temporary installation. In addition, the loops can be installed for permanent applications using a pavement saw, drill, wire, and loop sealant.

Installation Procedure for a Ferromagnetic Loop

The loop can be installed on a pavement as follows. The pavement is marked using paint to outline the locations or a web of grooves to be cut using a pavement saw. A slot is made by the saw that is between about 0.75 inches wide by about 1.5 inch deep. The loop is formed using a single conductor of preferably stranded wire AWG number 14 with high density polyethylene insulation with a jacket diameter of 130 to 140 mils. However, single or stranded conductor wire gauge of 12, 14, 16, or 18 could be used for this installation. It is recommended that the loop coils of wire are kept parallel to the roadway surface (i.e., the coils of wire are laid side-by-side). The wire is installed in the cut slot (see, e.g., FIGS. 41, 43, and 44). The wire and slot is then filled with a bonding agent. The bonding agent can be, for example, a loop sealant. The lead-in wire is twisted continuously from the loop to the signal processor.

Molded Ferromagnetic Loop and Installation Procedure

Figure 53:
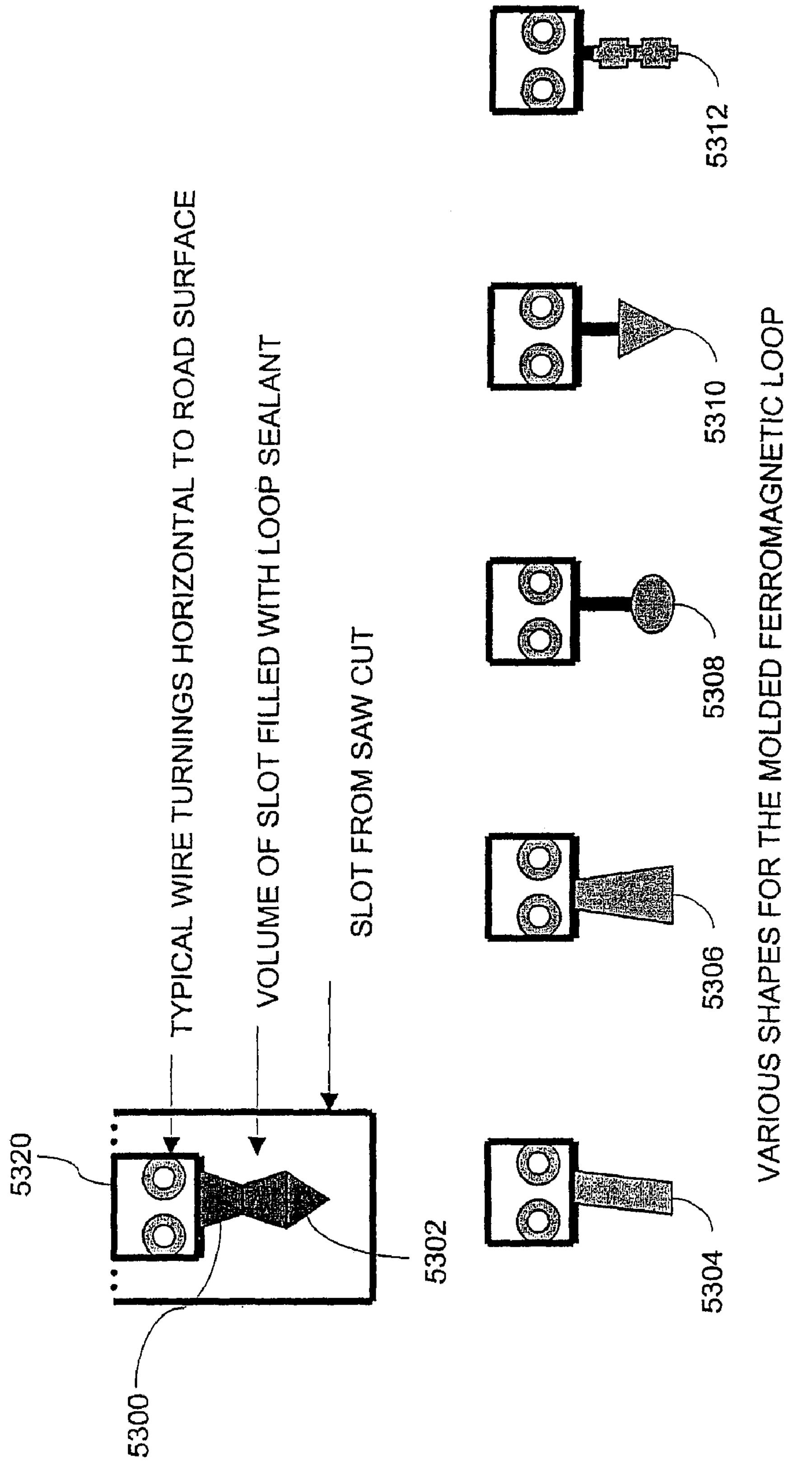
FIG. 53 is a schematic diagram showing alternative anchors of the present invention.

The unique design of the ferromagnetic loop can be made in a molded loop in the same variety of geometric shapes, sizes, and coil spacing as those formed using a pavement saw and wire method. Molded loop 5300 shown in FIG. 53 has a unique shape 5302 that provides a positive anchoring of the loop in the pavement. FIG. 53 illustrates several examples of the anchors 5304, 5306, 5308, 5310, and 5312 that can be incorporated in the molded ferromagnetic loop. Loop 5300 is secured by at least one fastener 5320 to maintain the multiple contiguous polygons of loop 5300. The advantages for using the molded loop included:

easy control of the loop depth during installation;

consistent wire turnings in the coils; and reduction of the loop installation time.

Figure 52:
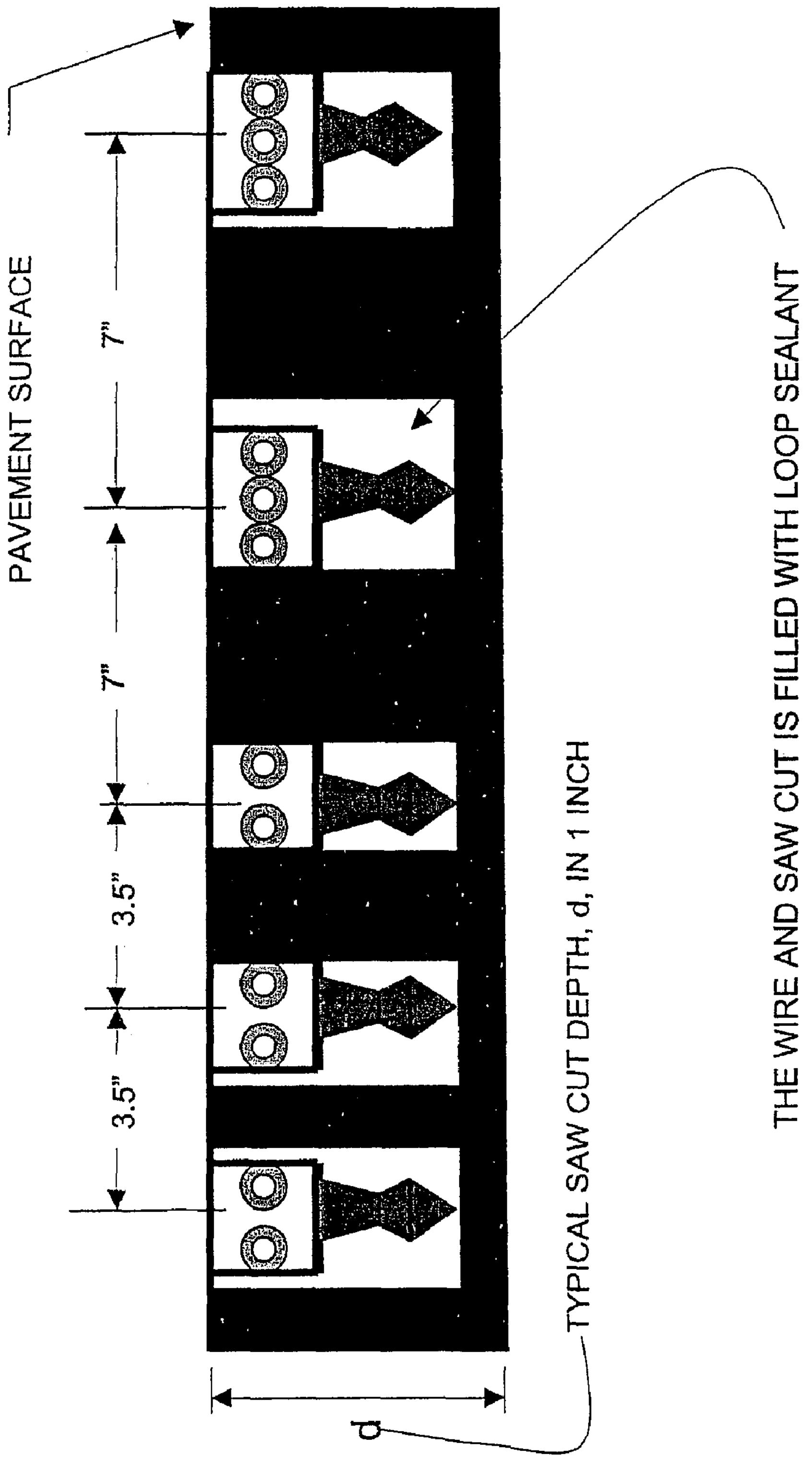
FIG. 52 is a schematic diagram showing a cross-sectional view of an anchor or a locking mechanism of the present invention.

The loop can be installed using a molded loop that can be placed in a saw cut or a web of grooves created within a pavement. For example, an outline of the loop is painted or marked on the pavement. A pavement saw is used to cut slots about 0.75 inches wide by about 1.5 inches deep. The molded loop is then placed in the slots and a loop sealant or another bonding agent is used to secure the molded loop in the saw cut. FIGS. 52 and 53 illustrate various cross sectional views of the molded loop. An alternative method involves the step of filling the web of grooves with the loop sealant before placing the molded loop in the saw cut. The molded loop is pressed down until the top of the loop is even with the road surface. The molded loop has a twisted lead-in cable continuously from the loop to the signal processor. The advantages of using the molded loop is the wire turnings are horizontal and parallel with the road surface. The depth of the loop installation is easy to control by installing the top of the molded loop flush to the surface of the road.

Installing Temporary Ferromagnetic Loop

Figure 54:
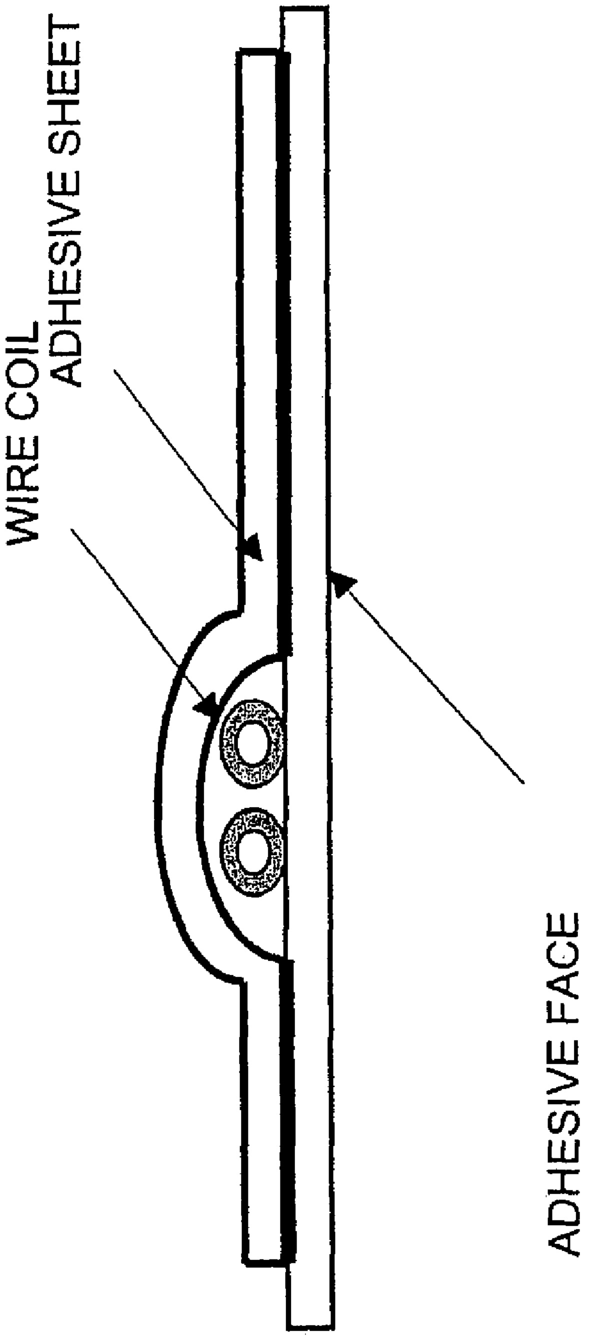
FIG. 54 is a schematic diagram showing a cross-sectional view of a ferromagnetic loop of the present invention.

Temporary loops can be made using a combination of wire and seal tape having a woven Polypropylene mesh. The adhesive of the road tape holds the loop in place in the road way. FIG. 54 illustrates a cross section of the construction of a temporary wheel loop.

Figure 55:
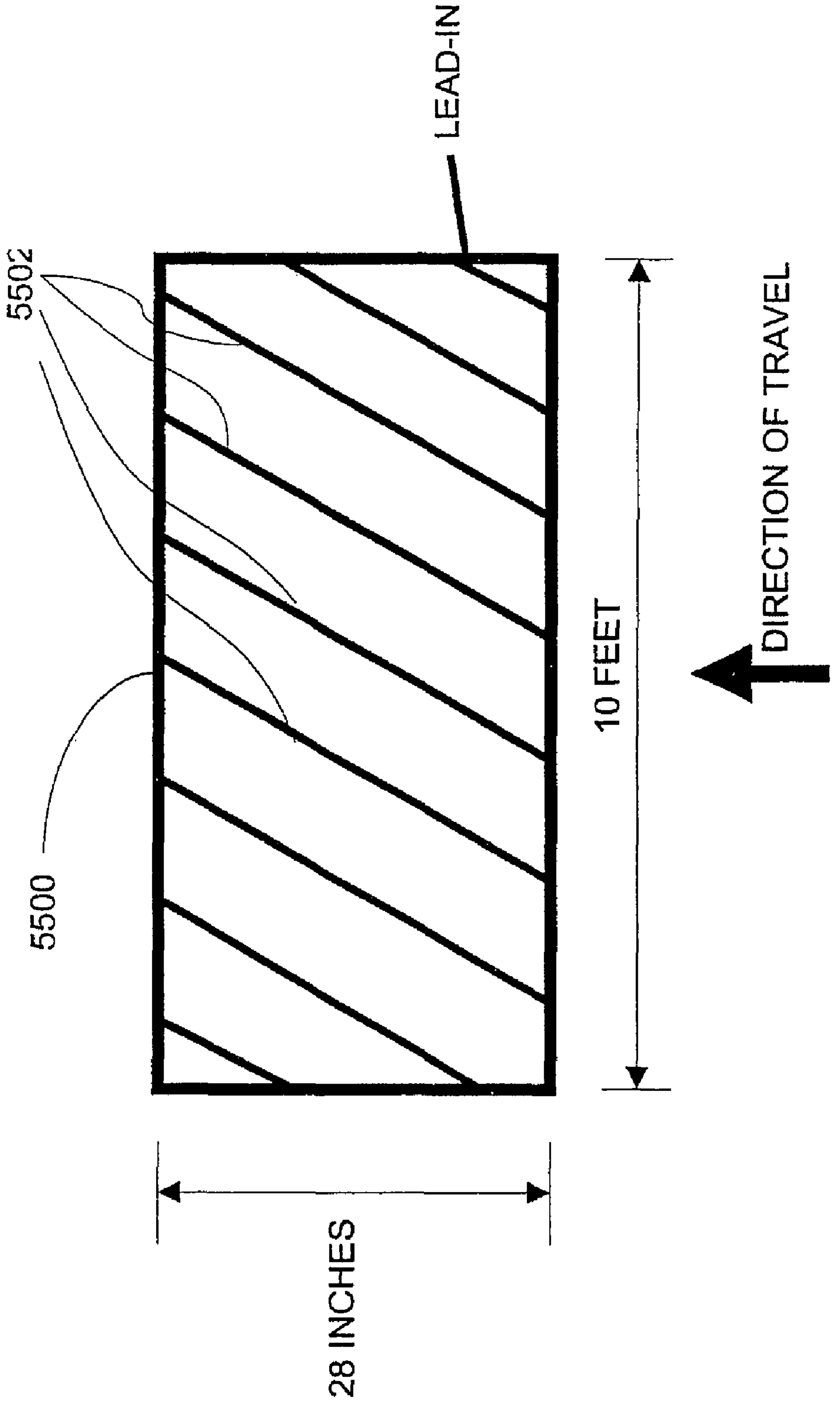
FIG. 55 is a schematic diagram showing a preferred embodiment of the present invention.

FIG. 55 illustrates temporary loop 5500 that is 10 feet wide by 28 inches long having diagonal coils 5502.

Example No. 39

Figure 55A:
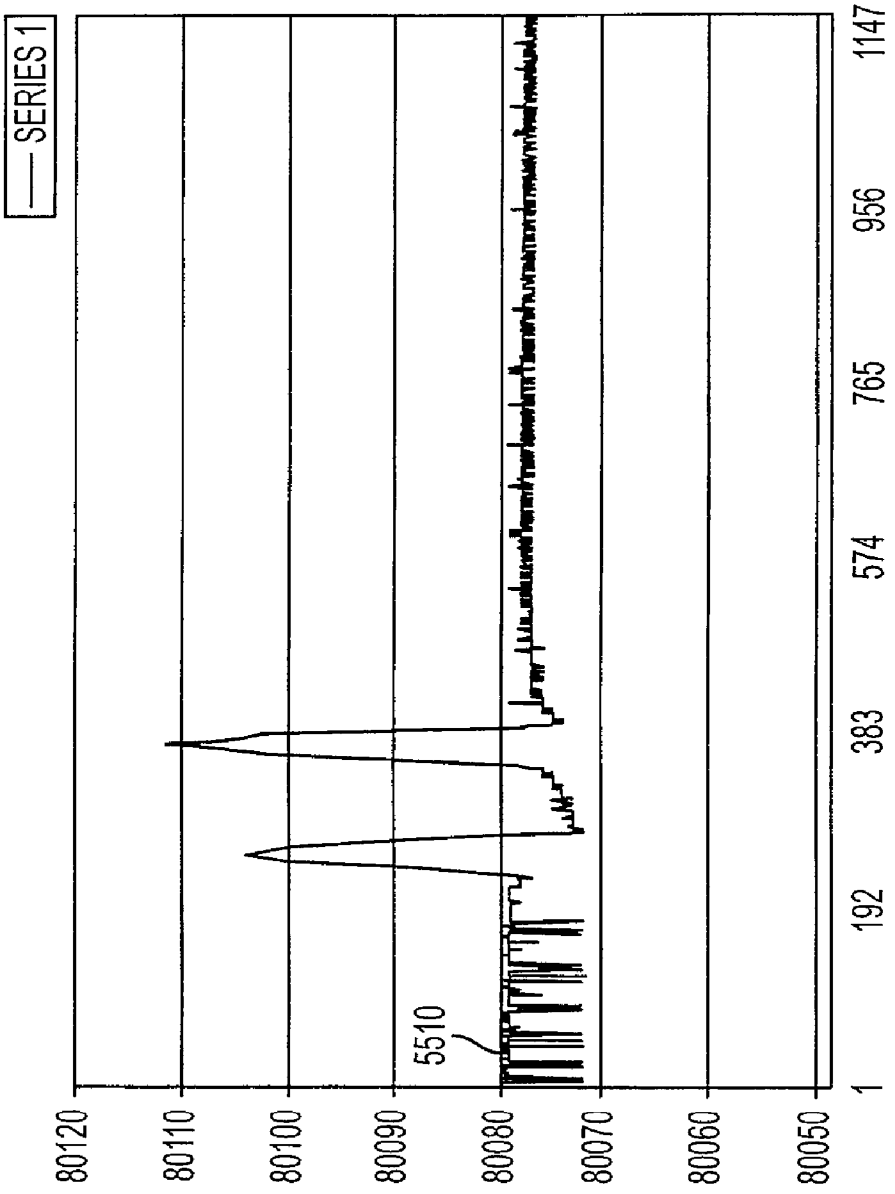
FIGS. 55A, 55B, and 55C are frequency vs. time plots produced using a ferromagnetic loop of the present invention.

Plot 5510 shown in FIG. 55A illustrates the detection a vehicle using loop 5500. The front wheels activation was between points where x1=231 and x2=272. The rear set of wheels activation was between points where x3=348 and x4=390.

Example No. 40

Figure 55B:
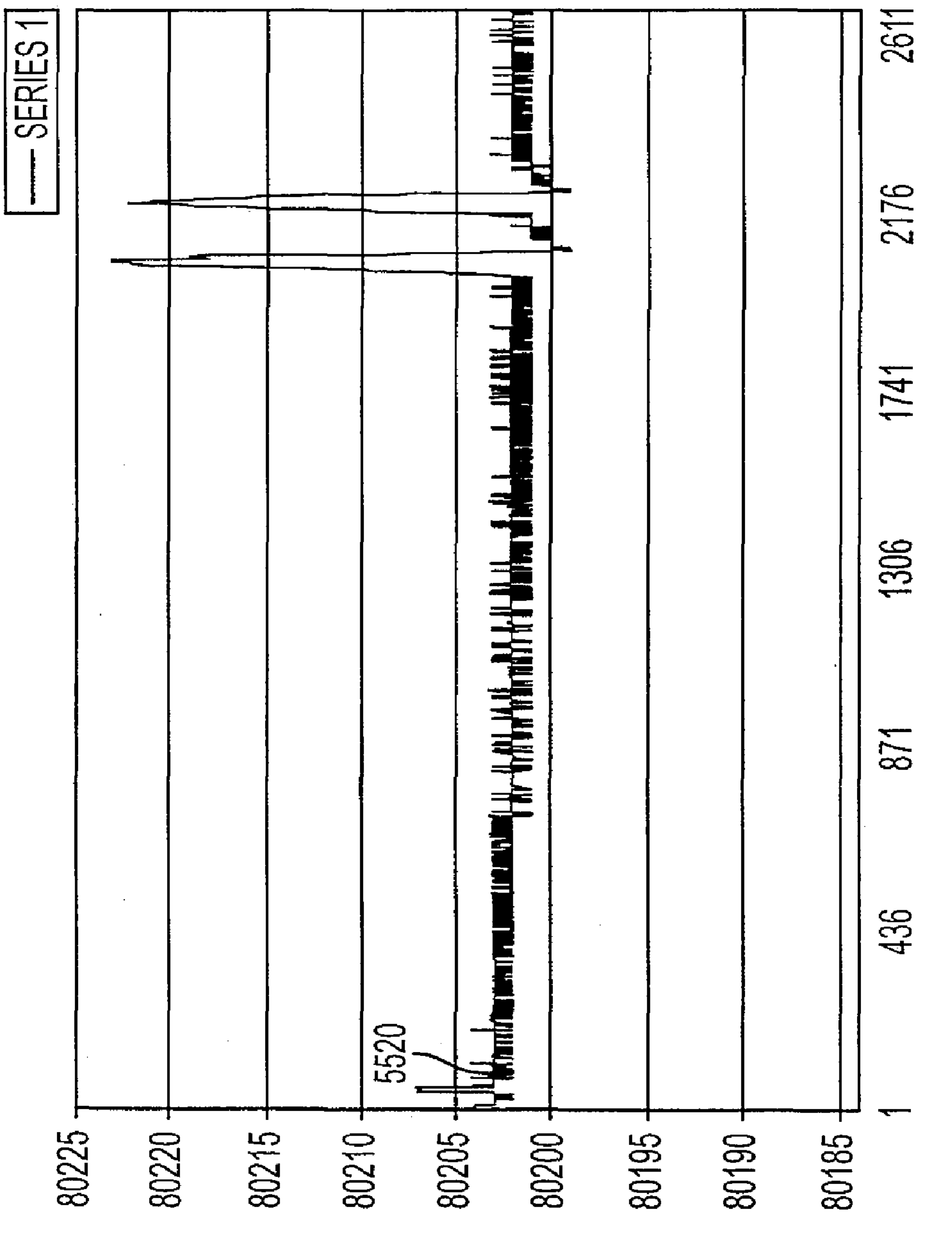

Plot 5520 shown in FIG. 55B illustrates the detection of a pickup truck as it moves above temporary loop 5500. The front wheels activation was between points where x1=2022 and x2=2074. The rear set of wheels activation was between points where x3=2167 and x4=2217.

Example No. 41

Figure 55C:
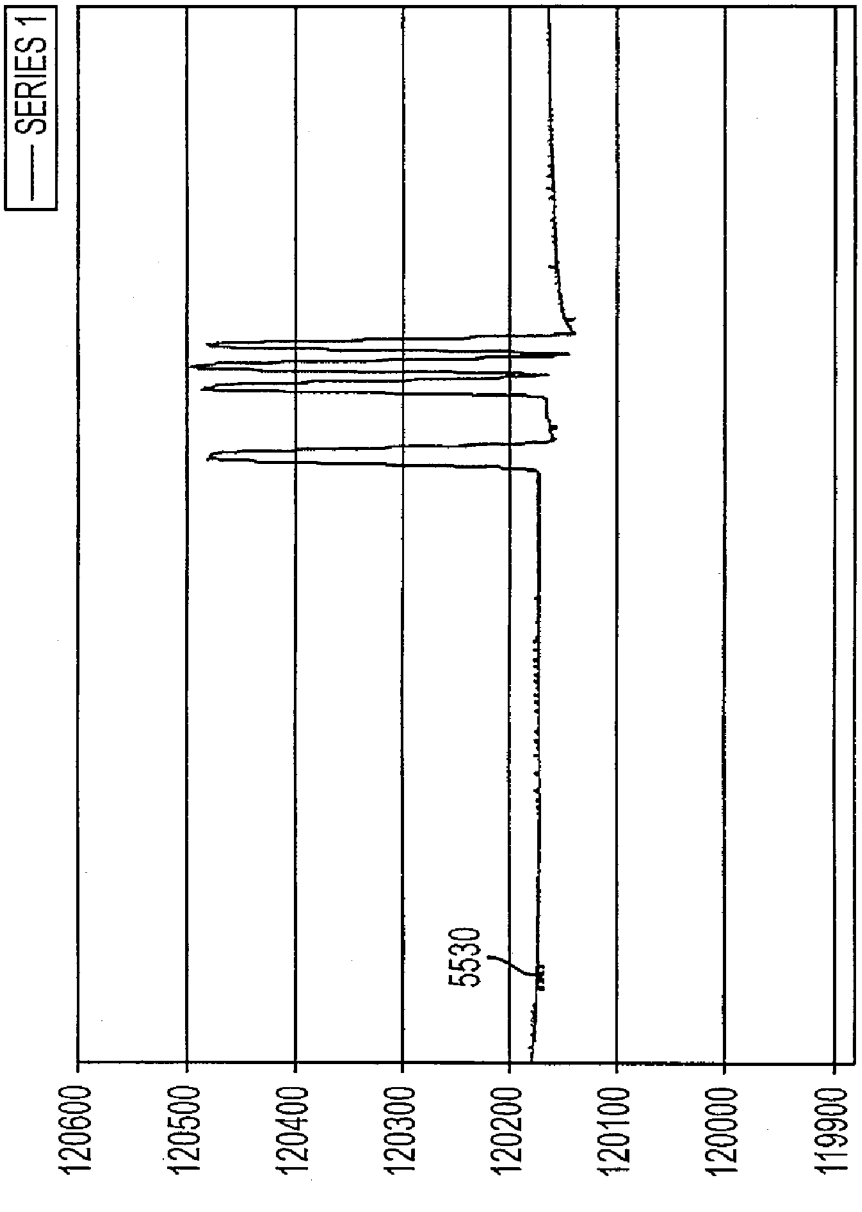

Plot 5530 shown in FIG. 55C illustrates the detection of a truck with four axles moving above temporary loop 5500. The front wheels activation was between points where x1=2204 and x2=2299. The second set of wheels activation was between points where x3=2479 and x4=2547. The third set of wheels activation was between points where x5=2563 and x6=2626. The fourth set of wheels activation was between points where x7=2644 and x8=2705.

Figure 56:
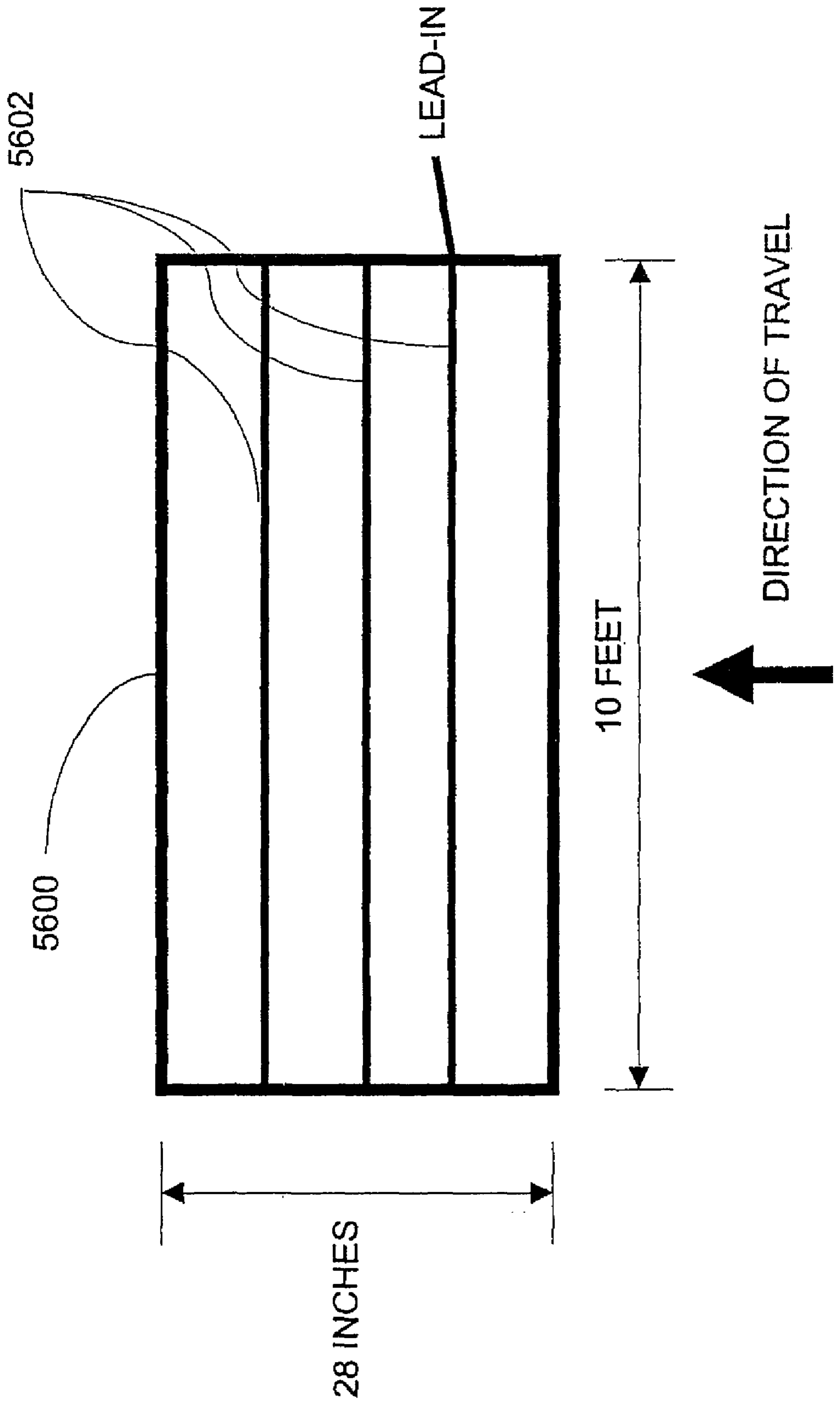
FIG. 56 is a schematic diagram showing another preferred embodiment of the present invention.

FIG. 56 illustrates temporary loop 5600 that is 10 feet wide by 28 inches long having coils 5602 perpendicular to the travel direction.

Example No. 42

Figure 56A:
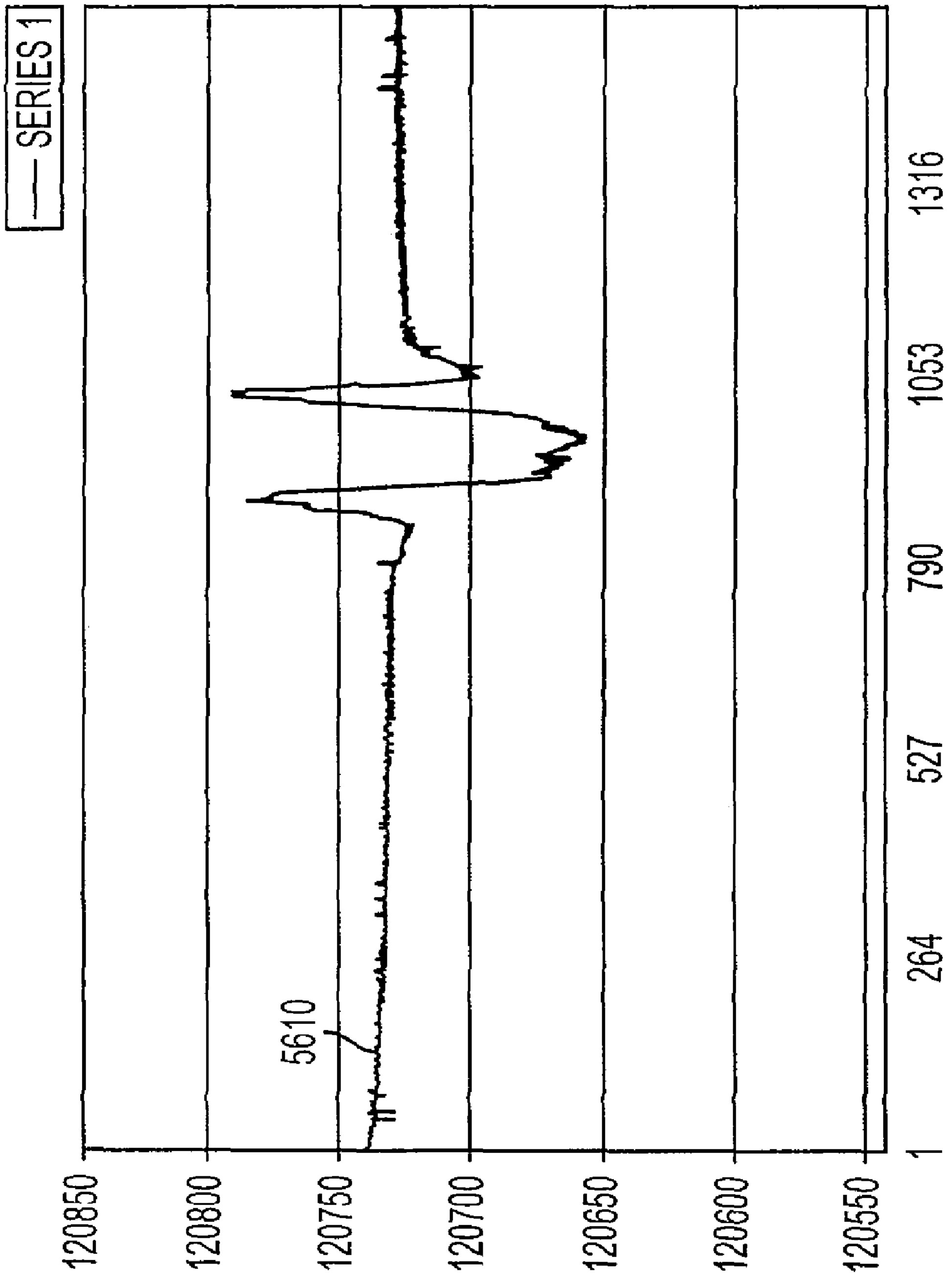
FIGS. 56A, 56B, and 56C are frequency vs. time plots produced using a ferromagnetic loop of the present invention.

Plot 5610 shown in FIG. 56A illustrates the detection of a car moving above temporary loop 5600. The front wheels activation was between points where x1=855 and x2=901. The rear set of wheels activation was between points where x3=1005 and x4=1044.

Example No. 43

Figure 56B:
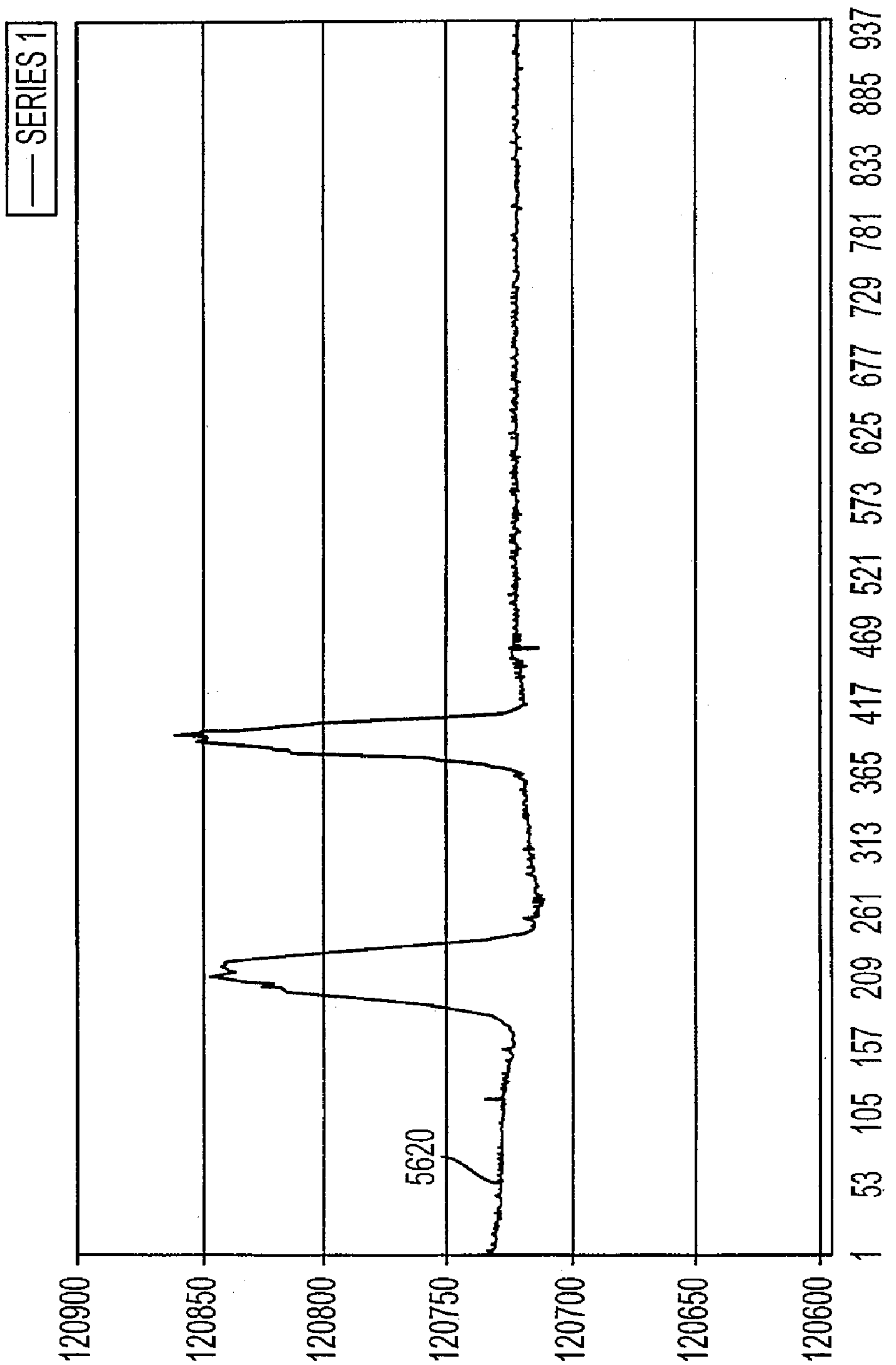

Plot 5620 shown in FIG. 56B illustrates the detection of a pickup truck moving above temporary loop 5600. The front wheels activation was between points where x1=181 and x2=242. The rear set of wheels activation was between points where x3=372 and x4=242.

Example No. 44

Figure 56C:
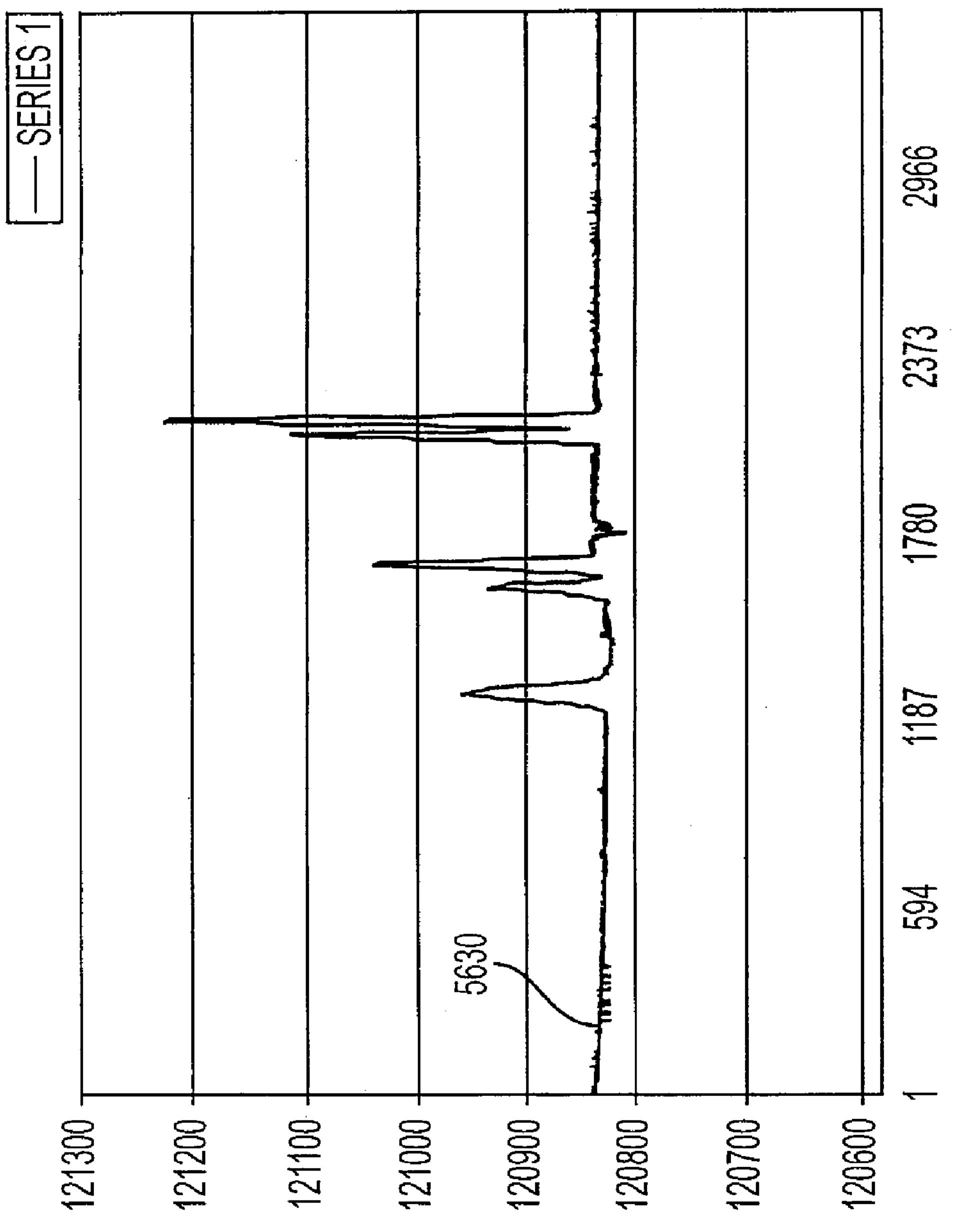

Plot 5630 shown in FIG. 56C illustrates the detection of a truck with five axles moving above temporary loop 5600. The front wheels activation was between points where x1=1240 and x2=1330. The second set of wheels activation was between points where x3=1588 and x4=1651. The third set of wheels activation was between points where x5=1670 and x6=1726. The fourth set of wheels activation was between points where x7=2096 and x8=2138. The fifth set of wheels activation was between points where x9=2144 and x10=2189.

Figure 57:
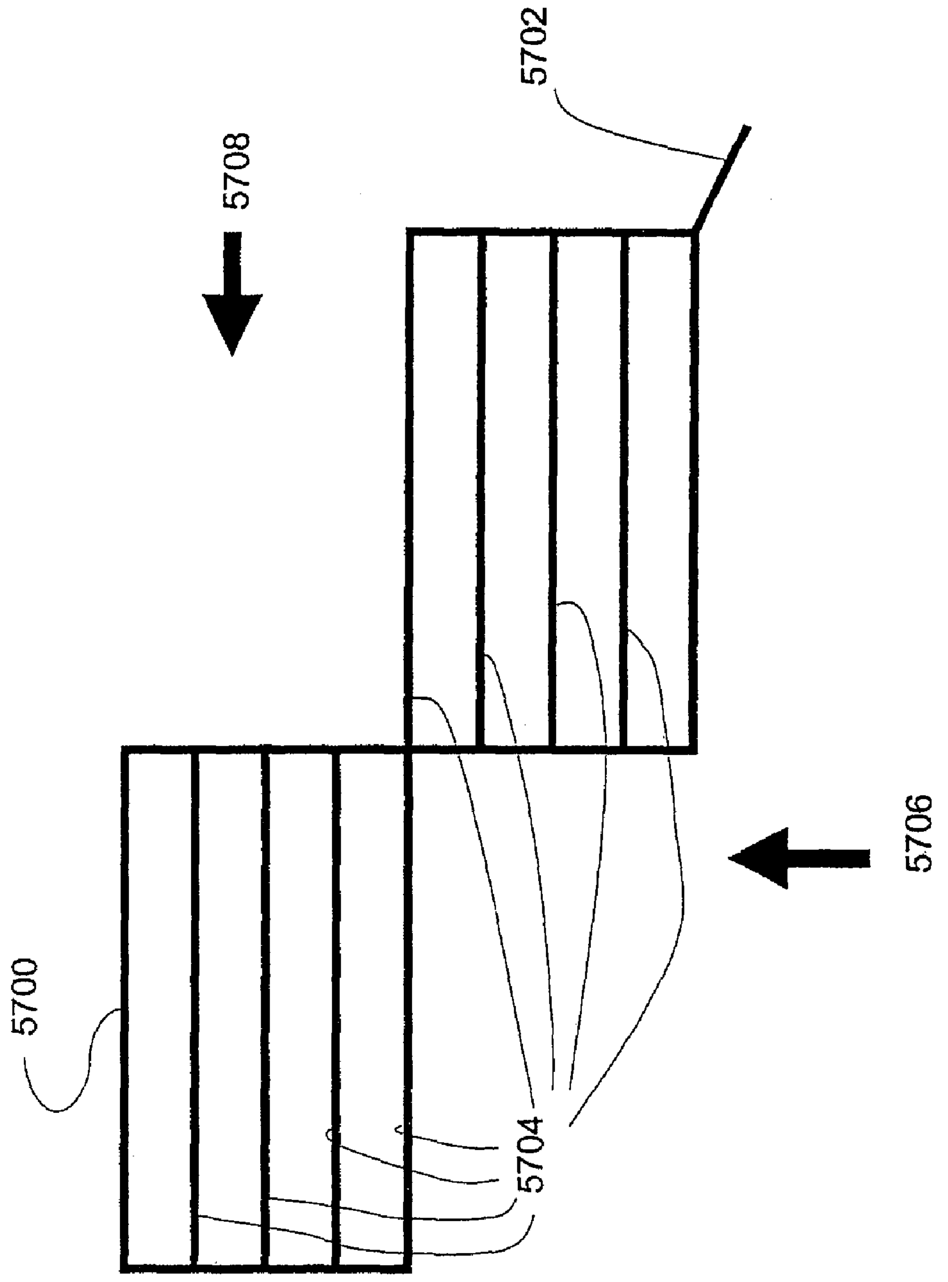
FIG. 57 is a schematic diagram of another preferred embodiment of the present invention.

FIG. 57 illustrates temporary offset loop 5700 that can be installed on a roadway so that its coils 5704 can be perpendicular or parallel to the direction of travel. Lead-in 5902 is connected to a loop detector.

Example No. 45

Figure 57A:
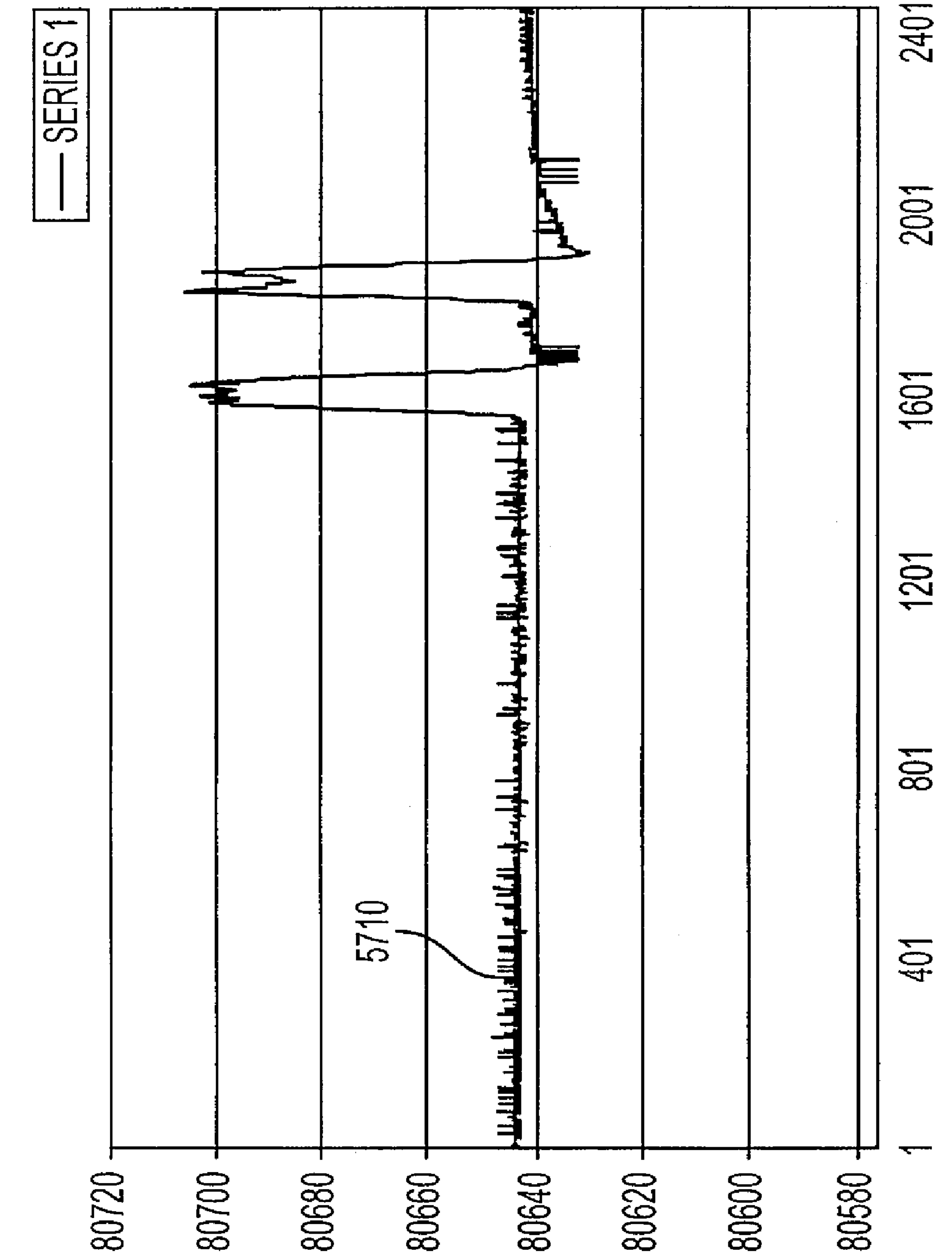
FIGS. 57A and 57B are frequency vs. time plots produced using a ferromagnetic loop of the present invention.

Plot 5710 shown in FIG. 57A illustrates the detection of a truck with two axles being detected on temporary offset loop 5700, which is having coils 5704 perpendicular to the flow of travel in direction 5706.

Example No. 46

Figure 57B:
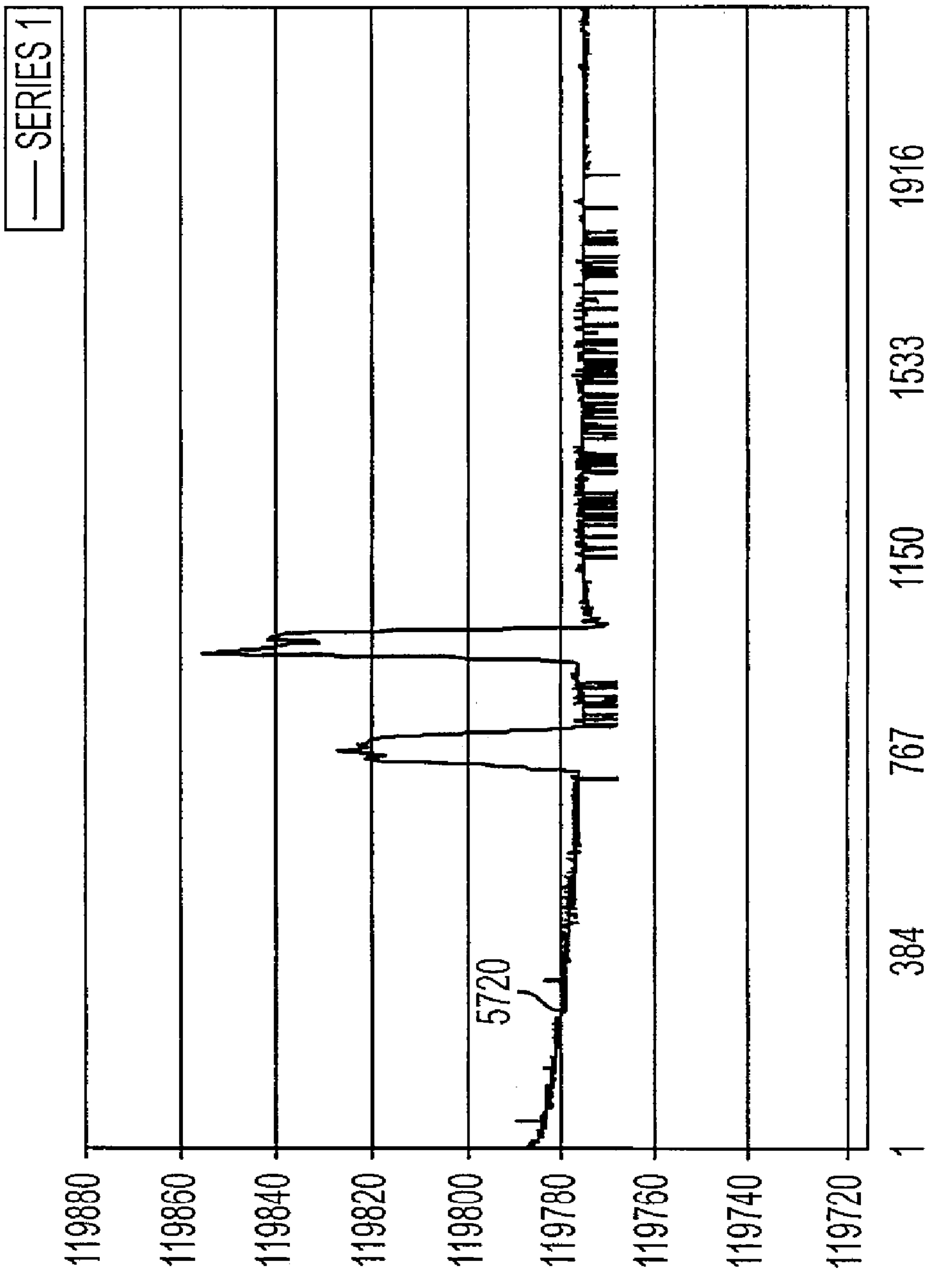

Plot 5720 shown in FIG. 57B illustrates the detection of a truck with two axles being detected on an offset loop having coils parallel to the direction of travel.

Together, plots 5710 and 5720 indicate that offset loop 5700 can be used to detect vehicle wheels regardless of whether coils 5704 are parallel or perpendicular (or diagonal) to the direction of travel.

The ferromagnetic loop of the present invention has many characteristics including the following.

The loop geometry associated with the present invention is unique. Preferred embodiments of the invention use wire turnings in a serpentine fashion to provide a low density magnetic field for the ferromagnetic loop. Preferably, the ferromagnetic loop provides a wire coil with multiple turns to remain parallel (side-by-side) and preferably one inch or less below the road surface.

The loop width can be larger than the diameter of the wheels being detected to provide a longer sample time of each wheel assembly.

The ferromagnetic loop design can detect and provide distinctions for single wheel assemblies on small vehicle wheels, automobiles, trucks and dual wheel assemblies on vehicles.

The loop design can be installed on a temporary basis using flexible adhesive sheets. Alternatively, the loop can be formed to contain the continuous wire. For example, the continuous wire can be encapsulated or encased in a molding process to give form to the loop circuit.

The loop circuit encapsulated or encased in a molding process can be further secured by an anchoring system. The anchoring system may consist one or more of plastic, rubber, synthetic, and other resinous product for permanent installations.

A molded loop designed specifically for temporary installations can be installed as a surface mount loop. This loop is designed to be reusable and more durable than the temporary loops made of a combination of wire and seal tape having a woven polypropylene mesh.

The permanent installations can use a shallow saw cut 0.5 to 0.75 inches wide and one inch deep to maintain close proximity of the ferromagnetic circuit to the road surface.

The permanent installations can be installed in a saw cut using a loop circuit that has been encapsulated or encased using a molding process using one or more of plastic, rubber, synthetic, and other resinous products.

The shape of the molded ferromagnetic loop design can be adapted to be secured by a mechanical anchor in the saw cut.

The loop design has the ability to discriminate between a single wheel assembly and a dual wheel assembly.

The unique serpentine method of wire turns can utilize different length sizes of spacing to create a low dense gradient field for different wheel diameters.

Temporary loops can be made from a combination of wire and seal tape having a woven Polypropylene material with adhesive. These temporary loops can be installed for short term or temporary installations.

Vehicle classification by detecting axle counts, vehicle spacing, and axle spacing can be done using a single loop.

Vehicle classification using two loops in series can have spacing from 3 feet to 15 feet between loops.

Overview of the Present CIP Application

The foregoing disclosure of preferred embodiments of the present invention has been presented for purposes of illustration and description. Other embodiments and additional aspects on the invention have been contemplated by the inventors. In particular, aspects of the ferromagnetic loop sensor system described above can be integrated with additional features in several additional embodiments. In addition, vehicle sensors other than ferromagnetic loops can be used in conjunction with the intelligent vehicle identification system (IVIS), vehicle image capture unit (VICU), multilane vehicle information capture system (MVIC), and vehicle tracking system (VTS) of the present invention.

In one aspect, a vehicle sensor, e.g., a ferromagnetic loop sensor, is incorporated in a VICU. In one aspect, the VICU may act as a violation enforcement system (VES) for enforcing toll violations. The VICU system includes a trigger unit, a capture unit, and a lighting unit. The trigger unit is coupled to an IVIS, which detects the presence of a vehicle and sends a trigger signal to the capture unit. The capture unit takes vehicle images of the vehicle that is lit by the lighting unit that provides a lighting source incident on the vehicle. The system further includes a processing unit that processes the vehicle images and controls the exposure employed by the capture unit. The processing unit contains an application program running in the processing unit, and containing modules for vehicle image processing and exposure.

In another aspect, vehicle sensors, e.g., ferromagnetic loop sensors, are incorporated in a system that contains an MVIC unit for collecting information from MVIC subsystems. The tolling system can also include an IVIS system. Preferably, the IVIS system contains the ferromagnetic loop sensors, but other sensors may be used. The IVIS system sends to the MVIC unit vehicle information. Preferably, the information is sent at a rate of many times per second. Also included are a vehicle tracking system (VTS) that collects information about the vehicle position using vision tracking sensors, and an RF system designed for reading a transponder on a passing vehicle, as well as a vehicle image capture system (VICU) for capturing images of the passing vehicle when a camera in the VICU receives a trigger from the MVIC unit.

In a further aspect, lane straddling sensors are incorporated in a dual RF read zone system for conducting transactions with high speed vehicles traveling on a road. Preferably, the lane straddling sensors are diamond-shaped loop sensors (also termed "lane straddling sensors"). The system includes one or more gantries that contain RF read sources that each extend over at least one lane of the highway. The system creates multiple RF read zones for passing vehicles, so that vehicle transactions can be completed with a high degree of accuracy.

In another aspect of the invention, a system for IVIS vehicle sensor synchronization includes a master program that coordinates sampling periods of vehicle sensors so that adjacent sensors do not have sampling periods at the same time.

Toll Violation Enforcement System

Figure 58:
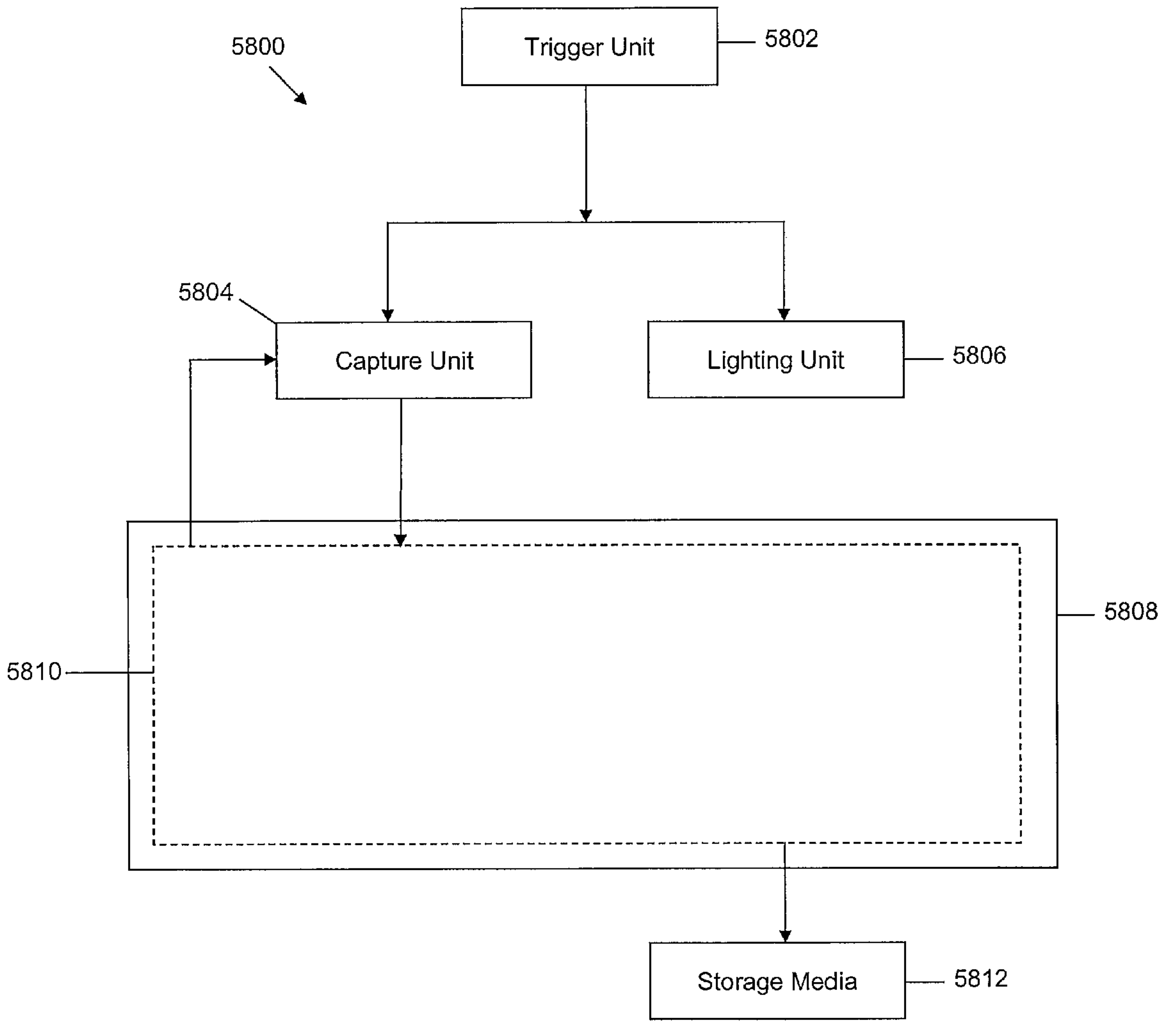
FIG. 58 depicts a block diagram of a toll violation enforcement system (VES), according to an exemplary embodiment of the present invention.
Figure 65:
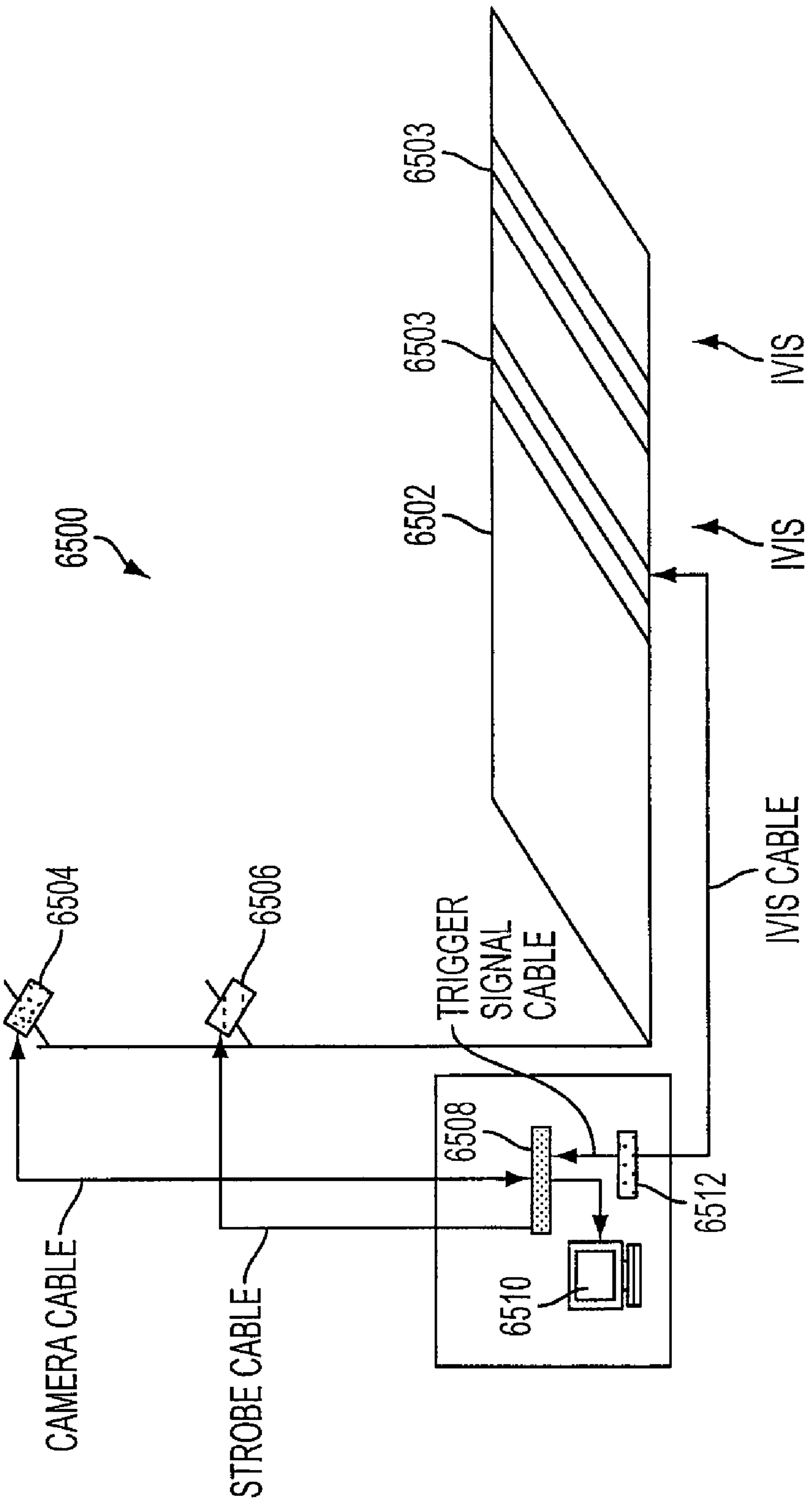
FIG. 65 illustrates exemplary features of a violation enforcement system according to an embodiment of the present invention.

FIGS. 58 and 65 depict a block diagram and a schematic, respectively, of a VICU 5800, acting as a toll violation enforcement system (VES). VICU 5800 includes trigger unit 5802. VICU 5800 is only one example of a VICU, designed for capturing vehicle images to help enforce tolling operations. However VICU 5800 can be used for any application in which capturing of a vehicle image is useful, such as law enforcement, or data collection. Trigger unit 5802 is configured to detect the presence of a vehicle in a toll environment or other traffic environment when vehicle image capture is important. Unit 5802 can be in any combination of one or more vehicle detection ferromagnetic loop sensors, pressure sensors, radar sensors, and laser sensors. Preferably, ferromagnetic loops are used in trigger unit 5802, for example as shown in FIG. 65 for IVIS sensors 6503. Trigger unit 5802 can also be configured to include one or more vehicle detectors that are based on digital video from one or more camera. Trigger unit 5802 can be activated to send a triggering signal when a vehicle triggers the triggering unit. In a preferred embodiment, trigger unit 5802 comprises an IVIS system that includes a processor (not shown) for sending a triggering signal to capture unit 5804.

VICU 5800 also includes a capture unit 5804, which can include a frame grabber and one or more cameras. The cameras can be digital video cameras or analogue video cameras plus a frame grabber. A preferred embodiment of the invention uses at least one digital video camera. Capture unit 5804 can be mounted either roadside or on a gantry above a traveling lane. Capture unit 5804 is configured to receive a trigger signal (or trigger) from trigger unit 5802. Upon receiving the trigger signal, capture unit 5804 can take one or more images of a passing vehicle that is detected by trigger unit 5802.

VICU 5800 preferably includes lighting unit 5806. Lighting unit 5806 can comprise a visible wavelength or infrared strobe light, or flood light. In a preferred embodiment of the invention, lighting unit 5806 employs a white strobe light. Preferably, a diffuser is arranged in front of lighting unit 5806 to make a lighting field created by the unit more uniform. When lighting unit 5806 is operational, it creates a lighting field that can illuminate a passing vehicle. In one embodiment, lighting unit 5806 is also configured to receive the triggering signal from trigger unit 5802 that can, for example, activate a strobe in lighting unit 5806.

VICU 5800 also includes processing unit 5808, which can be a standard or embedded computer system that is located locally or at a remote distance from capture unit 5804. Processing unit 5808 contains a processing program 5810 running therein. Preferably, processing program 5810 is used for processing vehicle images sent by capture unit 5804. Further, processing unit 5810 can be configured to control exposure in capture unit 5804. In preferred embodiments of the invention, unit 5808 comprises a standard desktop computer, an industrial computer, or single-board computer.

Application program 5810 is configured to run processing unit 5808. Further, application program 5810 contains several modules that can be used to process images received from capture unit 5804, as described further below with reference to FIG. 59.

VICU 5800 further includes storage media 5812, which can be local or remote memory, and in hard disk, flash disk, CD, or DVD form. Storage media 5812 is used to store information such as vehicle images received in digital form from processing unit 5808. In general, the images received for storage can be digital data representing as-received pictures of a passing vehicle taken by capture unit 5804, or they can be digital data that has been manipulated in some manner after being received from capture unit 5804 by processing unit 5808. For example, processing unit 5808 may receive a "raw" vehicle image from capture unit 5808 and create a brightened or darkened image, an extracted image, and the like (see discussion below). All of these images can be stored as digital data in storage media 5812. In the case where storage media 5812 is located remotely, communication from processing unit 5808 to storage media 5812 can be through a wireless, cable, or satellite network. In preferred embodiments of the invention, a local hard disk, local memory, or local flash disk are used for storage media.

Figure 59:
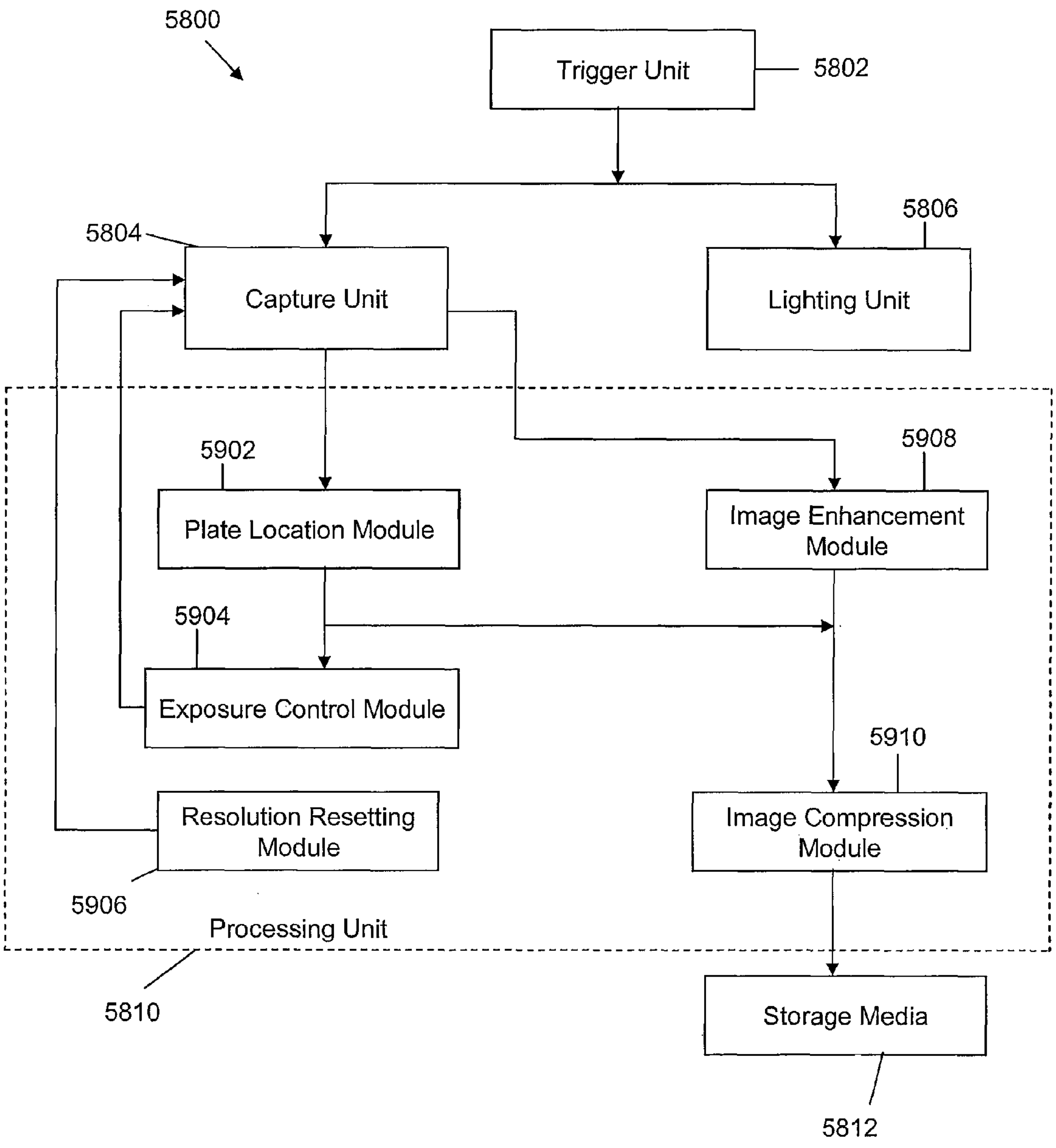
FIG. 59 discloses details of an application program according to one embodiment of the present invention.

FIG. 59 discloses details of one exemplary embodiment of the present invention in which application program 5810 contains plate location module 5902, exposure control module 5904, resolution resetting module 5906, image enhancement module 5908, and image compression module 5910.

Plate location module 5902 is configured to find and extract a license plate area in a vehicle image (also referred to as "whole vehicle image") received from capture unit 5804. Typically, there is a conflict between the needs to increase resolution for taking accurate images of vehicles, and the limitations in storage capacity and transmission rate of vehicle images. For example, camera resolution and original image size are increasing to the extent that image transmission and storage have become significant problems. From the point view of both transmission and storage, low image resolution (and therefore less data generated per image) is preferred. From the point of view of optical character recognition (OCR) and other processing purposes, higher image resolution image is preferred, so that accurate information regarding a vehicle in question is retained.

Figure 60:
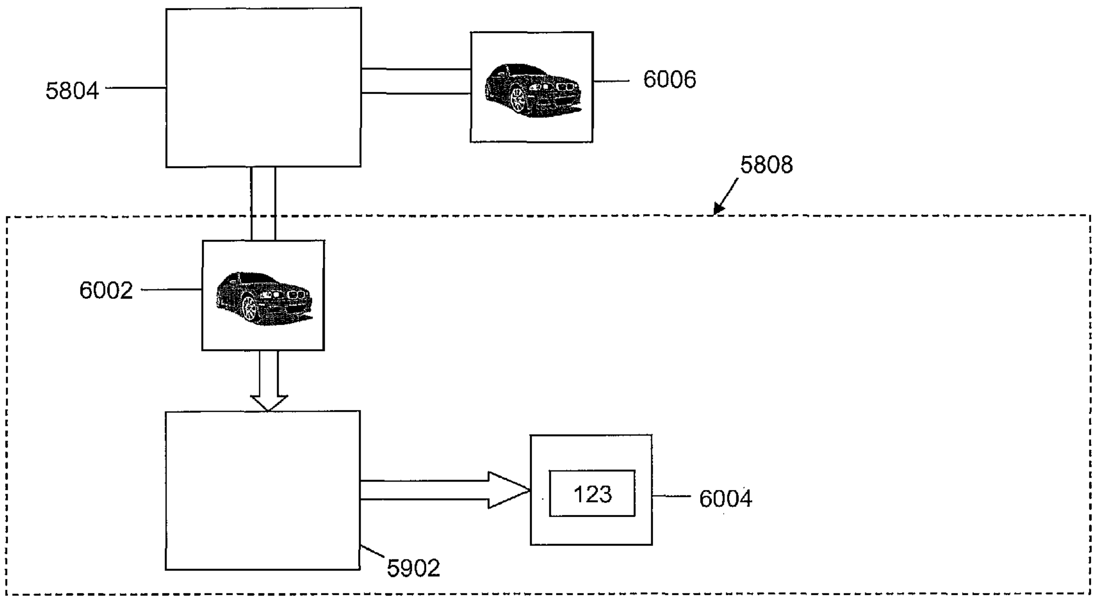
FIG. 60 depicts details of operation of a plate location module according to an exemplary embodiment of the present invention.

To solve this conflict, the present invention employs plate location module 5902. As depicted in FIG. 60, plate location module 5902 is configured to find and extract a license plate area within a whole vehicle image 6002, to create extracted plate area image 6004. Plate location module 5902 then maintains the extracted plate area image 6004 at an original image resolution as received from capture unit 5804.

Capture unit 5804 transmits whole vehicle image 6002 to plate location module 5902, which processes the image to find and extract a plate area image. Module 5902 can then output plate area image 6004 at the original resolution as received in vehicle image 6002. However, the amount of data in plate area image 6004 is only a fraction of the amount of data contained in original whole vehicle image 6002, due to the relatively small size of a license plate compared to a whole vehicle. For example, a typical whole vehicle image 6002 can comprise about 1.4 megapixels (one megapixel equals one million pixels), equivalent to 4.2 Mbytes of data, where each pixel of a color image uses 3 bytes of data to represent a red-blue-green image. On the other hand, plate area image 6004 having the same resolution as vehicle image 6002 comprises only about forty thousand pixels, or about 120 Kbytes of data. In order to minimize storage space associated with collecting a high resolution plate image, such as image 6004, original image 6002 can be discarded after being transmitted to and operated on by plate location module 5902.

Figure 61:
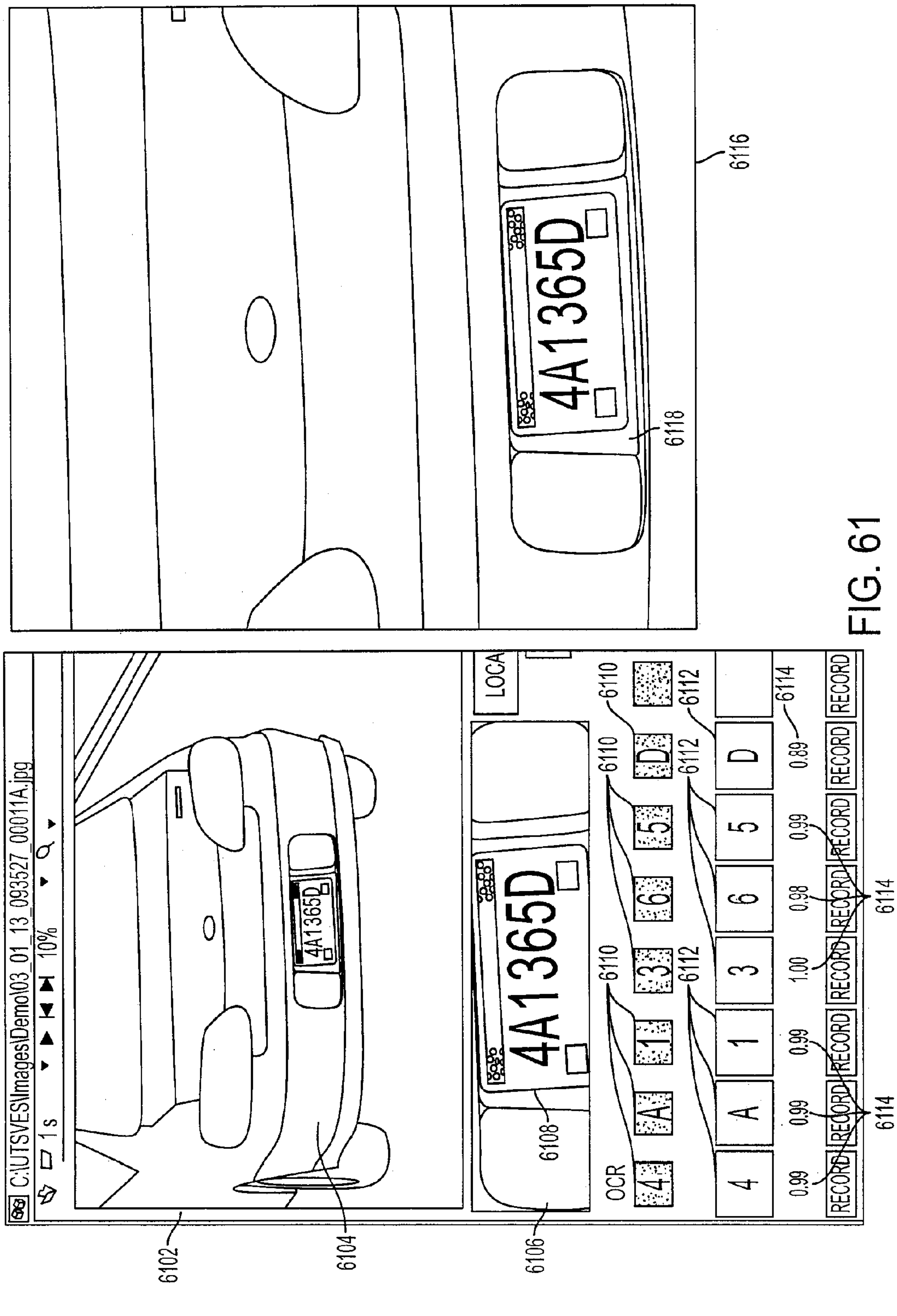
FIG. 61 shows images captured using a capture unit according to a preferred embodiment of the present invention.

FIG. 61 includes whole vehicle image 6102 that depicts a back portion of a passing vehicle including a plate area 6104. As mentioned above, image 6102 is recorded at a first resolution, where, for example, the total number of image pixels can be in the range of one to one hundred megapixels or greater. In one embodiment, the first resolution, in which vehicle image 6102 is captured, is a relatively lower image resolution. Also displayed in FIG. 61 is extracted plate image 6106, which in large part contains an image of license plate, 6108. Preferably, plate image 6106 is extracted from a full vehicle image (not shown) that is taken at a second image resolution that is relatively higher than the first resolution used for capturing whole vehicle image 6102. Characters in image 6106 clearly read "4A1365D". Below image 6106 are extracted character image 6110 that display images of each character in the license plate "number." Preferably, an optical character recognition (OCR) program or similar tool can be used to determine a character corresponding to each extracted character region and to display a corresponding determined character sequence 6112, which reads "4A1365D." Below each character of sequence 6112, are confidence values 6114 reflecting the degree of probability that a character has been determined accurately. In the example shown in FIG. 61, the confidence values range from 0.89 to 1.00, which indicates a high probability of reading the numbers accurately.

Capture unit 5804 is preferably configured to rapidly change between a plurality of different image resolution modes for taking pictures. Accordingly, capture unit 5804 can take pictures in rapid succession of a passing vehicle at a higher image resolution and a lower image resolution. For example, after capturing a high resolution whole vehicle image 6002, resolution resetting module 5906 can receive a signal so that capture unit 5804 can be reset to take a second whole vehicle image 6006 at a lower resolution. For example, image 6006 could comprise about 353 kilopxels, or about one quarter of that of image 6002. This lower resolution image can be used for image enhancement as described in more detail below.

Also displayed in FIG. 61 is an image portion 6116 of lower resolution vehicle image 6102 that includes low resolution license plate area 6118. The legibility of downsized plate area 6118 is comparatively poorer than a similar sized original resolution extracted plate image 6108. However, portions of the lower resolution image outside of area 6118 are sufficiently clear that license plate position on the vehicle, taillight shape, and logo of the vehicle manufacturer are discernable. Thus, lower resolution image 6116 may not be appropriate for accurate automatic license plate number determination, but is adequate for recording general vehicle features.

Images 6004 and 6006 can then be transmitted to storage media 5812 (see FIG. 59) for storage. In the example above, plate image 6004 and lower resolution vehicle image 6006 together comprise only about 393 thousand pixels. Preferably, the resolution of whole vehicle image 6006 is sufficient for any needed purposes of identification additional to the license plate identification provided by image 6004. Thus, far less memory space is needed to store images 6004 and 6006 as compared to 6002, but the reliability of critical identifying information, such as a license plate number, and other specific vehicle features, is maintained.

As further depicted in FIG. 59, exposure control module 5904 is configured to communicate with capture unit 5804 to control exposure settings employed by capture unit 5804. In existing toll violation enforcement systems, exposure setting of a capture unit is based on intensity information from a whole vehicle image, so that there is no guarantee that consistent intensity in the crucial license plate area will be obtained.

Figure 62:
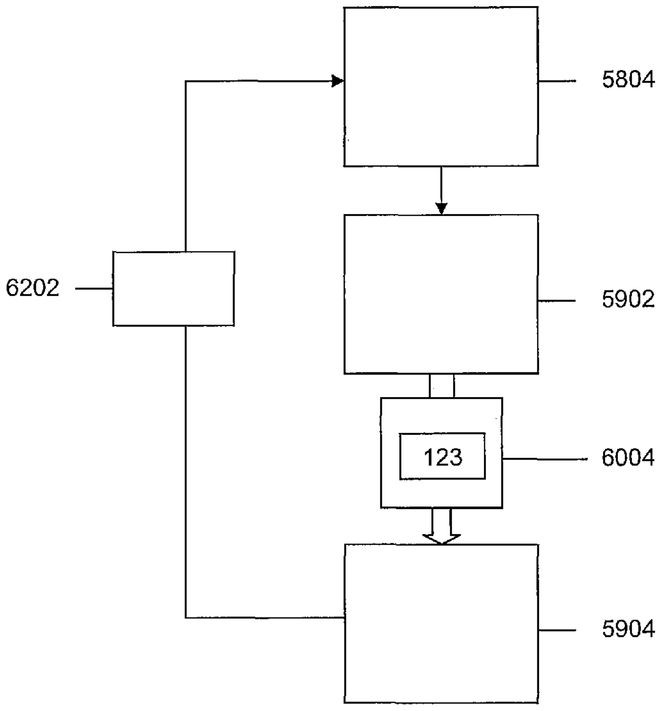
FIG. 62 illustrates details of operation of a plate location module according to an embodiment of the present invention.

In an embodiment of the present invention illustrated in FIG. 62, plate location module 5902 receives a vehicle image from capture unit 5804 and locates the plate area from the vehicle image. It then forwards information from the plate area, preferably including, e.g., image 6004, to exposure control module 5904. Exposure control module 5904 then forwards exposure control information 6202 to capture unit 5804 to control a camera exposure setting. Exposure control information 6202 is preferably based on intensity information associated solely from plate area image 6004. Such exposure control process improves the consistency of image intensity of vehicle plate areas that are captured by capture unit 5804. This acts to further increase the reliability of license plate information received and stored by system 5800.

Referring back to FIG. 59, image enhancement module 5908 is configured to receive whole vehicle images transmitted from capture unit 5804. Image enhancement module 5908 can be used to improve image features of a received whole vehicle image, for example.

In current systems that are used to take vehicle images for law enforcement purposes, a typical reflectorized license plate frequently appears much brighter than other parts of a vehicle. This is especially true when a lighting unit is used to illuminate a passing vehicle. Moreover, under certain circumstances, the license plate may actually appear darker than the rest of the vehicle. In general, the license plate area of an image differs in brightness compared with the rest of the vehicle. This creates an undesirable tradeoff: if the plate area has a normal intensity, the vehicle body is too dark (or light) to see vehicle details; and if the vehicle body is bright enough for resolution of vehicle details, the plate area appears overexposed (or underexposed).

Figure 63:
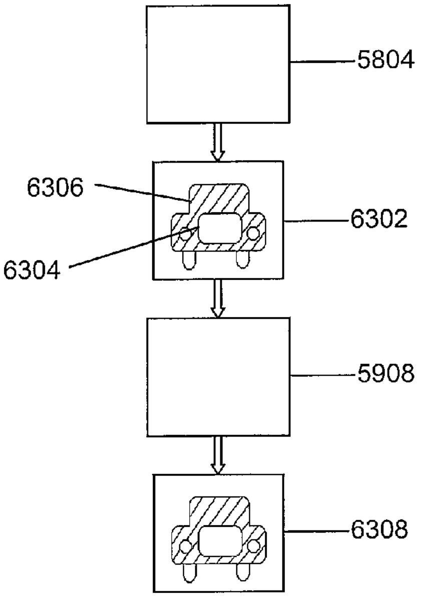
FIG. 63 illustrates operation of an image enhancement module according to another embodiment of the present invention.

In an embodiment of the present invention, the above conflict is addressed by initially controlling the exposure setting of capture unit 5804 to capture a vehicle image so that the plate area has normal brightness or intensity. As illustrated in FIG. 63, capture unit 5804 transmits whole vehicle image 6302 to image enhancement module 5908. Image 6302 contains plate area 6304 of normal intensity, as well as whole vehicle area 6306 having a different appearance, for example, a darker appearance. Image enhancement module 5908 then processes image 6302 to brighten pixels in area 6306 outside plate area 6304, such that brightened vehicle image 6308 is produced, Where both plate and vehicle body areas have reasonable brightness.

Figure 64:
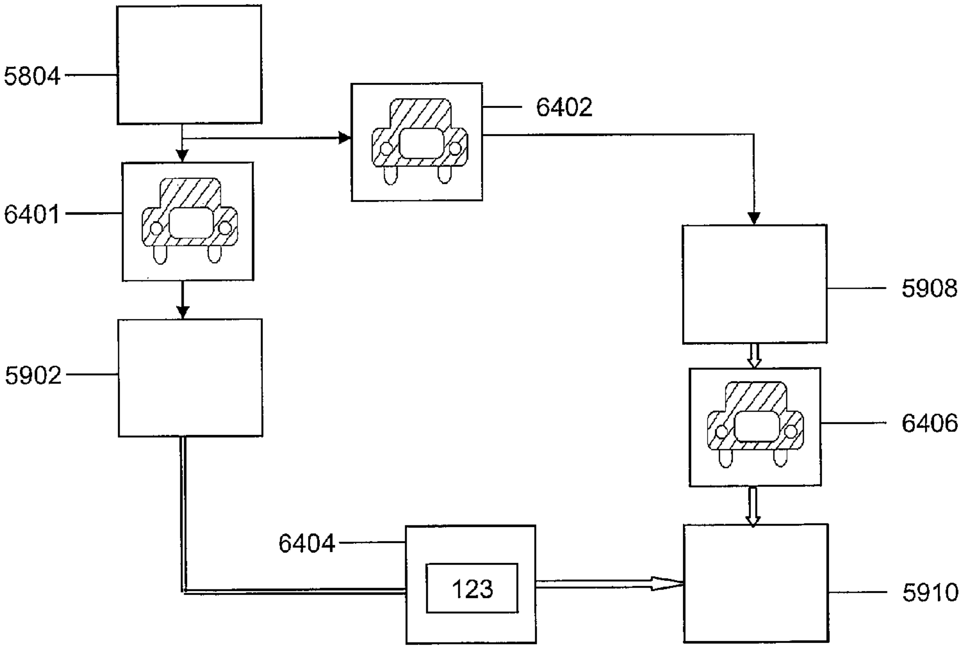
FIG. 64 depicts interoperation of an image compression module with other modules according to an embodiment of the present invention.

Image compression module 5910 (see FIG. 59) is configured to perform compression on images received from capture unit 5804. After compression, compressed images can be transmitted from image compression module 5910 to storage media 5812 for storage. Image compression is performed such that compression can be either lossy (like JPEG etc.) or lossless (like Huffman, Arithmetic, LZW, GIF, lossless JPEG, or other known compression techniques). Compression may be performed, for example on images received from capture unit 5804 via modules 5902 or 5908. In an embodiment of the present invention depicted in FIG. 64, image compression module 5910 receives input from plate location module 5902 and image enhancement module 5908. For example, plate location module 5902 transmits plate image 6401 derived from higher resolution vehicle image 6402 to compression module 5910. Image enhancement module 5908 receives a second, lower resolution vehicle image 6402 and transmits a brightened lower resolution full vehicle image 6406 to module 5910. Module 5910 then compresses images 6404 and 6406 to a predetermined format for output to storage media 5812.

FIG. 65 illustrates more details of features of VES 6500 according to an embodiment of the present invention. When a vehicle passes over trigger unit 6502 comprising ferromagnetic induction loop regions 6503, a change in inductance measured in the loops causes a signal to be sent to camera 6504. Note that in other embodiments, vehicle detectors other than ferromagnetic loops may be used. Camera 6504 is configured to take images of a passing vehicle that may be illuminated by strobe light 6506. In a preferred embodiment, strobe 6506 is triggered to activate when a vehicle is detected by trigger unit 6502. Preferably, a camera setting for camera 6504 is performed during an installation procedure for the camera. The setting of the camera's iris can be done in such a way that under normal exposure setting, a license plate image is clearly visible only when a lighting unit, such as strobe 6506, is working. Such a setting minimizes the influence of variations in ambient light on images of vehicle license plates.

A lighting unit in existing conventional toll enforcement systems works as compensation lighting and is turned on only when the ambient light is low due to a time of day or poor weather conditions. However, the ambient light still varies widely over the range of conditions where the ambient light is bright enough for no use of a lighting unit. Sunlight might shine in the field of view of a camera in an unpredictable manner due to floating clouds. Additionally, sunlight incident directly on a license plate, such as during sunrise, sunset or other coincident situations, can make a plate appear extremely bright and completely overexposed. These factors render it difficult to control exposure to capture images with consistent intensity.

By employing a major light source adjusted so that a license plate is not over-exposed when the source is on, the effects of ambient light can be greatly reduced. Thus, in a preferred embodiment, to minimize the influence of ambient light, a lighting unit of the present invention uses a major lighting source that is preferably operating substantially all the time, with camera settings adjusted so that a plate image is clearly visible only when the lighting source is operational. For example, a strobe unit 6506 is continuously operational so that it is triggered to expose a vehicle every time a passing vehicle is detected.

To further reduce the effect of direct sunshine on the ability to obtain good images, in an embodiment of the present invention, multiple different predetermined capture positions of cameras are employed so that two or more images are taken for each passing vehicle. Since the intensity of direct sunshine reflected from a plate and detected in a capture unit depends highly on the sunshine angle and view angle of the capture unit, changing a capture position, which also changes the view angle of the capture unit, likely results in at least one image position not receiving directly reflected sunlight. In addition, since often at lease one capture position might be located in the shadow of a surrounding object, such as a toll plaza canopy, use of multiple capture positions greatly increases the chance of capturing at least one good image when direct sunshine is present. Thus, as a vehicle passes by, images are collected at different points in time by a capture unit camera, such that each different image reflects a different capture position. Preferably, the strobe unit and capture unit are positioned to capture a license plate image of consistent intensity every time a passing vehicle is photographed at least one predetermined capture position.

VES system 6500 may include a frame grabber (not shown) that is coupled to a lane controller interface 6508. Lane controller interface 6508 is also coupled to IVIS board 6512 that collects signals from IVIS 6503. Lane controller interface is additionally coupled to camera 6504 and strobe 6506.

Figure 66:
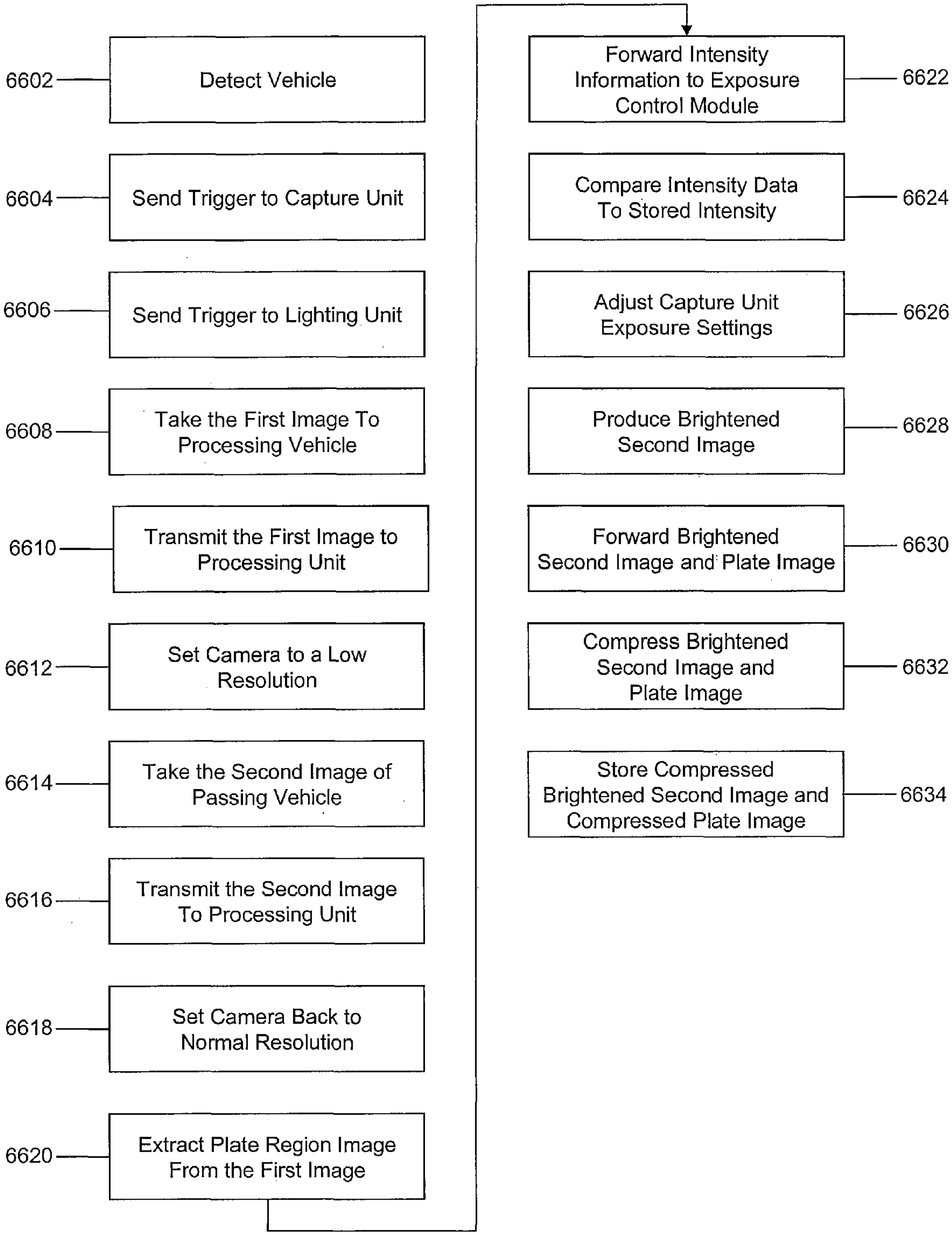
FIG. 66 illustrates exemplary steps for a method for toll violation enforcement according to an exemplary embodiment of the present invention.

FIG. 66 illustrates exemplary steps for a method for toll violation enforcement according to an exemplary embodiment of the present invention. In the following discussion, reference to FIGS. 58-63 is made to add clarity. Note that in some embodiments of the invention, some of the steps are optional.

In step 6602, a trigger unit detects the presence of a passing vehicle. As discussed above, trigger unit 5802 preferably includes an induction loop sensor embedded in the roadway that is configured to detect the presence of a vehicle overhead by sensing changes in inductance, but may include any other convenient means for detecting passing vehicles.

In step 6604, trigger unit 5802 send a trigger signal to capture unit 5804.

In step 6606, the trigger signal is also sent to lighting unit 5806, if unit 5806 includes a strobe light. The trigger signal can cause the strobe light to illuminate the passing vehicle.

In step 6608, capture unit 5804 takes a first image of the passing vehicle. In one embodiment of the present invention, the first image is taken at a predetermined image resolution. For example, camera 6504 can be configured to capture a first image of a passing vehicle at high resolution. Accordingly, after a vehicle is detected by trigger unit 6503, camera 6504 is automatically set for higher resolution vehicle image capture.

In step 6608, the exposure setting may also be set at a predetermined value based on, for example the type of image to be collected. If the first image is to be used to produce an extracted plate image, the capture exposure setting can be adjusted to produce optimum lighting conditions for obtaining a legible plate image.

In step 6610, the first vehicle image is transmitted to processing unit 5808 to be processed by program 5810 residing therein.

In step 6612, the image resolution of capture unit is changed from that employed in step 6608. Following the example of step 6608, if the image resolution for image capture at that step was a higher resolution, then in step 6612, the image resolution for image capture by capture unit 5804 is reduced to a lower resolution. However, in another embodiment, the image resolution for capture unit 5804 can be lower in step 6608 and relatively higher in step 6612.

In step 6614, a second vehicle image, for example, a lower resolution vehicle image, is taken. System 6500 is configured so that the first and second vehicle images can be taken with a minimum time lapse between successive images. For example, the second vehicle image can be taken at an interval ranging between about two and three hundred ] milliseconds after the first vehicle image. Thus, the first and second vehicle images can represent very similar views of the passing vehicle, for example, in terms of vehicle size and angle of view.

In one embodiment of the present invention, the second vehicle image taken in step 6614 is captured at an exposures setting different from that of the first vehicle image taken in step 6608. For example, if the second vehicle image is to be used to produce and store a whole vehicle image, the exposure setting may be adjusted to be greater than that used in step 6608, if the image in step 6608 is used to produce an extracted plate image. This is because the extracted plate region typically is more highly reflective and may appear much brighter than the rest of the vehicle, and accordingly require a lower exposure setting than that to be used to capture whole vehicle information.

In one embodiment, exposure control module 5904 and resolution resetting module 5906 are set to automatically toggle between different exposure and different resolution settings. For example, in an initial state, exposure control module 5904 is set at a lower exposure time and a higher resolution in order to capture a clear license plate image. After capture unit 5804 takes an initial picture of a passing vehicle a signal is received by units 5904 and 5906, upon which the image capture exposure time for capture unit 5804 is reset to a longer time and the image resolution for capture unit 5804 is set at a lower resolution. Accordingly, a second vehicle image appropriate for whole vehicle image capture can be taken at the longer exposure time and lower resolution that are more appropriate for capturing and storing a whole vehicle image. For example, the vehicle as a whole may be typically less reflective than a plate area, requiring a longer exposure time, but less resolution is generally required to resolve the general vehicle features besides those license plate features captured in the higher resolution image. In this manner, in this embodiment, the "capture state" of capture unit 5804, where the "capture state" includes the image resolution setting and the exposure setting, can be automatically and rapidly toggled between settings appropriate for plate image capture and whole vehicle image capture.

In step 6616, the second image is transmitted to unit 5810 for processing.

In step 6618, the resolution for image capture of capture unit 5804 is reset to the predetermined resolution, for example, a higher resolution, used in step 6608. Accordingly, a subsequent passing vehicle will have a first image taken at the same predetermined resolution as the first vehicle.

In step 6620, an extracted plate image is taken from one of the first or second vehicle images, whichever is higher. Following the example where the image resolution of a first vehicle image taken in step 6608 is a higher resolution, then the plate image is extracted from the first vehicle image. As discussed above, this allows for optimal identification of plate image information by preserving a high resolution image of the plate.

In step 6622, intensity information taken from the plate region of the high resolution image (in the example of steps 6608 and 6620 of FIG. 66, this is the first image) is forwarded to an exposure control module.

In step 6624, the intensity information from the plate region of the high resolution image is compared to stored intensity data.

In step 6626, the settings on a capture unit, for example, unit 5804, are adjusted based on the comparison of stored intensity data and that received from the most recent high resolution plate image. For example, lighting conditions may have varied between the time when the stored intensity data was collected and the time when the intensity data from the plate region of the most recent vehicle was taken. In this manner, the exposure settings for capture of the next vehicle can be adjusted, both for the high resolution image to be used to capture an image of a highly reflective plate, and a lower resolution image, to be used to collect an image from a less reflective whole vehicle.

In step 6628, a brightened image of the lower resolution image is produced as described above with respect to FIG. 63.

In step 6630, the brightened image is forwarded for image compression.

In step 6632, the brightened image and extracted plate image are compressed.

In step 6634, the compressed brightened whole vehicle image and plate image are stored in an appropriate storage medium.

Although the above example focuses on the processing of one original whole vehicle image taken at one image resolution and one vehicle image taken at a higher resolution (and, preferably, at a different exposure setting) for the purposes of extracting a plate image, it is contemplated that multiple low resolution and/or high resolution images of a passing vehicle can be captured and processed according to the appropriate steps outlined in FIG. 66 for the type of image captured. Thus, for example, in addition to capturing at least one low resolution vehicle image, system 6500 may be configured to produce two high resolution images of each passing vehicle to ensure that at least one extracted plate intensity has an appropriate level, as described above.

Additionally, it is contemplated that the procedures described above for embodiments of the present invention can be used in combination. For example, a capture unit might initially employ multiple capture positions to take multiple images of a passing vehicle at a first camera exposure setting. Subsequently, the plate location module processes one or more of the images taken at the first exposure setting, and sends a signal to the capture unit indicating the plate intensity data is not in a targeted range. Finally, the capture unit takes further images of the same passing vehicle at a second exposure setting adjusted based on the set of intensities received from the plate location module.

In additional embodiments, an enforcement system extracts only a plate region at an original resolution from a whole vehicle image while discarding the rest of the image rather than capturing and preserving a downsized image. This is useful in the case where system 5800 is employed only for a license plate study where other identifying vehicle information need not be preserved.

Furthermore, it is contemplated that embodiments of the present invention can be used to track and identify vehicles in areas other than tolling areas, such as parking lots, or predetermined locations on public streets. In exemplary embodiments, the system of the present invention can be triggered to capture vehicle information such as a license plate whenever a vehicle passes a point of interest. Such information could be used for law enforcement or public safety purposes.

Multilane Vehicle Information Capture

Aspects of the ferromagnetic induction loop sensor systems of the present invention can additionally be implemented in systems and processes for multilane vehicle information capture (MVIC). MVIC is an alternative approach to conventional transactions conducted with vehicles traveling along roads, where the term "road" includes multilane highways, toll plazas, bridges, tunnels, parking lots, and other vehicle traffic locations. These conventional transactions include toll collection at toll booth stations or in an open road environment using manual or RF-tag collection; vehicle identification using license plate image capture; vehicle detecting using loop sensors, and other methods of vehicle detecting. In a preferred embodiment of the present invention, a vehicle information collection process is completely automatic without use of human intervention, such as a toll attendant, for collecting tolls. In one aspect, vehicles traveling on multilane highways can be classified accurately using induction loop sensors of the invention and appropriately charged tolls to respective RF transponders placed on each vehicle. Preferably, vehicles do not have to stop or slow down in a lane to pay tolls. Preferably, vehicle information capture operates without requiring vehicles to move in a confined lane, so that, for example, during toll collection or other information capture, vehicles can straddle between lanes as typically occurs in an open road environment. Preferably, the MVIC system has the ability to capture a first type of information about a vehicle in order to determine if further information (or data) capture is required. In some embodiments, the MVIC system can send a trigger to a VICU if it determines based on initial data collection, that further vehicle data capture is needed. For example, the MVIC system has the ability to detect vehicles that do not have RF toll transponders passing through a tolling area, and to alternatively capture an image of the license plate of such vehicles. Preferably, the captured license plate information can then be used to record payment of users that are registered to pay toll based on their vehicle license plate ("pay by plate") or to send the plate information to a toll violation enforcement system for users that are not paying by means of an RF transponder or vehicle license plate.

Embodiments of the present invention utilize multiple intelligence units or subsystems to overcome current problems that are associated with multilane vehicle information capture in an open highway environment. In general, desirable features for an multilane vehicle information capture system include the following:

1) Ability to classify vehicle axles accurately and charge a vehicle transponder appropriately in the case of RF toll operations;
2) In case of vehicles not having RF transponders, ability to capture a vehicle image that can be used for the purposes of collecting toll payment or to send the image to a violation enforcement system.
3) Ability to capture vehicle images for pay by plate transactions;
4) Ability to perform general data capture operations to collect vehicle information that can be used for the purposes of surveys, statistical traffic information, and the like;
5) Ability to provide appropriate system failure notifications; and
6) Stability and accuracy of the system.

There are many problems associated with conventional open road tolling (ORT) systems. One of the most significant problems involves the identification of a vehicle that is located in multiple lanes (e.g., a vehicle that straddles more than one lane). When a vehicle straddles more than one lane, the toll system may fail to capture the vehicle for purposes of paying the toll, misassociate the paying customer with the wrong vehicle, or over- or under-count vehicle axles for the purposes of data capture. Another common problem is the inability of the system to properly manage multiple transactions occurring at about the same time and involving multiple vehicles in close proximity. For example, the following scenario representing a series of transactions that are difficult to manage may occur frequently: identify a first vehicle that has a toll transponder (tag); capture payment from the toll tag; associate the captured payment with the first vehicle; simultaneously identify a second nearby vehicle that did not pay by toll tag; and capture a license plate image of the second vehicle, the latter step followed by charging of payment for those vehicles authorized to pay be license plate, or sending the plate image of non-authorized vehicles to a toll enforcement system. These problems limit usefulness of conventional open road tolling schemes.

The present invention utilizes multiple intelligence units, or subsystems, to overcome current existing problems that are associated with toll collection in an open highway environment. In a preferred embodiment, the subsystems include an intelligent vehicle identification system (IVIS), an RF system, and a vision tacking system (VTS). The MVIC system of the present invention operates to consolidate intelligence obtained from the multiple subsystems.

Figure 67:
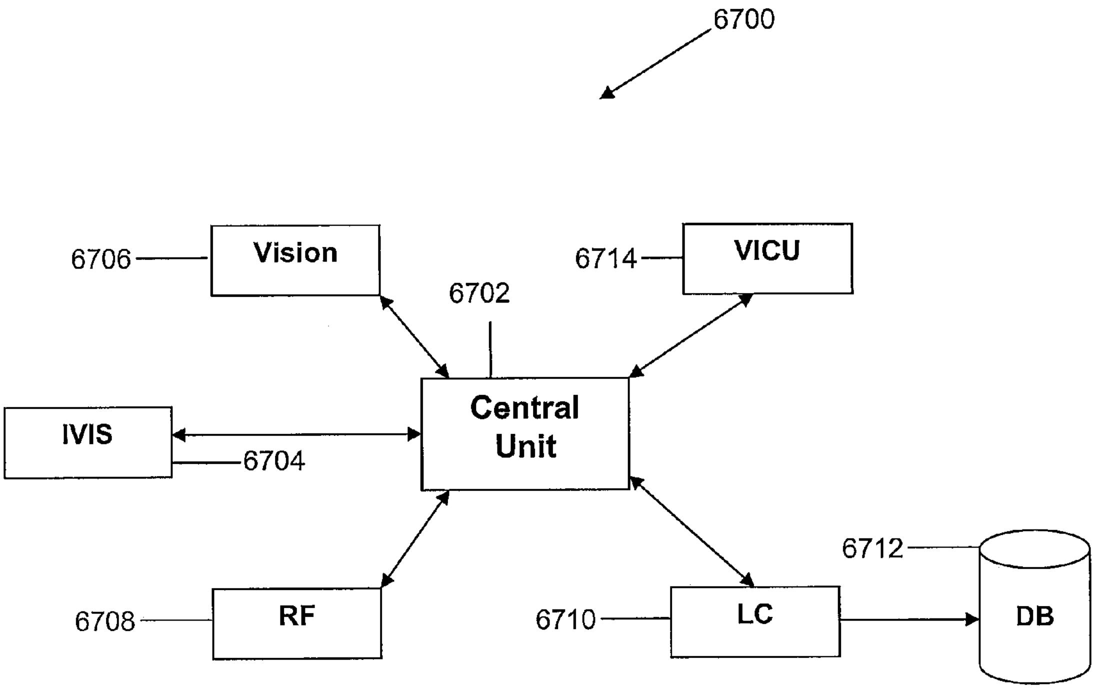
FIG. 67 illustrates components of an MVIC system according to an exemplary embodiment of the present invention.

FIG. 67 illustrates components of an multilane vehicle information capture system according to an exemplary embodiment of the present invention. MVIC system 6700 includes an multilane vehicle information capture (MVIC) central unit 6702, that acts as the central processing unit for MVIC system 6700. It is responsible for gathering information from the various subsystems 6704-6710 discussed individually below. Control unit 6702 consolidates input data received from the subsystems to make decisions about toll transactions, including a determination of a vehicle position and an associated transponder.

In the embodiment illustrated in FIG. 67, system 6700 includes IVIS 6704 that includes IVIS sensors that preferably comprise ferromagnetic induction loops. However, in other embodiments, IVIS 6704 can be replaced by any other type of vehicle sensor, such as a loop sensor, that can detect a vehicle's presence in a roadway. When a vehicle passes through an embedded roadway containing IVIS sensors, IVIS system 6704 reads many times per second (e.g., about 333 times/sec) to determine a vehicle position with respect to the sensors. IVIS system 6704 logs various types of information such as axle entry/exit times using sensors as described above, as well as axle amplitudes generated by vehicle tires on the sensors. All this information is then transmitted to MVIC unit 6702 for further processing to determine, for example, the vehicle position.

System 6700 includes VTS 6706 that collects information about a vehicle position when the vehicle passes through vision tracking sensors included in the VTS. This information is transmitted to MVIC central process unit 6702 for further processing.

System 6700 contains RF System 6708 that reads a properly mounted transponder in a side of the vehicle multiple times per second (e.g., about 90 to 300 times/sec) when the vehicle passes under an antenna located in system 6708. Typically, in tolling applications, where RF systems are used, an RF system reads only one time from a vehicle transponder and subsequently puts the transponder in a "sleep" mode to avoid cross-reads for that transponder from adjacent lanes. A cross-read occurs when a transponder is read by a system in a lane other than where the vehicle containing the transponder is traveling. RF system 6708 of the present invention differs in operation from this typical approach. Rather, system 6708 is configured to perform transponder reads as many times as possible, including cross-reads, late reads, and early reads. The latter two types of reads occur when a transponder is read after or before, respectively, a vehicle is in a proper area for conducting a "normal" RF read. The later reads are problematic for a conventional RF system, that may assign late reads to trailing vehicles, and early reads to leading vehicles, rather than the vehicle of interest. RF system 6708 passes the read data to MVIC unit 6702.

Lane Controller (LC) Unit 6710 of system 6700 is responsible for sending appropriate transactions to a database unit 6712. LC 6710 receives necessary information from MVIC central process unit 6702 for generating a unique transaction for each vehicle.

Database Unit (DB) 6712 is responsible for storing transaction information sent by lane controller 6710. Such information is used for revenue collection and audit purposes, as well as for generating reports and/statistics related to vehicle transactions.

System 6700 additionally includes VICU 6714 that is responsible for capturing vehicle images whenever a trigger source such as central process unit 6702, IVIS 6704, or another loop based triggering device (not shown) triggers a VICU camera. Exemplary operation of a VICU in a toll violation enforcement system is described above in detail. Preferably VICU 6714 contains at least one camera for capturing vehicle images, and is configured for storing the captured images with a proper file name associated with a vehicle transaction and sent by MVIC central process unit 6702. In exemplary embodiments, VICU 6714 additionally comprises a program running in a processing unit, such as program 5810 described above that contains individual image processing and exposure modules to ensure that a clear image of a violating vehicle and license plate are obtained.

In an open highway environment, VICU 6714 may be activated under one of several circumstances. For example, in an MVIC environment, certain vehicle travel lanes may be reserved for vehicles equipped with RF transponders to automatically record tolling transactions. Vehicles without transponders may be required to travel in other lanes that are equipped with conventional toll collection facilities. Therefore, a transponderless vehicle traveling in a reserved lane may be flagged as a potential violator, triggering VICU 6714 to capture vehicle images of the passing vehicle. Additionally, a vehicle equipped with a transponder that indicates insufficient funds within an account to pay a toll can be flagged as a potential violator. The vehicle information, for example, a license plate image, can then be used to assess a payment if the vehicle is registered for pay by plate, or it can be forwarded to a violation enforcement system.

In alternative embodiments, VICU 6714 is configured to remain active and can capture images of each passing vehicle. Accordingly, system 6700 can determine a time subsequent to a vehicle passing an MVIC site, that a transaction record associated with the vehicle passing the tolling site indicates the vehicle is a toll violator or needs to pay by license plate, if applicable. For example, it may be determined that an account associated with the vehicle's transponder did not authorize payment of the toll charge. System 6700 can then retrieve from VICU 6714 an image to assist in identification of the vehicle, which is then forwarded to a violation enforcement system of pay by plate collection system.

Summary of Operation of MVIC Components

RF System

Figure 68:
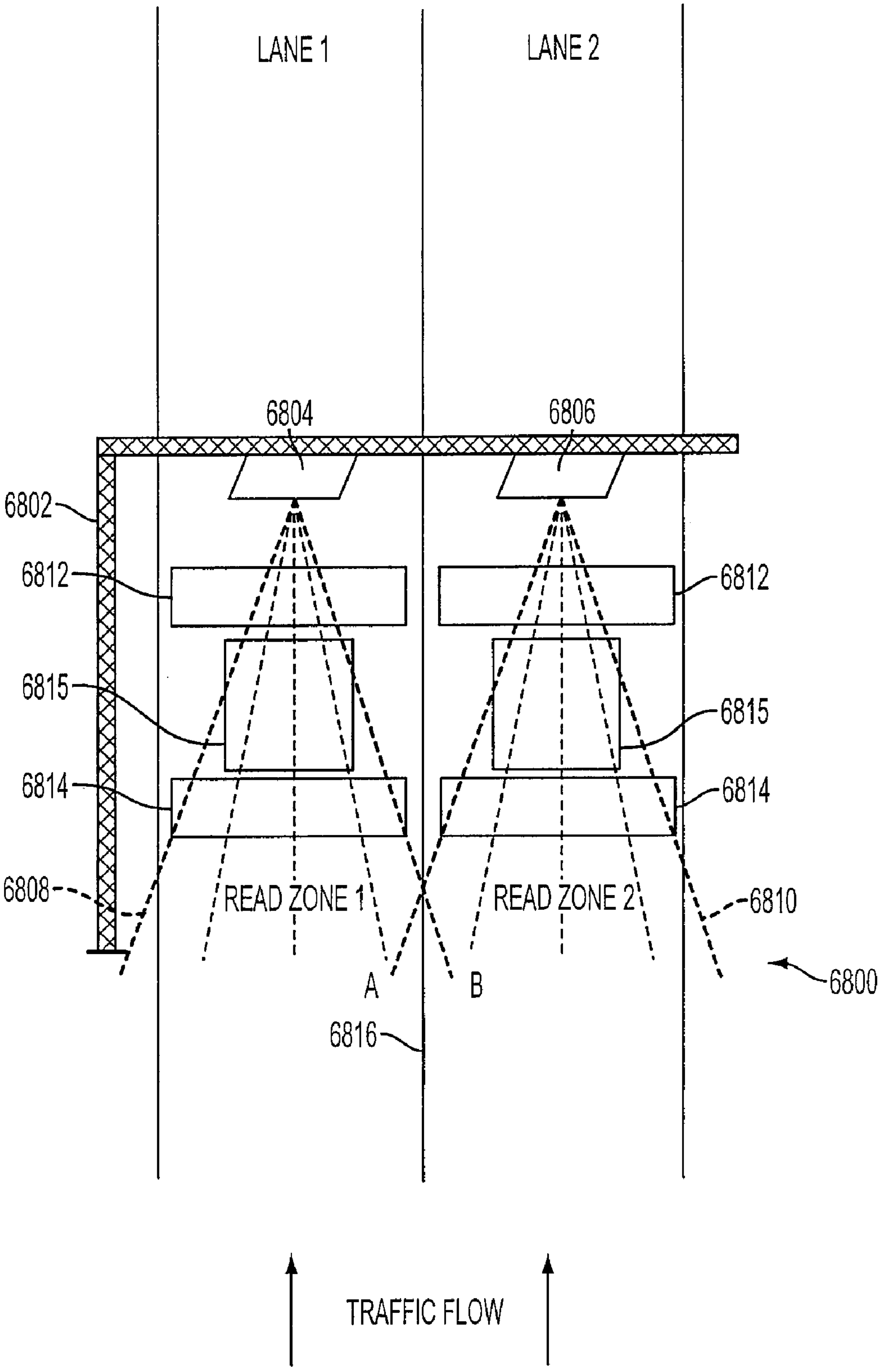
FIG. 68 depicts a relative arrangement employed for an RF read system and an IVIS system according to one embodiment of the present invention.

In embodiments of the present invention, RF system 6708 is configured to obtain multiple reads from a passing vehicle. Accordingly, as described in more detail below, problems in conventional systems, such as cross lane reads (cross-reads), advanced reads, skipped reads, or late reads are not as paramount. FIG. 68 illustrates aspects of RF system 6708 according to an exemplary embodiment of the present invention. In the example shown in FIG. 68, system 6708 comprises a gantry 6802 that is configured to overhang multiple travel lanes in a roadway. For the purposes of clarity, in this and following FIGS, embodiments of the present invention are presented with reference to two or three lane environments. However, it will be understood that system 6700 is generally applicable to operate in multilane environments, where the number of lanes can be up to 10 or more, and the number of components of subsystems 6704, 6706, 6708, 6710, and 6714 that are used to capture vehicle information and communicate with vehicles in different lanes will scale accordingly. For example, the number of gantry 6802 includes RF antenna 6804 and RF antenna 6806. Each antenna when operational creates a read zone, denoted as zones 6808 and 6810. Also illustrated in FIG. 68 are IVIS components including sensors 6812 and 6814, discussed further in the following section, and square sensors 6815. Sensors 6812 and 6814 are preferably gradient sensors. Sensors 6815 are preferably square sensors. Each read zone is constructed to read a passing vehicle with a transponder as it travels in its respective lane associated with the read zone. In addition, the read zones overlap, in a straddle region 6816 wherein a vehicle traveling in either lane may be read in both read zones, depending on the exact vehicle trajectory.

In an multilane open road environment, meaning that there are no barriers between multiple lanes, a car may travel outside of the center of a painted tolling lane. The car may cross between lanes, it may straddle lanes, or travel in the road shoulder. For example, when entering a zone for automatic tolling in an MVIC environment, it may enter the zone with vehicle placement at a 60 to 40 ratio (or 60-40) between two adjacent lanes, and subsequently cross under an RF antenna gantry used for reading a vehicle transponder at a 50-50, 70-30 or 90-10 ratio. Instead of reading the transponder one time and inducing a sleep mode, RF system 6708 provides overlay reading zones 6808 and 6810 so that the reading zones overlap in straddle region between adjacent lanes, enabling a user of the invention to ensure that an antenna read of the transponder occurs in straddle zone 6816 as well as in the center of a lane.

Preferably, RF system 6708 continuously reads the vehicle transponder as rapidly and frequently as possible. In a preferred embodiment, RF system 6708 employs multiple antennas 6804, 6806 on gantry 6802 to read a transponder of a passing vehicle, so that information from the multiple antenna reads can be used to determine where the vehicle is located. As is known, transponders vary in the rate that they can be read. Some perform as slowly as 96 times/sec while others perform as rapidly as 333 times/sec. In an exemplary embodiment, both RF read zones 6808, 6810 are roughly 10 feet long, such that, if a vehicle is traveling in the center of a lane at 60 mph, the vehicle moves at approximately one inch per millisecond. The read zone (120 inches) is thus traversed in about one tenth of a second, so that using a 333 times per second sample rate, roughly 30 reads can be performed as the vehicle traverses the read zone of a particular lane.

Using multiple reads of a passing vehicle, RF system 6708 can provide information to determine the vehicle position with respect to a given lane. For example, if a successful read count of a vehicle transponder of 20 to 30 times is obtained using an antenna associated with a first lane; and in a second, adjacent lane a read count of 5 is obtained; and in a third lane (not shown), nearby, 2 reads are obtained, the vehicle can be definitively located in the read zone associated with the first lane. In another scenario, if the vehicle straddles the first lane and second lane with a 70-30 ratio with respect to vehicle placement in the respective lanes, denoted by position A, 20 reads may be obtained in zone 6808 associated with the first lane, and 10 reads in zone 6810 associated with the second lane. Therefore, using only the information obtained from RF system 6708, system 6700 can determine that the vehicle is approximately located straddling the first and second lanes with a 70-30 ratio of vehicle placement. If, in another scenario, the vehicle were to exactly straddle the lanes at a 50-50 ratio, traveling through highway region 6816 at position B, the read zones associated with each lane would generate approximately the same number of reads. In the later scenario, depending on the exact configuration of RF read zones, the total number of reads generated for the vehicle transponder may be less than for travel through a lane center (for example, the total of successful reads may be 15 in the latter case, as opposed to 30 in the center lane case); however, the amount of reads is still sufficient to accurately locate the vehicle.

In contrast, current art using RF technology for toll tag reading was developed based on single lane applications. Efforts centered on obtaining information only from a read zone in a single lane, so that reading from an adjacent lane is eliminated, as well as early or late vehicle reads. This was compelled by the fact that the current technology used for toll tag reading is back scatter technology where a toll tag is polled and broadcasts its energy in all directions. The potential exist greatly for a tag to be read in an adjacent lane, because the RF radiation is reflected off vehicles and off different shapes at varying angles. When an RF backscatter system conducts a vehicle tag read, it broadcasts an RF signal from an antenna, which is then backscattered from the tag in every direction. So, attempts in the current art have predominantly involved focusing the RF radiation energy into a small region in the center of the lane in an effort to avoid reading in an adjacent lane. This focusing helps avoid reading in an adjacent lane that can cause a customer in the wrong lane to be treated as a violator, for example.

Another potential problem overcome by the present invention is the inadvertent charging of a vehicle that is read in two different lanes for both lanes. This might occur, for example due to cross-lane reads. This has further reinforced the practice in current technology to focus RF energy only in one lane, conduct a single read, put the RF tag to sleep, and avoid reading a car early, so that reads are not inadvertently conducted on a wrong car. Thus, a tag on a passing vehicle is read only one time allowing only one time to collect money. This technology works well in a stop-and-go or slow traffic speed, single lane environment. However, in a location where there are no barriers between multiple lanes of tolling all in one area, it becomes much more difficult to identify which vehicle paid a toll and where the read actually is located.

Another common industry practice to attempt to eliminate cross-lane reads is to use what is known as time division multiplexing. Such technology alternately turns on an antenna in a first lane to collect a toll, while turning off adjacent antennas. If the antenna generates a single read, it is identified with the car traveling in the first lane. However, the potential for cross-lane reads still exists. A car straddling lanes could avoid payment if an antenna of the wrong lane is activated, and a paying customer could be deemed a violator.

By conducting multiple reads, system 6708 provides the ability to minimize all the above-mentioned problems with the current art. A more precise location of a vehicle is generated, the possibility of mistaking one vehicle for another nearby based on a single read is reduced, and lane straddlers do not avoid payment.

IVIS System

In exemplary embodiments of the present invention, IVIS 6704 comprises vehicle detection sensors, e.g., inductive loop sensors as depicted in FIG. 68 that enable system 6700 to accurately classify vehicles, count axles, calculate speed, measure vehicle length and classify vehicle type. Preferably, collecting of information from IVIS 6704 is synchronized with RF tag reads conducted by system 6708 to further enhance the ability to identify an appropriate vehicle with an RF tag, and an appropriate vehicle that does not have an RF tag.

By synchronizing information obtained from IVIS 6704 and RF system 6708, the likelihood of failing to identify a vehicle is greatly reduced. For example, using RF reading to count the number of tag reads and determining the entry point of a vehicle at an IVIS sensor, the entry time of a vehicle into an RF read zone can be calculated, so that the time when tag reads should begin and end can be accurately determined, if the vehicle has an RF tag. As described above, an IVIS system based on ferromagnetic loop sensors containing, among others, gradient sensors, can accurately determine the spacing between two axles of a vehicle. In a majority of vehicles, an RF tag is located in the front one-third of that spacing between the axles. By knowing where the RF read zone is located on the earth compared to the RF read antenna, one can then determine the approximate time that the tag reads should start and stop, as discussed further below.

Use of RF system 6708 in conjunction with IVIS system 6704 provides further advantages in identifying a vehicle in an open road multilane environment. By knowing when a vehicle transponder should enter RF read zone 6808, for example, using IVIS gradient sensor 6814, and conducting continuous reads (continuously sampling) of the RF transponder during the time when the vehicle is read zone 6808, accurate marrying of IVIS data and RF data generated by the passing vehicle assures that a correct identification is made. This also increases the likelihood of identifying vehicles that do not have an RF tag since the system can determine if no RF reads are successful during the time in which the vehicle should be in the RF read zone.

In preferred embodiments, MVIC system central processor unit 6702 gathers all information sent by the subsystems including IVIS 6704, VTS 6706, and RF system 6708. The vehicle position can be partially determined based on the vehicle and/or vehicle axle entry/exit times on IVIS gradient sensors. IVIS 6704 is also capable of calculating a speed of the vehicle based on the entry/exit times of a vehicle and/or vehicle axle on the gradient sensors. IVIS 6704 can use this speed to calculate the axle spacing of the vehicle. All this information is subsequently sent to MVIC central process unit 6702.

MVIC central process unit 6702 also receives transponder data from RF system 6708. As further depicted in FIG. 68, RF antennas 6804 and 6806 are laid out in such way that each RF read zone for a vehicle transponder of a vehicle traveling in a given lane matches closely the position of a respective IVIS sensor layout. Preferably, the MVIC system of the present invention adjusts an RF antenna's angle to cover about 80% of the roadway region that is covered by a respective IVIS sensor layout, providing for optimum synchronization of IVIS sensor data with RF sensor data. This synchronization is important because MVIC-RF system 6708 of the invention allows cross/early/late reads of the transponder.

Figure 69:
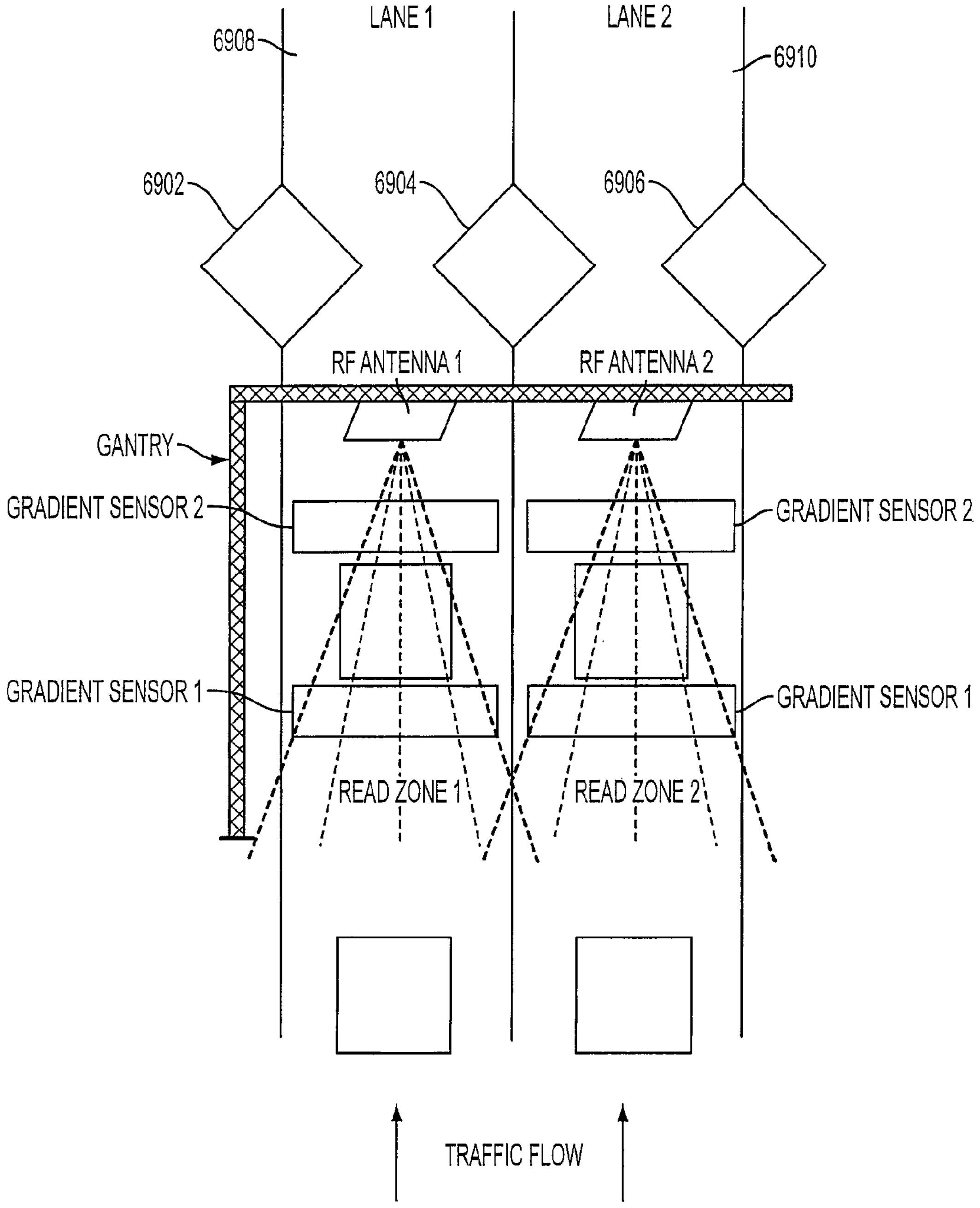
FIG. 69 depicts additional sensors used in an IVIS system according to an exemplary embodiment of the present invention.

In an exemplary embodiment of the present invention depicted in FIG. 69, an additional set of lane straddling sensors 6902, 6904, 6906 are added to IVIS system 6700. These lane straddling sensors may be configured to be part of IVIS 6704. Lane straddling sensors of the invention, such as sensors 6902, 6904, 6906 can have one of a number of shapes including square, circular, oval, rectangular, and other shapes. Preferably lane straddling sensors are configured as "diamond" sensors, that is, they assume a diamond shape as viewed in the direction of travel. Lane straddling sensors 6902, 6904, 6906 provide advantages over conventional loop configurations in determining vehicle position. In conventional inductive loop technology; if a sensor is placed in a normal manner in a roadway, a field of the sensor for a 6 by 6 (or 6×6) size, extends approximately 3 feet outside the sensor. The present inventors have determined that for fields of inductance, the diameter of the field is reduced at corners of a loop. Therefore, by turning a square loop about 45 degrees to the roadway travel direction, and placing the loop at positions that straddle the border between lanes and other lanes or shoulders, a vehicle position can be more accurately determined. For example, if a vehicle is going through the center of lane 6908, lane straddling sensors 6902, 6904 will be activated at approximately the same time. If the vehicle is straddling between lanes 6908 and 6910, only lane straddling sensor 6904 will be activated at one time.

In exemplary embodiments of the present invention, system 6700 collects information including activation information obtained from lane straddling sensors, vehicle axle spacing, arrival time and departure time of the vehicle and/or vehicle axles in each lane, speed of the vehicle, and length of the vehicle all obtained from other sensors of IVIS system 6704, so that the information can be compared to determine the status of multiple vehicles occupying adjacent lanes.

For example, if RF data collected based on the amount of RF reads in adjacent lanes indicates a first vehicle is a straddler, and IVIS lane straddling diamond sensors indicate the vehicle is a straddler, and additional data such as vehicle speed, arrival and departure information, and axle spacing indicate it is a straddler, then system 6700 can determine which of a plurality of cameras of VICU 6714 to employ to record a car that did not pay by RF tag, and which of multiple vehicles in close proximity to appropriately allocate the payment of a toll. In exemplary embodiments, either RF tracking system 6708 or IVIS 6704 can be solely used to identify a straddler with a high degree of accuracy. But in a preferred embodiments, by concurrent use of any combination of RF tracking system 6708, IVIS 6704, as well as Vision tracking system 6706, MVIC system 6700 performs more accurately as a multilane vehicle identification system.

In the following sections, operation of an MVIC system according to exemplary embodiments of the present invention is discussed in further detail.

Figure 70:
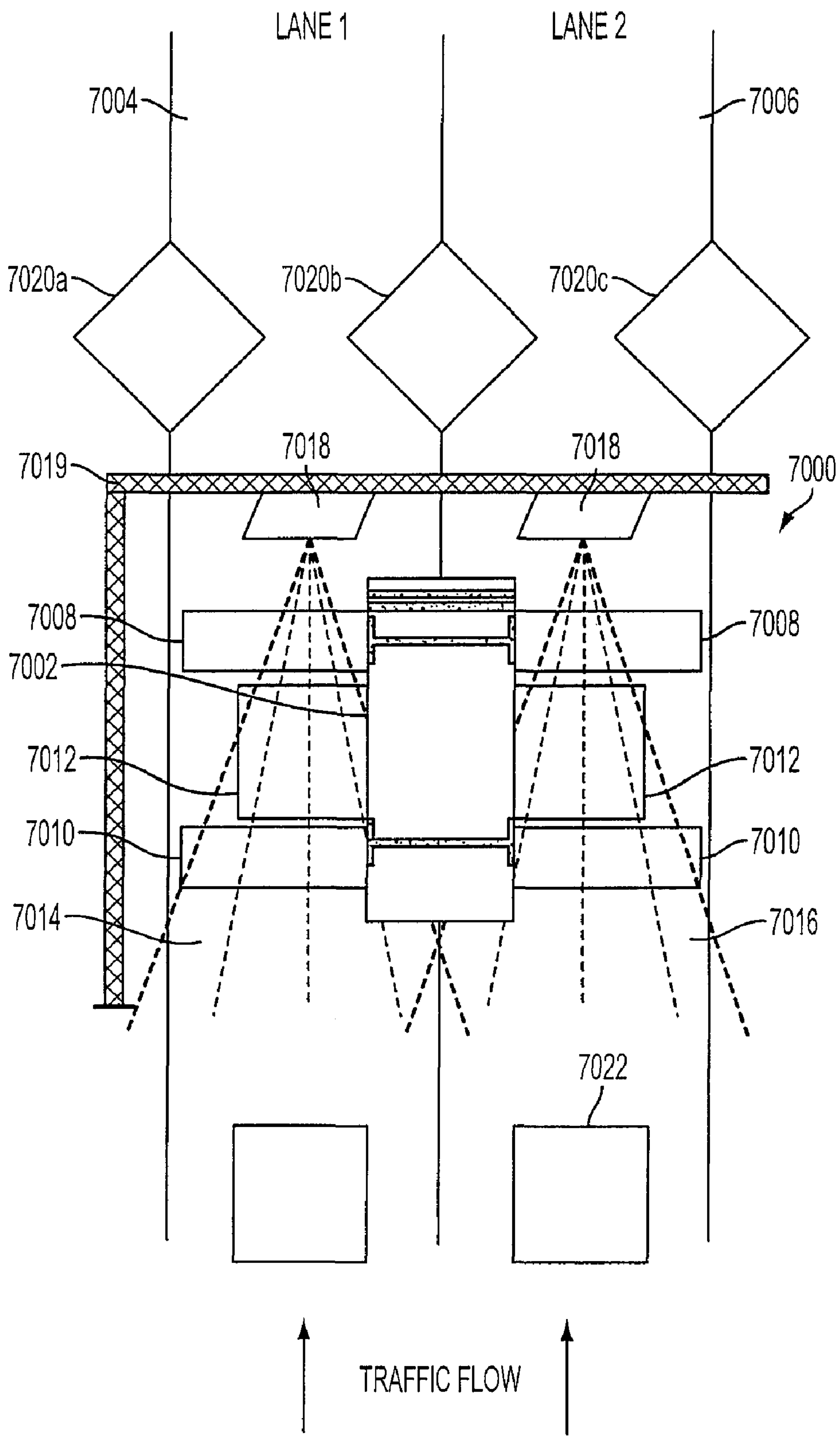
FIG. 70 depicts a scenario in which an MVIC arrangement of the present invention is used to detect a vehicle that straddles two travel lanes.

FIG. 70 depicts a situation in which MVIC arrangement 7000 is used to detect vehicle 7002 that straddles two travel lanes 7004, 7006, according to an exemplary embodiment of the present invention. Vehicle 7002 straddles equally adjacent lanes 7004, 7006 while located over sensors 7008, 7010, and 7012, each located in both lanes depicted. Vehicle 7002 also is located within RF read zones 7014, 7016 of lanes 1 and 2, respectively. Referring again to FIG. 67, tolling arrangement 7000 can be included, for example, as part of MVIC 6700, such that information is transmitted to MVIC unit 6702 when vehicle 7002 passes through arrangement 7000. In the scenario depicted in FIG. 70, vehicle 7002 may have entered arrangement 7000 entirely in lane 7004 or 7006, or partially straddling the two lanes.

Figure 71:
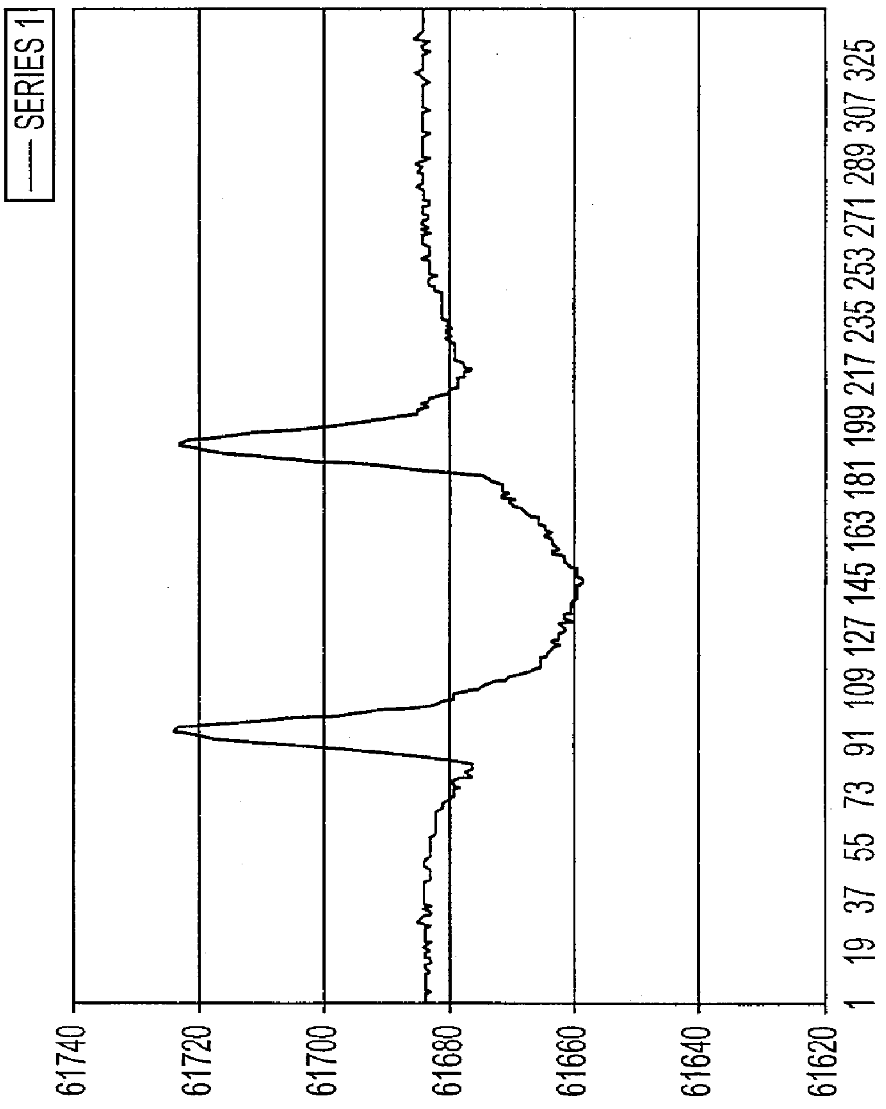
FIG. 71 displays a typical frequency is time plot for a two axle vehicle, taken by a gradient sensor arranged according to an embodiment of the present invention.

As vehicle 7002 travels through arrangement 7000, MVIC unit 6702 receives vehicle information from IVIS sensors 7008, 7010, 7012 as well as RF read zones 7014, 7016. Vehicle information such as vehicle speed, axle spacings, axle amplitudes and entry/exit times of the vehicle axles on sensors 7008, 7010 of both the lanes are forwarded to unit 6702. FIG. 71 displays a typical gradient sensor result showing frequency vs time for a two axle vehicle, illustrating the appearance of two peaks corresponding to individual axles, as discussed in detail above.

MVIC central process unit 6702 also receives RF data for the vehicle (if a transponder exists in the vehicle) from RF (AVI) system 6708, using antennas 7018 over respective lanes 7004,7006. Gantry 7019 is configured to contain a plurality of an antennas. Preferably, the location of antennas 7018 on gantry 7019 is such that an antenna is placed over each travel lane. Preferably antennas 7018 in both lanes 7004, 7006 try to read the same vehicle transponder (not shown) as many times as possible, and forward the read information to MVIC unit 6702. MVIC central process unit 6702 consolidates all these data to make an accurate determination of the position of vehicle 7002.

MVIC central process unit 6702 also receives data from diamond-shaped lane straddling sensors 7020*a*, 7020*b*, 7020*c* that are positioned to straddle their respective lanes, as depicted in FIG. 70. Information received from the latter sensors is used to make a final decision on the vehicle position with respect to lanes, as described further below.

Figure 72:
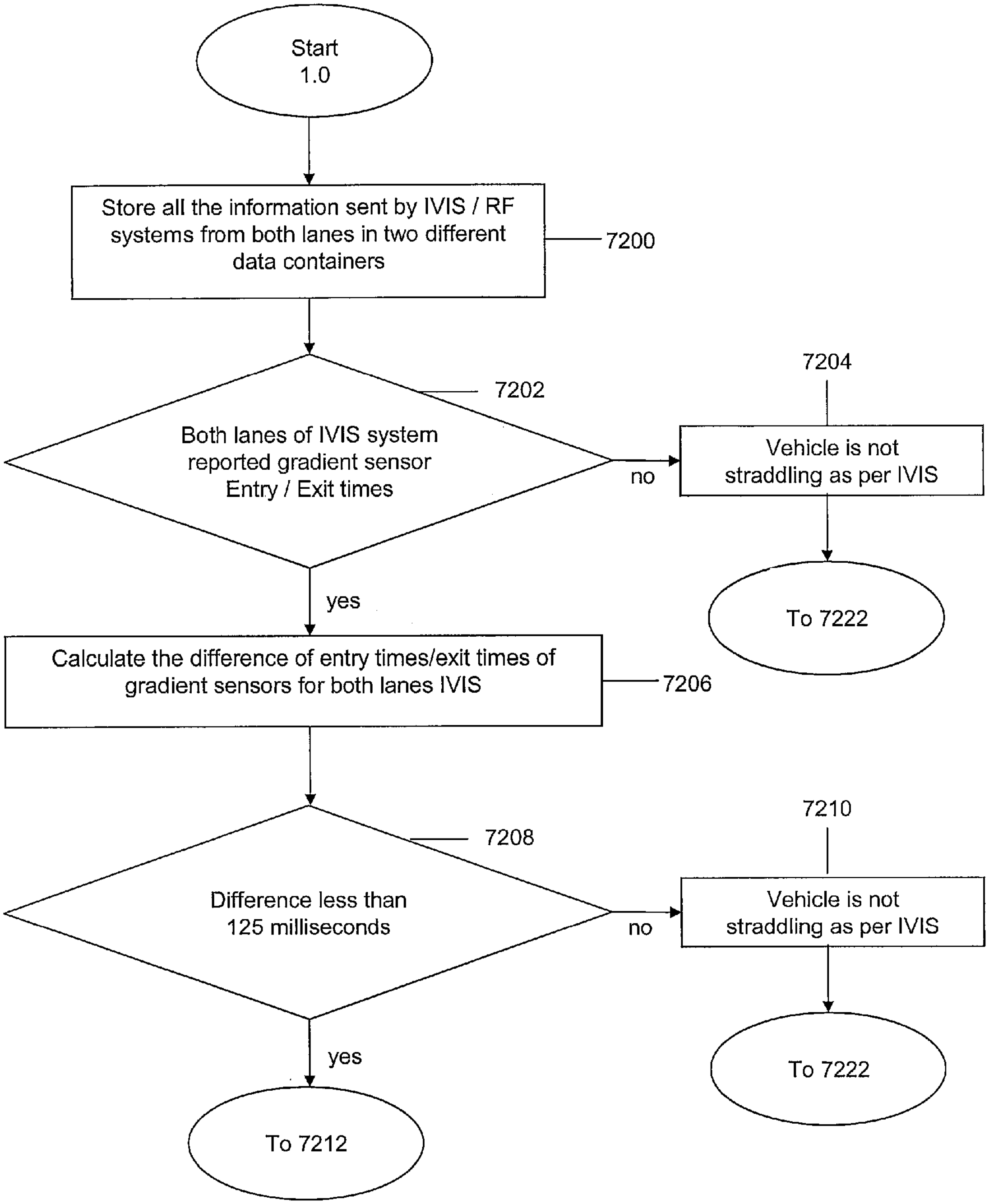
FIG. 72 illustrates exemplary steps involved in a method for determining a vehicle position using IVIS and RF data, according to an exemplary embodiment of the present invention.
Figure 72:
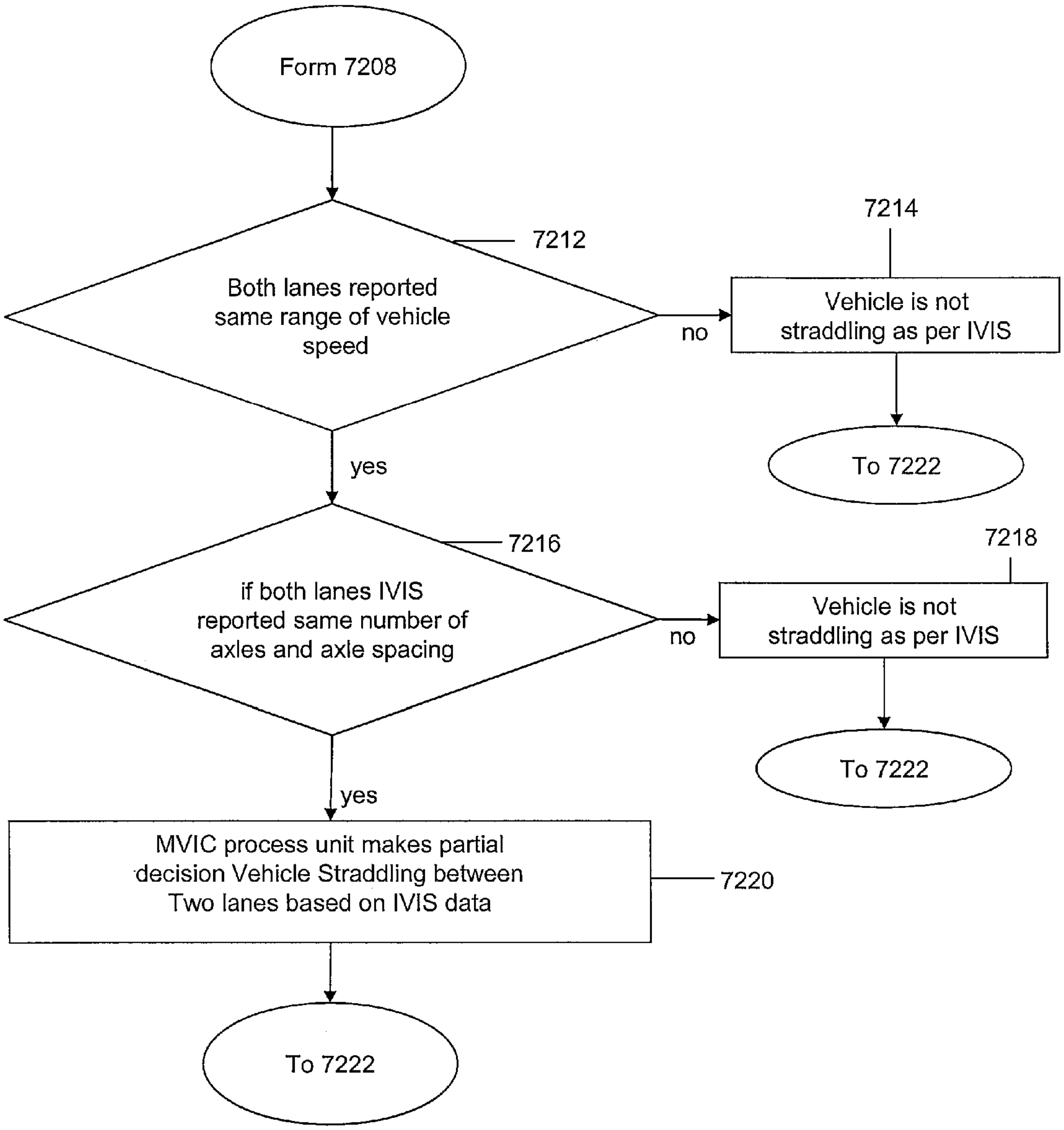
Figure 72:
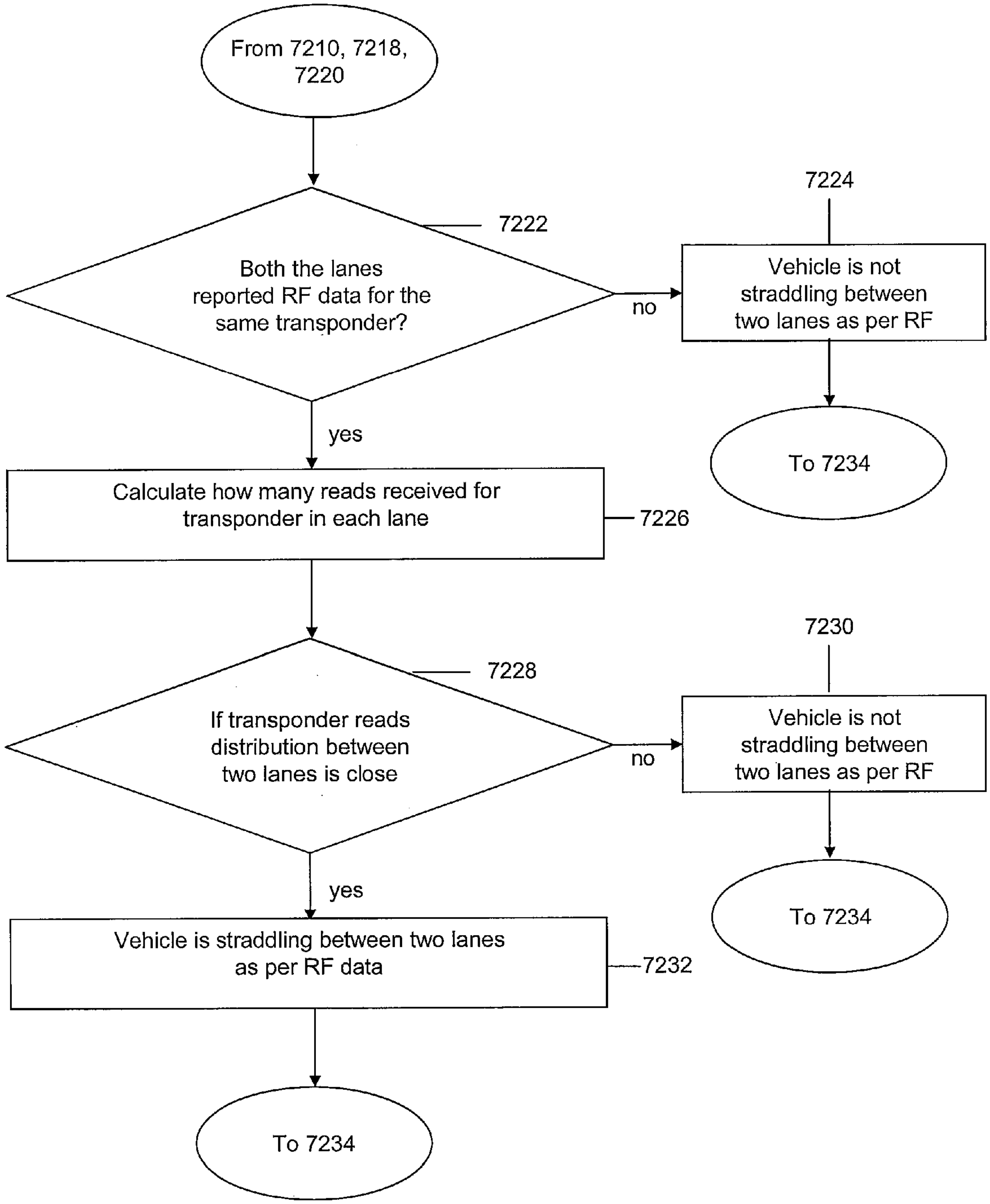
Figure 72:
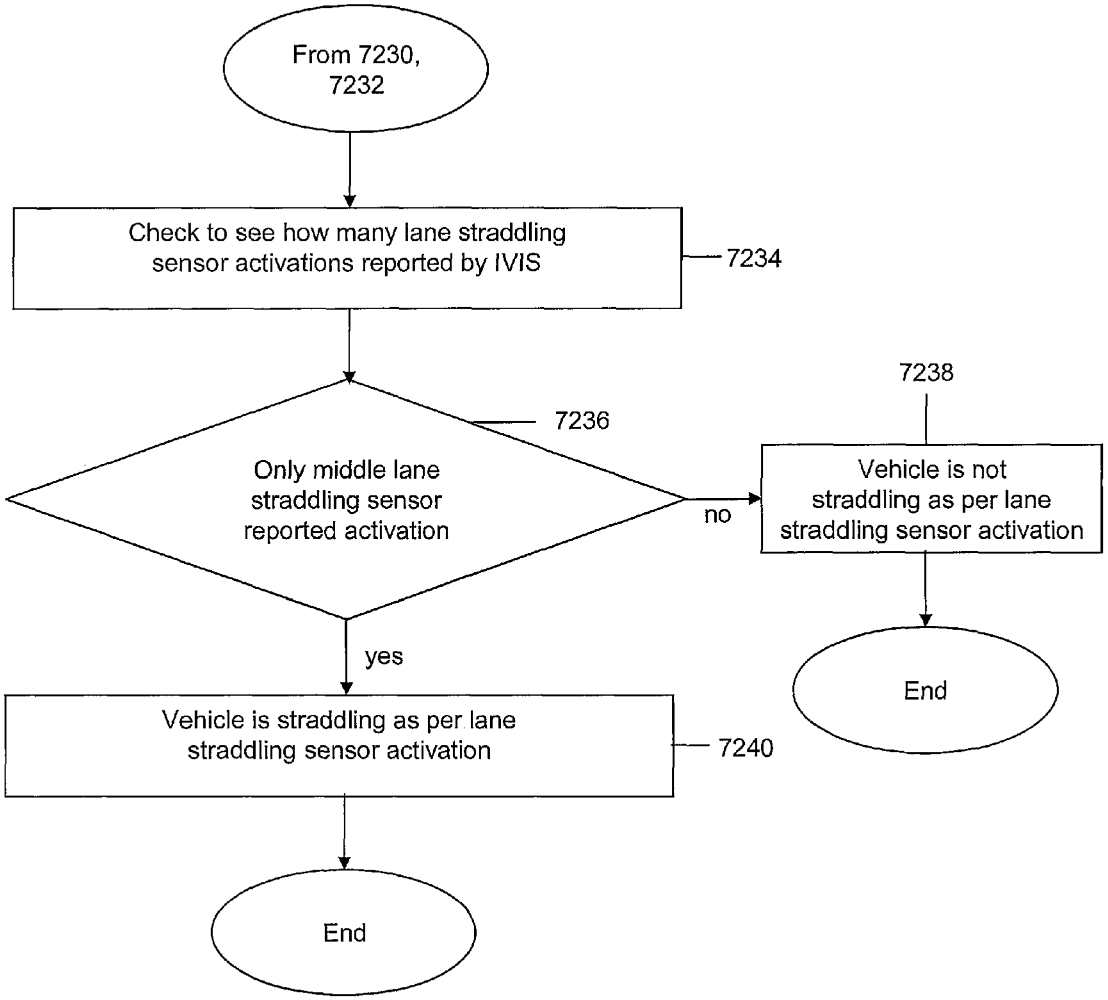

FIG. 72 illustrates steps in a method for determining a vehicle position using IVIS and RF data, according to an exemplary embodiment of the present invention. In step 7200, information received from IVIS 6704 and RF 6708 systems is stored in two different databases. For example, as vehicle 7002 travels through arrangement 7000, both IVIS and AVI systems, as well as lane straddling sensors 7020*a*, 7020*b*, 7020*c* can detect the vehicle position. The information received preferably includes data collected from respective inductive loop arrays and RF read zones in each of lanes 7004, 7006.

At step 7202, if central process unit 6702 determines that vehicle entry/exit times are not reported from sensors 7008, 7010 of both travel lanes, then the process moves to step 7204, where unit 6702 makes a tentative decision that vehicle 7002 is not straddling as per determination by IVIS 6704. The process then moves to step 7222.

If entry/exit times are reported by sensors 7008, 7010 in both lanes, then the process moves to step 7206, where a difference in entry/exit times between that recorded for lane 7004 and 7006 is calculated. This time difference is then used to assess whether the data likely reflects detection of one vehicle or two vehicles. For example, at a highway speed of 60 mph, a vehicle may traverse an average car length of 15 feet in about 125-150 milliseconds. Therefore, if IVIS arrays in neighboring lanes report differences in vehicle entry times that are less than the calculated time to travel such a distance, it can be assumed that the recorded times are from the same vehicle, since two vehicles cannot occupy the same space at the same time. If a value of entry time discrepancy greater than such a calculated value is recorded, it increases the likelihood that two vehicles are present.

In step 7208, in the embodiment shown, if central process unit 6702 determines that vehicle entry/exit times reported from adjacent lanes are greater than 125 milliseconds, the process moves to step 7210 where a tentative decision is made that the data received comes from two vehicles, and vehicle 7002 is not lane straddling. The process then moves to step 7222. If a difference in entry times less than 125 milliseconds is reported, the process moves to step 7212.

In step 7212, if central process unit 6702 determines that data collected from IVIS sensors in both lanes does not correspond to a same range of vehicle speed, the process moves to step 7214, where a tentative decision is made that vehicle 7002 is not lane straddling. The process then moves to step 7222. If a same range of vehicle speed is reported form IVIS sensor data of both lanes, then the process moves to step 7216.

In step 7216, if central process unit 6702 determines that the number of vehicle axles and axle spacing recorded from IVIS data reported from both lanes does not agree, then the process moves to step 7218, where a tentative decision is made that vehicle 7002 is not lane straddling. The process then moves to step 7222. If axle number and axle spacing data collected from IVIS sensors in both lanes agrees, then the process moves to step 7220 where central process unit 6702 makes a partial decision that vehicle 7002 is lane straddling according to IVIS data.

In step 7222, central process unit 6702 retrieves RF data reported from a transponder on vehicle 7002. If central process unit 6702 determines that RF data corresponding to vehicle 7002 is not reported from both RF read zones the process moves to step 7224, where a tentative decision is made that vehicle 7002 is not lane straddling. The process then moves to step 7234. If central process unit 6702 determines that RF data corresponding to vehicle 7002 is reported from both RF read zones the process moves to step 7226.

In step 7226, unit 6702 calculates the number of RF reads obtained from each RF read zone 7014, 7016.

In step 7228, if central process unit 6702 determines that the number of RF reads received from read zone 7014 differs widely from that received from zone 7016, the process moves to step 7230. In step 7230 a tentative decision that vehicle lane straddling by vehicle 7002 did not occur is made. The process then moves to step 7234.

If central process unit 6702 determines that the number of reported transponder reads in zone 7214 is close to the corresponding number in zone 7216, the process moves to step 7232. Because the number of reported reads in neighboring lanes is close, it is determined that vehicle 7002 is lane straddling as determined by system 6708. The process then moves to step 7234.

Figure 73:
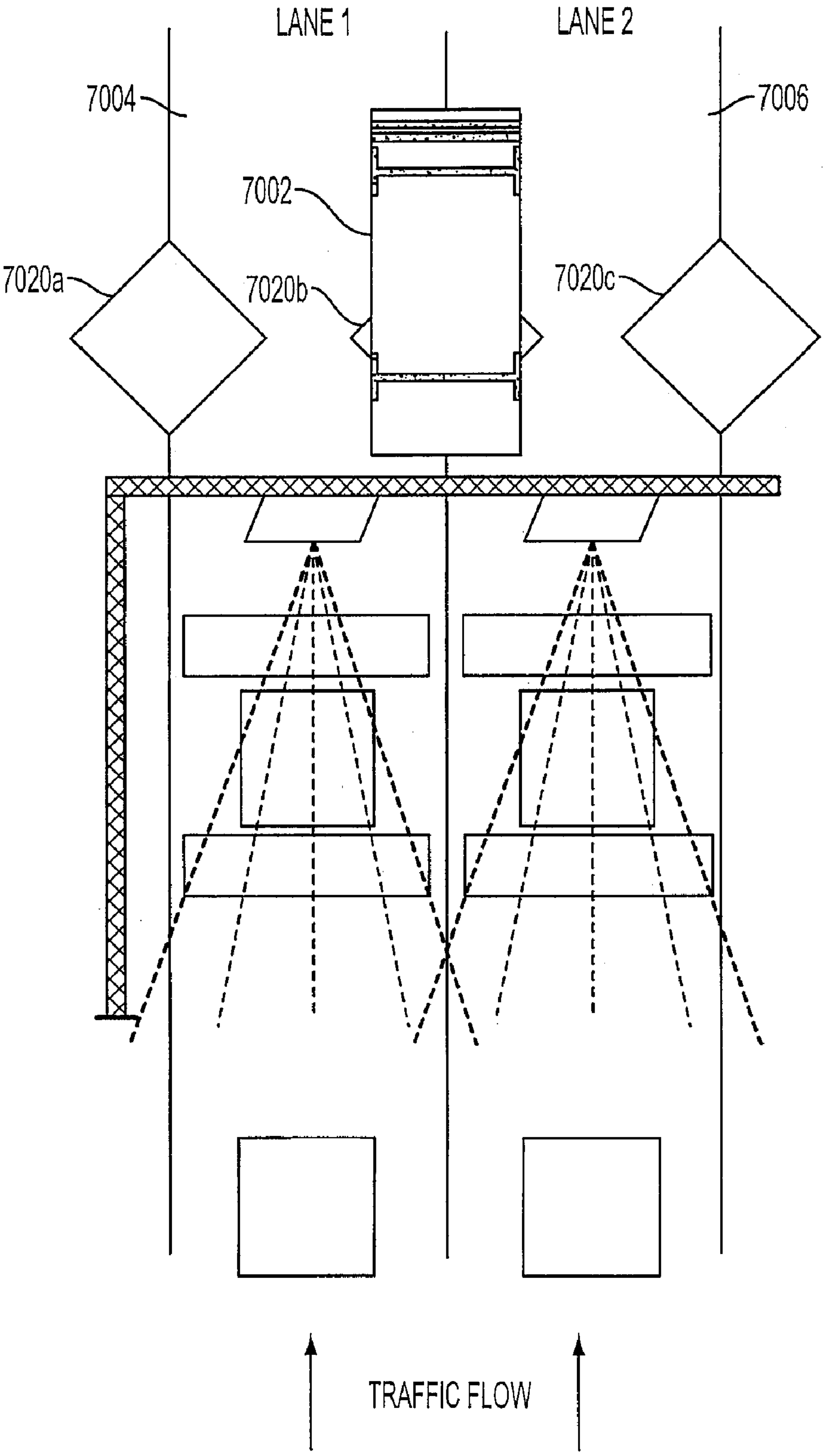
FIG. 73 depicts a scenario where a vehicle passes lane straddling sensors arranged according to another embodiment of the present invention.

Referring now to FIG. 73, at a point of time subsequent to that depicted in FIG. 70, vehicle 7002 passes through a roadway region containing lane straddling sensors 7020*a*, 7020*b*, 7020*c*. The presence of vehicle 7002 is detected by at least one lane straddling sensor and forwarded to MVIC central processing unit 6702. In a preferred embodiment of the present invention, the size of lane straddling sensors 7020*a*, 7020*b*, 7020*c* is such that at least one sensor is always activated when a vehicle traveling in a highway lane of width in the normal range for highways passes by the lane straddling sensors. Preferably, a width of lane straddling sensors is about 6 feet as described above. As also discussed previously, a lane straddling sensor having a diamond shape minimizes the possibility of cross talk between two adjacent lane straddling diamond-shaped sensors, as opposed to square or rectangular shaped sensors.

As evident from FIG. 73, lane straddling sensors 7020*a*, 7020*b*, 7020*c* are laid along lane borders in such a way that vehicle 7002 activates a different number of lane straddling sensors depending on its exact position within a lane or lanes. In the case illustrated in FIG. 73, where vehicle 7002 is straddling equally between two lanes 7004, 7006, only middle lane straddling sensor 7020*b*, that also straddles the two lanes, is activated.

Referring again to FIG. 72, at step 7234, central process unit 6702 retrieves data reported from lane straddling sensors 7020*a*, 7020*b*, 7020*c*. Unit 6702 checks to see how many of the sensors were activated at the time vehicle 7002 passed arrangement 7000.

In step 7236, if it is determined that activation occurred from other sensors in addition to middle sensor 7020*b*, then the process moves to step 7238 where a determination is made that vehicle 7002 was not straddling lanes. If only sensor 7020*b* reported activation, then the process move to step 7240 where vehicle 7002 is tentatively deemed to be straddling lanes 7004, 7006 based on lane straddling sensor data. Based on the above approach, the MVIC system makes a final determination as to whether vehicle straddling has occurred. Depending on the agreement or lack of agreement between the tentative determinations of straddling from data received from "subsystems" (the subsystems comprise in the case of FIG. 72: 1. IVIS sensors 7008, 7010, 7012; 2. RF AVI antennas 7018, and; 3. IVIS lane straddling sensors 7020*a*, 7020*b*, and 7020*c*), the final determination can be more or less certain. For example, if data from all subsystems is in agreement, then a firm final determination of straddling or not straddling is made with a very high confidence level.

Figure 74:
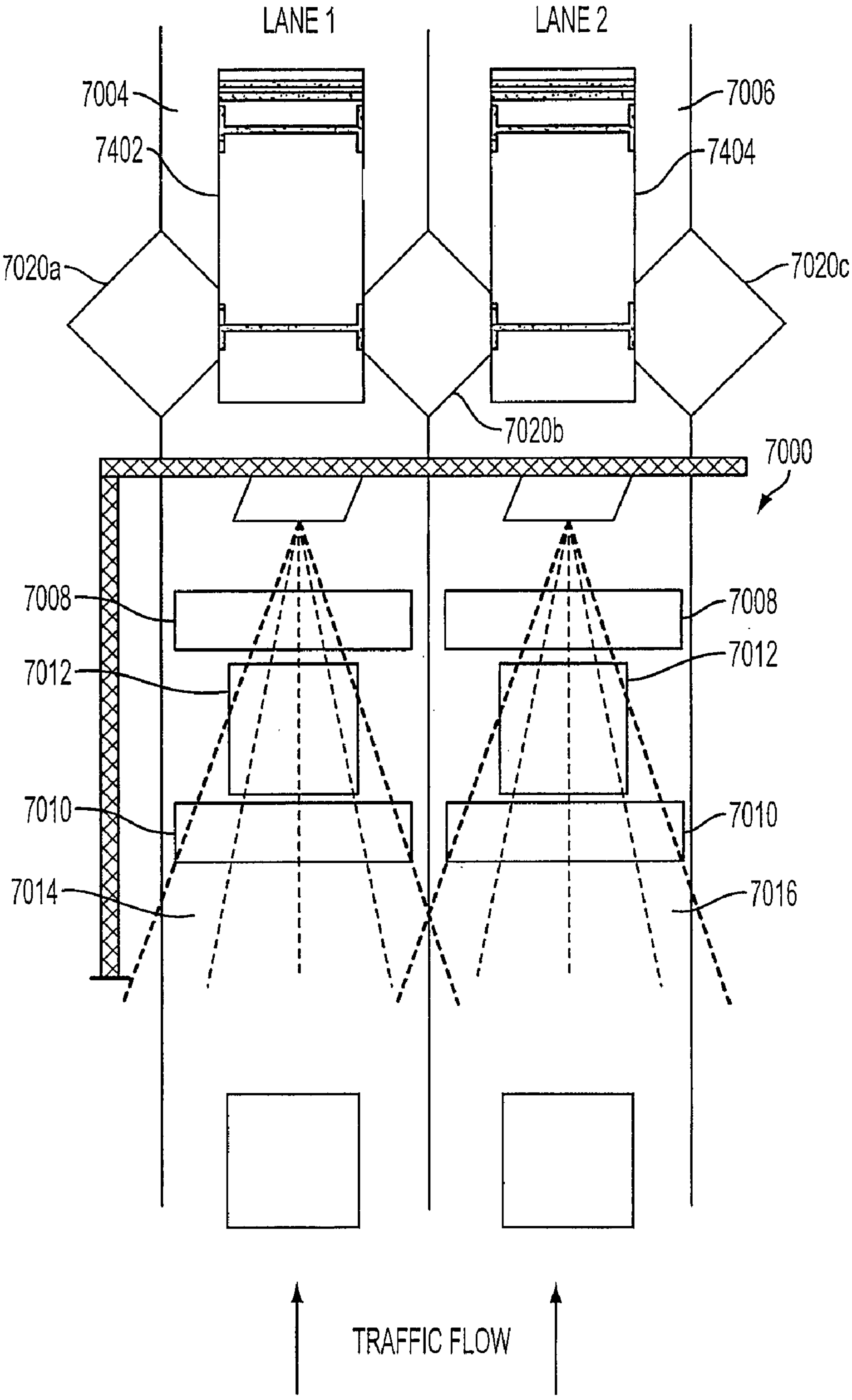
FIG. 74 illustrates a scenario in which two vehicles in two adjacent lanes pass through an MVIC arrangement of the present invention at the same time.

FIG. 74 illustrates a scenario in which two vehicles 7402, 7404 pass through arrangement 7000 in two adjacent lanes 7004, 7006, respectively, at the same time. In the scenario illustrated, arrangement 7000 first senses the vehicles' presence using RF read zones 7014, 7016 and IVIS sensors 7008, 7010, 7012. At the instant illustrated in FIG. 74, the two vehicles are side-by-side and passing through respective regions of lanes 7004, 7006 containing lane straddling sensors 7020*a*, 7020*b*, 7020*c*. Vehicles 7402 and 7404 are located entirely within their respective lanes, 7004 and 7006. In this case, vehicle 7402 activates lane straddling sensors 7020*a* and 7020*b*, while vehicle 7404 activates lane straddling sensors 7020*b* and 7020*c*. Thus, unit 6702 determines that all three lane straddling sensors illustrated are activated. Based on the fact that a normal-size vehicle width is less than a lane width, unit 6702 knows that one vehicle can activate at most two lane straddling sensors. Accordingly, system 6700 determines that more than one vehicle are present at the same time in arrangement 7000.

Figure 75:
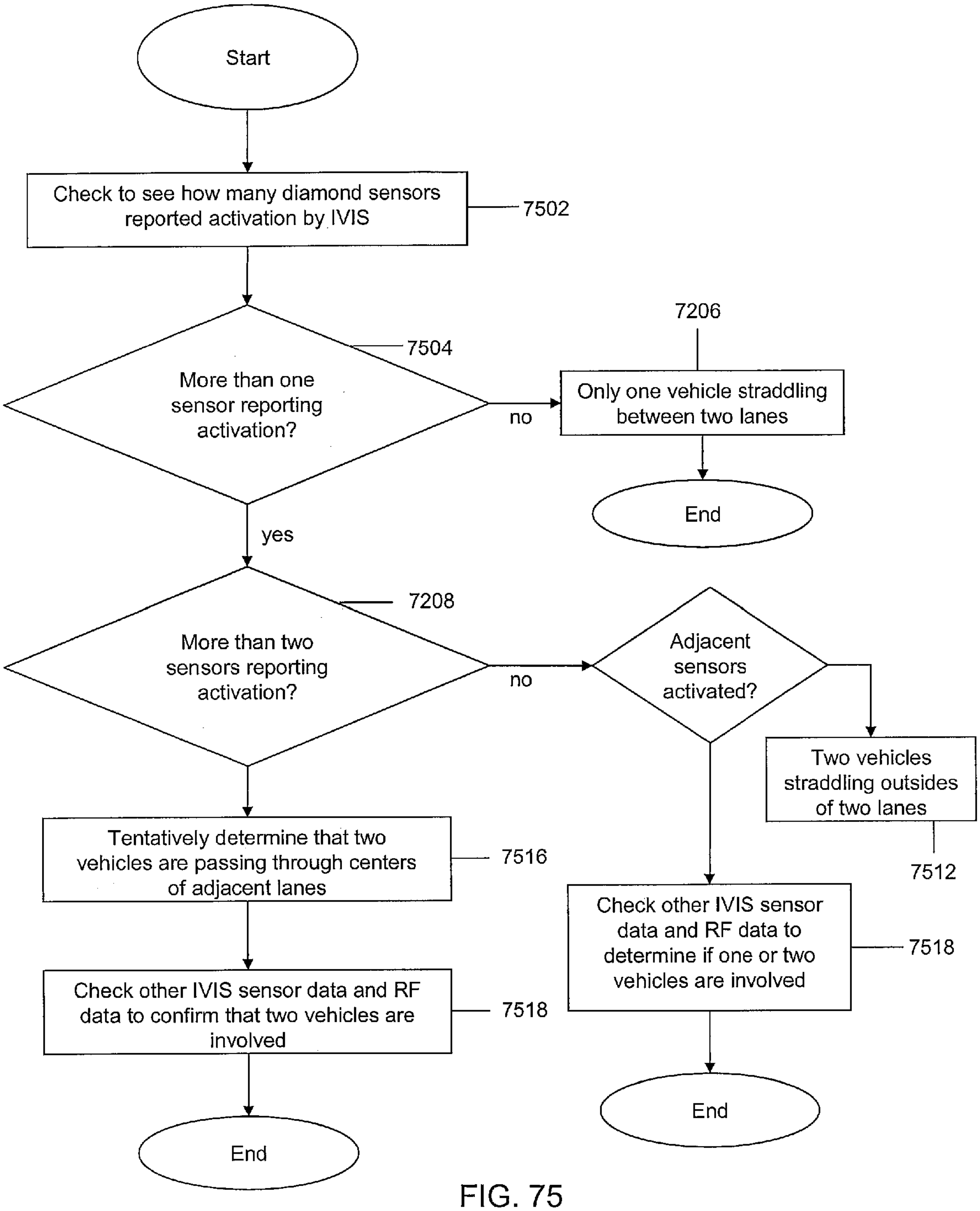
FIG. 75 illustrates exemplary steps involved in a method for determining the simultaneous presence of more than one vehicle in an MVIC area using lane straddling sensors, according to an exemplary embodiment of the present invention.

FIG. 75 illustrates exemplary steps employed in a method for determining the simultaneous presence of more than one vehicle in an MVIC area using lane straddling sensors, according to an exemplary embodiment of the present invention. In step 7502, central process unit 6702 checks to determine how many lane straddling sensors in two contiguous lanes have been activated. Preferably, the lane straddling sensors are diamond shaped.

In step 7504, central process unit 6702 determines if more than one sensor reports activation. If not, the process moves to step 7506 where a determination that only one vehicle is present and is straddling lanes, as illustrated for vehicle 7302 in FIG. 73. If more than one sensor reports activation, the process moves to step 7508.

In step 7508 central process unit 6702 determines if more than two sensors report activation. If not, the process moves to step 7510.

Figure 76:
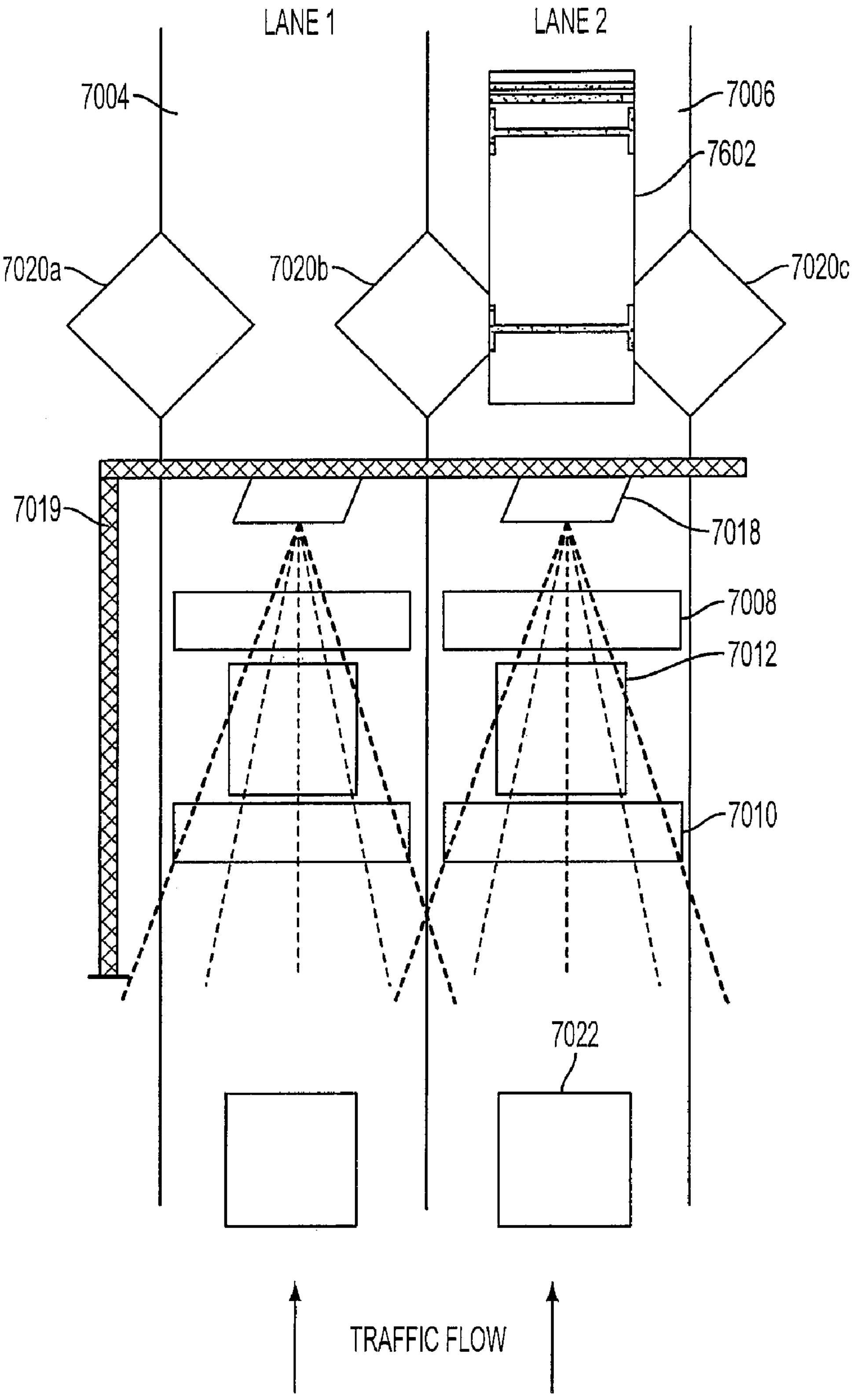
FIG. 76 illustrates a scenario in which two lane straddling sensors of the present invention are activated when a vehicle travels entirely within a single travel lane.

In the steps to follow, three different scenarios where only two sensors are activated can be distinguished. In a first scenario illustrated in FIG. 76, vehicle 7602 travels entirely within lane 7006 and activates two sensors, 7020*b* and 7020*c*. In a second scenario illustrated in FIG. 77, vehicles 7702 and 7704 each travel directly over only one lane straddling sensor, 7020*a* and 7020*c* respectively, such that only two lane straddling sensors in total are activated. A third set of scenarios in which two cars traveling through adjacent lanes that only trigger two lane straddling sensors to activate include the scenario of FIG. 78, in which vehicles 7802 and 7804 travel directly over adjacent sensors 7020*b*, 7020*c*, respectively. Similarly, if instead of over 7020*c*, vehicle 7804 were placed over sensor 7020*a*, only two sensors would activate.

Figure 77:
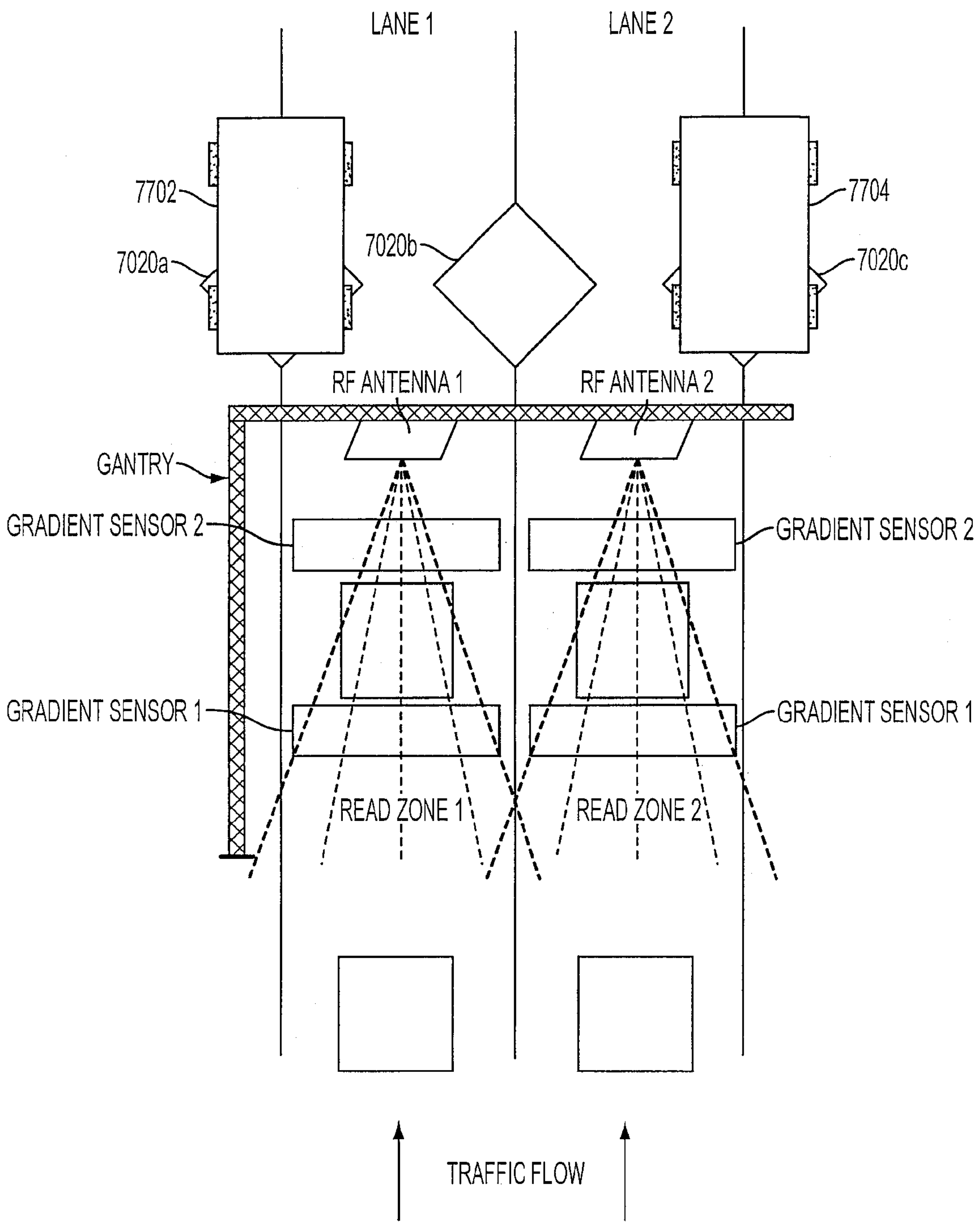
FIG. 77 illustrates a scenario in which two lane straddling sensors of the present invention are activated when two vehicles each travel directly over one sensor.
Figure 78:
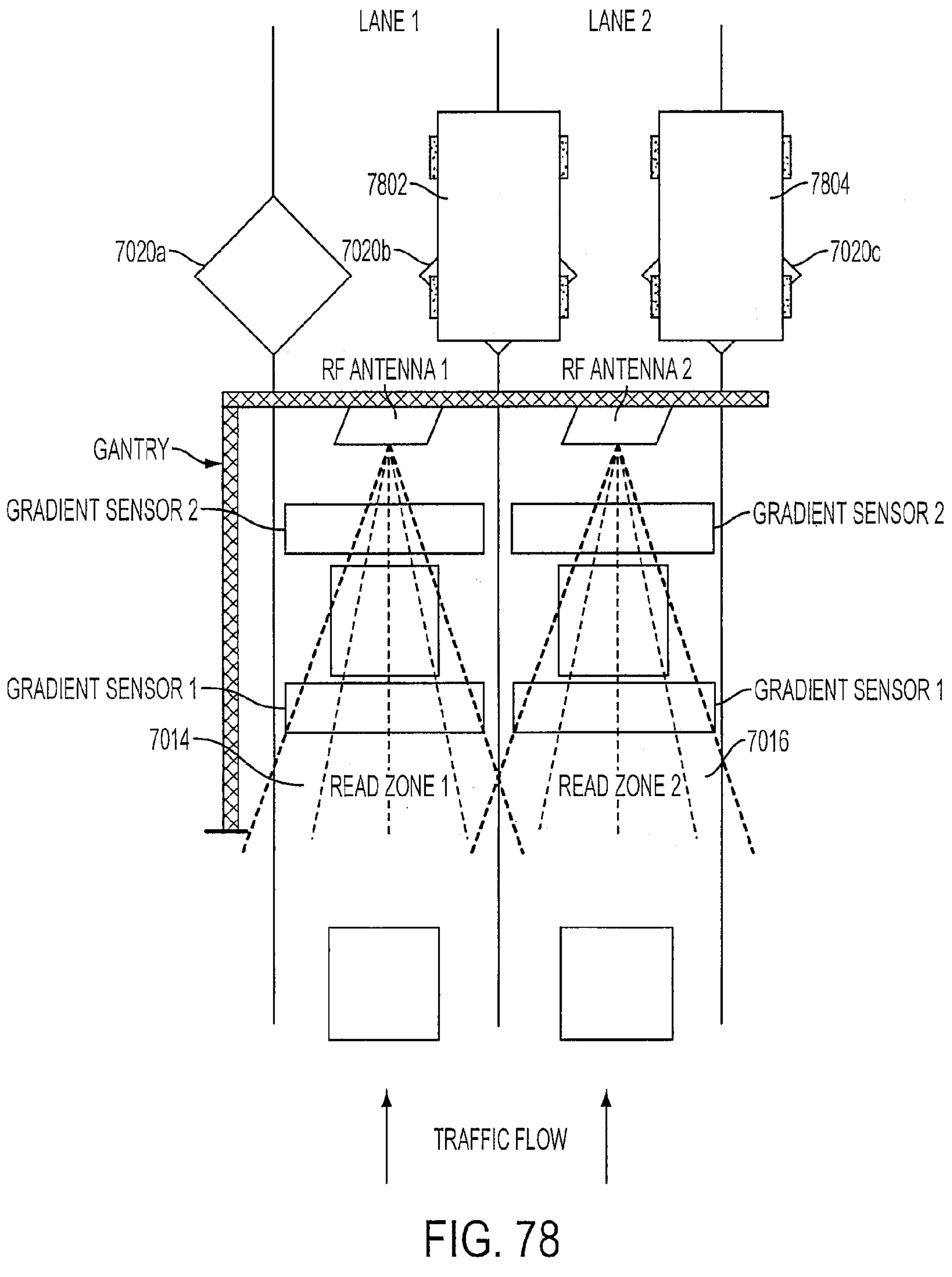
FIG. 78 illustrates a scenario in which two cars traveling through adjacent lanes that only trigger two lane straddling sensors to activate.

In step 7510, central process unit 6702 determines whether the two sensors activated are adjacent. If not, then the process moves to step 7512 where it is determined that two vehicles are present and each is straddling a lane, as illustrated in FIG. 77.

If adjacent sensors area activated, then the process moves to step 7514. In step 7514, unit 6702 checks other IVIS sensor data and RF data reported for the same transaction or time period from arrangement 7000. Using the other IVIS sensor and RF data, a determination is made as to whether the two adjacent lane straddling activation reports represent a single vehicle traveling entirely within a lane, as in FIG. 76, or two vehicles as in FIG. 78. The scenario involving two adjacent lane-straddling vehicles passing over the lane straddling sensors also implies the vehicles likely were adjacent while in RF read zones 7014, 7016. Accordingly, as discussed above, unit 6702 can determine based on a distribution of RF read counts for a given vehicle transponder that the scenario of two lane straddling is present, rather than a single vehicle in the center of a single lane. The latter scenario would produce as single more narrow peak in RF read counts representing the region in a lane or lanes through which the vehicle traveled; while the former scenario would produce a broader peak or even two separate peaks in RF read counts over a group of lanes, representing the positions of two distinct vehicles. Additionally, the total amount of successful RF reads over a group of nearby lanes would be higher in the case of two adjacent vehicles.

If three lane straddling sensors report activation, the process moves to step 7516, where a tentative determination is made that two vehicles are present. The process then moves to step 7518 to confirm the determination using other IVIS and RF data.

RF Read Zone Prediction Technique

Figure 79:
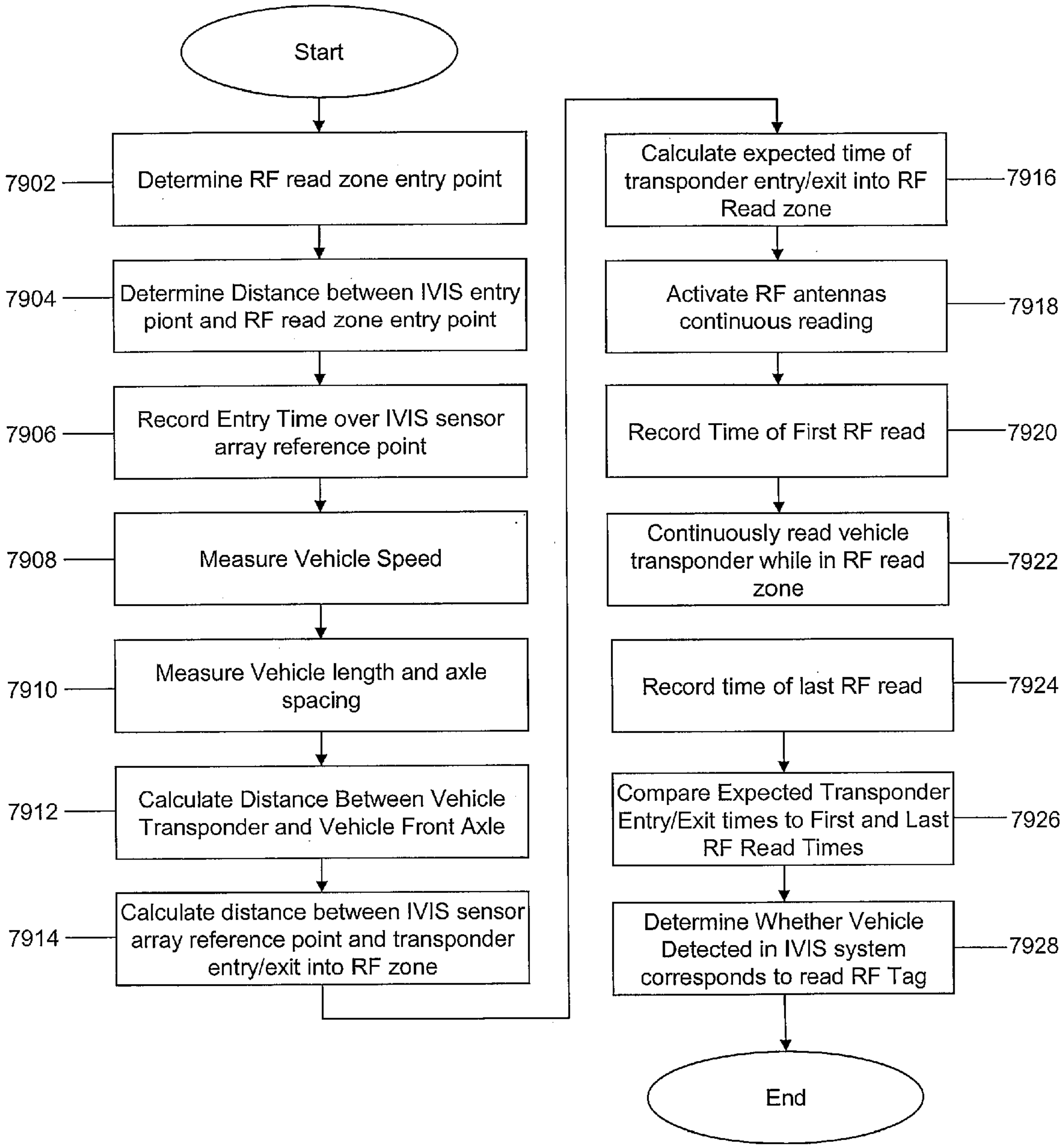
FIG. 79 illustrates exemplary steps for implementing a "read zone prediction" process to accurately identify a vehicle, according to an exemplary embodiment of the present invention.

Other embodiments of the present invention employ accurate synchronization of data gathered from different subsystems, such as IVIS 6704, VTS 6706, and RF system 6708, to track and identify vehicles in an MVIC environment. FIG. 79 illustrates steps for implementing a "read zone prediction" process to accurately identify a vehicle, according to an exemplary embodiment of the present invention.

In step 7902, a point at which a vehicle transponder enters an RF read zone is determined. Referring to FIG. 70, the extent RF read zones 7014, 7016 can be varied by changing the RF power from antennas 7018 and also by changing an antenna angle, the latter of which causes changes in RF read zone size at a given power. RF read zone dimensions can be defined as that portion of space in which RF power projected from an antenna is sufficient to conduct a read on a passing transponder. As viewed in FIG. 70, a two dimensional RF read zone is shown for each antenna 7018. In three dimensions an actual RF read zone can roughly assume a shape of a cone. Knowledge of approximate height above a roadway surface for transponders in typical vehicles traveling in lanes 7004, 7006, as well as the relative position of the transponder on a vehicle can then be used to estimate at what point along a direction of traffic flow, a transponder on a vehicle will enter the RF read zone cone.

Figure 80:
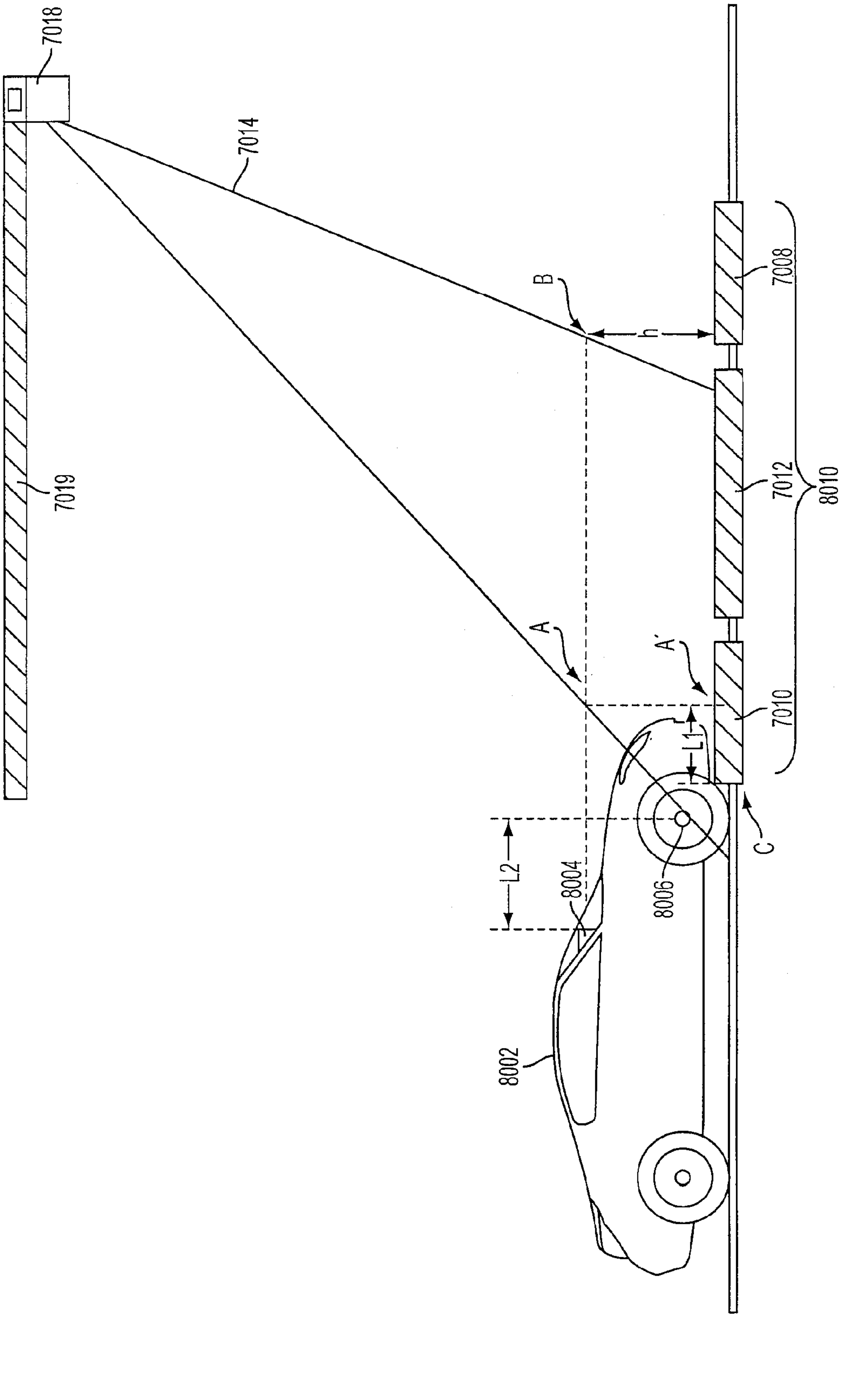
FIG. 80 depicts a side view of a portion of an MVIC arrangement, according to an exemplary embodiment of the present invention.
Figure 81A:
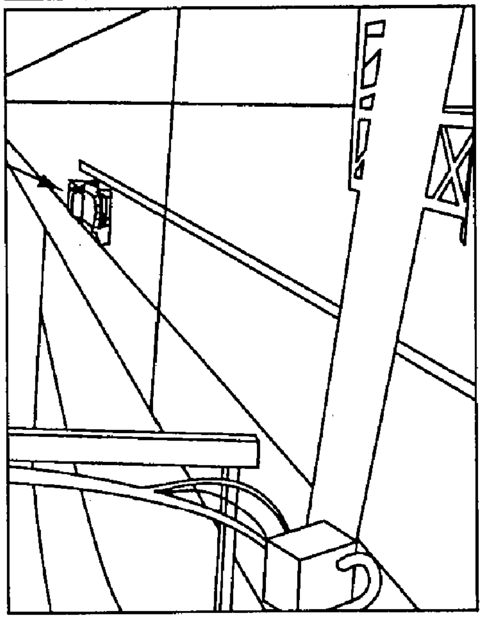
FIGS. 81*a*-81*d* show a series of images of vehicle images recorded using a vision tracking system according to one embodiment of the present invention.
Figure 81B:
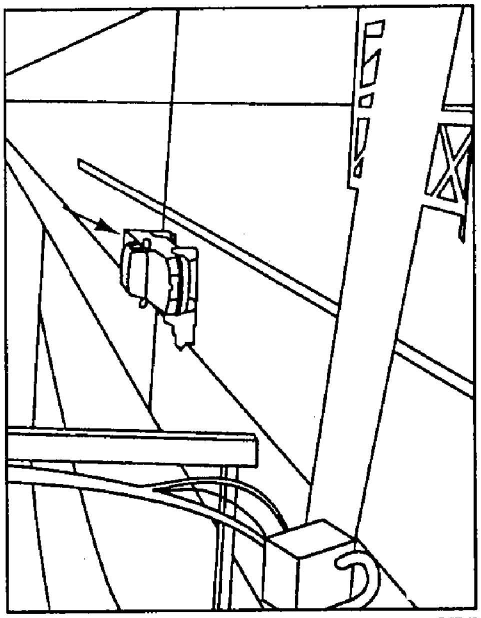
Figure 81C:
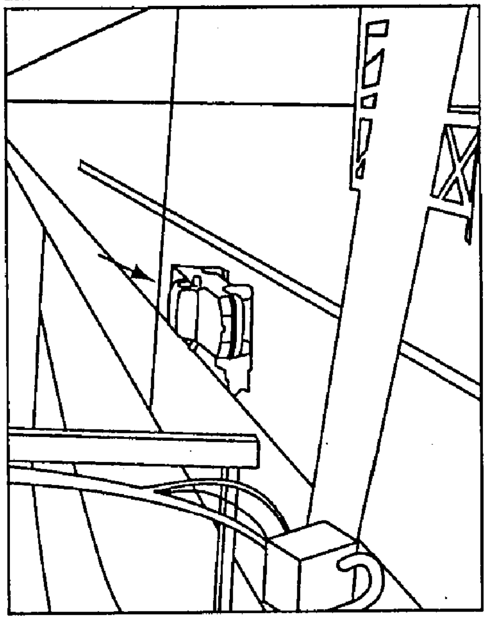
Figure 81D:
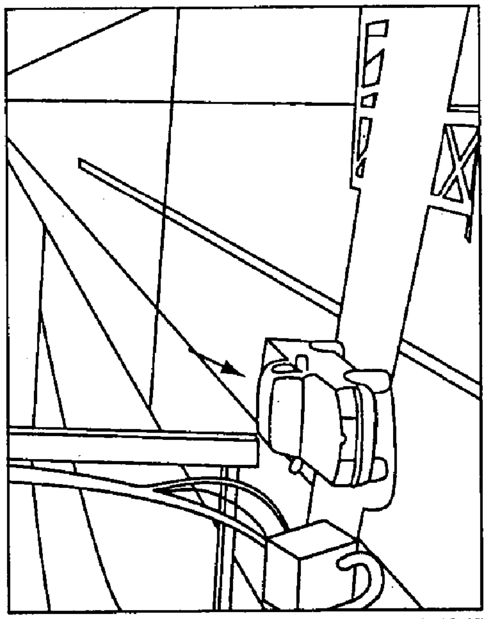
Figure 82A:
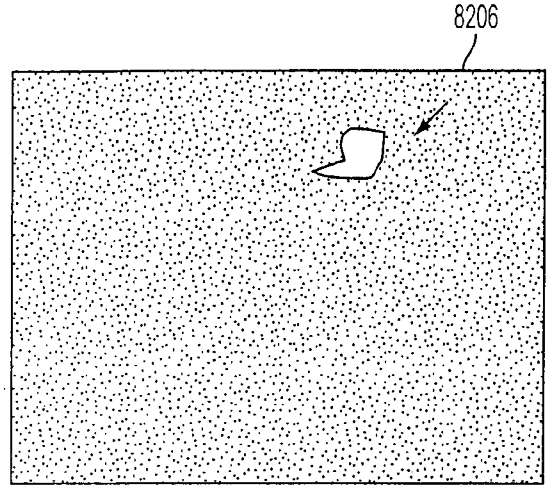
FIGS. 82*a*-82*d* display the results of motion analysis collected for moving vehicle 8102 of FIG. 81.
Figure 82B:
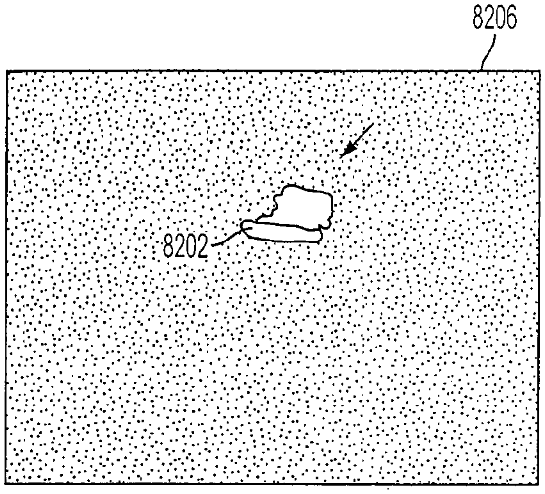
Figure 82C:
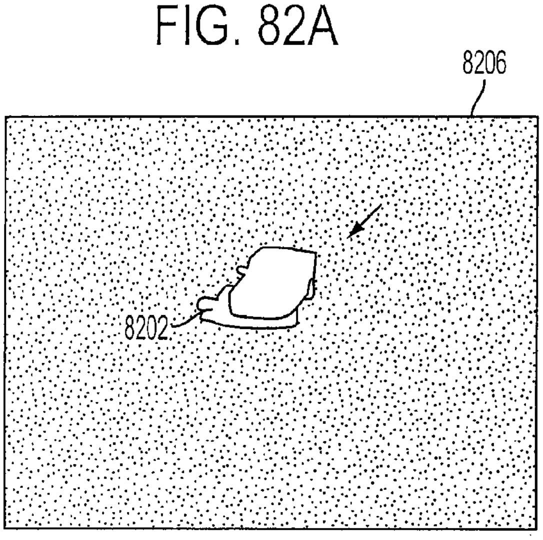
Figure 82D:
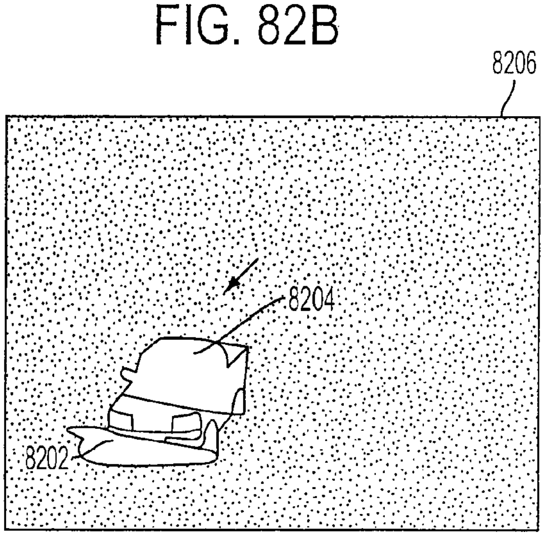

FIG. 80 depicts a side view of a portion of arrangement 7000, where vehicle 8002 contains transponder 8004. As vehicle 8002 travels within lane 7004 (see FIG. 70) through. RF read zone 7014 created by antenna 7018 on gantry 7019, for purposes of the RF system communicating with its transponder, the vehicle effectively enters read zone 7014 at point A and leaves at point B. Therefore, a vertically projected point A' on a surface of the travel lane represents a point at which RF read zone begins for a transponder positioned directly over the point at a height h indicated. Thus, as a reference point on the highway, point A' indicates the position above which a vehicle transponder positioned at an average height is first able to be read by RF antenna 7018.

In step 7904, a distance between an entry point of a vehicle over a first IVIS reference point 7010 and the entry point of the RF read zone is determined. In the example illustrated in FIG. 80, this corresponds to the distance L1, which represents the physical distance along the roadway from the point where a feature of vehicle 8002 first travels over IVIS sensor 7010

(point C), and the point A'. This distance is thus preconfigured by arrangement of an RF read zone in conjunction with IVIS sensors.

In step 7906, an entry time TI of a vehicle feature of interest over an IVIS reference point in is recorded by IVIS system 6704. TI can correspond, for example, to a front edge of vehicle 8002 crossing over a first edge of sensor 7012 shown in FIG. 70. Alternatively, in an exemplary embodiment of the present invention, TI corresponds to a time at which front axle 8006 crosses over first sensor 7010 at point C. TI data is collected and stored in system 6700.

In step 7908, a speed VS of vehicle 8002 is measured by IVIS array 7012, as described above.

In step 7910, a vehicle length and axle spacing for vehicle 8002 are measured by a loop sensor, such as sensor 7012.

In an exemplary embodiment, based on overall vehicle size and axle separation, in step 7912 a projected horizontal distance L2 between the front axle and transponder of vehicle 8002 is calculated by central process unit 6702. Historically, for a majority of vehicles, an RF tag is located in a front one-third of a spacing between the axles. Thus, distance L2 represents an estimate of a projected horizontal between distance tag 8004 and front axle 8006, based in part on measurement of axle separation.

In step 7914, a distance L=L1+L2 is calculated, which represents the distance vehicle 8002 travels from the time the vehicle feature of interest passes an IVIS reference point as in step 7906, and when vehicle transponder 8004 enters RF zone 7014. In an exemplary embodiment, the vehicle feature of interest is front axle 8006, and IVIS reference point is sensor 7010 at point C, which detects the front axle presence as it passes over point C. Thus, after axle 8006 passes over point C, it travels a distance L1 to reach a point over point A', and continues distance L2 before transponder 8004 is positioned over A' at the point of entry into RF read zone 7014.

In step 7916, unit 6702 calculates an expected time of entry TE, for vehicle transponder 8004 to enter zone 7014, TE=TI+L/VS. Thus, system 6700 measures an initial vehicle entry time TI as detected by a loop sensor of IVIS array 8010, as well as speed and axle spacing, and computes an estimated time TE when RF antenna 7018 can begin reading transponder 8004, based on a preconfigured MVIC system distance L1 and estimated vehicle-based distance L2. Similarly, with knowledge of the distance A-B, based on the geometry of read zone 7014, an exit time TX can be calculated.

Referring again also to FIG. 70, in step 7918, central process unit 6702 ensures that all RF antennas 7018 are continuously reading so that vehicle multiple vehicle transponder reads can be conducted as vehicle 8002 enters zone 7014. Preferably, antennas 7018 are triggered to be continuously reading before vehicle 7902 enters zone 7014.

In step 7920, unit 6702 records a time TRE in which a first read of transponder 7904 is received.

In step 7922, antennas 7018 conduct continuous reads, such that multiple RF reads of transponder 7904 are recorded as vehicle 7902 travels through RF read zone 7014.

In step 7924, central process unit 6702 records a time TRX that a last RF read of transponder 7904 is recorded before no further successful reads are received.

In step 7926, central process unit 6702 compares calculated RF read zone entry time TE to actual recorded time TRE. Preferably, a comparison between calculated and recorded exit times, TX and TRX, is also made.

In step 7928, based on comparison of predicted entry and exit times of vehicle transponder 8004 in zone 7014, central process unit 6702 makes a determination as to whether the vehicle detected by IVIS array 8010 corresponds to the RF tag read subsequently.

Because multiple RF reads are conducted, a "time window" in which vehicle 8002 enters, passes through, and exits read zone 7014 is created and can be preserved in a transaction record. The precision of this window can be maximized by maximizing the rate at which RF reads are conducted. Thus, if a vehicle passing through a 10 foot long RF read zone at 100 feet/second (~65 mph) is read at a rate of 50 times per second, or every 20 milliseconds, it can be expected to be read approximately 5 times within the 100 milliseconds it takes to traverse the read zone. However, a slight variation in capturing a reflected signal from the transponder might cause an actual number of reads to be 4 or 6, leading to some uncertainty in actual entry and exit times. However, if the vehicle is read at a rate of 330 times per second (once every 3 milliseconds) the three millisecond precision provides for the vehicle to be recorded about 33 times, within the RF read zone. A slight variation in the number of reads, from 32 to 34 reads, for example, results in much less uncertainty as to actual vehicle entry and exit times in the RF read zone.

In other embodiments, vehicle data collected from a VTS, such as VTS 6706, can be synchronized with an RF read zone system, either in conjunction with the IVIS system described above, or in place of the IVIS system. This data can result in a VTS-based RF read zone prediction. For example, a time can be recorded in which a vehicle appears in an image captured by a VTS mounted near the RF read zone. The time and relative position of the vehicle in the image with respect to the RF read zone can then be used to establish whether a vehicle toll tag measured in the RF read zone is associated with the vehicle in question.

In a further exemplary embodiment of the present invention, VTS 6706 is used in conjunction with IVIS 6704 to provide accurate tracking of a vehicle in an MVIC environment. In FIGS. 81*a*-81*d*, a series of images of a vehicle are recorded by a vision tracking system arranged according to one embodiment of the present invention.

Figure 88:
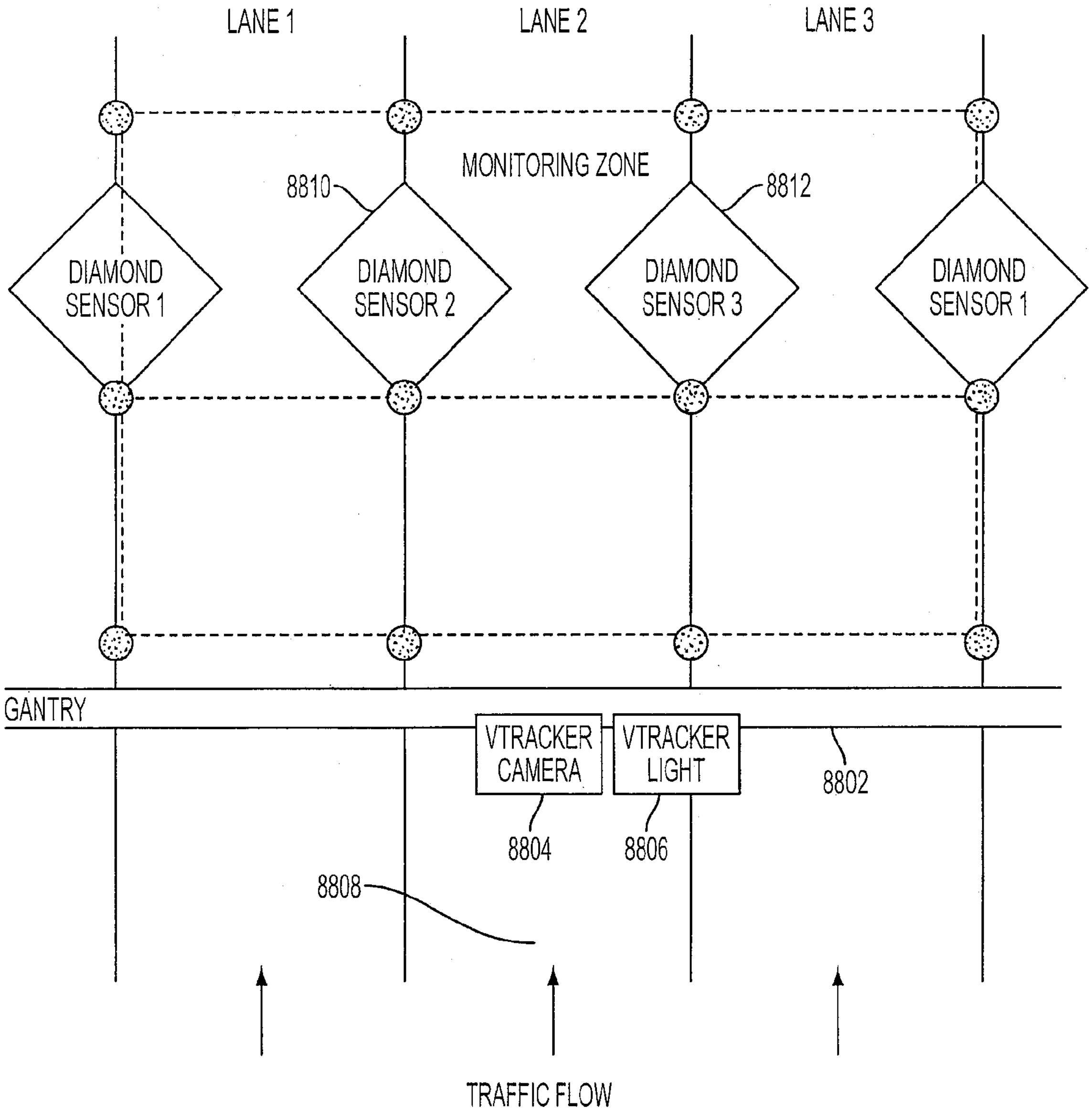
FIG. 88 illustrates a "four diamond one VTS" configuration, according to an embodiment of the present invention.

FIG. 88 illustrates a "four diamond one VTS" configuration, according to an embodiment of the present invention. Gantry 8802 contains camera 8804 and VTS light 8806. Camera 8804 is mounted above a middle of a lane 8808, such that information gathered from sensors 8810, 8812 that straddle lane 8808 can be coordinated with VTS information gathered from camera 8804.

Figure 89:
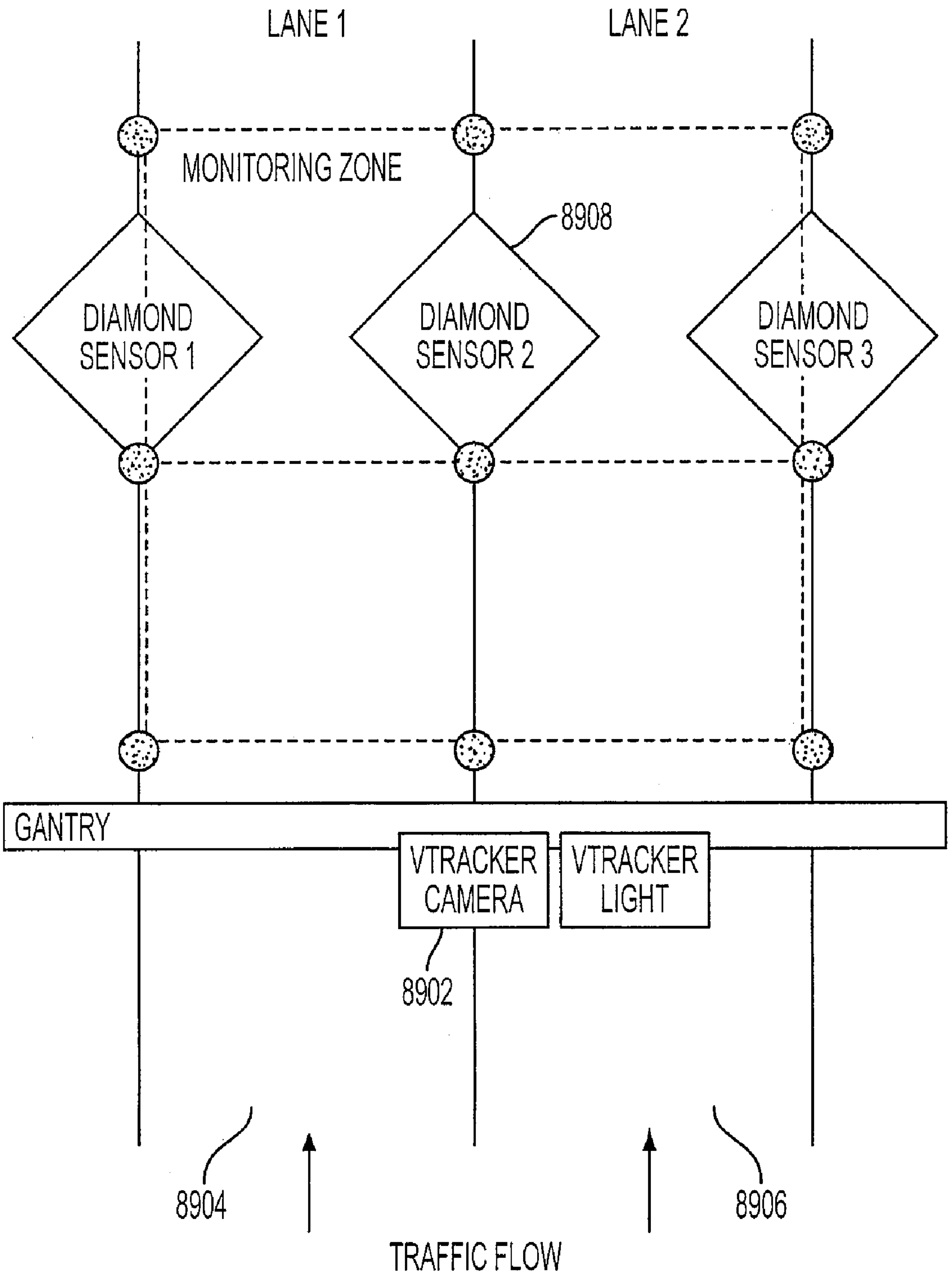
FIG. 89 illustrates a "three diamond VTS" arrangement according to another embodiment of the present invention.

In another embodiment illustrated in FIG. 89, a "three diamond one VTS" arrangement contains a VTS camera 8902 mounted directly over a border between lanes 8904 and 8906, placing the camera in line with a lane straddling sensor 8908.

Figure 90:
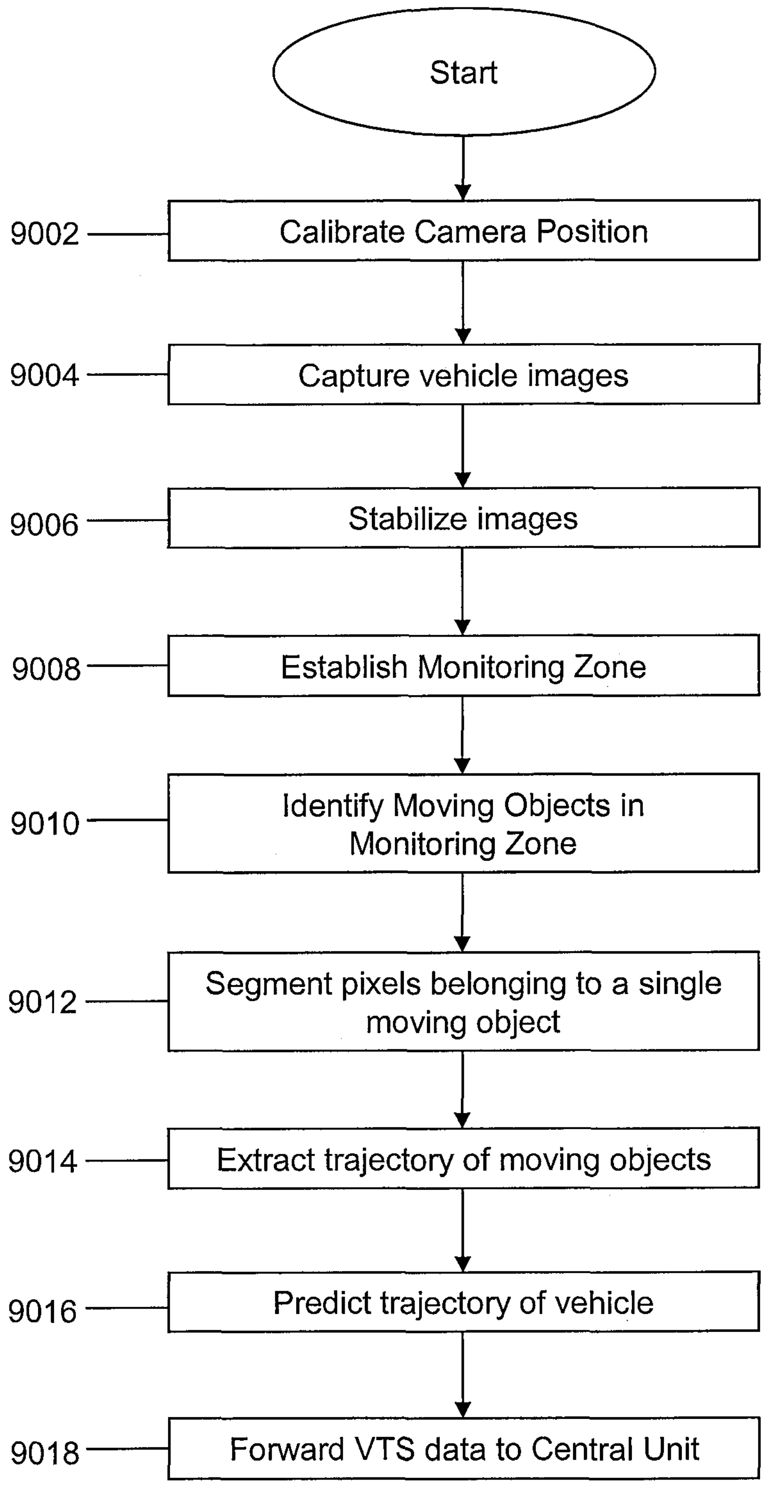
FIG. 90 illustrates exemplary steps involved in a method for vehicle tracking, according to an embodiment of the present invention.

FIG. 90 illustrates exemplary steps involved in a method for vehicle tracking, according to an embodiment of the present invention. In step 9002, a camera position of a VTS unit is calibrated with respect to a coordinate on a road surface.

In step 9004, images of passing vehicles are captured by the camera unit. Preferably, the images are captured continuously at a predetermined frame rate.

In step 9006, the captured images are stabilized by compensating for pixel movement caused by camera movement due to gantry vibration during capture of the images.

In step 9008, a monitoring zone within the images is established. The monitoring zone can comprise all or part of each image.

In step 9010, moving objects are identified by analyzing the series of captured and stabilized images within the monitoring zone.

In step 9012, a segmentation process is applied to pixels, such that all pixels identified as belonging to the same object are grouped together.

In step 9014, a trajectory is extracted based on a relative movement of a segmented object between predetermined captured images.

In step 9016, a predicted trajectory is obtained for an object during further movement within the monitoring zone.

In step 9018, vehicle trajectory information is reported to a central process unit, for example unit 6702, in order to assist in vehicle tracking.

Figure 83:
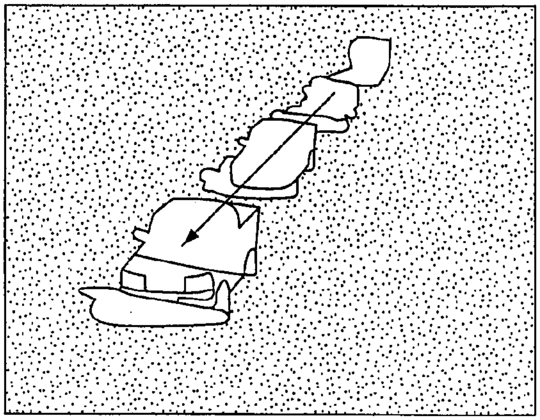
FIG. 83 displays images from FIGS. 82*a* to 82*d* superimposed on the same frame.

In FIGS. 82*a*-82*d*, the results of motion analysis collected for moving objects within a picture frame by VTS system 6706 are displayed. A segmentation process groups all neighboring bright pixels together to form a moving object, so that each moving object corresponds to a moving vehicle. Area 8202, for example, contains an image of vehicle 8204. Each figure displays an image of fixed region 8206, where the successive images are taken at different times. FIG. 83 displays images containing only area 8202 extracted from FIGS. 82*a* to 82*d*, respectively. The images are superimposed on the same frame to display their relative position within the field of view. The arrow displays a calculated trajectory of vehicle 8202 during the time between images displayed in FIGS. 82*a* and 82*d*.

Such position-time trajectory output information can be combined with IVIS straddle sensor information to determine whether a vehicle is a straddler or not. For example, cameras of VTS 6706 can be mounted in close proximity to an IVIS sensor. Vehicle images of a vehicle traveling in a lane of interest can be collected by system 6706, forwarded to central process unit 6702, time stamped, and stored in a record with vehicle information collected at the same time from corresponding IVIS sensors. Examination of a trajectory of the vehicle can help make a determination as to whether it is straddling, changing lanes, and so forth.

Figure 91:
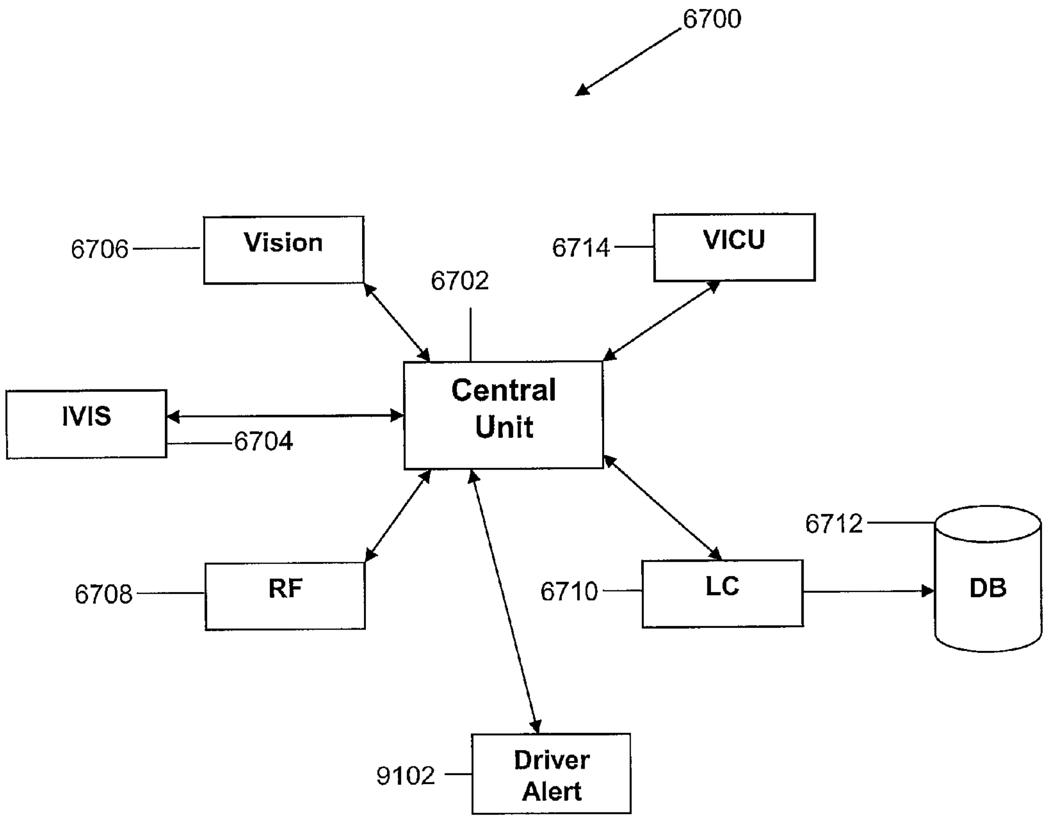
FIG. 91 illustrates another MVIC system, arranged according to a further embodiment of the present invention.

FIG. 91 illustrates another MVIC system 9100, arranged according to a further embodiment of the present invention, that contains a driver alert module 9102. Driver alert module 9102 is used to provide information to occupants of a vehicle, preferably by means of a visible signal, when the vehicle passes through a region where tolling transactions are performed. For example, a vehicle may be assessed a toll by having an RF tag read as it passes an RF read zone controlled by RF system 6708, or by having a license plate read as it passes a video capture unit associated with vision tracking system 6706, if the vehicle is authorized for pay be plate toll payment. In conjunction with either of the above operations, module 9102 can alert a driver, for example, that a toll account associated with the driver's vehicle has an acceptable balance.

Recently, new technologies for automatic tolling of vehicles have emerged, such as pay by plate, where an authorized vehicle can be assessed a toll by capture of its license plate image, and "sticker" tag technology, where a toll is assessed by RF communication between a reader and a small RF tag on a vehicle. In both technologies, a vehicle passing a tolling region is assessed a toll without providing information to the vehicle driver as to the tolling transaction. For example, sticker tags installed on a vehicle have an embedded RF chip that is able to broadcast a serial number or other indicator that allows an RF system reading the sticker tag to deduct money from an account associated with the sticker tag. Such sticker tags tend to be too small, however, to provide an alerting signal to the driver when an RF system reads the tag and charges a toll. In other words, the sticker tag is a silent tag, by which it is meant that the silent tag is unable to provide the driver with relevant information concerning the account that the silent tag is linked to. Similarly, a pay by plate user after passing through a region where a license plate image is captured (also termed "read") and a toll assessed to an account associated with that license plate, is not alerted as to any information concerning that account.

Because of the inability of technologies such as sticker tags and pay by plate to provide direct feedback to a vehicle user during or after a toll transaction, a vehicle user, such as a sticker tag user, may in the first instance be assessed a toll without being aware. In addition, whether aware of tolling transactions taking place or not, the driver (user) may have no knowledge of the state of an account balance used to pay the automatically assessed toll. The balance may be low or insufficient to pay a toll, in which case the driver may be assessed a violation without being aware until sometime later. Furthermore, a driver aware that an account is being depleted during travel through automatic toll points, may nevertheless have to wait until a phone call or internet transaction, or other means of account verification can be performed before determining the state of the account balance.

In one embodiment of the present invention, driver alert module 9102 is triggered to provide a driver with a simplified account status signal to a driver. Preferably, driver alert module 9102 includes one or more light-emitting devices located in a roadway that, when activated by a trigger, present a visible sign to a passing driver. For example, another module (or "system") can act as a tolling module, where a vehicle toll account is read as the vehicle is encountered by the tolling module when it passes by. Referring again to FIG. 68, a tolling module such as system 6708 can perform read or read/write operations with a passing vehicle having a sticker tag or other silent tag, when the vehicle passes through one of the read zones of arrangement 6800. When the read or read/write operation is performed, for example, the account balance of the vehicle silent tag is read and a toll deducted from the balance, an alerting signal is triggered. Preferably, a signal is sent to activate an alerting light visible to the driver. For example, system 6708 may send a signal that a silent tag account has been read, and the account balance is satisfactory. This signal could be sent directly to module 9102 or via central unit 6702 or via unit 6710. Module 9102 then activates an alerting light to give an account status signal, for example, alerting the driver of the silent toll tag vehicle that the account balance associated with the silent tag is satisfactory.

Figure 92:
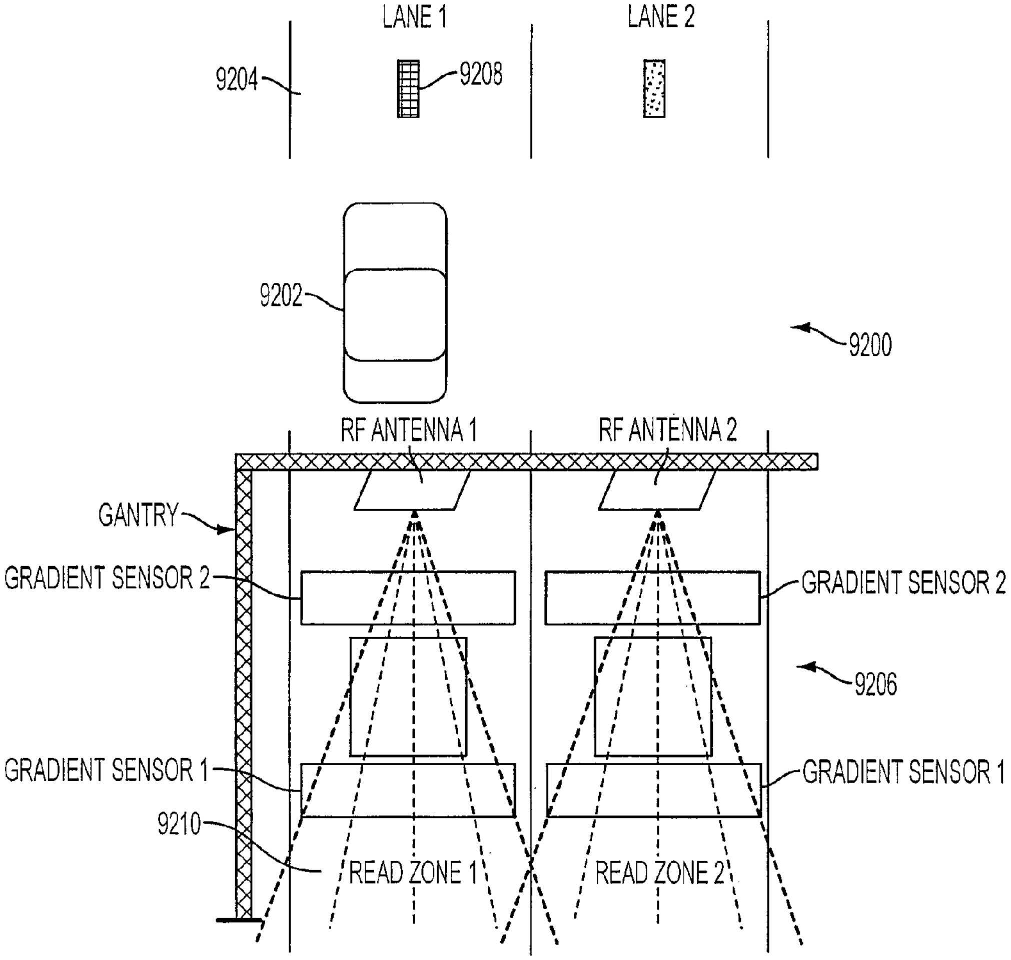
FIG. 92 illustrates an embodiment of the present invention in which a visible light signal is arranged within or above the roadway.

In one embodiment of the invention, illustrated in FIG. 92, the account status signal is a visible light signal arranged within the roadway and associated with a vehicle travel lane of an RF read zone used to read the vehicle toll tag. When vehicle 9202 traveling in lane 9204 passes through RF system 9206, a signal is sent that activates light source 9208 embedded in the surface of lane 9204. Lighting source 9208 can be, for example, a high intensity light emitting diode (LED) whose top surface is located at or near the surface of lane 9204. Preferably, lighting source 9208 is located within a central portion of travel lane 9204 so that a driver of a vehicle traveling within lane 9204 can conveniently see a signal emitted by source 9208 without having to avert attention from the roadway in front of the vehicle. Thus, a driver passing through RF read zone 9210 sees a visible signal in light source 9208 that is associated with the same lane as that containing RF read zone 9210. The driver can then recognize the visible signal as indicating the status of the vehicle toll account.

In one embodiment, visible light source 9208 can include a variety of signals (not shown), each representative of a different account status. For example, in one arrangement, light source 9208 includes individual blue, yellow and green light elements, each light indicative of a different account status. The blue light, for example, can indicate insufficient funds to pay for the tolling transaction just attempted by RF system 9206. Depending on the exact nature of the toll account, the blue light may additionally be indicative that a violation is being reported, or it may indicate to the driver that funds must be replenished within a certain time in order that a violation not be assessed. Yellow can indicate that the toll tag account is low, and should be replenished. Green can indicate that the toll tag contains a sufficient balance that no action need be taken in the near future.

However, other configurations of alerting lights are possible. In other embodiments of the invention, a single type of alert signal is sent to a driver after passing through a zone where an RF toll transaction takes place. For example, a single yellow light can be activated to alert a driver of insufficient or low funds in the account associated with the driver's toll tag, or a single blue light could be used to indicate insufficient funds in the toll tag account.

Thus, system 9102 provides a convenient way to alert a driver as to an account status so that the driver can be apprised in real time, and be enabled, for example, to take corrective action when necessary and possibly prevent imminent toll violations from being enforced, or prevent continued violations from occurring. Furthermore, a driver receiving a green signal, for example, is provided with reassurance during a trip, so that time consuming action need not be taken to check account balances to ensure that a vehicle can properly be operated on an automatic toll road.

In embodiments of the invention, system 9102 employs specific criteria to set account balance boundaries that delineate the different account status regions. For example, the green/yellow account balance boundary might be set based on average vehicle travel patterns that determine how much more toll charges a driver is likely to incur within a set period of time.

Figure 93:
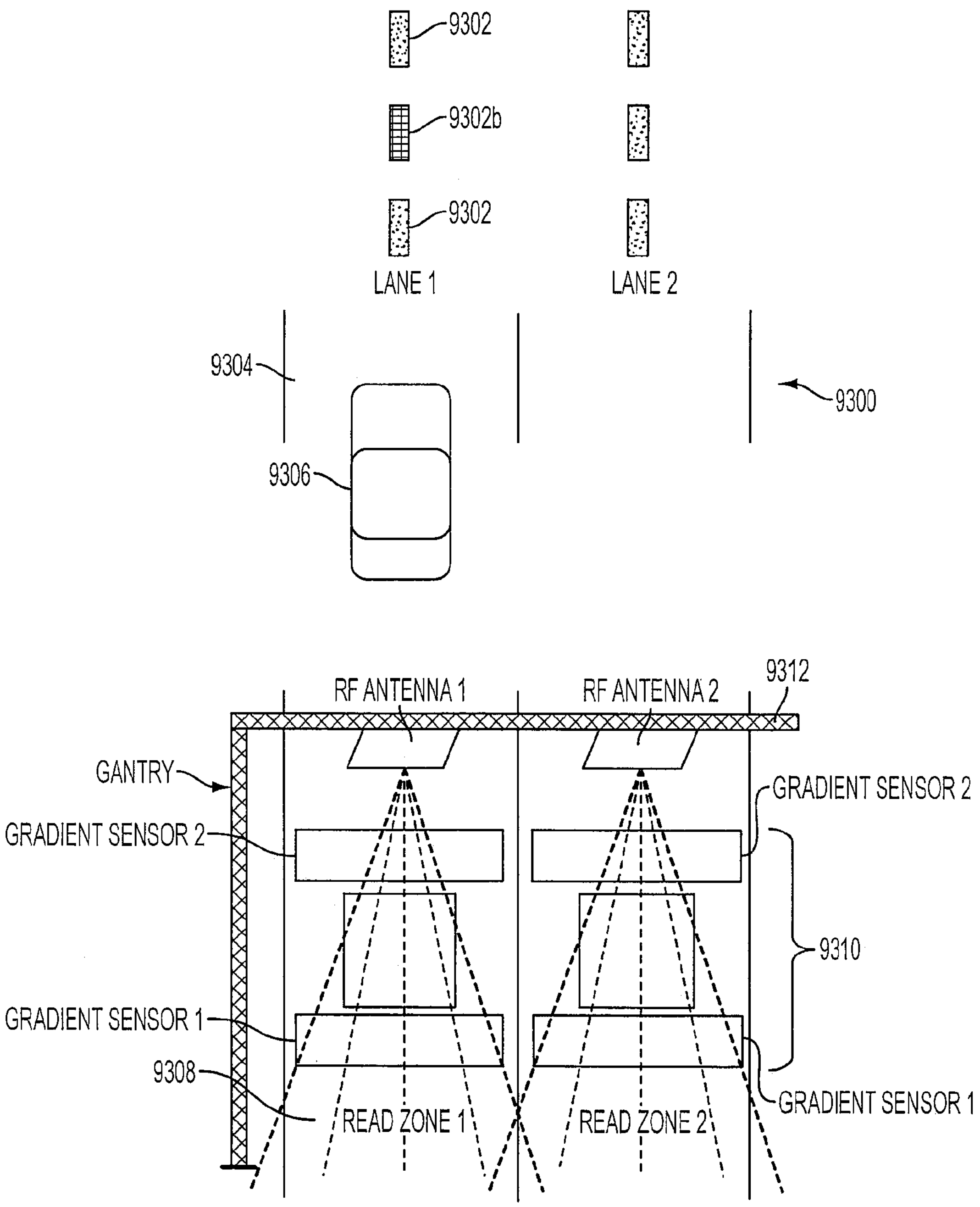
FIG. 93 illustrates another embodiment of the invention, in which multiple lighting sources are employed in travel lanes to alert a passing vehicle as to toll account status.

In another embodiment of the invention, illustrated in FIG. 93, multiple lighting sources are employed in travel lanes to alert a passing vehicle as to account status of an RF toll tag account. As illustrated, a series of three lighting sources 9302 are located within each lane, where each lighting source may comprise multiple individual lights, such as blue, green, yellow lights. Lighting sources 9302 are mutually spaced along lane 9304 so that a driver in traveling vehicle 9306 can be properly alerted as to RF tag account balance after the vehicle passes through a tolling point, such as RF read zone 9308. In one embodiment of the invention, the individual light source, for example, 9302*b*, that is activated, is chosen based on its distance from an RF read zone, for example, from gantry 9312 associated with read zone 9308, as well as other factors. For example, a loop sensor system, such as IVIS array 9310 can be used to measure vehicle speed of a passing vehicle, from which it can be determined the best lighting source 9302 to activate to catch the driver's attention. Thus, for example, for faster vehicle speed a signal is sent to activate a lighting source located at a further distance from the RF read zone. Preferably, the distance along a roadway in the travel direction between RF read zone 9306 and alerting signal lights 9302 is about 20 to 120 feet.

In other embodiments, a visual systems such as VICU 6714, or vision tracking system 6706 can be used to capture license plate information and assess a toll for a pay by plate vehicle, as well as initiate a violation report, if necessary. In these latter embodiments, lighting sources that are triggered by the visual system are chosen to be located within a travel lane and spaced about 20-120 feet (in the direction of vehicle travel) from a license plate capture camera or other device that acts as a tolling point.

In embodiments where only a single lighting source is employed in a vehicle alert system, the separation distance between the lighting source and a tolling point can be set based on select criteria. For example, average vehicle speed and/or average vehicle spacing in the vicinity of the tolling point can be used to determine the appropriate separation distance.

In further embodiments of the invention, the techniques described above with respect to FIGS. 67-83 and 88-90 that are used for identifying more accurately vehicle lane position in a multilane environment, are employed in conjunction with a driver alert module to provide to a driver passing through a tolling region a visible alerting signal in the proper travel lane. For example, combinations of lane straddling diamond sensors, vision tracking sensors and RF read zones, can be used to accurately determine lane position of a vehicle whose account is being tolled and account balance checked. Accordingly, a lighting source in the vehicle travel lane predicted to be that of the tolled vehicle is activated.

Figure 84:
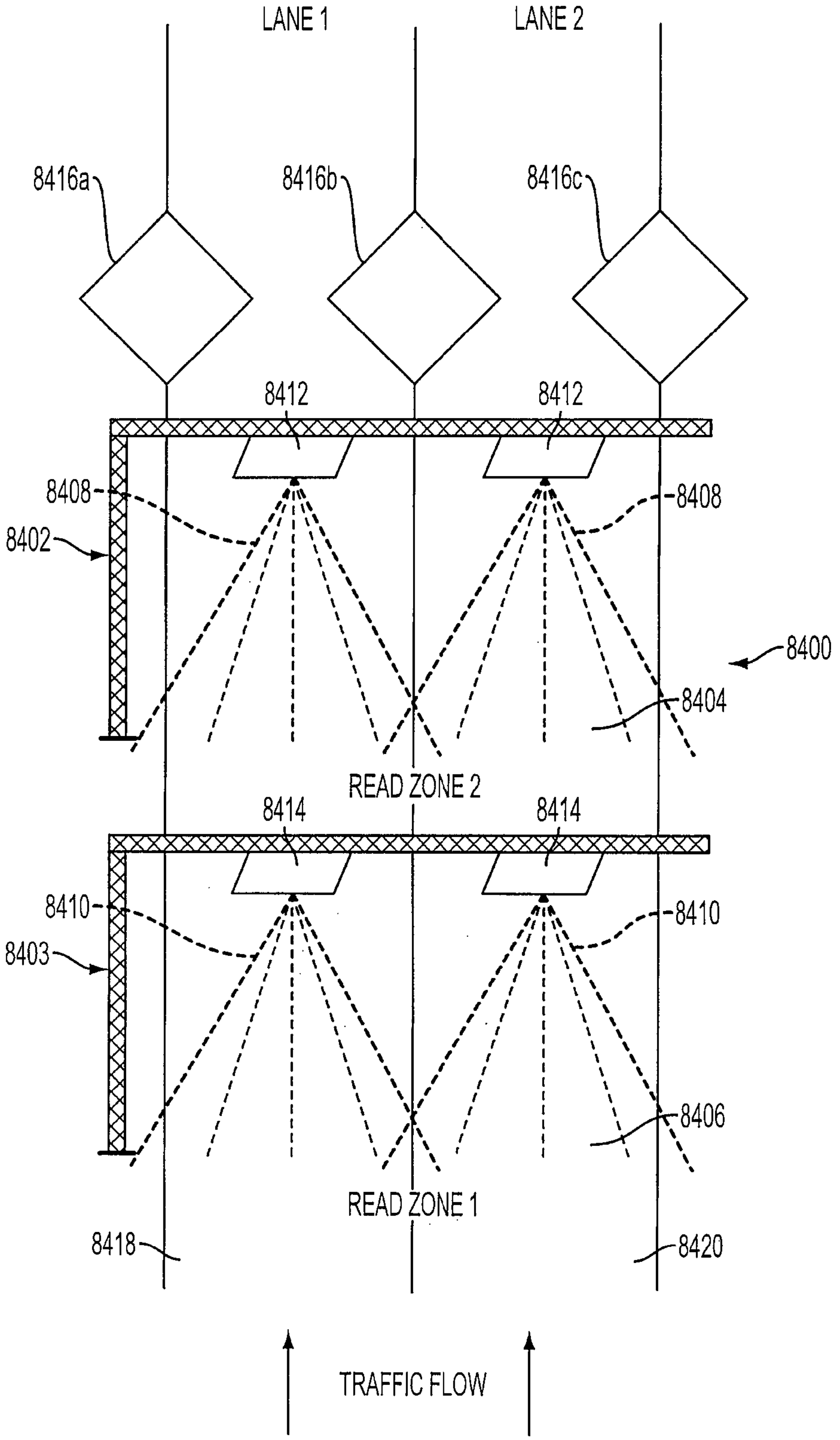
FIG. 84 illustrates a tandem RF read zone geometry employed in conjunction with an IVIS sensor array according to another exemplary embodiment of the present invention.

In other embodiments of the invention, system 9102 can be used in conjunction with any combination of other systems (also termed "modules") such as RF system 6708, IVIS 6704, Vision tracking system 6706, and VICU 6714, where at least one of the other modules provides a means for identifying a vehicle or vehicle toll account and assessing a toll associated with that account. Accordingly, a driver of an identified vehicle can be alerted that a toll is being assessed, or simply that information associated with the vehicle has been recorded. Vehicle identification using Tandem RF read zones FIG. 84 illustrates a tandem RF read zone geometry employed in conjunction with an IVIS sensor array according to another exemplary embodiment of the present invention. Tandem RF read zone system 8400 employs two RF gantries, 8402, 8403 arranged to create read zones 8404, 8406 that are positioned in tandem for a vehicle traveling along the direction of traffic flow indicated. The tandem geometry affords advantages over conventional RF based technologies, such as automatic vehicle identification (AVI) systems employed currently in some states for Electronic Toll Collection (ETC), as discussed in detail below.

In some AVI systems that employ RF read technology, a read-only system is employed. This involves simply reading an identifier from a toll transponder, which can then be used by a processing unit in an AVI system to charge an account associated with the identifier, analogous to charging an account associated with a credit card number. In a transaction carried on with a passing vehicle, a vehicle tag is read once as it passes through an RF read zone, and a toll charged to the account associated with the tag.

More typically, AVI technology employs read/write technology, in which information can also be written by an RF antenna to a toll tag on a passing vehicle. In the latter case, an RF system first interacts with the toll tag to determine information such as a transponder number, a transponder ID, a current balance on the toll tag, and various other data that is contained on the transponder. Based on this information, the system makes a decision as to whether a payment valid and write information back to the transponder. The information typically includes an updated account balance for the toll tag. Finally, the system may read the information again to verify that all the previous transactions took place as planned.

However, conventional AVI systems conduct the above-described multiple transactions in a fairly inefficient manner for vehicles traveling at high roadway speeds. Originally such systems were designed for stop and go transactions in single lanes, and not intended to operate in a high speed MVIC environment. The conventional technology involves reading an RF tag once while the vehicle is within a single lane, and writing back to the tag once for read/write systems. However, when a vehicle passes from one zone of reading and writing in a first lane and into an adjacent lane, it enters a different zone of reading and writing. Therefore, a toll transaction started while the vehicle travels through the first zone may be interrupted before completion. If another transaction is subsequently started in the second zone corresponding to the new travel lane, it may also lack sufficient time to complete before the vehicle leaves the read zone area. Therefore, revenue is lost and a transaction is not fully captured.

In addition, if a read or write process fails, at typical highway vehicle speeds, there is typically not sufficient time to conduct a second attempt at reading or writing before a vehicle leaves a reading zone. Also, the potential exists with conventional AVI technology for an antenna that is used for a first travel lane to inadvertently transact with a vehicle transponder in an adjacent lane or in a straddling region of the lane, and mis-associate the transponder with a vehicle passing through the first lane (cross-lane read). This can occur because an RF read signal bounced off a vehicle transponder in the adjacent lane reflects off the vehicle in the first lane, causing the transponder of the adjacent vehicle to be interpreted as residing in the first vehicle. Therefore, the system could collect revenue from the transponder of the adjacent lane vehicle while charging the vehicle for violation, since it was not read by the antenna in its lane. Also, the potential exists to charge a vehicle transponder in two adjacent lanes if an RF read zone is sufficiently over-lapping.

It is common practice in conventional AVI systems to reduce cross-lane reads using time division multiplexing for adjacent RF zones, so that antennas are cycled off and on in a pattern that provides for no adjacent antennas to be on simultaneously. However, this practice increases the likelihood that a vehicle tag passing at high speed and changing lanes will fail to be read at all.

System 8400 of the present invention overcomes the above problems by providing two large powerful RF read zones 8404, 8406. As depicted in FIG. 84, RF read zones 8404 and 8406 comprise respective overlapping subzones 8408 and 8410, each subzone created by a single antenna of antennas 8412 and 8414, respectively. Preferably both zones 8404 and 8406 are approximately 20 feet in length. Preferably the overlap of subzones along a border region between lanes 8418 and 8420 is such that each antenna 8412 and each antenna 8414 can read a vehicle that is positioned in either lane. Preferably, antennas 8412, 8414 are configured so that an antenna angle can be varied from about 2 degrees to about 35 degrees with respect to horizontal. In a preferred embodiment, RF zones 8404 and 8406 are kept on continuously. Also included in system 8400 are IVIS lane straddling sensors 8416*a*, 8416*b*, 8416*c* that can detect the presence of vehicle lane straddlers.

In a preferred embodiment, a vehicle toll tag (not shown) is read while passing through zone 8406. System 8400 is configured so that a successful read can take place if the vehicle tag passes through only lane 8418, only lane 8420, or a combination of the two lanes while traversing zone 8406. For example, continuous reads can be conducted at a rate of about 300 times per second, or every three milliseconds, resulting in about 75 reads for a vehicle traveling at 60 mph through the center of a 20 ft read zone. Thus, system 8400 has sufficient time to conduct multiple reads of each passing vehicle, even if a vehicle is straddling the lanes or passing between lanes, where the amount of successful reads may be reduced by about 50%.

Figure 85:
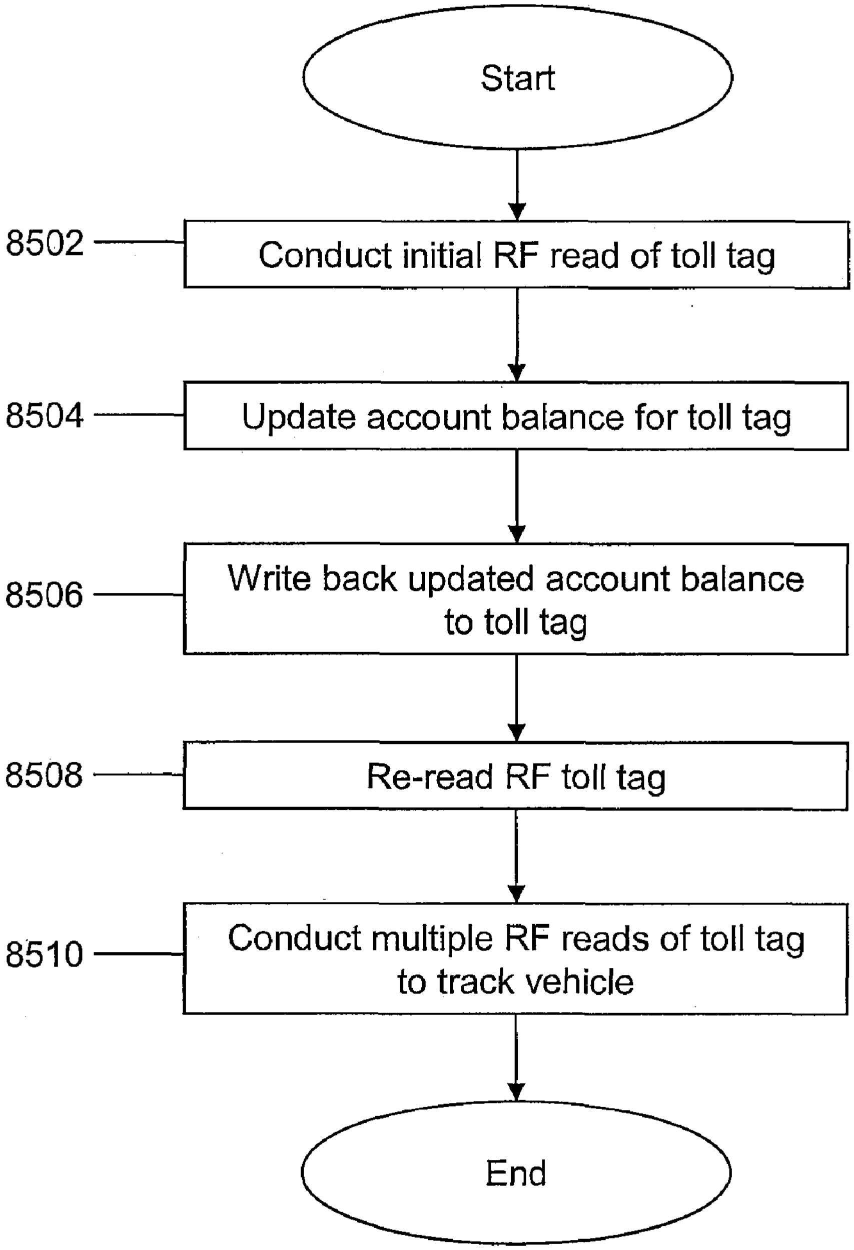
FIG. 85 depicts exemplary steps involved in a method for conducting multiple RF transactions with vehicle passing through a tandem RF read zone, according to a preferred embodiment of the present invention.

In an exemplary embodiment of the present invention, system 8400 is configured to conduct read/write transactions with a vehicle containing a read/write RF toll tag. FIG. 85 depicts steps in a method for conducting multiple transactions with a passing vehicle, according to a preferred embodiment of the present invention. Referring also to FIG. 84, in step 8502, system 8400 conducts an initial read of a read/write toll tag as a vehicle enters zone 8406. Preferably, system 8400 collects information such as tag number and present account balance.

In step 8504, system 8400 updates the account balance for the vehicle toll tag. The updated balance reflects a toll deducted from the present account balance based on a predetermined toll value to be assessed against the vehicle.

In step 8506 information is written back to the toll tag that includes the updated account balance.

In step 8508, the toll tag is re-read by system 8400 to determine whether the toll transaction was properly recorded and the account balance accurately updated.

In step 8510, system 8400 conducts multiple RF reads of the vehicle as it moves through secondary RF read zone 8404. In a preferred embodiment, the multiple reads are conducted primarily to track the vehicle position as it passes through zone 8402. In this manner, the vehicle can be properly identified so that system 8400 properly associates the vehicle with the RF transponder transactions that occurred in steps 8502-8508. This also helps the system distinguish the paying vehicle from a vehicle passing nearby that does not have a transponder. Preferably, as the vehicle moves through zone 8404, lane straddling sensors 8416*a*-8416*c* are used to provide additional vehicle tracking data. In an exemplary embodiment, a vision tracking system (VTS) described above, is used to capture vehicle images when the vehicle passes through zone 8404. The lane straddling sensor data, RF data, and VTS data can be passed to an MVIC controller in order to correctly associate the paying vehicle and any non paying vehicle with the captured vehicle images and to classify vehicles, detect vehicle speed, and vehicle movement. When a vehicle that does not have a valid toll tag (non-paying vehicle) is identified, further vehicle information of that vehicle can be gathered and processed, for purposes of general data collection, statistics, or enforcement. For example, a license plate image of a vehicle not paying via RF toll tag can be captured and used to determine whether the non-paying vehicle is a registered pay by plate vehicle, in which case an appropriate toll can be assessed by the latter method. If the non-paying vehicle is not registered to pay by means other than RF toll tag, a violation report can be forwarded to an appropriate violation enforcement system.

In another embodiment of the present invention, system 8400 is employed to conduct transactions with a read only vehicle toll tag. In this case, the read-only toll tag can be read initially as the vehicle enters zone 8406 to extract information such as an account number to charge a toll. The toll tag can be read multiple times to ensure a correct transaction.

A benefit of the system of the present invention is that the tandem RF read zones afford a greater possibility to complete a series of transactions with a read/write transponder. If, for example, there is a difficulty in finally writing back to the transponder and verifying that the correct amounts associated with a toll transaction are properly received from the transponder, while the vehicle is in zone 8406, system 8400 can package the information from the transactions conducted in zone 8406 and send the information to the transponders of zone 8404 so that any unfinished transactions can be completed. In other words, the system continues the transaction series with the vehicle transponder at a point where it was unable to complete it using RF read zone 8406. In the example shown in FIG. 84, two tandem RF read zones create an effective read zone length of about 40 feet for the case of 20 ft long individual read zones. Thus, system 8400 is afforded nearly half a second to complete a series of toll transactions with a vehicle passing at 60 mph.

Although FIG. 84 depicts an embodiment in which two gantries 8402, 8403 are employed to create tandem RF read zones, other embodiments can employ a single gantry to create RF tandem read zones. Moreover, embodiments employing more than two RF antennas in each gantry for reading more than two lanes are contemplated.

In another embodiment of the present invention, a dual read zone system is employed for RF read/write toll tags used in vehicles traveling in a closed toll road system. In this case, at the entry point, information on time, date, and vehicle location is written to the transponder, while at the exit point, this information is read out to determine the distance traveled on the toll road, so that a distance-based toll can be assessed.

In another embodiment of the present invention, RF read zones 8404 and 8406 are created using mutually different RF technologies. In this embodiment, read zone 8404 is capable of communicating with RF devices, such as transponders of a first RF technology type. Read zone 8406 is capable of communicating with RF transponders of a second RF technology type. In general, the first and second RF technology types can differ such that RF tags of either technology type can only be read or written to by one of read zones 8404, 8406. For example, the RF read zone technology associated with read zone 8404 may be unique to a vendor selling a particular RF toll tag, so that only those vehicles having the vendor's toll tags can be read in read zone 8404. Similarly, read zone 8406 may correspond to a second vendor's unique RF technology also configured to only interact with toll tags sold by the second vendor. This configuration of a tandem RF read zone system is useful when vehicles using RF tags of differing technologies are permitted to concurrently use a common roadway as a tolling road. Accordingly, in this embodiment, a vehicle having one of two differing RF toll tags can be read when passing through system 8400, either within read zone 8404 or read zone 8406. The dual gantry arrangement of FIG. 84 can be extended to include additional gantries that create additional RF read zones, where the additional RF read zones employ still other RF technologies for communicating with still other RF tag types. Thus, in other embodiments, a multiple RF read zone arrangement for reading one of a multiple set of different permissible RF tags types is possible.

In further exemplary embodiments of the present invention, each RF technology type of a multiple RF read zone system is associated with a dual RF read zone that operates as described above to allow reading, writing, and vehicle tracking through tandem read zones. Thus, in an embodiment used for two different RF read technologies, four RF read zones are created in tandem, two of which are used for a first RF technology and the other two used for a second technology. Accordingly, vehicles having RF toll tags corresponding to either one of the two RF technologies employed in the four zone system, can be read, written to, and tracked while passing through the system.

Synchronization of Loop Based Sensors

In a further aspect of the present invention, a system for controlling loop based sensors in a multilane environment comprises a master program that controls the sampling periods of loop based sensors. A common problem that occurs using inductive loop technology in multiple lanes, either in a multilane open road environment or a toll plaza or toll ramp environment, is overlap of adjacent sensor fields during operation. If a first lane and second, adjacent lane both have loop detectors, where the loop detectors of the first and second lane are located next to each other, the probability exists that at various times the loop detectors will be on at the same time and overlap frequencies. When the adjacent loops are on simultaneously, a mutual change of induction within each loop is likely to be induced, such that one or both of the loops may be interpret the change to indicate a vehicle presence, even in the absence of a vehicle. In addition, if a vehicle is present, the change in inductance induced by mutual overlap could confuse an inductive loop that the vehicle passes over into miscounting the number of vehicle axles and misclassifying the vehicle.

Figure 86:
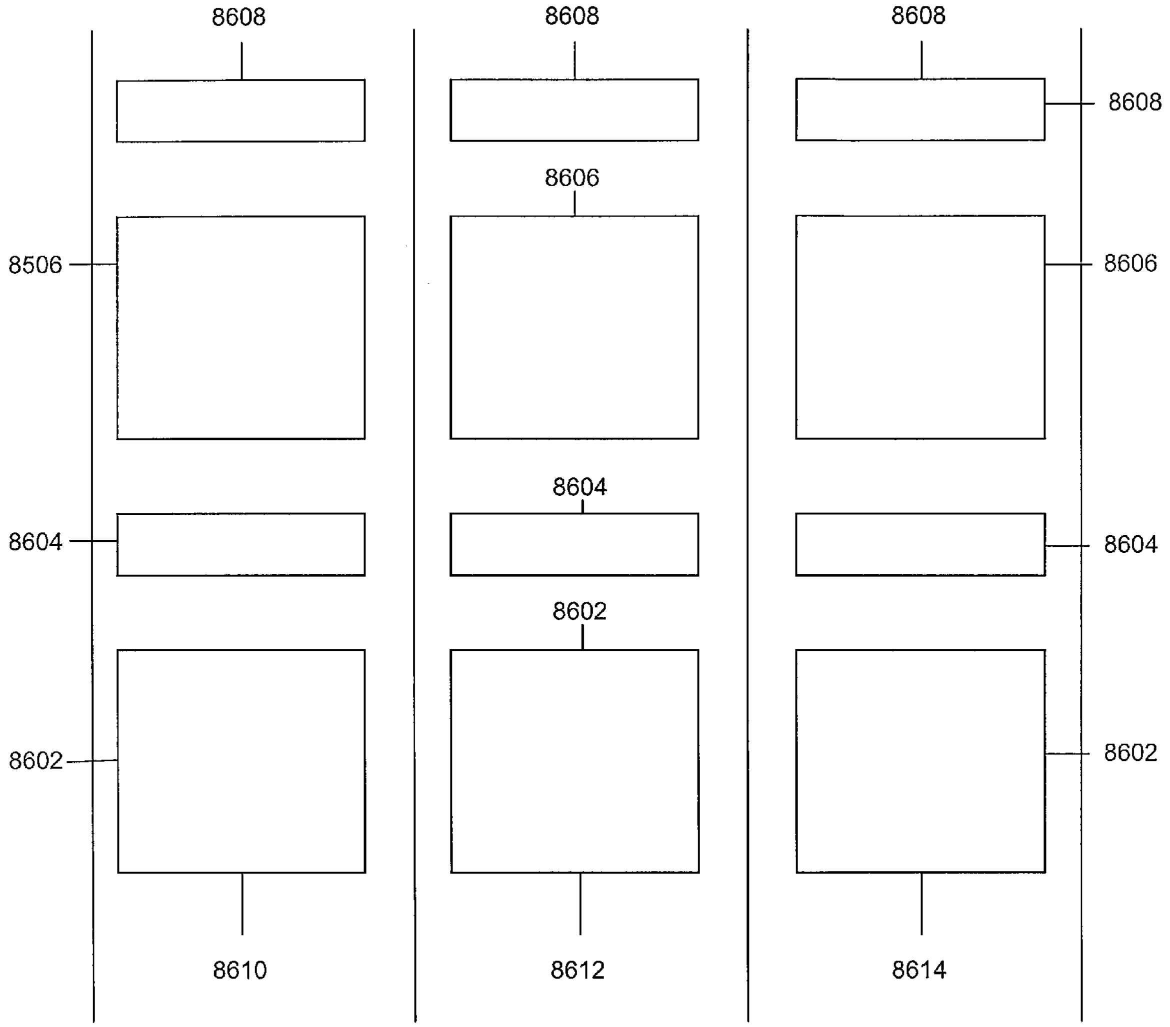
FIG. 86 illustrates a sensor arrangement in a multiple sensor array according to an embodiment of the present invention.

In a preferred embodiment of the present invention, individual loop detector controllers are configured to control sampling periods of loop sensors (or sensors) within individual lanes such that the sampling periods of loop sensors within one lane are coordinated with the sampling periods of loop sensors within adjacent lanes. Preferably, like sensors in a sensor array in a first lane are placed adjacent to like sensors of sensors in adjacent lanes, as illustrated in FIG. 86. Each lane of lanes 8610, 8612, and 8614 contain a group of loop sensors 8602, 8604, 8606, 8608. In this embodiment, each sensor of each group of four sensors is arranged adjacent to a like sensor (same sensor type) in one or more adjacent lanes. In other embodiments, each sensor group in an individual lane comprises eight individual sensors. In still other embodiments, sensors are arranged next to different sensor type in an adjacent lane.

Referring to FIG. 86, a master program communicates with loop detector controllers for each lane 8610, 8612, and 8614. The master program sends instructions that determine sampling periods for the loop sensors depicted in FIG. 86. The sampling periods are arranged so that any loop sensor is not being sampled during a sampling period of a loop sensor immediately adjacent in an adjacent lane. For example, if sensor 8604 in lane 8612 is on, then sensors 8604 in lanes 8610 and 8614 are off for the duration of sampling of 8604 in lane 8612.

Figure 87:
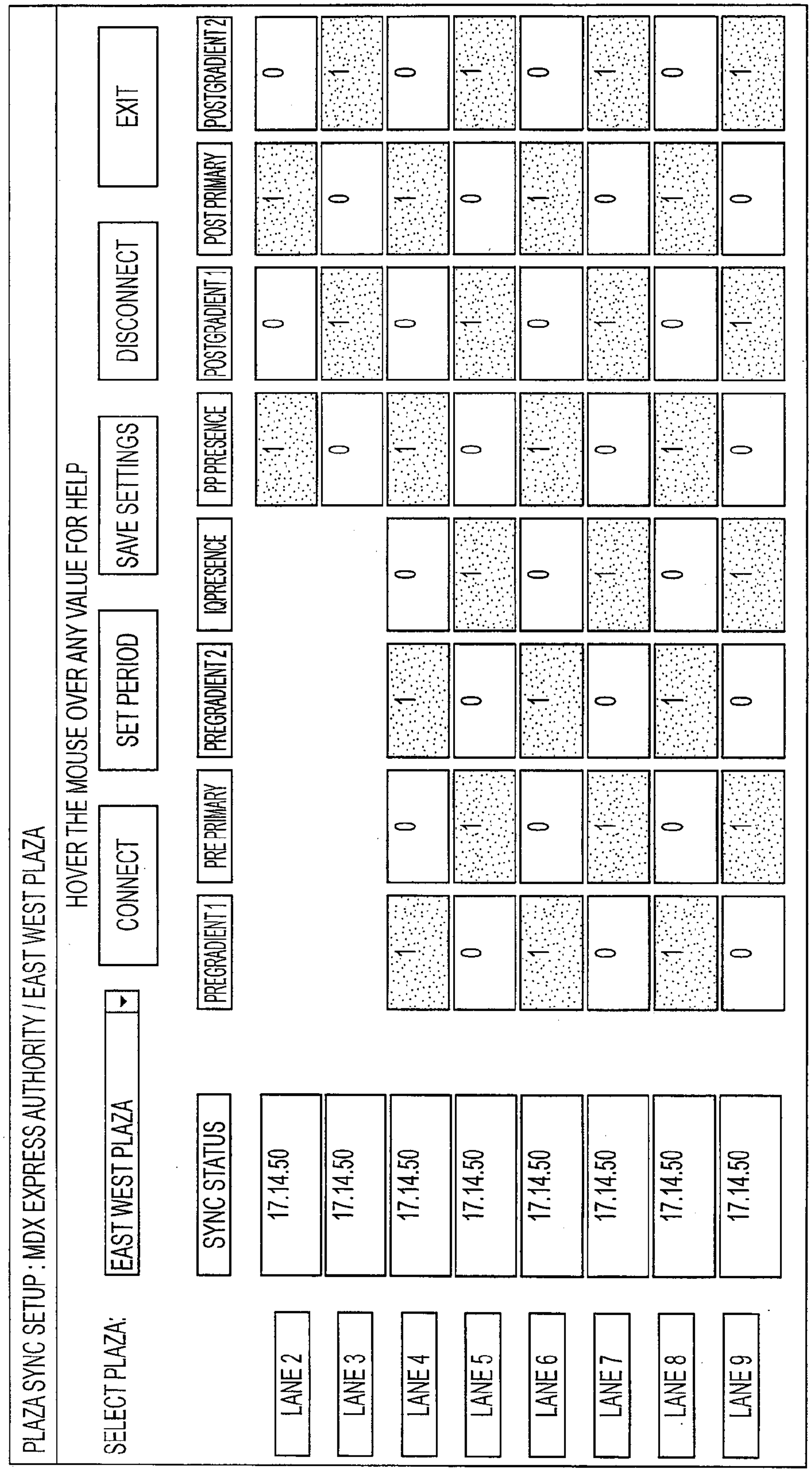
FIG. 87 shows a control page of a master program for controlling sampling periods in a multilane IVIS system, according to a preferred embodiment of the present invention.

FIG. 87 shows a control page 8700 of a master program for controlling sampling periods in an exemplary multilane loop sensor system configured as an IVIS system that contains eight lanes with IVIS sensors, according to an embodiment of the present invention. Two of the lanes contain four IVIS sensors and the remaining lanes each contain eight sensors. As illustrated, each sensor position status is shown for a given moment in time. An overall checkerboard pattern is formed where every "primary sampling period" sensor (indicated by a "1") is surrounded by "secondary sampling period" (indicated by "0") sensors, both in adjacent lanes, and at adjacent positions within a lane of the "primary sampling period" sensor. The master program controls the IVIS sensor sampling pattern shown in FIG. 87 such that any position in the checkerboard oscillates from primary sampling period to secondary sampling period according to a period corresponding to the sensor sampling period.

In order to synchronize an entire toll plaza regardless of its quantity of IVIS sensors, so that a checkerboard pattern of sensor sampling is maintained, a synchronization signal is sent to all IVIS detectors. Preferably, the master program communicates with IVIS detectors over an Ethernet, serial or a dedicated communications line. Preferably, a signal is sent at one time to all IVIS detectors with instructions to begin a primary sample period instantly or at a predetermined time. In an exemplary embodiment, this synchronization signal is sent to every sensor on a predetermined time schedule. For example, a synchronization signal could be sent every 10 to 15 seconds or every 30 seconds, depending on an amount of drift in crystals used for clock timing within the detectors.

In another embodiment, if clock speed of detectors used in an IVIS system are extremely accurate and have no drift, only a single synchronization signal is sent. Thus, a single synchronization upon start up of all lanes is sent.

In still another embodiment of the invention, all detector boards corresponding to the IVIS detectors are synchronized according to the phase of a common power source used to power all the IVIS detectors.

The foregoing disclosure of preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. For example, with respect to the structure or operation of an MVIC system, use of any combination of the systems 6704, 6706, 6708, 6710, and 6714 is believed within the scope of the invention. Furthermore, use of the aforementioned systems, in particular systems 6704, 6706, 6708, and 6714 to collect and manage vehicle information other than for tolling purposes is within the scope of this invention. For example, image capture, vision tracking, and vehicle classification performed by the aforementioned systems can be used for the purposes of data collection or law enforcement purposes. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for determination of a vehicle position in a multilane open road environment, comprising:

determining first vehicle position information with respect to a pair of adjacent lanes using a plurality of induction loop sensors;

determining second vehicle position information with respect to the pair of adjacent lanes using a multiple read RF system;

consolidating the first and second vehicle position information determined from the induction loop sensor and the multiple read RF system; and making a final determination of the vehicle position with respect to the pair of adjacent lanes, based on a result of the consolidating step.

2. The method of claim 1, wherein the loops sensors are arranged in loop sensor layouts within each of the adjacent lanes, each loop sensor layout containing a gradient sensor.

3. The method of claim 1, wherein the multiple read RF system comprises a separate RF antenna for each of the adjacent lanes, each antenna used to conduct multiple RF reads of a transponder on the vehicle.

4. A method for determination of a vehicle position in a multilane open road environment, comprising:

determining first vehicle position information with respect to a pair of adjacent lanes using a plurality of induction loop sensors;

determining second vehicle position information with respect to the pair of adjacent lanes using a multiple read RF system;

consolidating the first and second vehicle position information determined from the induction loop sensor and the multiple read RF system;

determining third vehicle position information with respect to the pair of adjacent lanes using reports of activation of lane straddling sensors that straddle borders of adjacent lanes, including a border between the pair of adjacent lanes;

receiving fourth vehicle position information from a vision tracking system; and making a final determination of the vehicle position with respect to the pair of adjacent lanes, based on a result of the consolidating step and the third and fourth vehicle position information.

5. The method of claim 2, further comprising:

noting whether sensors in both adjacent lanes report entry/exit times; and determining that the vehicle is not straddling between the pair of adjacent lanes if entry and exit times are not reported from gradient sensors in both lanes.

6. A method for determination of a vehicle position in a multilane open road environment, comprising:

determining first vehicle position information with respect to a pair of adjacent lanes using a plurality of induction loop sensors, wherein the loops sensors are arranged in loop sensor layouts within each of the adjacent lanes, each loop sensor layout containing a gradient sensor;

noting whether sensors in both adjacent lanes report entry/exit times;

determining that the vehicle is not straddling between the pair of adjacent lanes if entry and exit times are not reported from gradient sensors in both lanes;

if entry/exit times are reported from sensors in both of the pair of adjacent lanes, calculating a difference in entry/exit times between information recorded from sensors in each of the pair of adjacent lanes;

if the difference in entry/exit times is greater than a predetermined value for based on the vehicle traveling at a given vehicle speed, determining that the vehicle is not straddling between the pair of adjacent lanes;

determining second vehicle position information with respect to the pair of adjacent lanes using a multiple read RF system;

consolidating the first and second vehicle position information determined from the induction loop sensor and the multiple read RF system; and making a final determination of the vehicle position with respect to the pair of adjacent lanes, based on a result of the consolidating step.

7. The method of claim 6, further comprising:

if the difference in entry/exit times is less than a predetermined value, recording a range of vehicle speed reported; and determining that the vehicle is not straddling between the pair of adjacent lanes, if the range of vehicle speed reported from each of the loop sensor layouts of the pair of adjacent lanes differs.

8. The method of claim 7, further comprising:

if the range of vehicle speed reported from each of the loop sensor layouts of the pair of adjacent lanes is the same, recording a number of axles and axle spacing reported by the loop sensor layouts of each of the pair of adjacent lanes; and determining that the vehicle is not straddling between the pair of adjacent lanes, if the number of axles and axle spacing reported by the loop sensors in each of the pair of adjacent lanes differs.

9. The method of claim 8, further comprising:

if the number of axles and axle spacing reported by the loop sensors in each of the pair of adjacent lanes is the same, making a partial determination that the vehicle is straddling between the pair of adjacent lanes.

10. The method of claim 3, further comprising:

noting whether RF data for the transponder on the vehicle is read from each RF antenna conducting RF reads on one of the adjacent lanes; and determining that the vehicle is not straddling between the pair of adjacent lanes if data for the vehicle transponder is not reported from each RF antenna.

11. The method of claim 6, further comprising:

if data for the vehicle transponder is reported from each RF antenna, calculating a number of times data is read using each RF antenna;

determining if the number of times data is read on one of the RF antennas is close to a corresponding number for the other RF antenna; and determining that the vehicle is not straddling between the adjacent lanes if the number of times data is read on one of the RF antennas is not close to the corresponding number for the other RF antenna.

12. The method of claim 11, further comprising making a partial determination that the vehicle is straddling between the adjacent lanes if the number of times data is read on one of the RF antennas is close to the corresponding number for the other RF antenna.

13. The method of claim 4, further comprising:

determining how many lane straddling sensors are reported activated;

determining that the vehicle is not straddling between adjacent lanes if more than one lane straddling sensors are reported activated; and determining that the vehicle is straddling between adjacent lanes if only a diamond sensor straddling the adjacent lanes is reported activated.

* * * * *